US011758298B2

(12) United States Patent
Nagumo et al.

(10) Patent No.: US 11,758,298 B2
(45) Date of Patent: Sep. 12, 2023

(54) IMAGE PROCESSING APPARATUS AND METHOD

(71) Applicant: SONY CORPORATION, Tokyo (JP)

(72) Inventors: Takefumi Nagumo, Tokyo (JP); Toshinori Ihara, Tokyo (JP); Takuya Kitamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 350 days.

(21) Appl. No.: 17/058,084

(22) PCT Filed: May 17, 2019

(86) PCT No.: PCT/JP2019/019642
§ 371 (c)(1),
(2) Date: Nov. 23, 2020

(87) PCT Pub. No.: WO2019/230443
PCT Pub. Date: Dec. 5, 2019

(65) Prior Publication Data
US 2021/0266478 A1 Aug. 26, 2021

(30) Foreign Application Priority Data

Jun. 1, 2018 (JP) ................................. 2018-106013

(51) Int. Cl.
H04N 25/60 (2023.01)
G06T 7/207 (2017.01)

(52) U.S. Cl.
CPC ............. H04N 25/60 (2023.01); G06T 7/207 (2017.01); G06T 2207/10036 (2013.01)

(58) Field of Classification Search
None
See application file for complete search history.

(56) References Cited

U.S. PATENT DOCUMENTS 7,349,023 B2 * 3/2008 Kojima .................. H04N 19/80
375/E7.193
9,955,160 B1 * 4/2018 Yadav .................. H04N 19/154
(Continued)

FOREIGN PATENT DOCUMENTS

JP 2001-086496 A 3/2001
JP 2003-143625 A 5/2003
(Continued)

OTHER PUBLICATIONS

English translation of JP 2003143625 A Miyazaki, May 2003 (Year: 2003).*

(Continued)

Primary Examiner — James M Hannett
(74) Attorney, Agent, or Firm — CHIP LAW GROUP

(57) ABSTRACT

The present disclosure relates to image processing apparatus and method that can suppress the increase in the load of processing multi-wavelength data. A subject is imaged to generate multi-wavelength data that is image data including four or more wavelength components, the generated multi-wavelength data is encoded to generate encoded data of the multi-wavelength data, and the generated encoded data is transmitted. The present disclosure can be applied to, for example, an image processing apparatus, an image encoding apparatus, an image decoding apparatus, an imaging element, an imaging apparatus, or the like.

18 Claims, 86 Drawing Sheets

(56) References Cited

U.S. PATENT DOCUMENTS

| | | | |
|---|---|---|---|
| 2004/0252894 A1* | 12/2004 | Miyanohara | H04N 19/176 375/E7.176 |
| 2008/0001802 A1* | 1/2008 | Higuchi | H04N 25/60 348/E5.079 |
| 2008/0075163 A1* | 3/2008 | Brydon | H04N 19/184 375/E7.17 |
| 2008/0224913 A1* | 9/2008 | Suzuki | H04N 25/00 348/E5.078 |
| 2009/0141974 A1 | 6/2009 | Ono | |
| 2015/0103215 A1* | 4/2015 | Sugiyama | H04N 19/44 348/272 |

FOREIGN PATENT DOCUMENTS

| | | | |
|---|---|---|---|
| JP | 2003143625 A | * | 5/2003 |
| JP | 2005-277742 A | | 10/2005 |
| JP | 2008-136251 A | | 6/2008 |
| JP | 2008-227876 A | | 9/2008 |
| JP | 2009-134383 A | | 6/2009 |
| JP | 2017-201317 A | | 11/2017 |
| JP | 2017-220828 A | | 12/2017 |

OTHER PUBLICATIONS

International Search Report and Written Opinion of PCT Application No. PCT/JP2019/019642, dated Jul. 16, 2019, 11 pages of ISRWO.

* cited by examiner

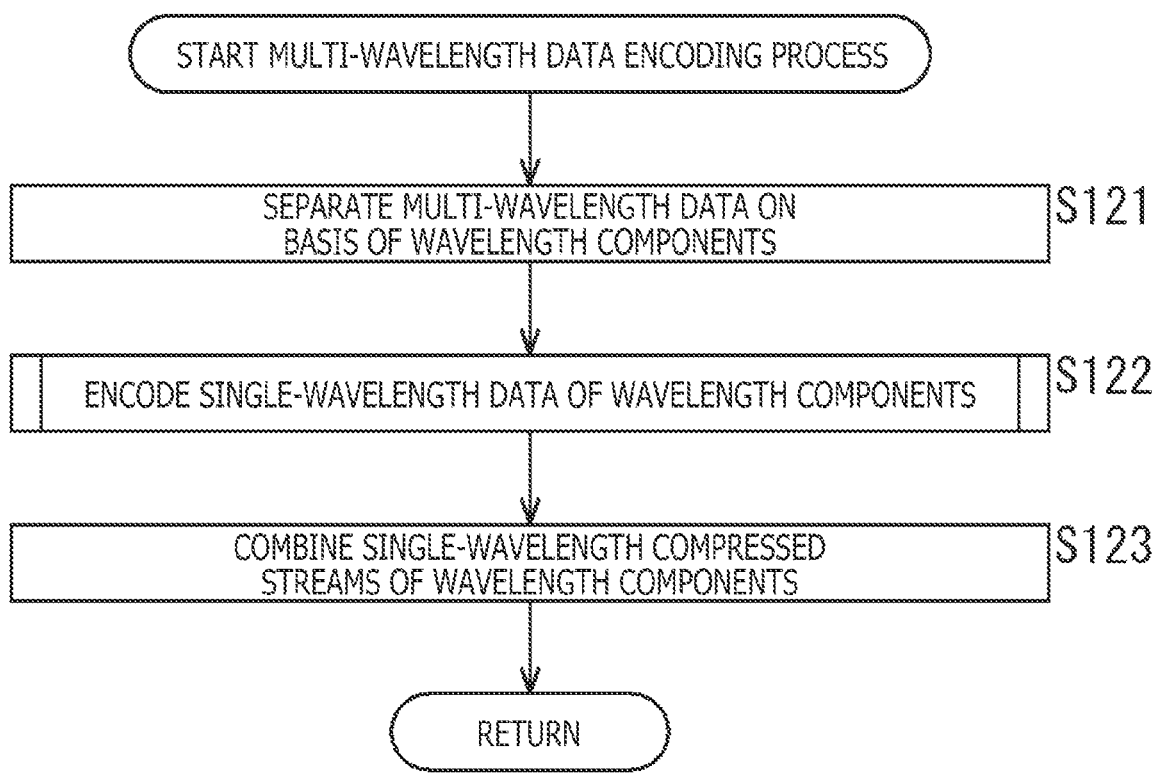

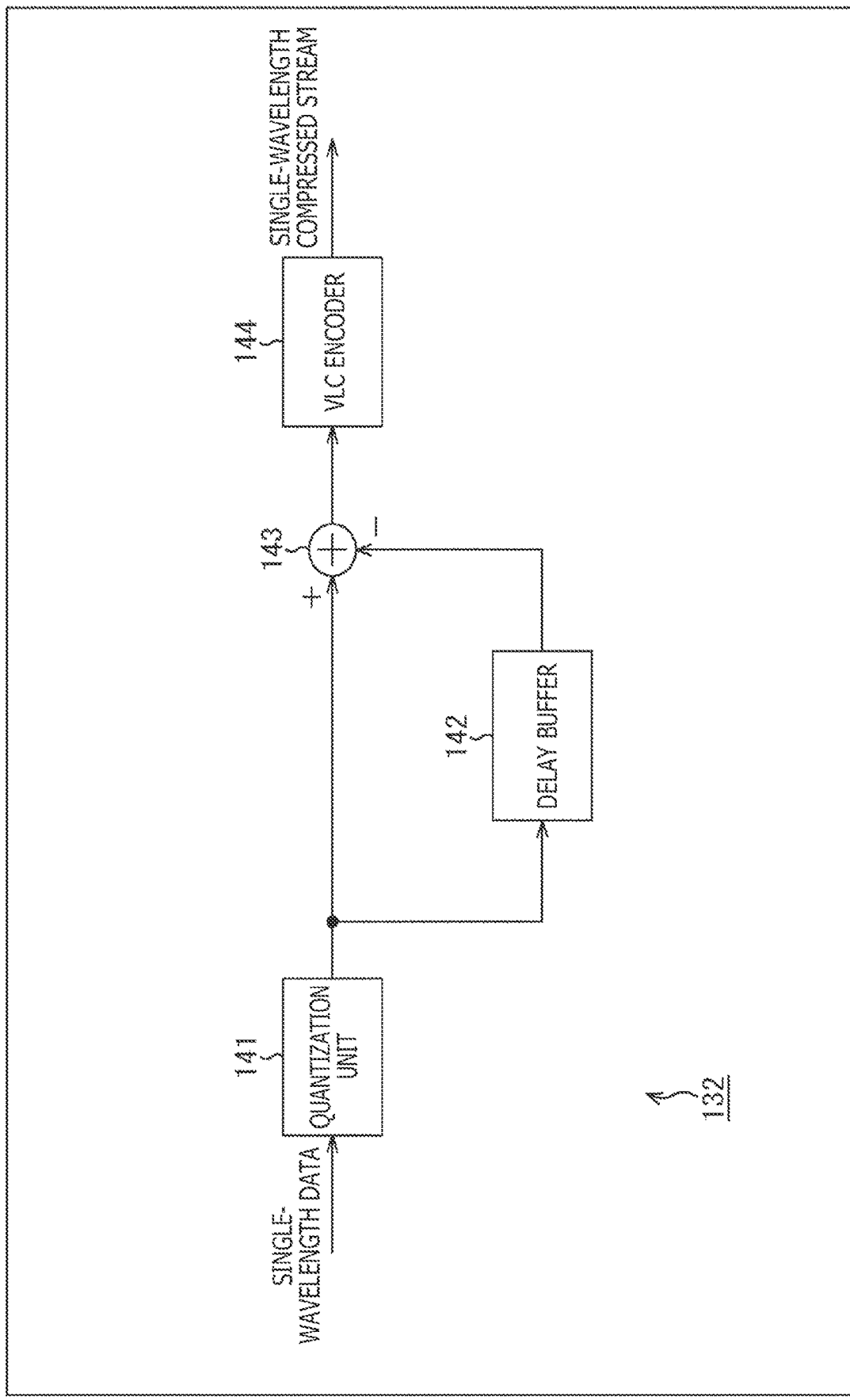

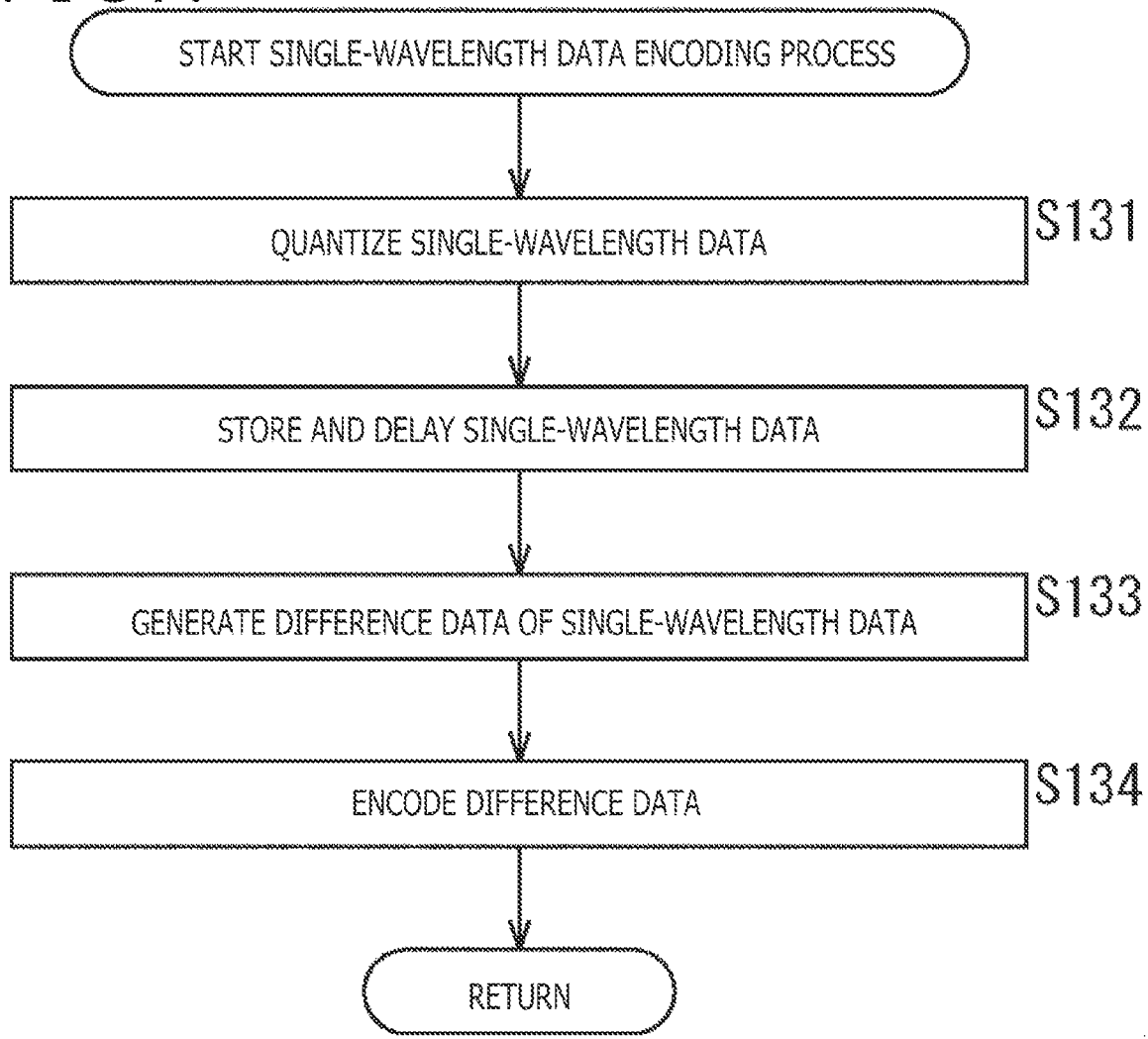

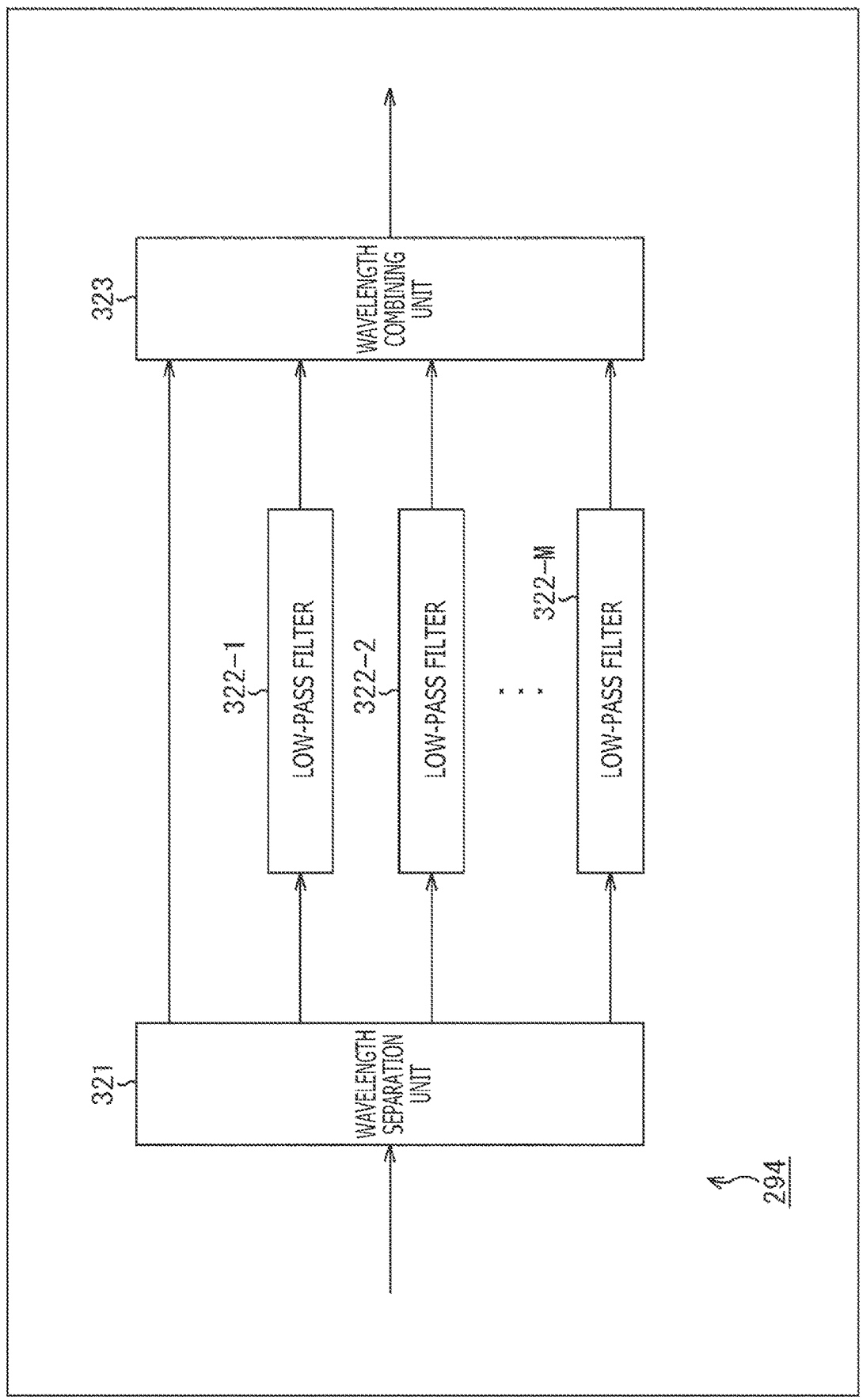

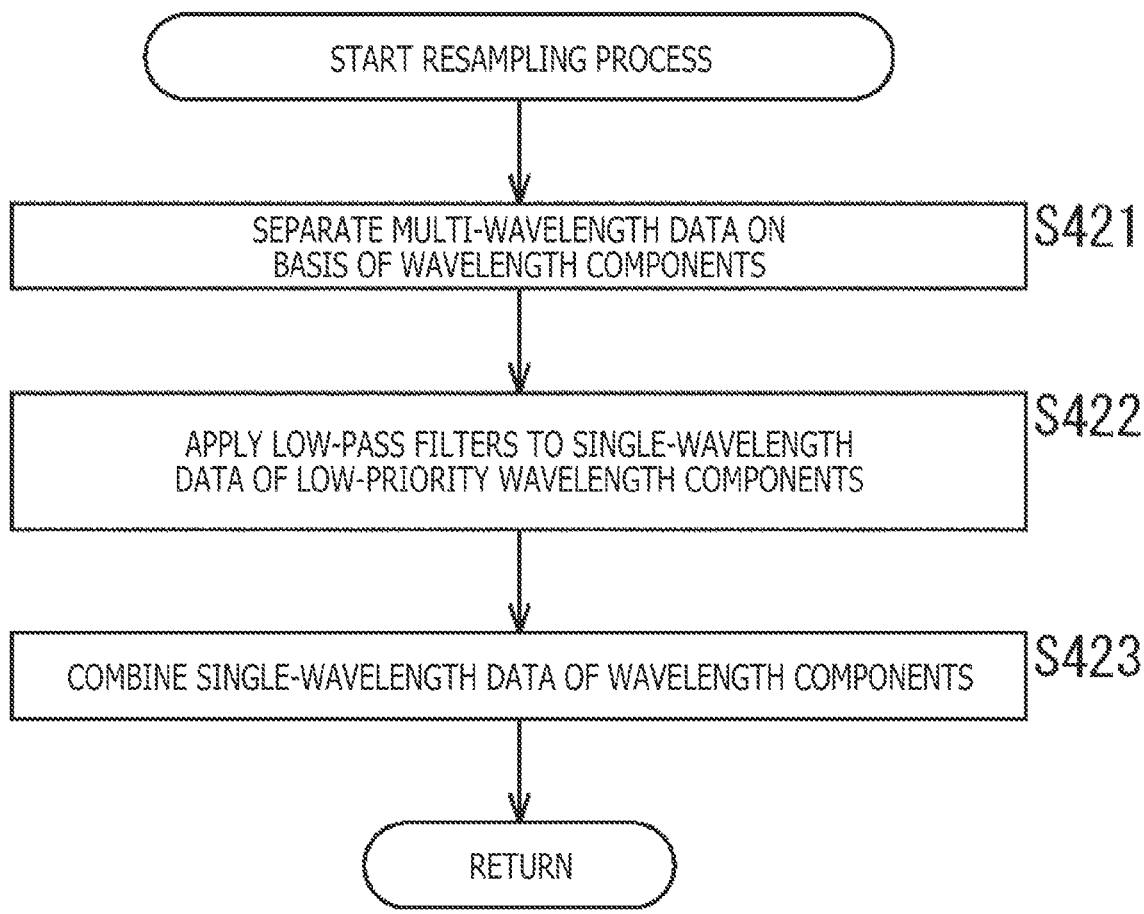

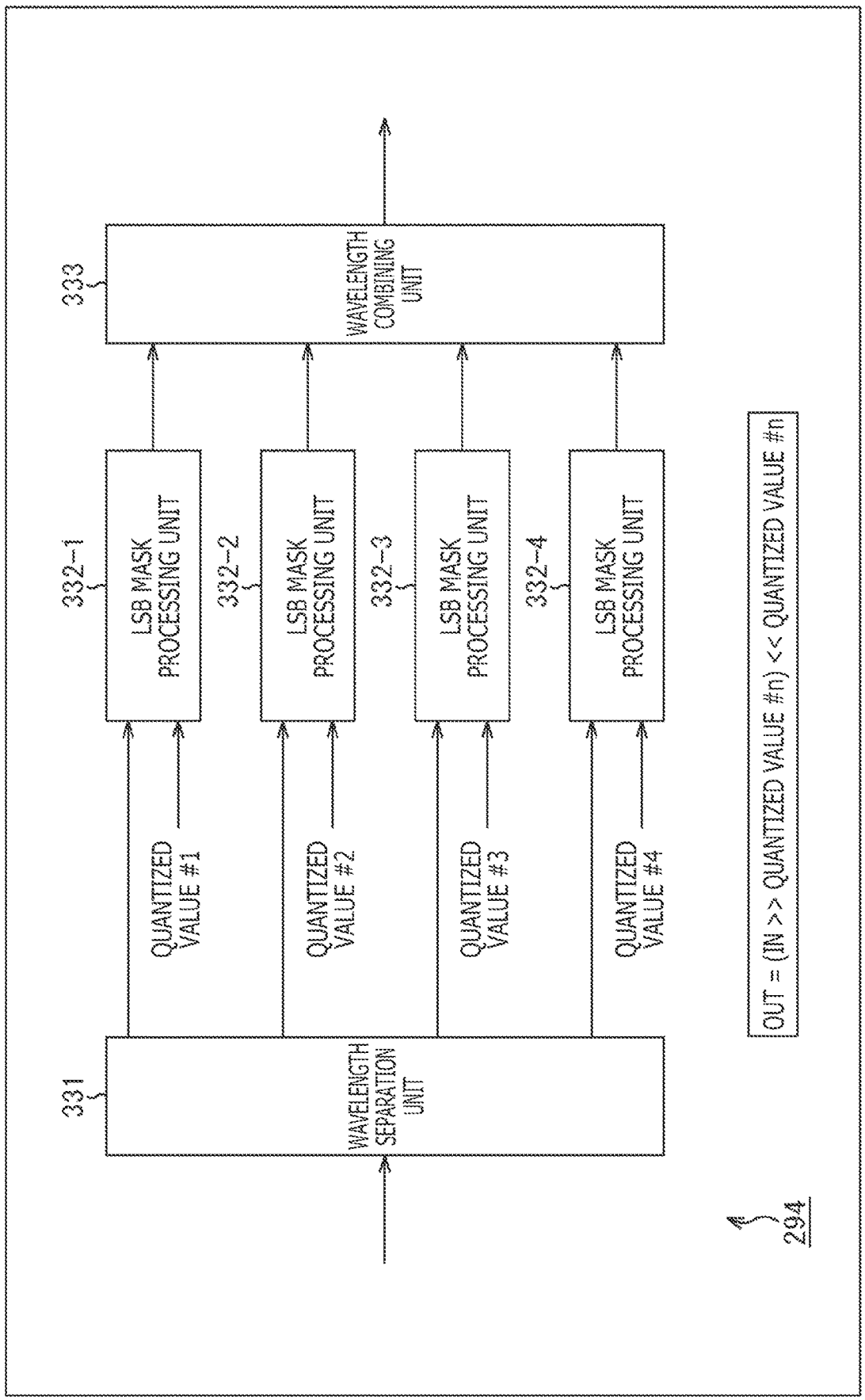

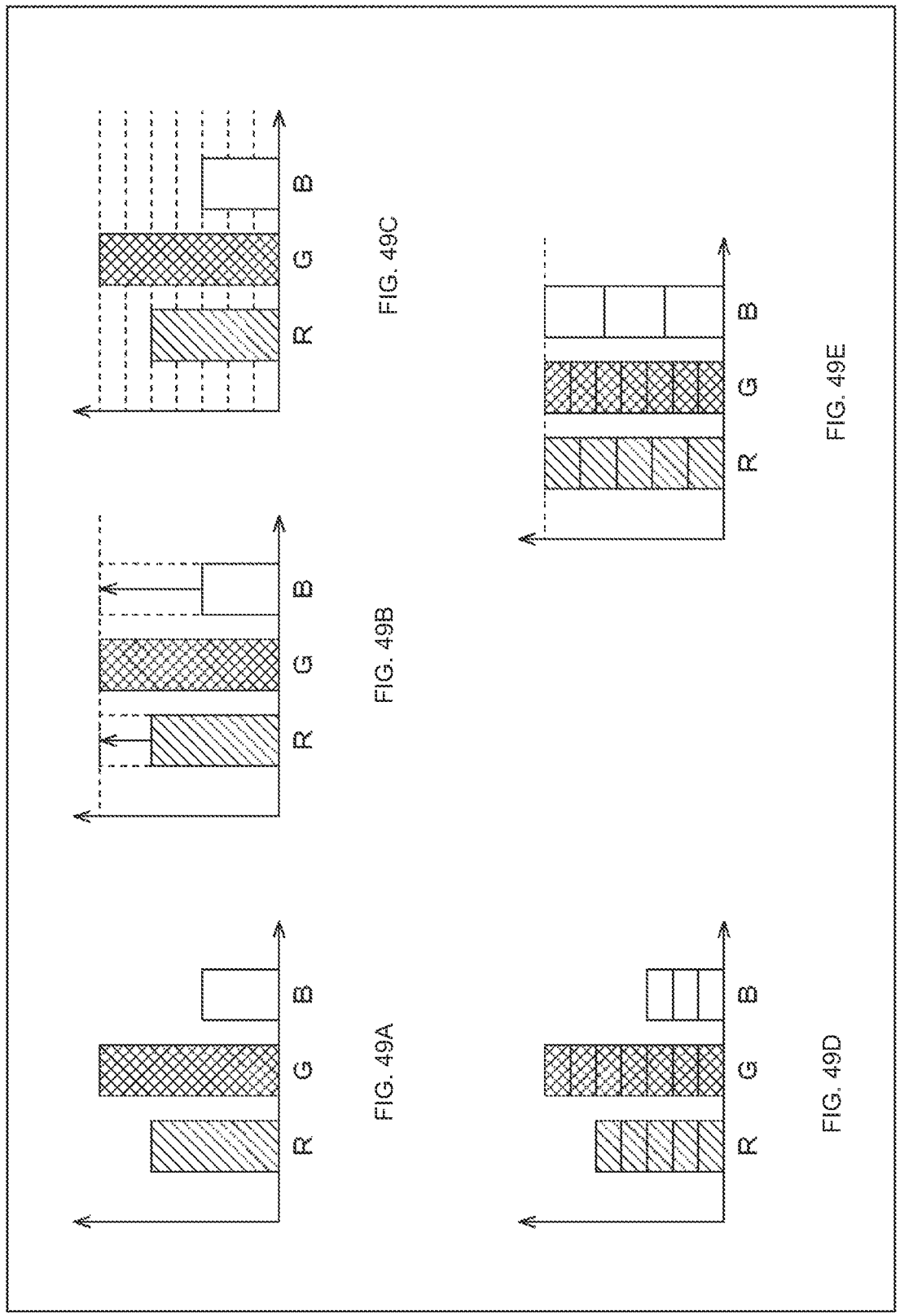

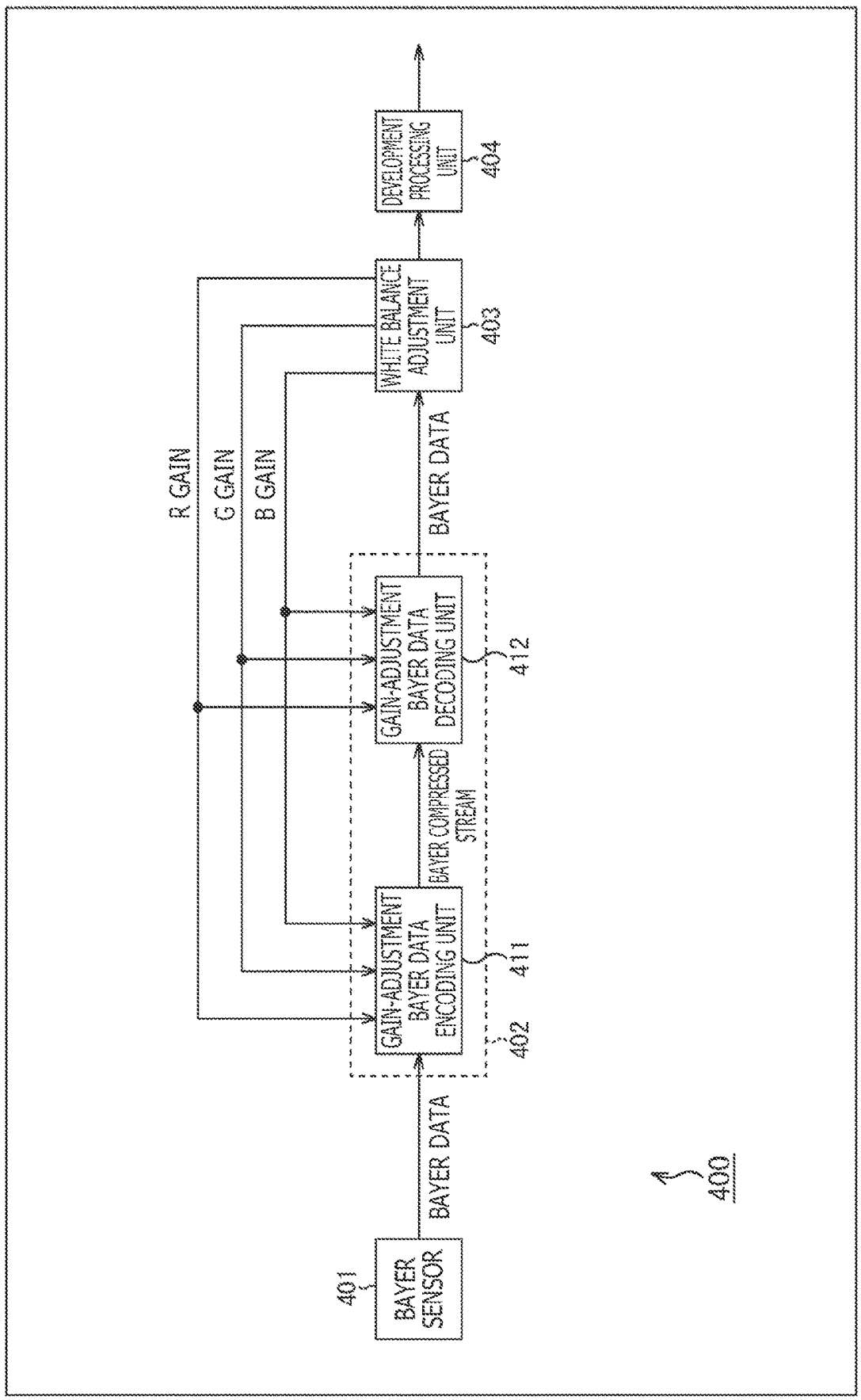

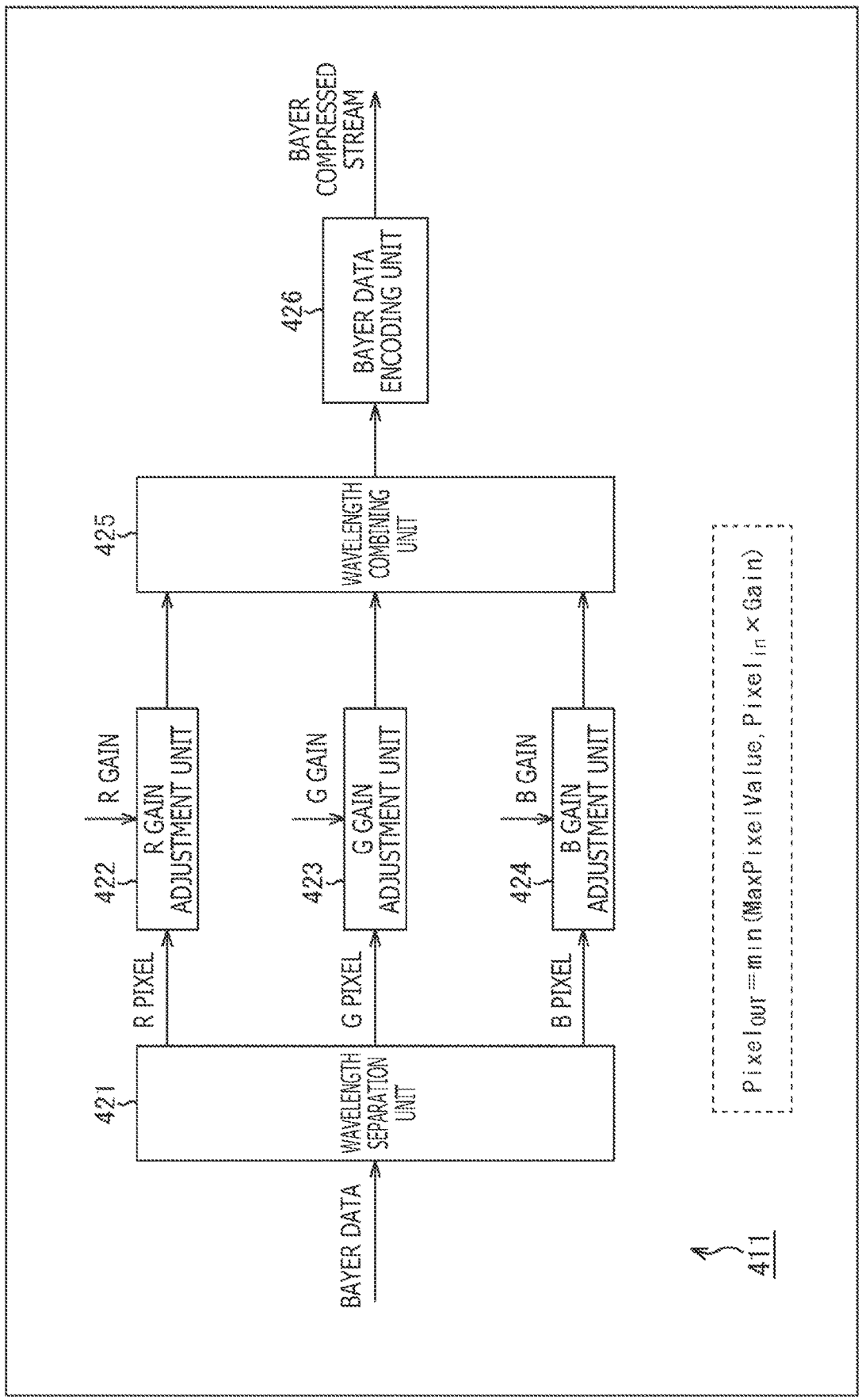
F I G. 5 2

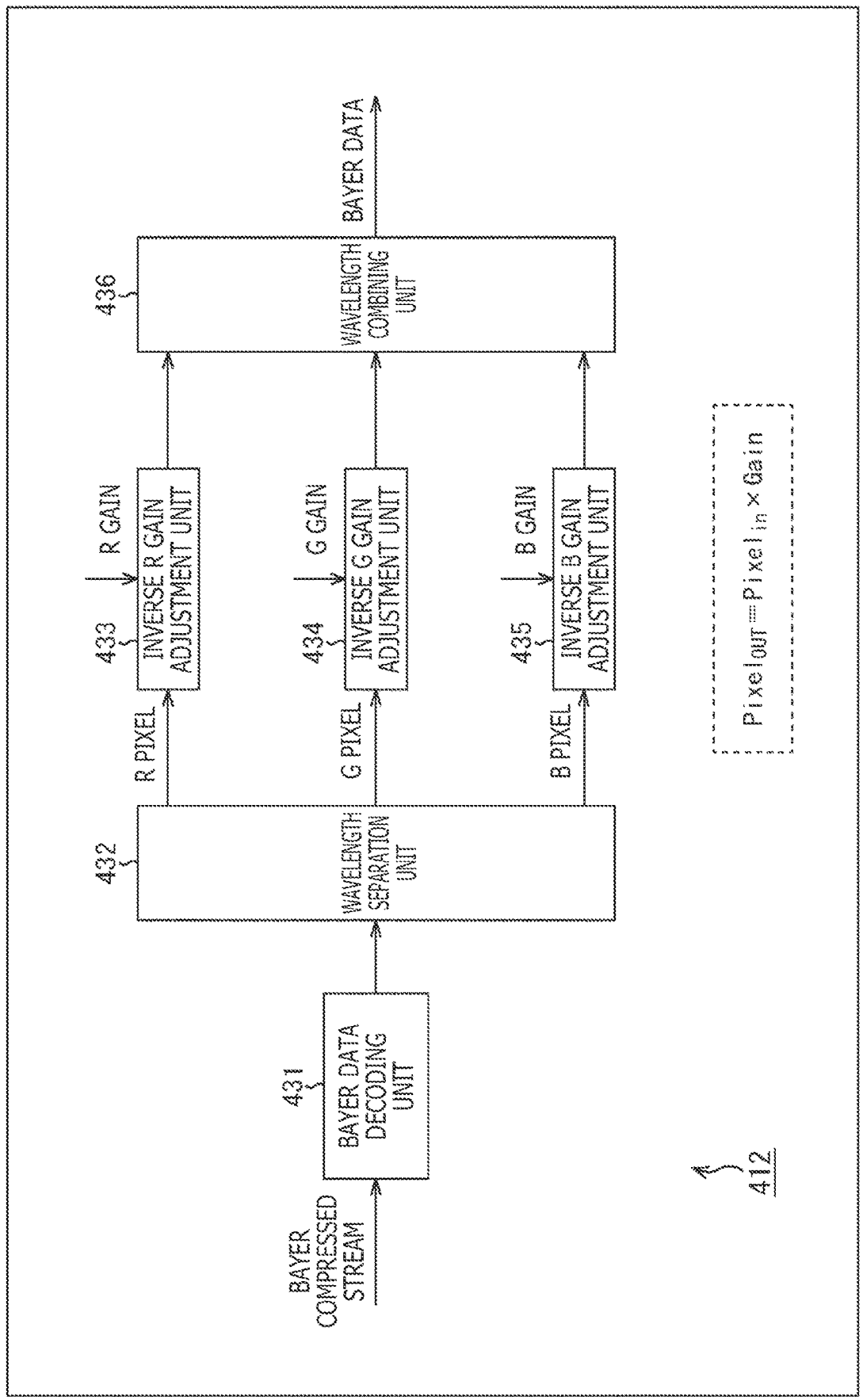

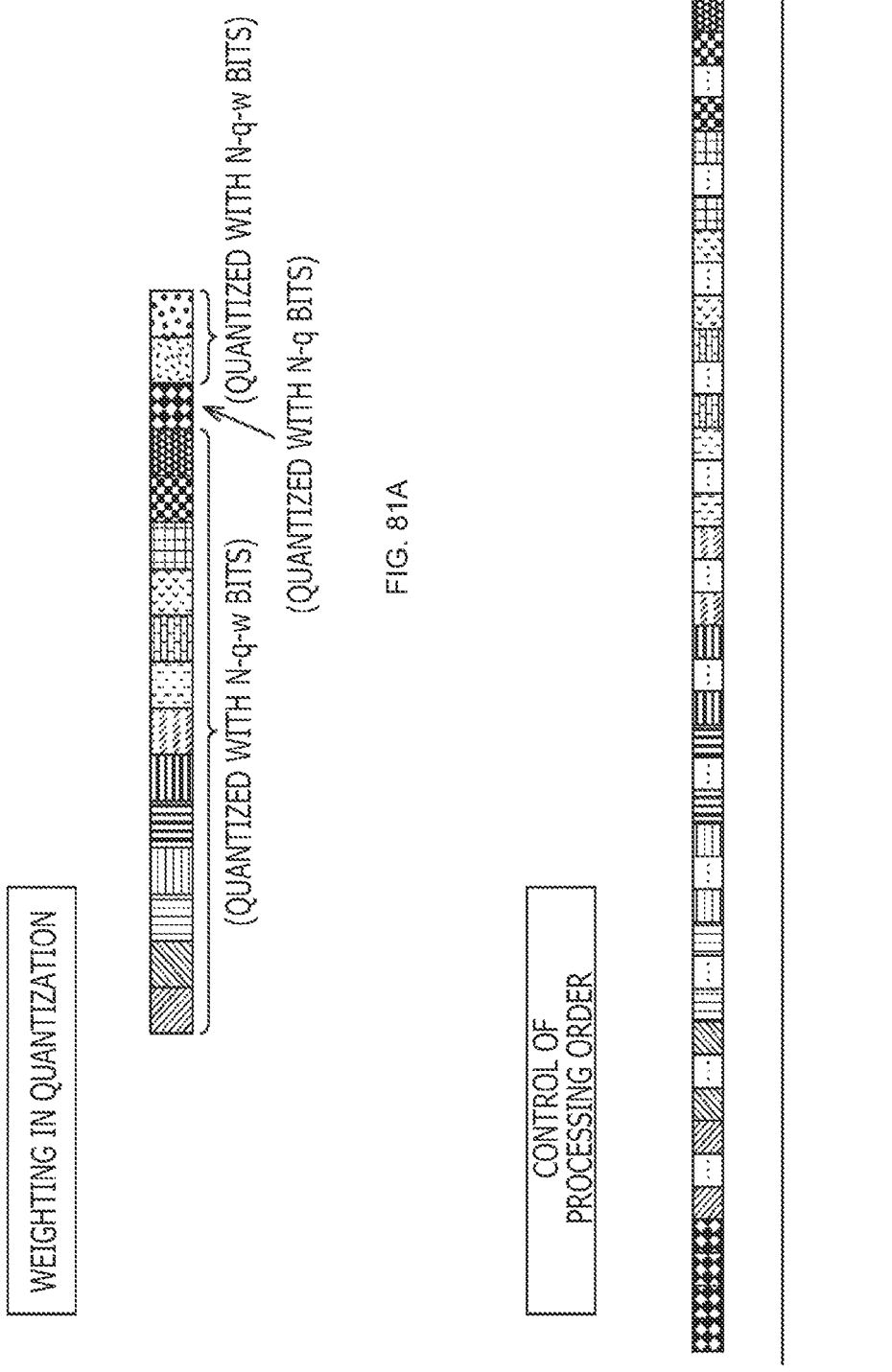

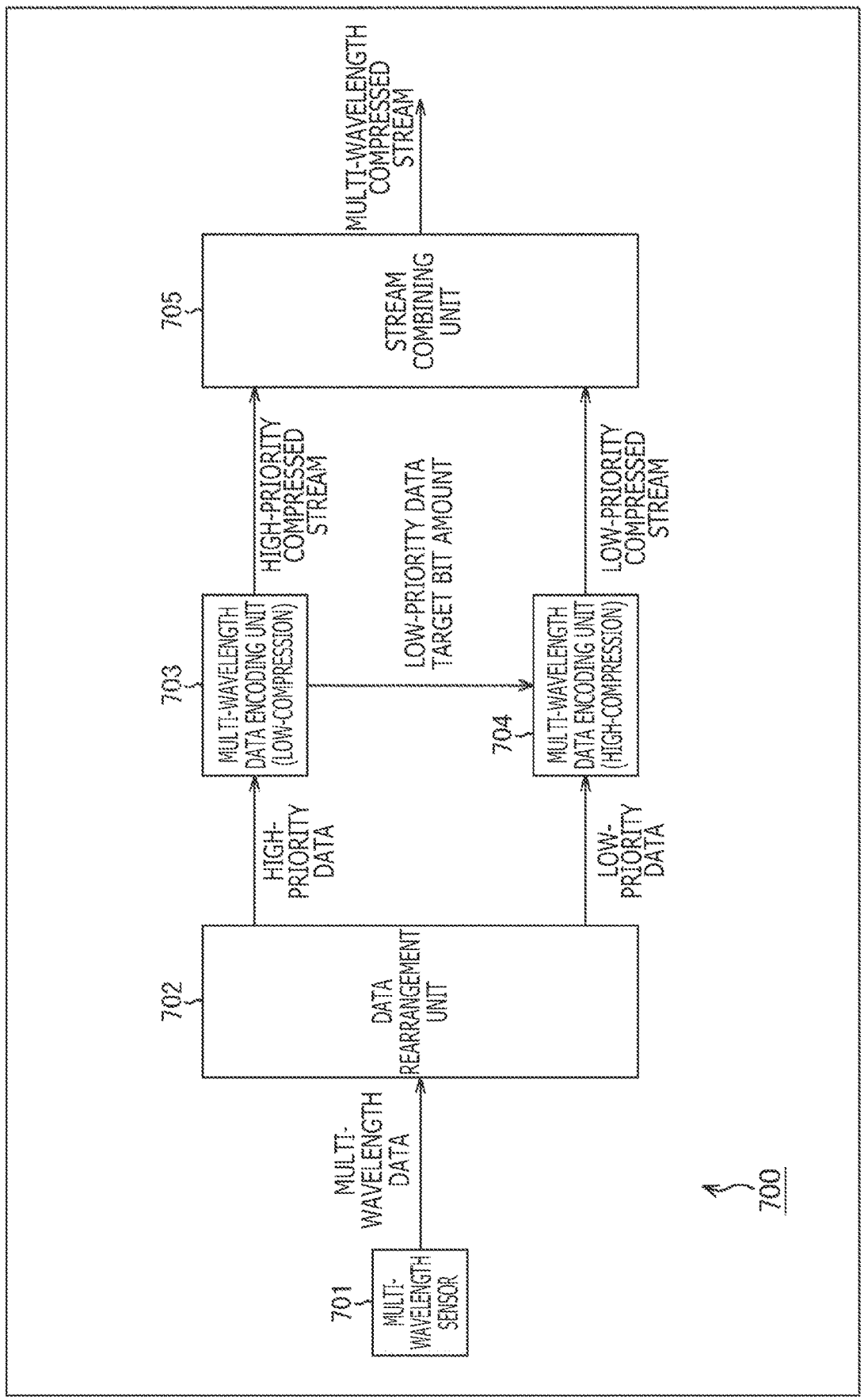
F I G . 8 2

FIG. 83A HIGH-PRIORITY DATA ENCODING

FIG. 83B LOW-PRIORITY DATA ENCODING

FIG. 83C SUPPLY stuffing bit

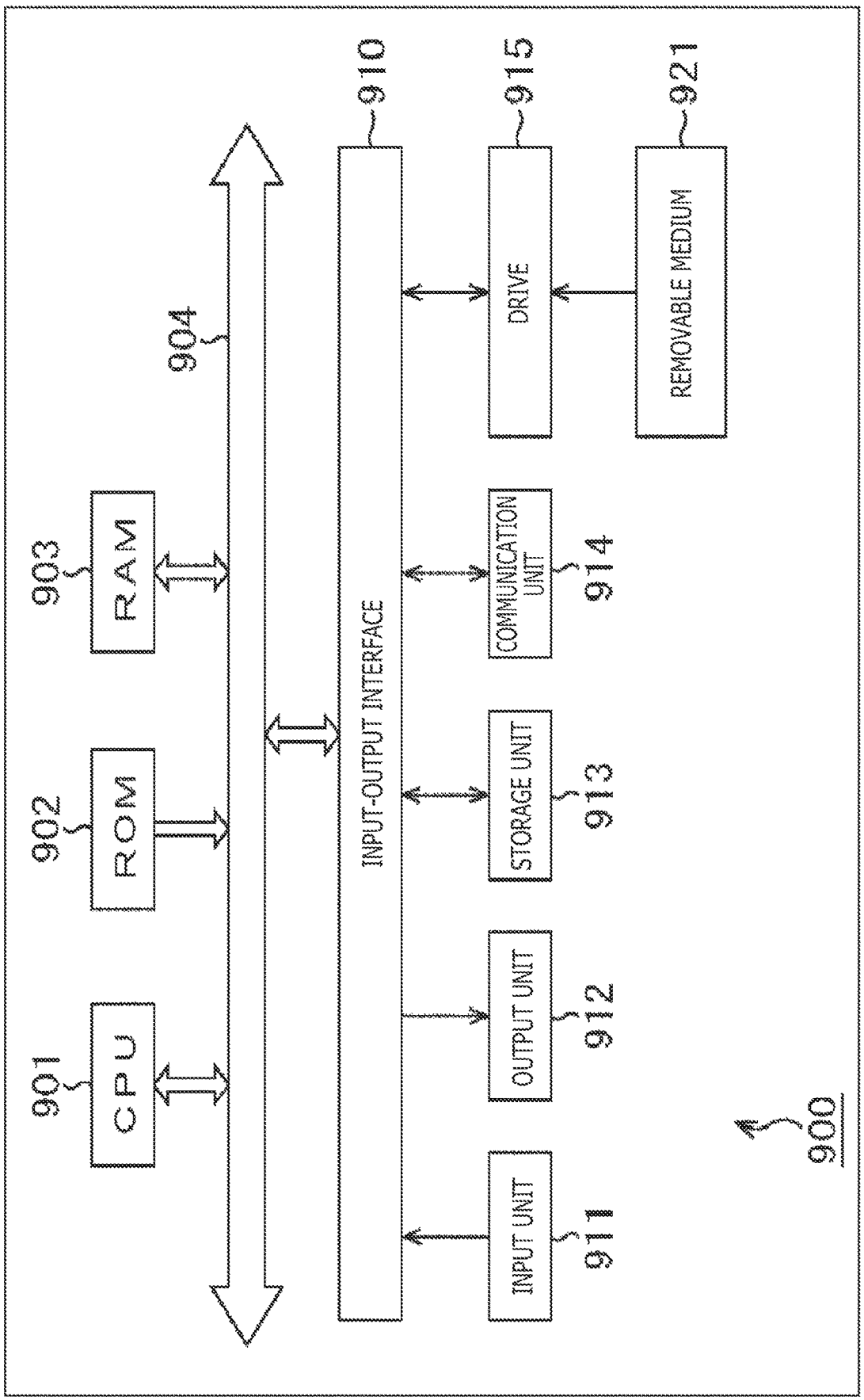

IMAGE PROCESSING APPARATUS AND METHOD

CROSS REFERENCE TO RELATED APPLICATIONS

This application is a U.S. National Phase of International Patent Application No. PCT/JP2019/019642 filed on May 17, 2019, which claims priority benefit of Japanese Patent Application No. JP 2018-106013 filed in the Japan Patent Office on Jun. 1, 2018. Each of the above-referenced applications is hereby incorporated herein by reference in its entirety.

TECHNICAL FIELD

The present disclosure relates to an image processing apparatus and method, and particularly, to an image processing apparatus and method that can suppress an increase in the load of processing multi-wavelength data.

BACKGROUND ART

In the past, there has been an imaging element that can image a subject to acquire multi-wavelength data that is image data including four or more wavelength components (for example, see PTL 1 and PTL 2).

For example, the multi-wavelength data obtained by using the imaging element can be used to perform what is generally called precision agriculture.

CITATION LIST

Patent Literature

[PTL 1]
Japanese Patent Laid-Open No. 2008-136251
[PTL 2]
Japanese Patent Laid-Open No. 2017-201317

SUMMARY

Technical Problems

However, the amount of data of the multi-wavelength data is large, and the load of processing may increase. This may increase the cost.

The present disclosure has been made in view of the circumstances, and the present disclosure can suppress an increase in the load of processing multi-wavelength data.

Solution to Problems

An aspect of the present technique provides an image processing apparatus including an imaging unit that images a subject to generate multi-wavelength data that is image data including four or more wavelength components, an encoding unit that encodes the multi-wavelength data generated by the imaging unit to generate encoded data of the multi-wavelength data, and a transmission unit that transmits the encoded data generated by the encoding unit.

An aspect of the present technique provides an image processing method including imaging a subject to generate multi-wavelength data that is image data including four or more wavelength components, encoding the generated multi-wavelength data to generate encoded data of the multi-wavelength data, and transmitting the generated encoded data.

Another aspect of the present technique provides an image processing apparatus including an imaging unit that images a subject to generate image data including a plurality of wavelength components, and an encoding unit that uses quantized values on the basis of the wavelength components to quantize and encode the image data generated by the imaging unit.

Another aspect of the present technique provides an image processing method including imaging a subject to generate image data including a plurality of wavelength components, and using quantized values on the basis of the wavelength components to quantize and encode the generated image data.

Yet another aspect of the present technique provides an image processing apparatus including an imaging unit that images a subject to generate multi-wavelength data that is image data including four or more wavelength components, a quantization unit that quantizes the multi-wavelength data generated by the imaging unit so that only a predetermined wavelength component is quantized by using a quantized value smaller than in other wavelength components, and an encoding unit that encodes the multi-wavelength data quantized by the quantization unit to generate encoded data of the multi-wavelength data.

Yet another aspect of the present technique provides an image processing method including imaging a subject to generate multi-wavelength data that is image data including four or more wavelength components, quantizing the generated multi-wavelength data so that only a predetermined wavelength component is quantized by using a quantized value smaller than in other wavelength components, and encoding the quantized multi-wavelength data to generate encoded data of the multi-wavelength data.

In the image processing apparatus and method according to an aspect of the present technique, the subject is imaged to generate the multi-wavelength data that is image data including four or more wavelength components, the generated multi-wavelength data is encoded, the encoded data of the multi-wavelength data is generated, and the generated encoded data is transmitted.

In the image processing apparatus and method according to another aspect of the present technique, the subject is imaged to generate image data including a plurality of wavelength components, and the quantized values on the basis of the wavelength components are used to quantize and encode the generated image data.

In the image processing apparatus and method according to yet another aspect of the present technique, the subject is imaged to generate the multi-wavelength data that is image data including four or more wavelength components, the generated multi-wavelength data is quantized so that only a predetermined wavelength component is quantized by using a quantized value smaller than in other wavelength components, and the quantized multi-wavelength data is encoded to generate encoded data of the multi-wavelength data.

Advantageous Effects of Invention

According to the present disclosure, an image can be processed. Particularly, an increase in the load of processing multi-wavelength data can be suppressed.

BRIEF DESCRIPTION OF DRAWINGS

FIG. 5 is a flow chart describing an example of a flow of a multi-wavelength data encoding process.

FIG. 6 is a block diagram illustrating a main configuration example of a single-wavelength data encoding unit.

FIG. 7 is a flow chart describing an example of a flow of a single-wavelength data encoding process.

FIG. 44 is a block diagram illustrating a main configuration example of the resampling unit.

FIG. 45 is a flow chart describing an example of a flow of the resampling process.

FIG. 46 is a block diagram illustrating a main configuration example of the resampling unit.

FIGS. 47A and 47B are diagrams illustrating an example of a state of LSB mask processing.

FIGS. 49A, 49B, 49C, 49D, and 49E are diagrams illustrating an example of a state of quantization.

FIG. 51 is a block diagram illustrating a main configuration example of an imaging apparatus.

FIG. 52 is a block diagram illustrating a main configuration example of a gain-adjustment Bayer data encoding unit.

FIG. 53 is a block diagram illustrating a main configuration example of a gain-adjustment Bayer data decoding unit.

FIGS. 81A and 81B are diagrams illustrating an example of a state of processing the multi-wavelength data.

FIG. 82 is a block diagram illustrating a main configuration example of the imaging apparatus.

FIGS. 83A, 83B, and 83C are diagrams illustrating an example of a state of fixed-length encoding.

FIG. 90 is a block diagram illustrating a main configuration example of a computer.

DESCRIPTION OF EMBODIMENTS

Figure 1:
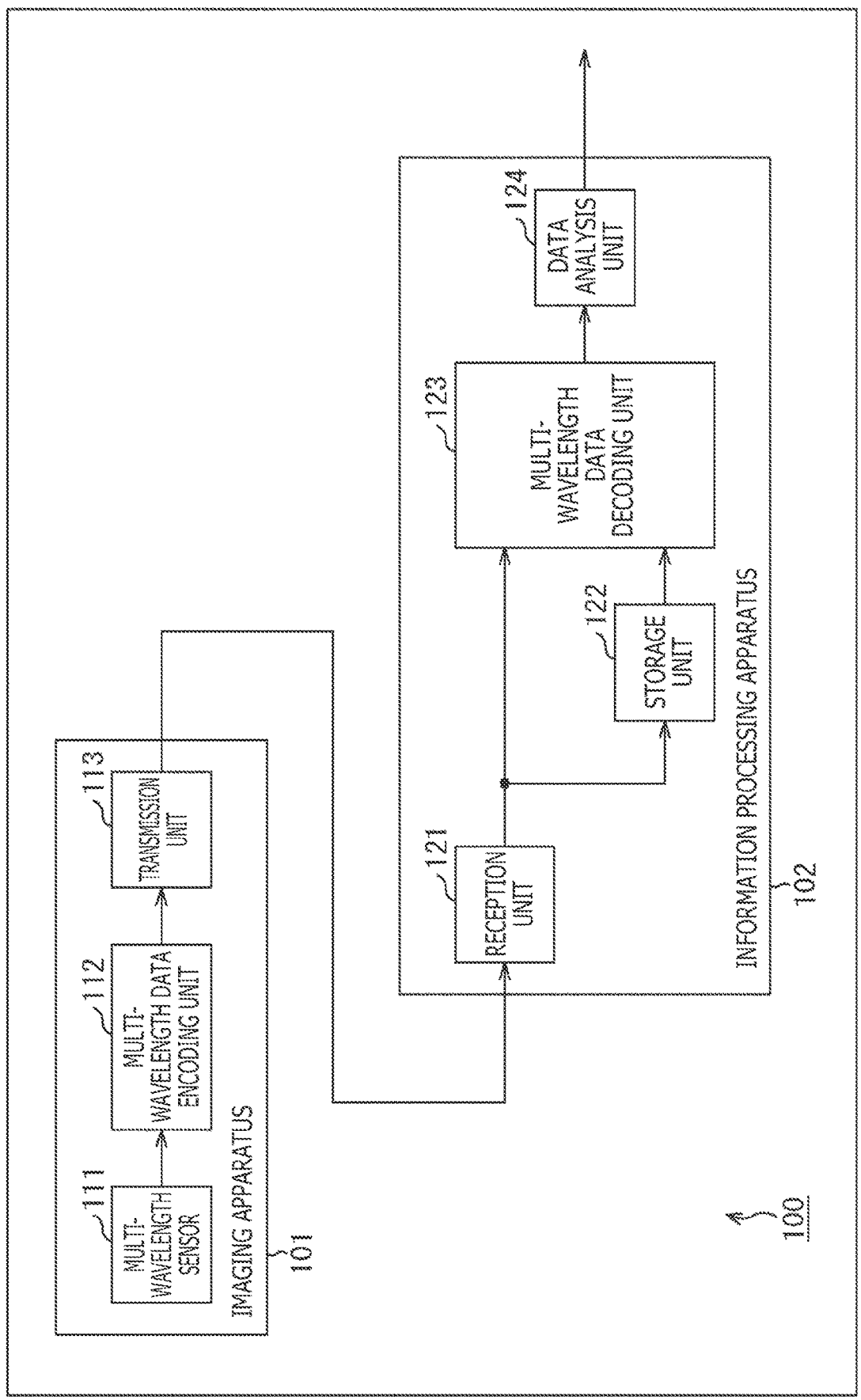
FIG. 1 is a block diagram illustrating a main configuration example of an image processing system according to the present technique.

Hereinafter, modes for carrying out the present disclosure (hereinafter, referred to as embodiments) will be described. Note that the embodiments will be described in the following order.
1. Description of Common Technique
2. First Embodiment (Transmission of Multi-Wavelength Data)
3. Second Embodiment (Storage of Multi-Wavelength Data)
4. Third Embodiment (Quantization Control on the Basis of Wavelength Components)
5. Fourth Embodiment (Protection of Specific Wavelength Components)
6. Additional Remarks 1. Description of Common Technique <Literature and the Like Supporting Technical Content and Technical Terms>

The scope disclosed in the present technique includes not only the content described in the embodiments, but also the content described in the following Literature publicly known at the time of the application.
PTL 1: (described above)
PTL 2: (described above)
Non Patent Literature 1: http://www.secure-drone.org/precision-agriculture/
Non Patent Literature 2: https://www.optim.co.jp/it-industry/agriculture/case-study/tpa/
Non Patent Literature 3: https://ja.wikipedia.org/wiki/NDVI
Non Patent Literature 4: https://www.sci.osaka-cu.ac.jp/~masumoto/vuniv2000/gis09.html
Non Patent Literature 5: http://www.ebajapan.jp/spectral.html
Non Patent Literature 6: https://www.argocorp.com/cam/special/HeadWall/how_it_works.html
Non Patent Literature 7: https://www.klv.co.jp/product/easy_hyperspectral3.html That is, the content described in the literature is also a basis for judging the support requirements.

<Multi-Wavelength Data>

In the past, there has been an imaging element that can image a subject to acquire a multispectral image that is image data including four or more wavelength components as described in, for example, Patent Literature 1 or Patent Literature 2.

In recent years, what is generally called precision agriculture is considered, in which multi-wavelength data obtained by using the imaging element is used to perform production control of agriculture or the like.

In the precision agriculture, for example, an artificial satellite, an aerial photography helicopter, a drone, or the like is used to image multi-wavelength data or the like necessary for figuring out the growth conditions of plants. The multi-wavelength data of the captured image obtained by the devices is transmitted to an analysis system including a server (cloud) and the like, and the data is analyzed. In a case where the cultivation conditions are poor based on the analysis result, information of additional fertilization or the like is provided.

In addition, the multi-wavelength data is stored in the server (cloud) or the like, and the multi-wavelength data is used at any timing. For example, the stored multi-wavelength data is used to figure out the growth conditions of plants performed at later timing, such as, for example, after several days and after several months.

For example, the multi-wavelength data can be used to detect NDVI (Normalized Difference Vegetation Index) and the like. The index is used to figure out the cultivation conditions and the like of the crops to take a measure such as additional fertilization.

An imaging apparatus that can generate image data including four or more wavelength components is used to image the multi-wavelength data. An example of the imaging apparatus includes a hyperspectral camera. The hyper spectrum is a spectrum divided into several dozen or more bands (types). The hyperspectral information can be acquired to capture characteristics and information of the target that cannot be captured by human eyes or existing RGB cameras.

The hyperspectral camera is a camera that can acquire the hyperspectral information of each image pixel to acquire two-dimensional spatial information and hyperspectral information at the same time. For example, the hyperspectral camera obtains a spectrum of the wavelengths from 350 nm (near ultraviolet) to 1100 nm (near infrared) at predetermined wavelength intervals to generate the hyperspectral information. For example, the hyperspectral camera uses line spectroscopy to obtain a spectrum corresponding to one horizontal line of the measured view in the vertical direction and uses a two-dimensional detector to detect horizontal spatial information and spectroscopic information of the horizontal spatial information. First, the light reflected by the measurement target goes through an optical lens and passes through an entrance slit. The light goes toward a spectroscopic engine (grating) through a collimation mirror, and a spectrum of the light corresponding to one horizontal line is obtained there. The spectrum of the light goes toward the two-dimensional detector through a focusing mirror, and the spectrum of the light is detected, with the horizontal axis as the spatial information and the vertical axis as the wavelength information.

In a case of generating visualized data from the multi-wavelength data, the measurement target or the camera can be moved to measure a plurality of horizontal lines to thereby generate a two-dimensional image.

The information is used in various fields, such as industry, agriculture, analysis, biotechnology, and remote sensing. For example, the information is used for sorting in recycling, measurement of distribution range of alien plants, and the like.

<Processing Load of Multi-Wavelength Data>

However, the amount of data of the multi-wavelength data is large, and the load of processing may increase. This may increase the cost. For example, in the precision agriculture, the multi-wavelength data generated by the imaging apparatus of the terminal is transmitted to the server (cloud) or the like and used. However, the amount of data of the multi-wavelength data is large, and this may increase the power consumption and the cost, such as access fee, in the transmission. Furthermore, the time required for the transmission may also be long in a case where the communication line cannot be sufficiently secured.

2. First Embodiment

<2-1. Encoding and Transmission of Multi-Wavelength Data>

Therefore, the multi-wavelength data is encoded (compressed), and the encoded data is transmitted. For example, a subject is imaged to generate multi-wavelength data that is image data including four or more wavelength components. The generated multi-wavelength data is encoded to generate encoded data of the multi-wavelength data, and the generated encoded data is transmitted. For example, provided is an image processing apparatus including an imaging unit that images a subject to generate multi-wavelength data that is image data including four or more wavelength components, an encoding unit that encodes the multi-wavelength data generated by the imaging unit to generate encoded data of the multi-wavelength data, and a transmission unit that transmits the encoded data generated by the encoding unit.

In such a way, an increase in the amount of transmitted data can be suppressed. That is, an increase in the load of processing the multi-wavelength data can be suppressed.

<Image Processing System>

FIG. 1 is a block diagram illustrating an example of a configuration of an image processing system according to the present technique. An image processing system 100 illustrated in FIG. 1 includes an imaging apparatus 101 and an information processing apparatus 102. Multi-wavelength data generated by the imaging apparatus 101 is transmitted to the information processing apparatus 102 and processed. The image processing system 100 is an exemplification of a system used in, for example, precision agriculture or the like. For example, the imaging apparatus 101 denotes a terminal apparatus with an imaging function, such as the artificial satellite, the aerial photography helicopter, and the drone, and the information processing apparatus 102 denotes a computer (image processing apparatus), such as the server (cloud).

The imaging apparatus 101 includes a multi-wavelength sensor 111, a multi-wavelength data encoding unit 112, and a transmission unit 113. The multi-wavelength sensor 111 images a subject to generate multi-wavelength data. The multi-wavelength sensor 111 may be any device that can image a subject to generate multi-wavelength data. For example, the multi-wavelength sensor 111 may be the hyperspectral camera. The multi-wavelength data encoding unit 112 encodes the multi-wavelength data to generate encoded data of the multi-wavelength data. The encoding method is optional. The transmission unit 113 transmits the encoded data to the information processing apparatus 102. The communication system in the communication for transmitting the multi-wavelength data between the imaging apparatus 101 and the information processing apparatus 102 is optional. For example, the communication system may be wired communication or may be wireless communication.

The information processing apparatus 102 includes a reception unit 121, a storage unit 122, a multi-wavelength data decoding unit 123, and a data analysis unit 124. The reception unit 121 receives the encoded data of the multi-wavelength data transmitted from the imaging apparatus 101 (transmission unit 113). The reception unit 121 can supply the received encoded data to the storage unit 122 to cause the storage unit 122 to store the encoded data. The storage unit 122 includes, for example, any storage medium, such as a hard disk and a semiconductor memory, and stores the encoded data. In addition, the reception unit 121 can also supply the received encoded data to the multi-wavelength data decoding unit 123. The multi-wavelength data decoding unit 123 acquires the encoded data from the reception unit 121 or the storage unit 122 and decodes the encoded data to recover the multi-wavelength dSata. The decoding method can be any method corresponding to the encoding method of the multi-wavelength data encoding unit 112. The data analysis unit 124 analyzes the recovered multi-wavelength data and outputs the analysis result.

<Flow of Imaging Process>

An example of a flow of the imaging process executed by the imaging apparatus 101 will be described with reference to a flow chart of FIG. 2. Once the imaging process is started, the multi-wavelength sensor 111 images the subject to generate the multi-wavelength data in step S101. In step S102, the multi-wavelength data encoding unit 112 encodes the multi-wavelength data to generate the encoded data (multi-wavelength compressed stream). In step S103, the transmission unit 113 transmits the multi-wavelength compressed stream.

The multi-wavelength compressed stream transmitted by the imaging apparatus 101 is transmitted to the information processing apparatus 102.

<Flow of Multi-Wavelength Data Processing>

An example of a flow of the multi-wavelength data processing executed by the information processing apparatus 102 will be described with reference to a flow chart of FIG. 3. Once the multi-wavelength data processing is started, the reception unit 121 receives the multi-wavelength compressed stream transmitted from the imaging apparatus 101 in step S111. In step S112, the reception unit 121 determines whether or not to cause the storage unit 122 to store the received multi-wavelength compressed stream. In a case where the reception unit 121 determines to cause the storage unit 122 to store the multi-wavelength compressed stream, the storage unit 122 stores the multi-wavelength compressed stream in step S113. In a case where the reception unit 121 determines not to cause the storage unit 122 to store the multi-wavelength compressed stream, the process is skipped.

In step S114, the multi-wavelength data decoding unit 123 acquires and decodes the multi-wavelength compressed stream received by the reception unit 121 or the multi-wavelength compressed stream stored in the storage unit 122 to recover the multi-wavelength data. The data analysis unit 124 analyzes the recovered multi-wavelength data to create a report in step S115 and outputs the report in step S116.

In such a way, in the transmission of the multi-wavelength data from the imaging apparatus 101 to the information processing apparatus 102, the multi-wavelength data is encoded and (the encoded data is) transmitted. As a result, the increase in the amount of transmitted data can be suppressed. That is, the increase in the load of processing the multi-wavelength data can be suppressed.

<Multi-Wavelength Data Encoding Unit>

Figure 4:
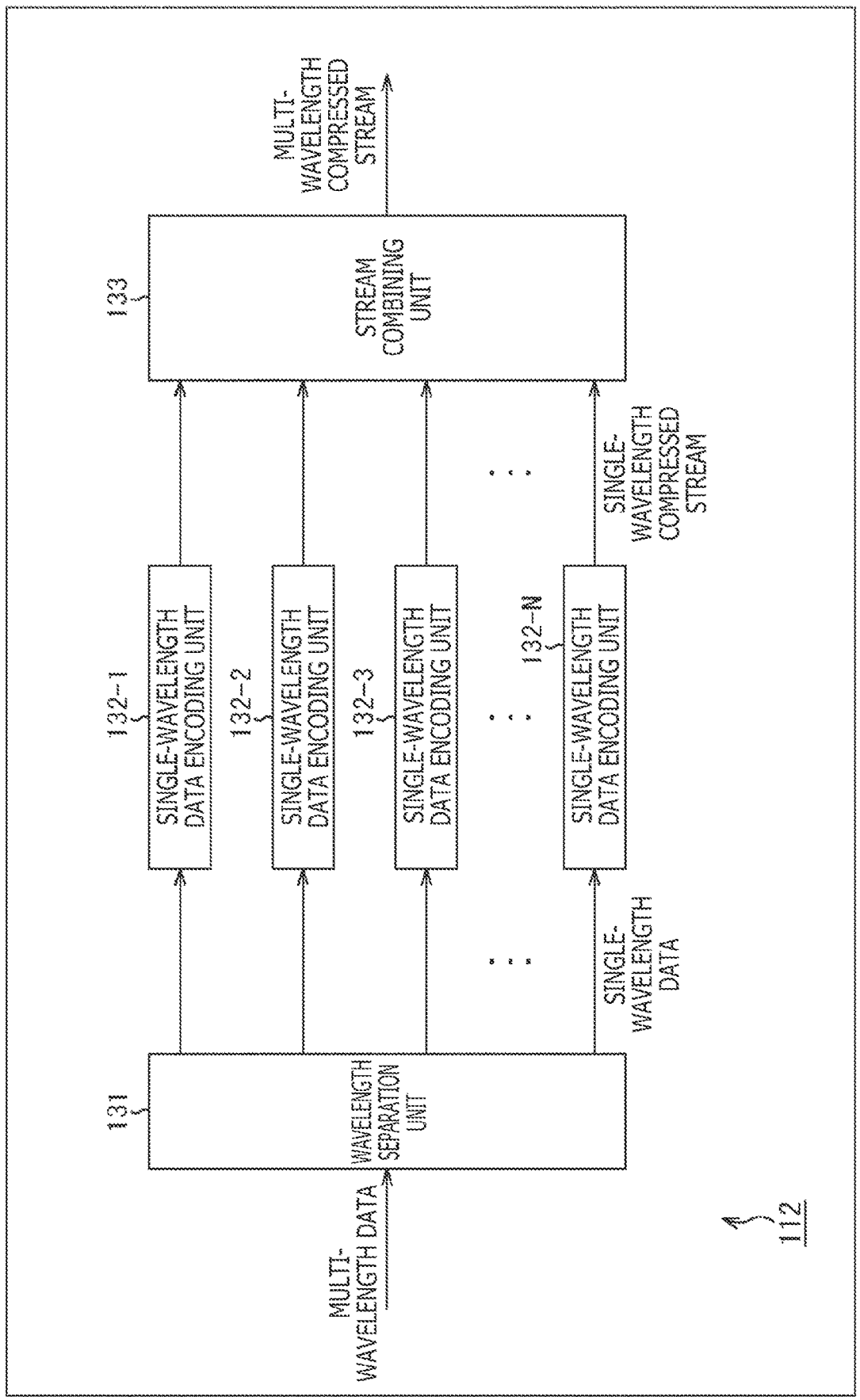
FIG. 4 is a block diagram illustrating a main configuration example of a multi-wavelength data encoding unit.

The multi-wavelength data may be independently encoded on the basis of, for example, wavelength components. FIG. 4 is a block diagram illustrating a main configuration example of the multi-wavelength data encoding unit 112 in this case. As illustrated in FIG. 4, the multi-wavelength data encoding unit 112 includes a wavelength separation unit 131, single-wavelength data encoding units 132-1 to 132-N (N is any natural number), and a stream combining unit 133. The single-wavelength data encoding units 132-1 to 132-N will be referred to as single-wavelength data encoding units 132 in a case where the units do not have to be distinguished from each other in the description.

The wavelength separation unit 131 separates the multi-wavelength data into data (single-wavelength data) on the basis of wavelength components. The single-wavelength data encoding units 132 are prepared on the basis of wavelength components. That is, the single-wavelength data encoding units 132-1 to 132-N encode the single-wavelength data of corresponding wavelength components, respectively, to generate encoded data (single-wavelength compressed streams) of the single-wavelength data. Note that the encoding method is optional. The stream combining unit 133 combines the single-wavelength compressed streams to generate a multi-wavelength compressed stream and outputs the multi-wavelength compressed stream (for example, supplies the multi-wavelength compressed stream to the transmission unit 113). The method of combining is optional.

<Flow of Multi-Wavelength Data Encoding Process>

An example of a flow of the multi-wavelength data encoding process executed in step S102 of FIG. 2 by the multi-wavelength data encoding unit 112 in this case will be described with reference to a flow chart of FIG. 5. Once the multi-wavelength data encoding process is started, the wavelength separation unit 131 separates the multi-wavelength data into single-wavelength data on the basis of wavelength components in step S121. In step S122, the single-wavelength data encoding units 132 encode the single-wavelength data of the wavelength components to generate the single-wavelength compressed streams. In step S123, the stream combining unit 133 combines the single-wavelength compressed streams of the wavelength components to generate the multi-wavelength compressed stream.

Figure 2:
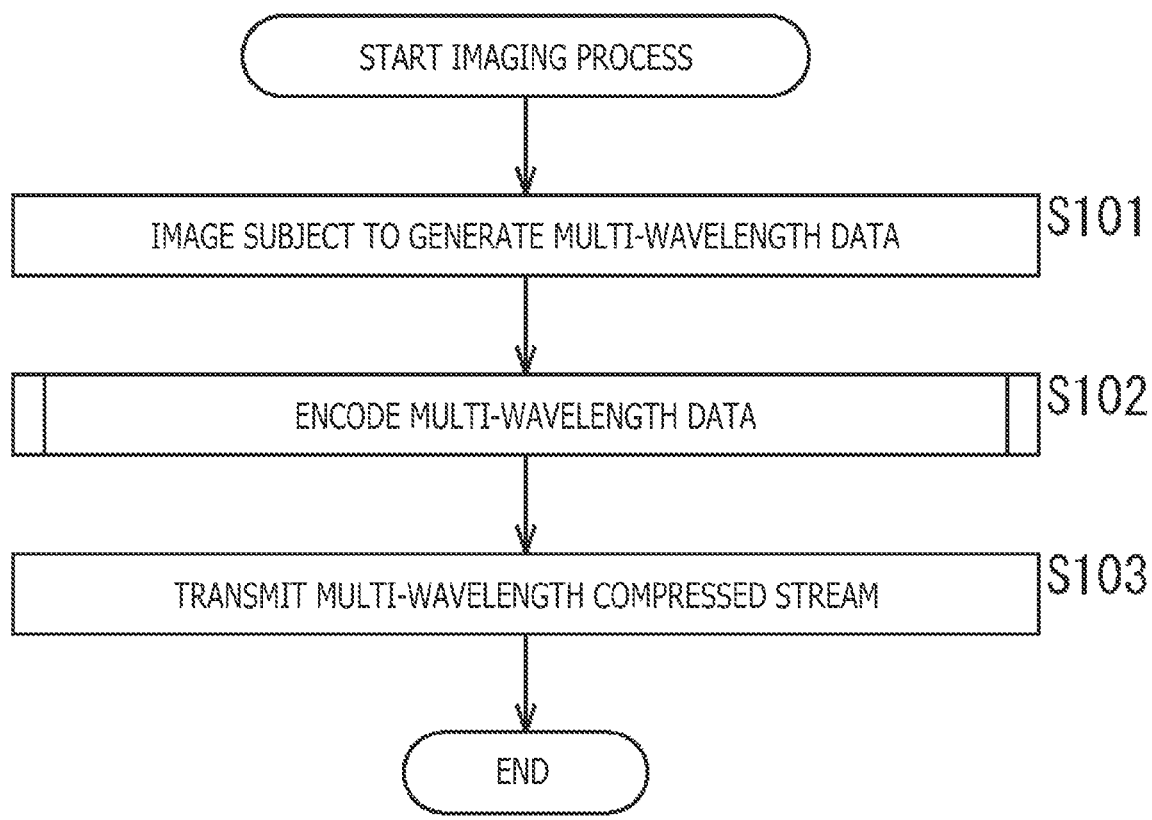
FIG. 2 is a flow chart describing an example of a flow of an imaging process.

Once the process of step S123 is finished, the multi-wavelength data encoding process ends, and the process returns to FIG. 2.

In such a way, the encoding can be performed on the basis of wavelength components, and the multi-wavelength data can be more easily encoded.

<Single-Wavelength Data Encoding Unit>

The single-wavelength data may be encoded by using, for example, quantization and encoding of differences between the single-wavelength data. That is, the wavelength components (single-wavelength data) may be quantized, and differences between the quantized single-wavelength data may be calculated. Variable-length encoding may be applied to the differences.

FIG. 6 is a block diagram illustrating a main configuration example of the single-wavelength data encoding unit 132 in this case. As illustrated in FIG. 6, the single-wavelength data encoding unit 132 includes a quantization unit 141, a delay buffer 142, a computation unit 143, and a VLC (Variable Length Code) encoder 144.

The quantization unit 141 quantizes the single-wavelength data. The delay buffer 142 includes any storage medium and stores (holds) the single-wavelength data quantized by the quantization unit 141. The delay buffer 142 delays the single-wavelength data by one cycle and supplies the single-wavelength data to the computation unit 143. The computation unit 143 calculates the differences between the single-wavelength data quantized by the quantization unit 141 and the single-wavelength data of the previous cycle supplied from the delay buffer 142. The VLC encoder 144 applies the variable-length encoding to the differences calculated by the computation unit 143 to generate single-wavelength compressed streams and outputs the single-wavelength compressed streams (for example, supplies the single-wavelength compressed streams to the stream combining unit 133). The method of variable-length encoding is optional.

<Flow of Single-Wavelength Data Encoding Process>

An example of a flow of the single-wavelength data encoding process executed in step S122 of FIG. 5 by the single-wavelength data encoding unit 132 in this case will be described with reference to a flow chart of FIG. 7. Once the single-wavelength data encoding process is started, the quantization unit 141 quantizes the single-wavelength data in step S131. In step S132, the delay buffer 142 stores the quantized single-wavelength data and delays the single-wavelength data. In step S133, the computation unit 143 calculates the differences (difference data of single-wavelength data) between the quantized single-wavelength data and the single-wavelength data of the previous cycle. In step S134, the VLC encoder 144 applies the variable-length encoding to the difference data to generate the single-wavelength compressed streams.

Once the process of step S134 is finished, the single-wavelength data encoding process ends, and the process returns to FIG. 5.

In such a way, each wavelength component (single-wavelength data) can be more easily encoded.

<Multi-Wavelength Data Decoding Unit>

Figure 8:
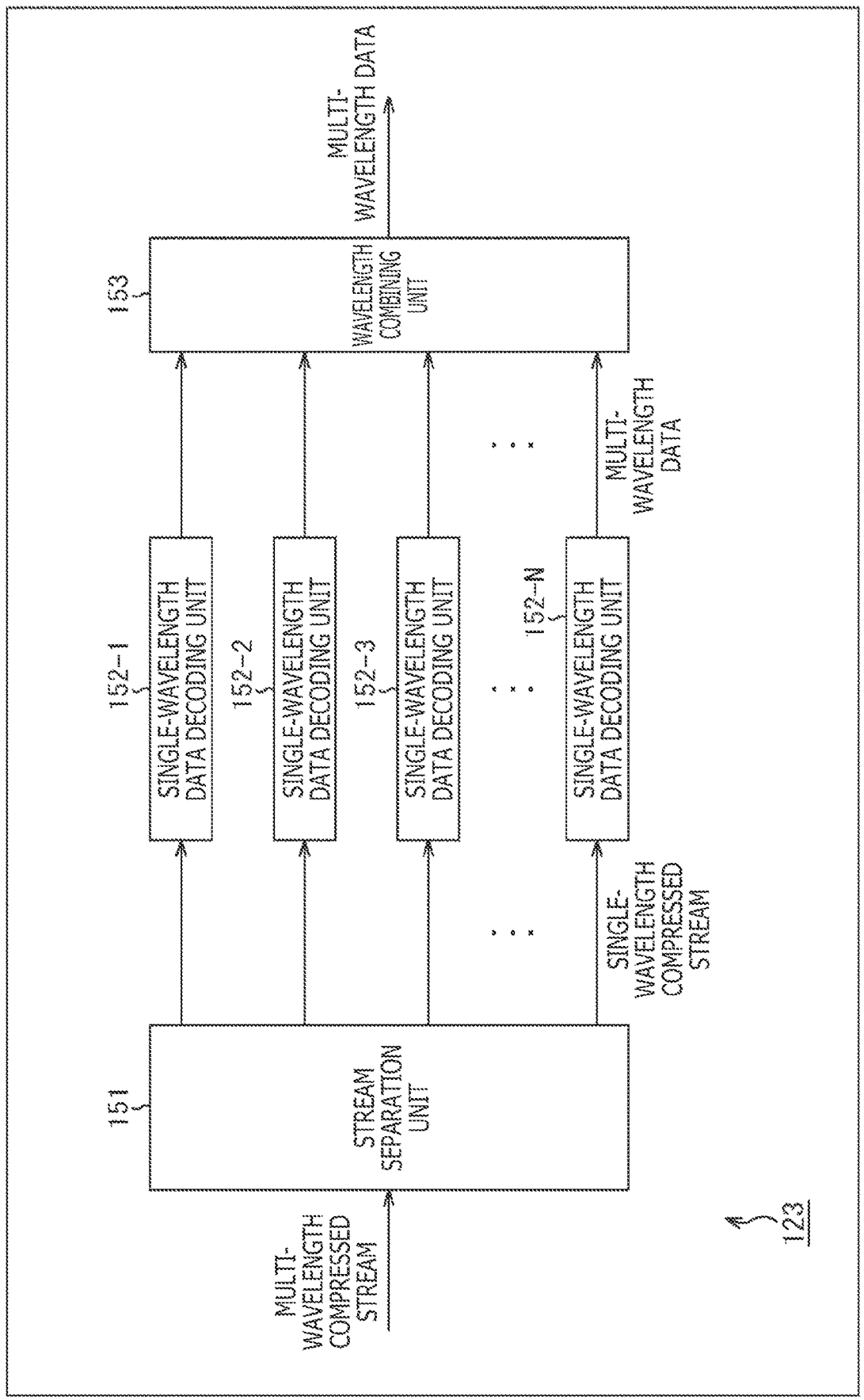
FIG. 8 is a block diagram illustrating a main configuration example of a multi-wavelength data decoding unit.

The multi-wavelength compressed stream may be independently decoded on the basis of, for example, the wavelength components. FIG. 8 is a block diagram illustrating a main configuration example of the multi-wavelength data decoding unit 123 in this case. As illustrated in FIG. 8, the multi-wavelength data decoding unit 123 includes a stream separation unit 151, single-wavelength data decoding units 152-1 to 152-N (N is any natural number), and a wavelength combining unit 153. The single-wavelength data decoding units 152-1 to 152-N will be referred to as single-wavelength data decoding units 152 in a case where the units do not have to be distinguished from each other in the description.

The stream separation unit 151 separates the multi-wavelength compressed stream into streams on the basis of wavelength components (single-wavelength compressed streams). The single-wavelength data decoding units 152 are prepared on the basis of wavelength components. That is, the single-wavelength data decoding units 152-1 to 152-N decode the single-wavelength compressed streams of corresponding wavelength components, respectively, to recover the single-wavelength data. Note that the decoding method can be any method corresponding to the encoding method of the single-wavelength data executed by the single-wavelength data encoding unit 132. The wavelength combining unit 153 combines the single-wavelength data of the wavelength components recovered in such a way to recover the multi-wavelength data and outputs the multi-wavelength data (for example, supplies the multi-wavelength data to the data analysis unit 124).

<Flow of Multi-Wavelength Data Decoding Process>

An example of a flow of the multi-wavelength data decoding process executed in step S114 of FIG. 3 by the multi-wavelength data decoding unit 123 in this case will be described with reference to a flow chart of FIG. 9. Once the multi-wavelength data decoding process is started, the stream separation unit 151 separates the multi-wavelength compressed stream into the single-wavelength compressed streams on the basis of wavelength components in step S141. In step S142, the single-wavelength data decoding units 152 decode the single-wavelength compressed streams of the wavelength components to recover the single-wavelength data of the wavelength components. In step S143, the wavelength combining unit 153 combines the recovered single-wavelength data of the wavelength components to recover the multi-wavelength data.

Figure 3:
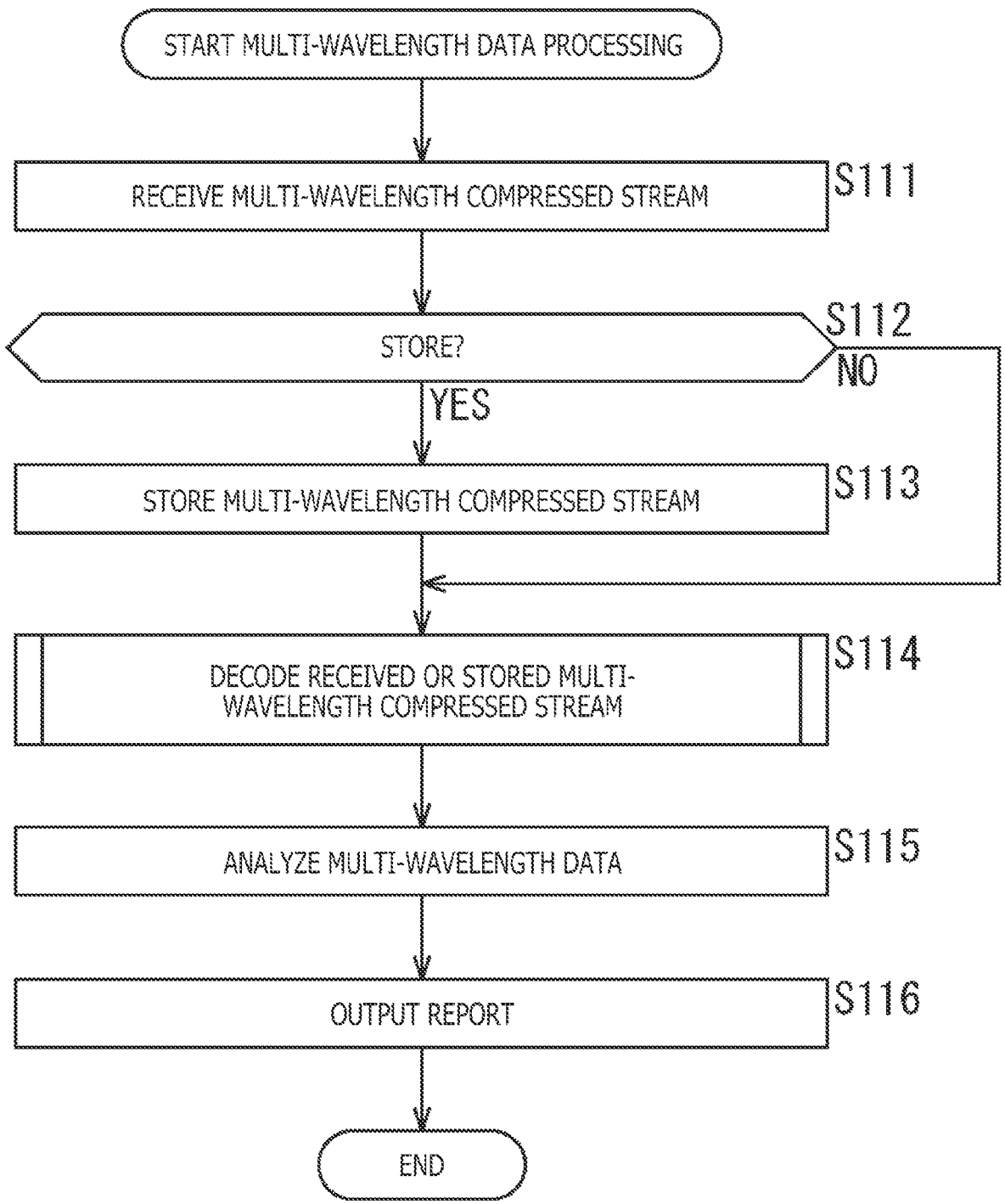
FIG. 3 is a flow chart describing an example of a flow of multi-wavelength data processing.

Once the process of step S143 is finished, the multi-wavelength data decoding process ends, and the process returns to FIG. 3.

In such a way, the decoding can be performed on the basis of wavelength components, and this can correctly decode the multi-wavelength compressed stream including the multi-wavelength data encoded on the basis of wavelength components.

<Single-Wavelength Data Decoding Unit>

The single-wavelength compressed streams may be decoded by using, for example, variable-length decoding, addition of single-wavelength data, and inverse quantization. That is, the variable-length decoding may be applied to the single-wavelength compressed streams to recover the different data between the single-wavelength data, and the single-wavelength data of the previous cycle may be added to the difference data to recover the quantized single-wavelength data. The inverse quantization may be applied to the quantized single-wavelength data to recover the single-wavelength data.

Figure 10:
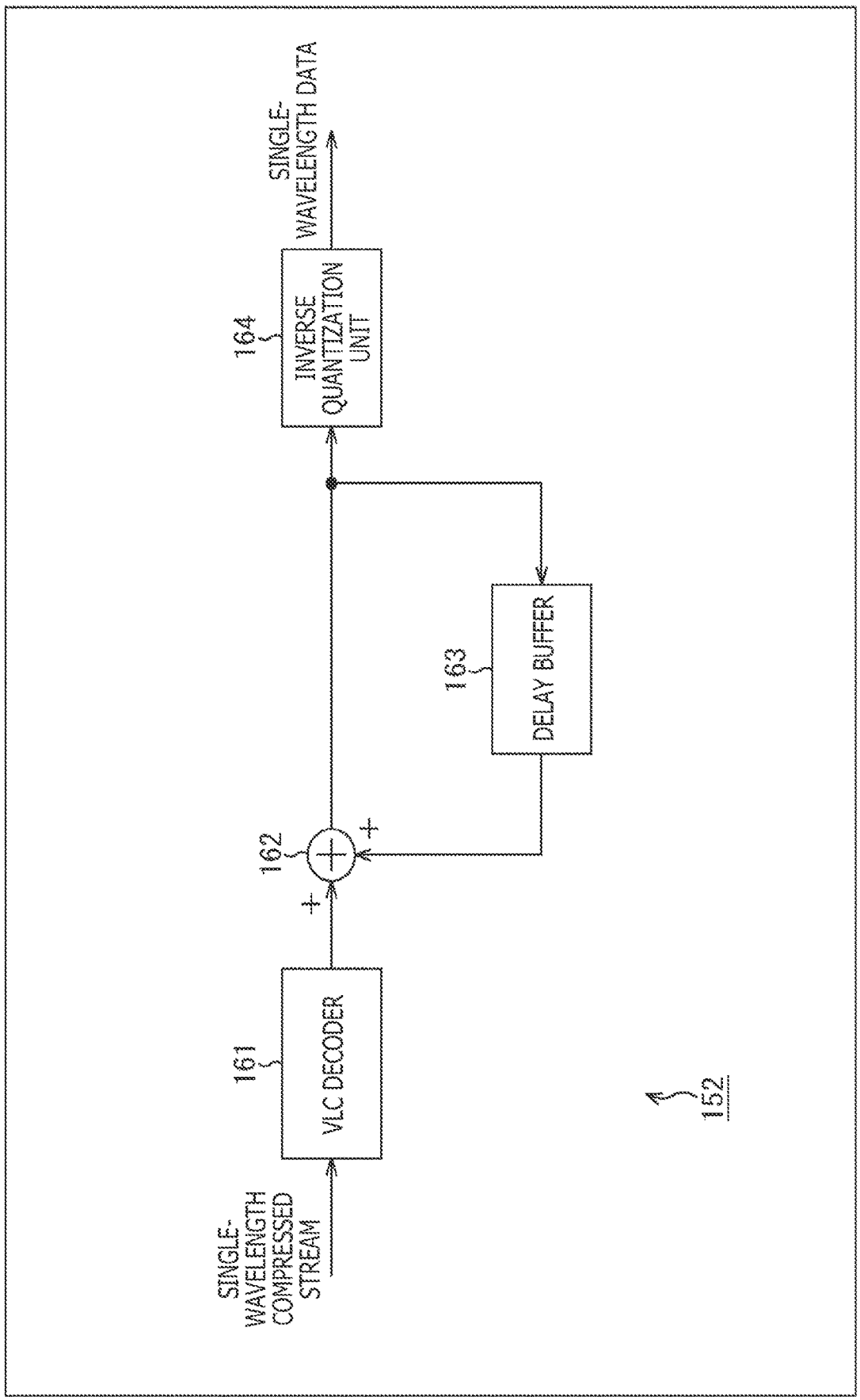
FIG. 10 is a block diagram illustrating a main configuration example of a single-wavelength data decoding unit.

FIG. 10 is a block diagram illustrating a main configuration example of the single-wavelength data decoding unit 152 in this case. As illustrated in FIG. 10, the single-wavelength data decoding unit 152 includes a VLC decoder 161, a computation unit 162, a delay buffer 163, and an inverse quantization unit 164.

The VLC decoder 161 applies the variable-length decoding to the single-wavelength compressed streams to recover the difference data. Note that the method of variable-length decoding can be any method corresponding to the method of variable-length encoding executed by the VLC encoder 144. In addition, the computation unit 162 adds the quantized single-wavelength data of the previous cycle supplied from the delay buffer 163 to the difference data to recover the quantized single-wavelength data. The delay buffer 163 stores (holds) the quantized single-wavelength data and delays the quantized single-wavelength data by one cycle. The delay buffer 163 supplies the quantized single-wavelength data to the computation unit 162. The inverse quantization unit 164 applies the inverse quantization to the quantized single-wavelength data recovered by the computation unit 162 to recover the single-wavelength data and outputs the single wavelength data (for example, supplies the single wavelength data to the wavelength combining unit 153).

<Flow of Single-Wavelength Compressed Stream Decoding Process>

Figure 11:
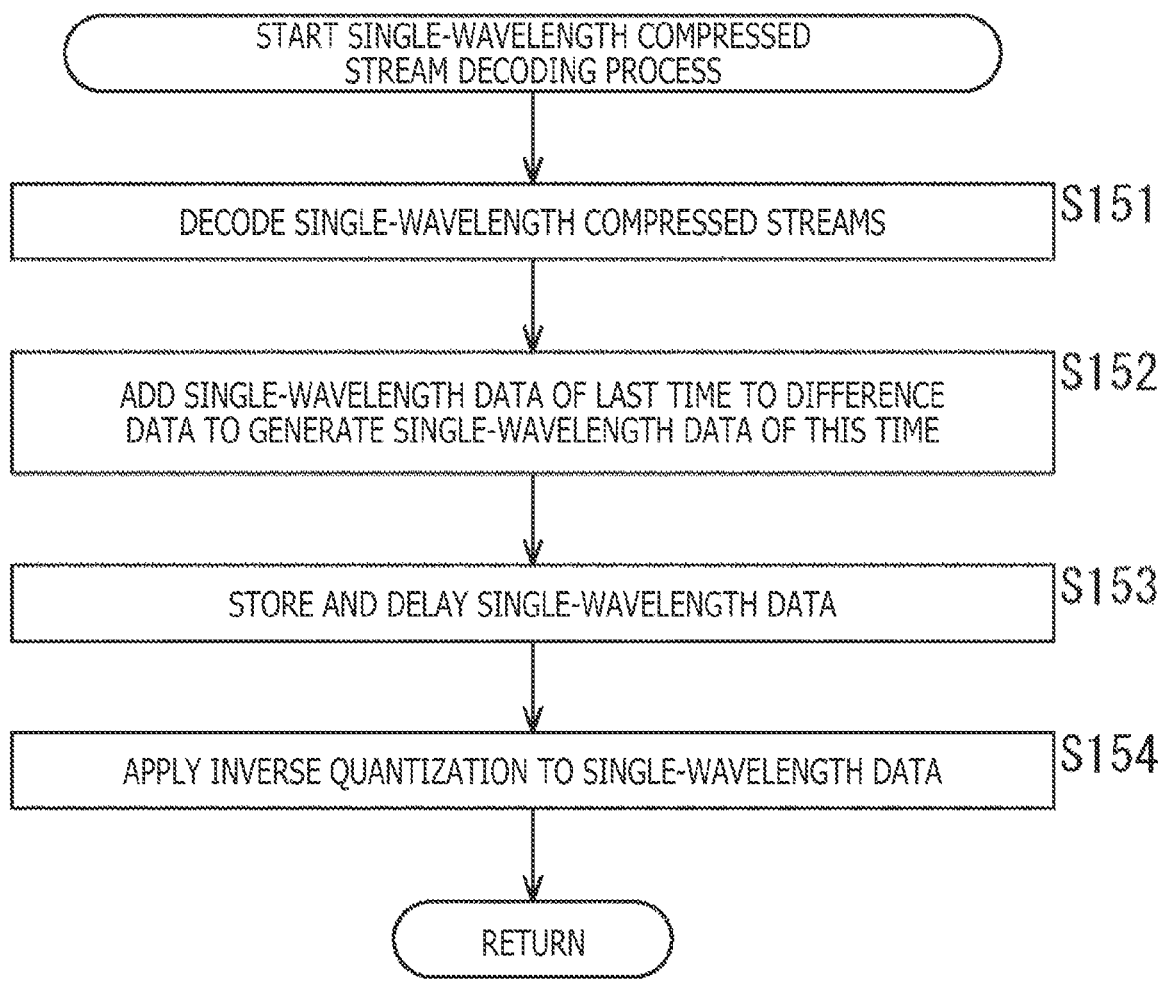
FIG. 11 is a flow chart describing an example of a flow of a single-wavelength compressed stream decoding process.

An example of a flow of the single-wavelength compressed stream decoding process executed in step S142 of FIG. 9 by the single-wavelength data decoding unit 152 in this case will be described with reference to a flow chart of FIG. 11. Once the single-wavelength compressed stream decoding process is started, the VLC decoder 161 applies the variable-length decoding to the single-wavelength compressed streams to recover the difference data in step S151. In step S152, the computation unit 162 adds the single-wavelength data of the previous cycle to the recovered difference data to recover the quantized single-wavelength data. In step S153, the delay buffer 163 stores the recovered quantized single-wavelength data and delays the quantized single-wavelength data. In step S154, the inverse quantization unit 164 applies the inverse quantization to the quantized single-wavelength data to recover the single-wavelength data.

Figure 9:
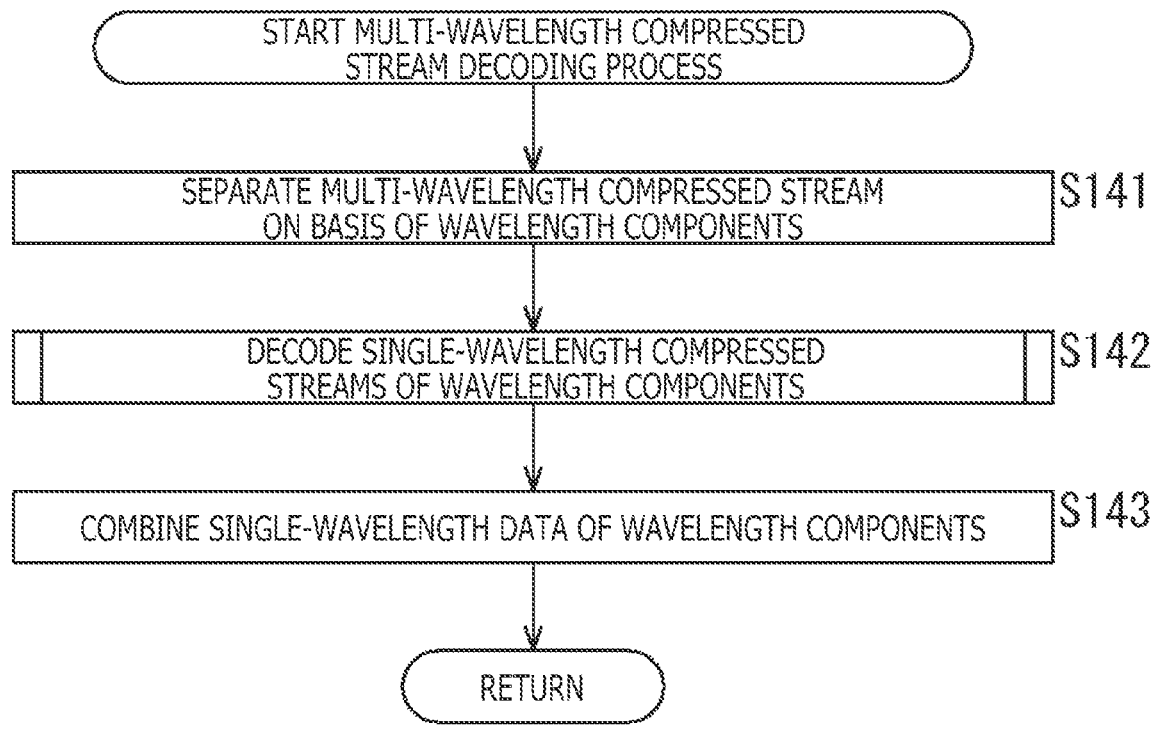
FIG. 9 is a flow chart describing an example of a flow of a multi-wavelength compressed stream decoding process.

Once the process of step S154 is finished, the single-wavelength compressed stream decoding process ends, and the process returns to FIG. 9.

In such a way, each wavelength component (single-wavelength compressed stream) can be more easily decoded.

<2-2. Control of Encoding According to Transmission Rate>

Whether or not to encode the multi-wavelength data may be controlled according to a transmission rate (target transmission rate) set by the transmission unit that transmits the multi-wavelength data (multi-wavelength compressed stream). For example, the image processing apparatus may further include an encoding control unit that controls whether or not to encode the multi-wavelength data according to the transmission rate of the transmission unit. In a case where the encoding control unit performs control to perform encoding, the encoding unit may encode the multi-wavelength data, and the transmission unit may transmit the encoded data generated by the encoding unit. Furthermore, in a case where the encoding control unit performs control not to perform the encoding, the transmission unit may transmit the multi-wavelength data generated by the imaging unit.

<Image Processing System>

Figure 12:
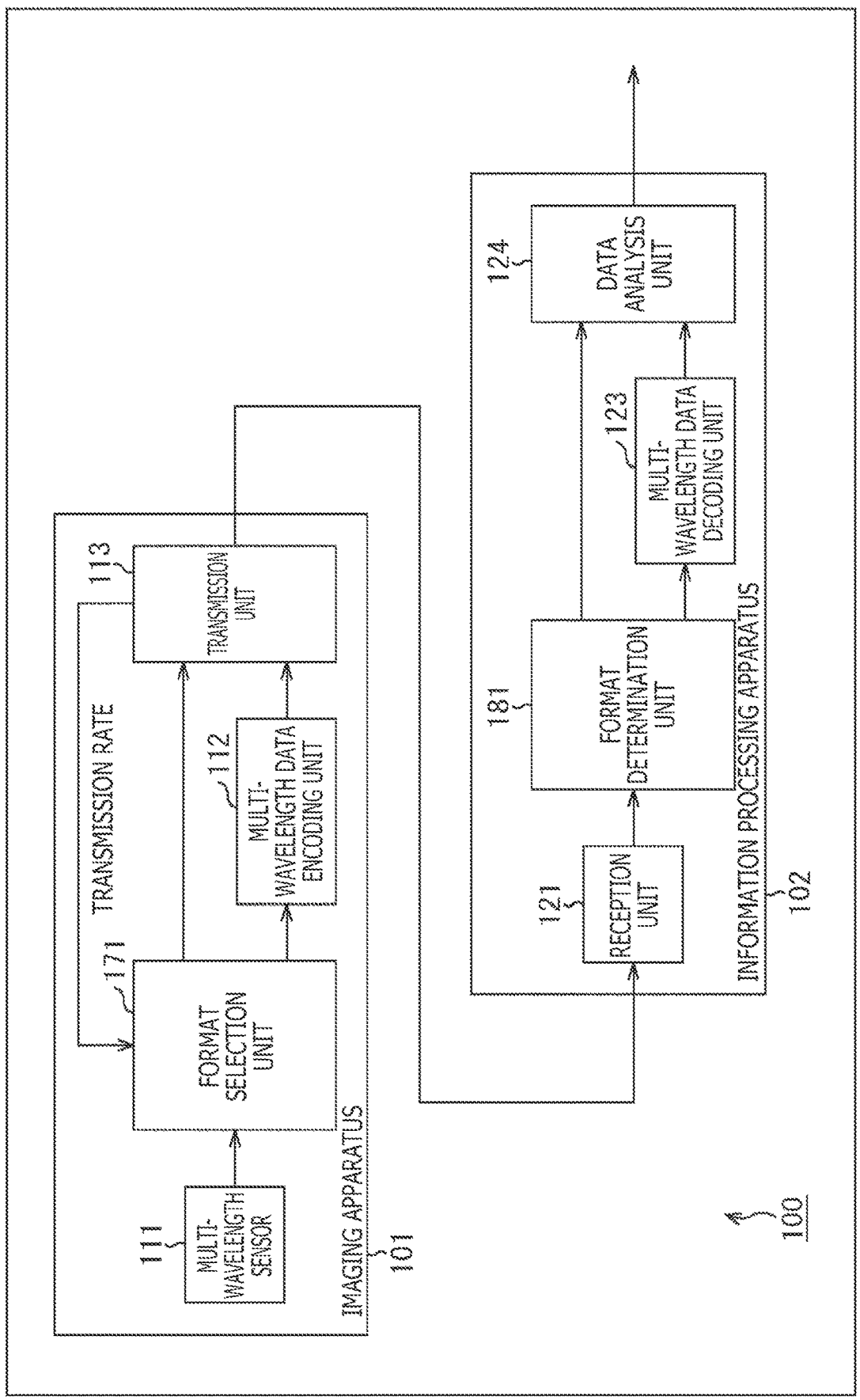
FIG. 12 is a block diagram illustrating a main configuration example of the image processing system.

FIG. 12 is a block diagram illustrating a main configuration example of the image processing system 100 in this case. As illustrated in FIG. 12, the imaging apparatus 101 in this case further includes a format selection unit 171 compared to the case of FIG. 1. The transmission unit 113 sets the transmission rate (rate of data transmission) according to the use conditions of communication path or the like and supplies the set transmission rate to the format selection unit 171. The format selection unit 171 selects whether or not to encode the multi-wavelength data according to the transmission rate. For example, in a case where the transmission rate is sufficiently large (available bandwidth is sufficiently wide), the format selection unit 171 selects to transmit the multi-wavelength data without encoding and supplies the multi-wavelength data generated by the multi-wavelength sensor 111 to the transmission unit 113. Furthermore, in a case where, for example, the transmission rate is not sufficiently large (available bandwidth is narrow), the format selection unit 171 selects to encode and transmit the multi-wavelength data. The format selection unit 171 supplies the multi-wavelength data generated by the multi-wavelength sensor 111 to the multi-wavelength data encoding unit 112 and causes the multi-wavelength data encoding unit 112 to encode the multi-wavelength data. The transmission unit 113 transmits the multi-wavelength data supplied from the format selection unit 171 or the multi-wavelength data supplied from the multi-wavelength data encoding unit 112.

Furthermore, the information processing apparatus 102 in this case includes a format determination unit 181 in place of the storage unit 122 compared to the case of FIG. 1. The format determination unit 181 determines the format of data (whether or not the data is encoded) transmitted from the imaging apparatus 101. In a case where the format determination unit 181 determines that the multi-wavelength data is transmitted (that is, the data is not encoded), the format determination unit 181 supplies the multi-wavelength data to the data analysis unit 124. Furthermore, in a case where the format determination unit 181 determines that the multi-wavelength compressed stream is transmitted (that is, the data is encoded), the format determination unit 181 supplies the multi-wavelength compressed stream to the multi-wavelength data decoding unit 123. The data analysis unit 124 analyzes the multi-wavelength data supplied from the format determination unit 181 or the multi-wavelength data decoding unit 123.

<Flow of Imaging Process>

Figure 13:
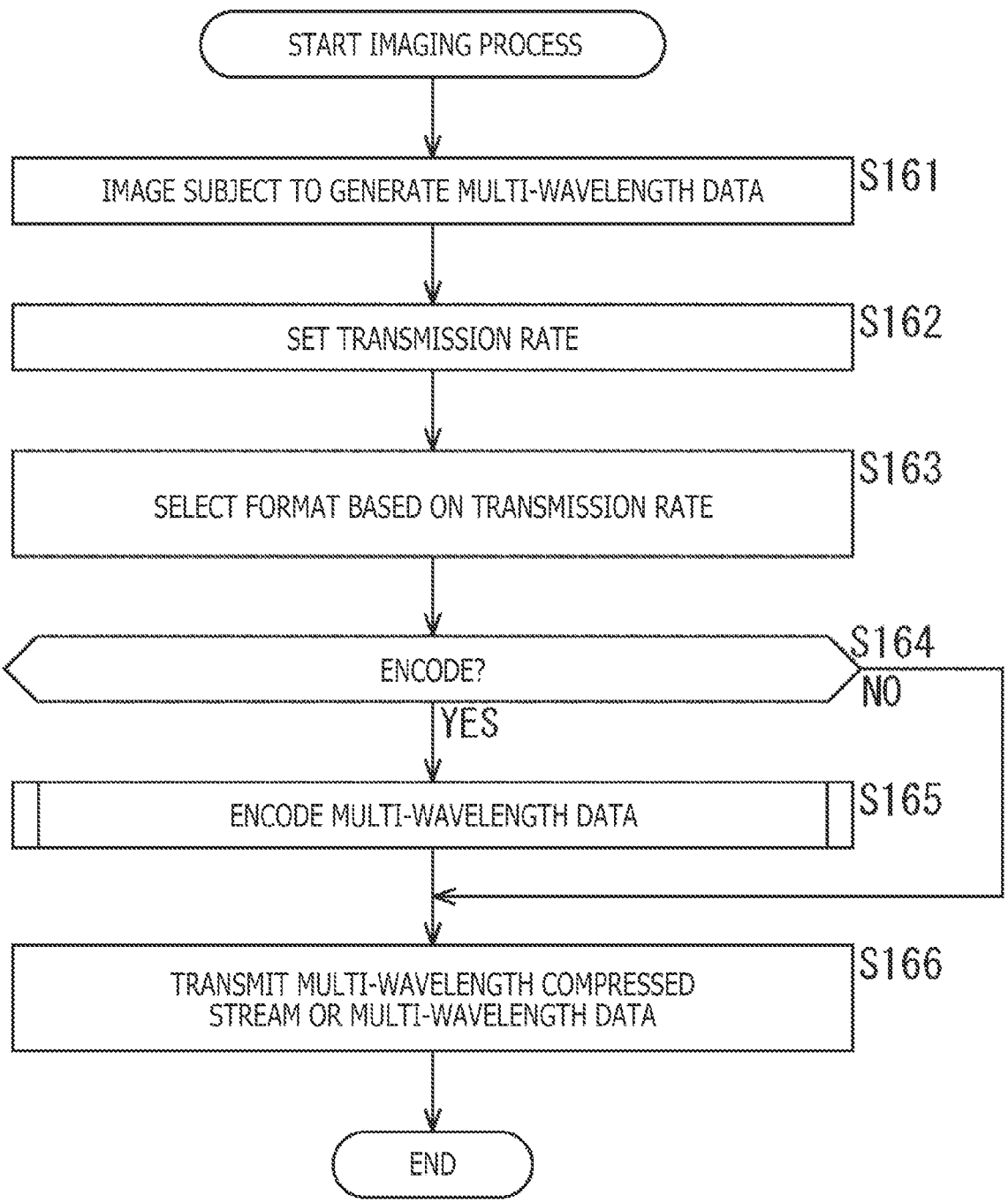
FIG. 13 is a flow chart describing an example of a flow of the imaging process.

In this case, the imaging process is executed in a flow as illustrated in a flow chart of FIG. 13. That is, once the imaging process is started, the multi-wavelength sensor 111 images the subject to generate the multi-wavelength data in step S161. In step S162, the transmission unit 113 sets the transmission rate. In step S163, the format selection unit 171 selects the format (that is, selects whether or not to encode the data) based on the transmission rate. In step S164, the multi-wavelength data encoding unit 112 determines whether or not to encode the multi-wavelength data based on the selection result of the format in step S163. In a case where the multi-wavelength data encoding unit 112 determines to encode the multi-wavelength data, the multi-wavelength data encoding unit 112 encodes the multi-wavelength data in step S165. In a case where the multi-wavelength data encoding unit 112 determines not to encode the multi-wavelength data, the process of step S165 is skipped. In step S166, the transmission unit 113 transmits the multi-wavelength compressed stream or the multi-wavelength data.

The multi-wavelength compressed stream or the multi-wavelength data transmitted by the imaging apparatus 101 is transmitted to the information processing apparatus 102.

<Flow of Multi-Wavelength Data Processing>

Figure 14:
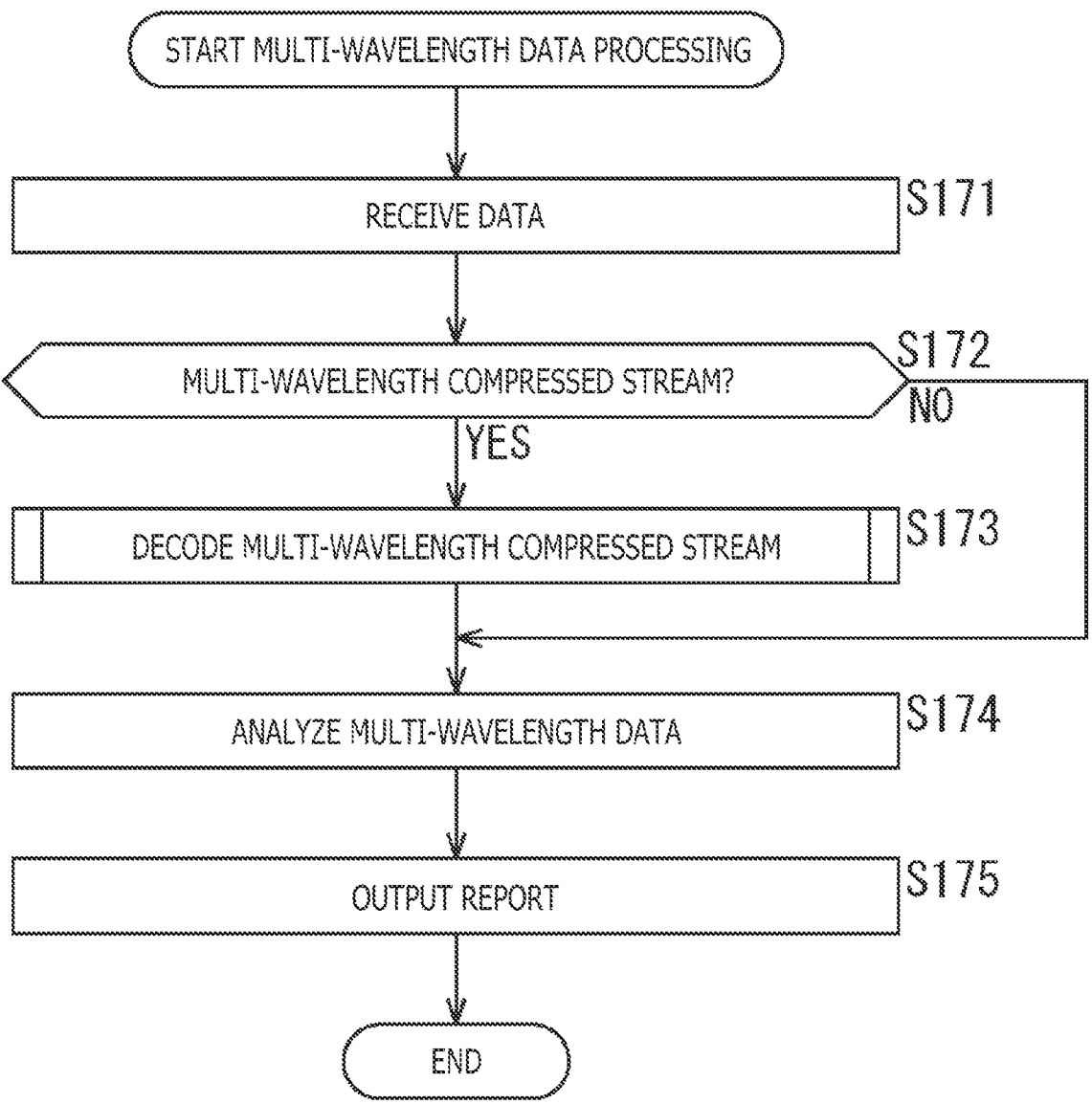
FIG. 14 is a flow chart describing an example of a flow of the multi-wavelength data processing.

An example of a flow of the multi-wavelength data processing executed by the information processing apparatus 102 in this case will be described with reference to a flow chart of FIG. 14. Once the multi-wavelength data processing is started, the reception unit 121 receives the data (multi-wavelength compressed stream or multi-wavelength data) transmitted from the imaging apparatus 101 in step S171. In step S172, the format determination unit 181 determines whether or not the received data is a multi-wavelength compressed stream (that is, whether or not the data is encoded). In a case where the format determination unit 181 determines that the received data is a multi-wavelength compressed stream (data is encoded), the multi-wavelength data decoding unit 123 decodes the multi-wavelength compressed stream to recover the multi-wavelength data in step S173. In a case where the format determination unit 181 determines that the received data is multi-wavelength data (data is not encoded), the process is skipped. The data analysis unit 124 analyzes the multi-wavelength data to create a report in step S174 and outputs the report in step S175.

In such a way, the imaging apparatus 101 controls whether or not to encode the multi-wavelength data according to the transmission rate, and in a case where there is an allowance in the transmission rate, the imaging apparatus 101 transmits uncompressed multi-wavelength data. As a result, the multi-wavelength data can be encoded only if necessary, and the degradation of the multi-wavelength data due to encoding can be suppressed. In addition, the information processing apparatus 102 determines the format of the transmitted data and executes the decoding process as necessary. Therefore, the information processing apparatus 102 can appropriately process the data transmitted from the imaging apparatus 101 in this case and analyze the data.

<2-3. Compression Rate Control According to Transmission Rate>

A compression rate of the multi-wavelength data may be controlled according to the transmission rate (target transmission rate) set by the transmission unit that transmits the multi-wavelength data (multi-wavelength compressed stream). For example, the image processing apparatus may further include an encoding control unit that controls the compression rate of encoding the multi-wavelength data according to the transmission rate of the transmission unit, and the encoding unit may encode the multi-wavelength data at the compression rate controlled by the encoding control unit.

<Image Processing System>

Figure 15:
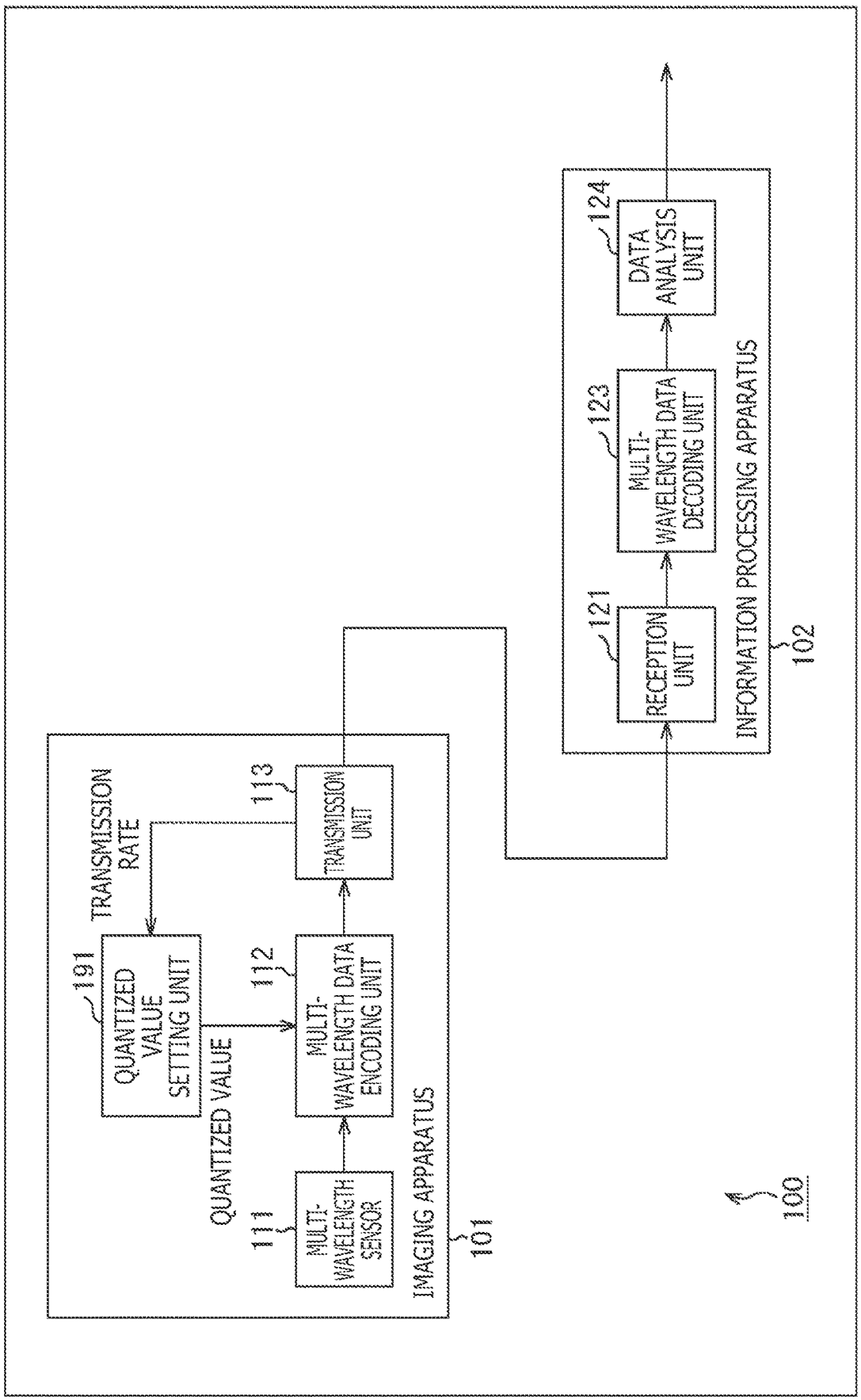
FIG. 15 is a block diagram illustrating a main configuration example of the image processing system.

FIG. 15 is a block diagram illustrating a main configuration example of the image processing system 100 in this case. As illustrated in FIG. 15, the imaging apparatus 101 in this case further includes a quantized value setting unit 191 compared to the case of FIG. 1. The transmission unit 113 sets the transmission rate (rate of data transmission) according to the use conditions of communication path or the like and supplies the set transmission rate to the quantized value setting unit 191. The quantized value setting unit 191 sets a quantized value according to the transmission rate and supplies the quantized value to the multi-wavelength data encoding unit 112. The multi-wavelength data encoding unit 112 uses an encoding system involving quantization to encode the multi-wavelength data to generate a multi-wavelength compressed stream. In the encoding, the multi-wavelength data encoding unit 112 uses the quantized value set by the quantized value setting unit 191 to perform the quantization. That is, the quantized value setting unit 191 controls the compression rate of encoding the multi-wavelength data encoded by the multi-wavelength data encoding unit 112.

For example, in a case where the transmission rate is sufficiently large (available bandwidth is sufficiently wide), the quantized value setting unit 191 reduces the quantized value to reduce the compression rate. Furthermore, in a case where, for example, the transmission rate is not sufficiently large (available bandwidth is narrow), the quantized value setting unit 191 increases the quantized value to increase the compression rate.

Furthermore, the information processing apparatus 102 in this case does not include the storage unit 122 compared to the case of FIG. 1.

<Flow of Imaging Process>

Figure 16:
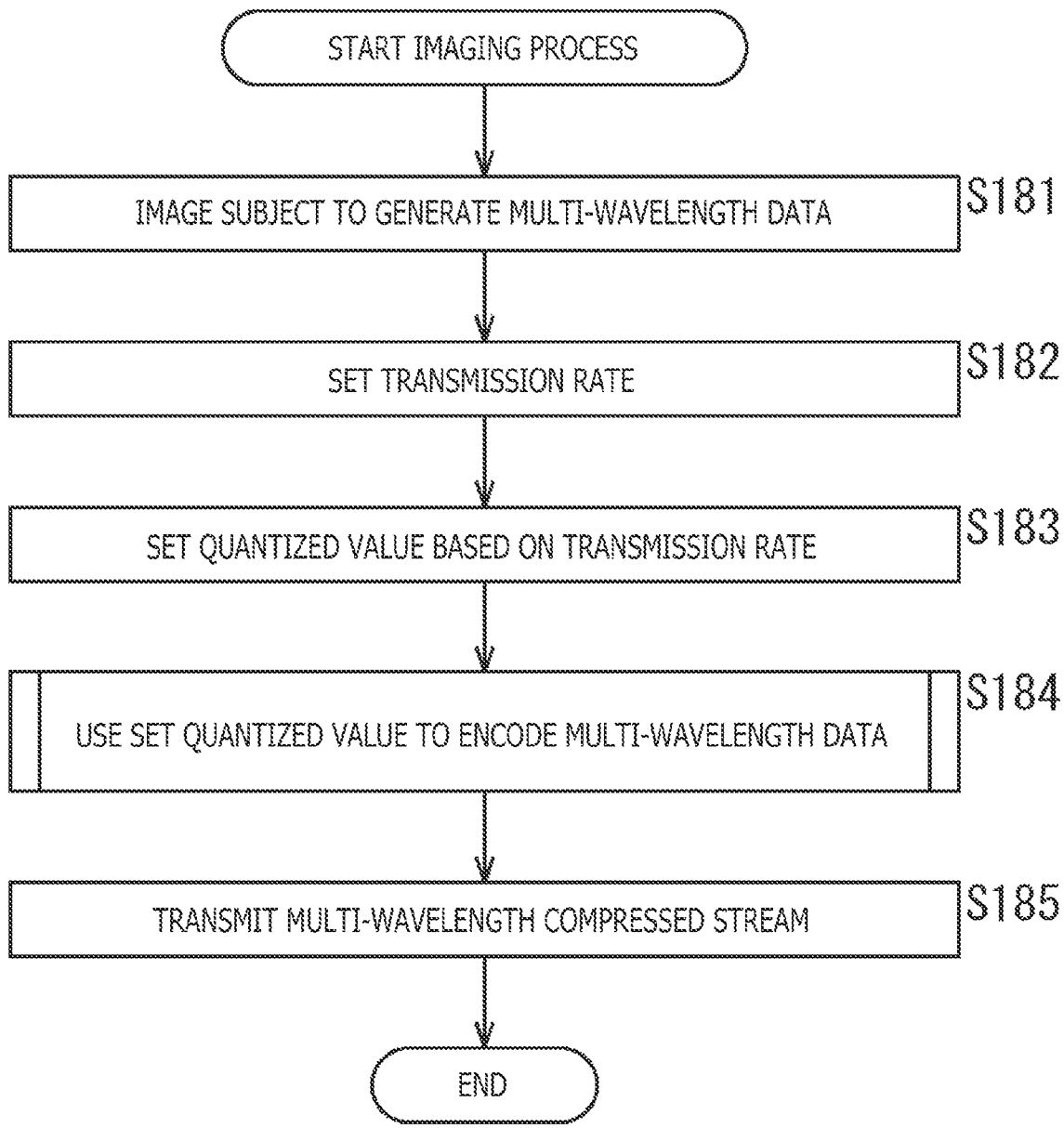
FIG. 16 is a flow chart describing an example of a flow of the imaging process.

In this case, the imaging process is executed in, for example, a flow as illustrated in a flow chart of FIG. 16. That is, once the imaging process is started, the processes of steps S181 and S182 are executed as in the processes of steps S161 and S182 of FIG. 13.

In step S183, the quantized value setting unit 191 sets the quantized value based on the transmission rate set in step S182. In step S184, the multi-wavelength data encoding unit 112 uses the quantized value set in step S183 to encode the multi-wavelength data. In step S185, the transmission unit 113 transmits the multi-wavelength compressed stream.

The multi-wavelength compressed stream transmitted by the imaging apparatus 101 is transmitted to the information processing apparatus 102.

<Flow of Multi-Wavelength Data Processing>

Figure 17:
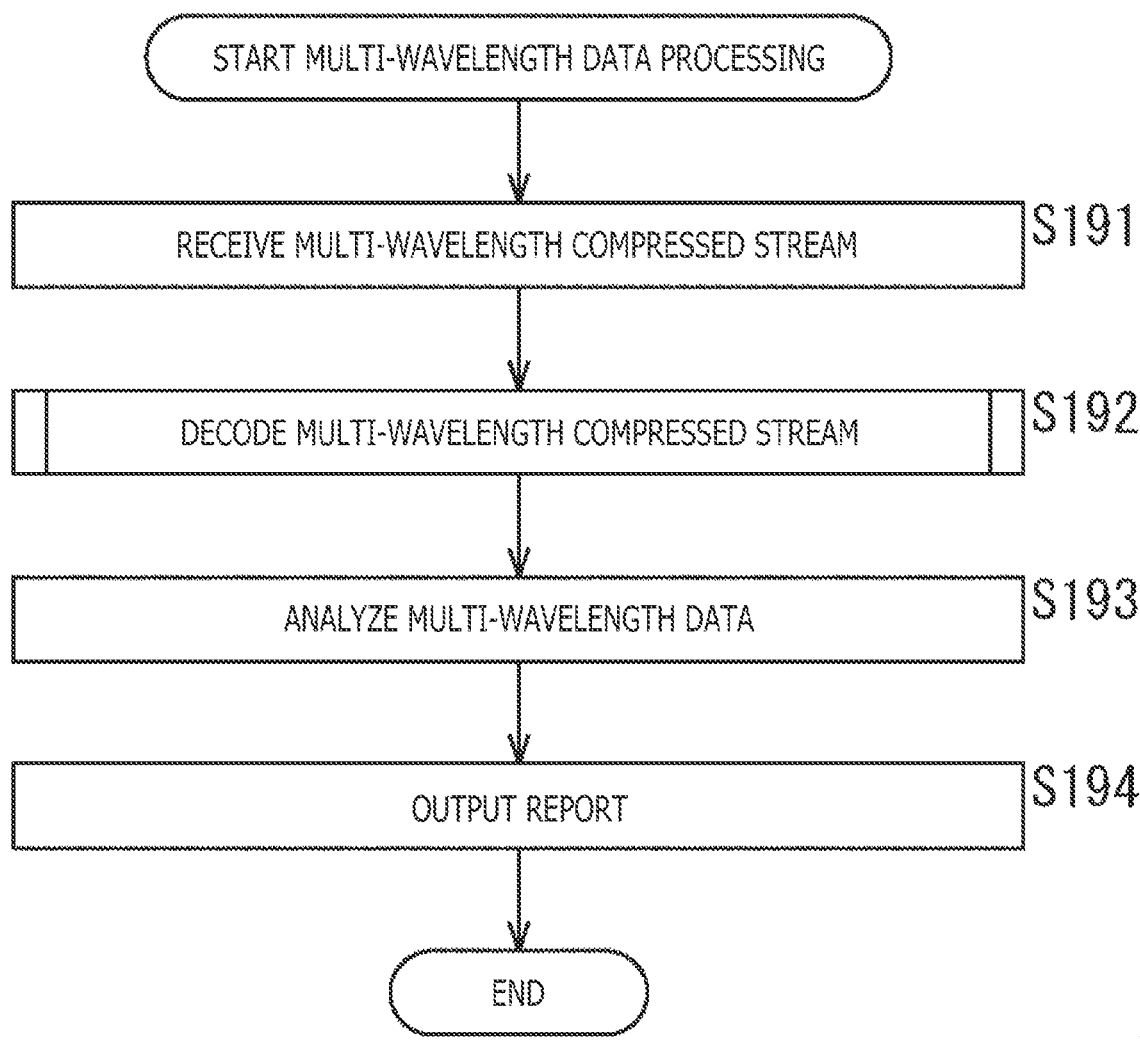
FIG. 17 is a flow chart describing an example of a flow of the multi-wavelength data processing.

An example of a flow of the multi-wavelength data processing executed by the information processing apparatus 102 in this case will be described with reference to a flow chart of FIG. 17. Once the multi-wavelength data processing is started, the reception unit 121 receives the multi-wavelength compressed stream transmitted from the imaging apparatus 101 in step S191. In step S192, the multi-wavelength data decoding unit 123 decodes the received multi-wavelength compressed stream to recover the multi-wavelength data. The data analysis unit 124 analyzes the multi-wavelength data to create a report in step S193 and outputs the report in step S194.

In such a way, the imaging apparatus 101 controls the compression rate of the multi-wavelength data according to the transmission rate, and in a case where there is an allowance in the transmission rate, the imaging apparatus 101 transmits the multi-wavelength data at a low compression rate. As a result, an unnecessary increase in the compression rate can be suppressed, and the degradation of the multi-wavelength data due to encoding can be suppressed.

<2-4. Transmission of Encoding Data at a Plurality of Compression Rates>

The multi-wavelength data may be encoded at a plurality of compression rates to transmit each multi-wavelength compressed stream. For example, in the image processing apparatus, the encoding unit may encode the multi-wavelength data at a plurality of compression rates, and the transmission unit may transmit the encoded data with each of the compression rates generated by the encoding unit.

<Image Processing System>

Figure 18:
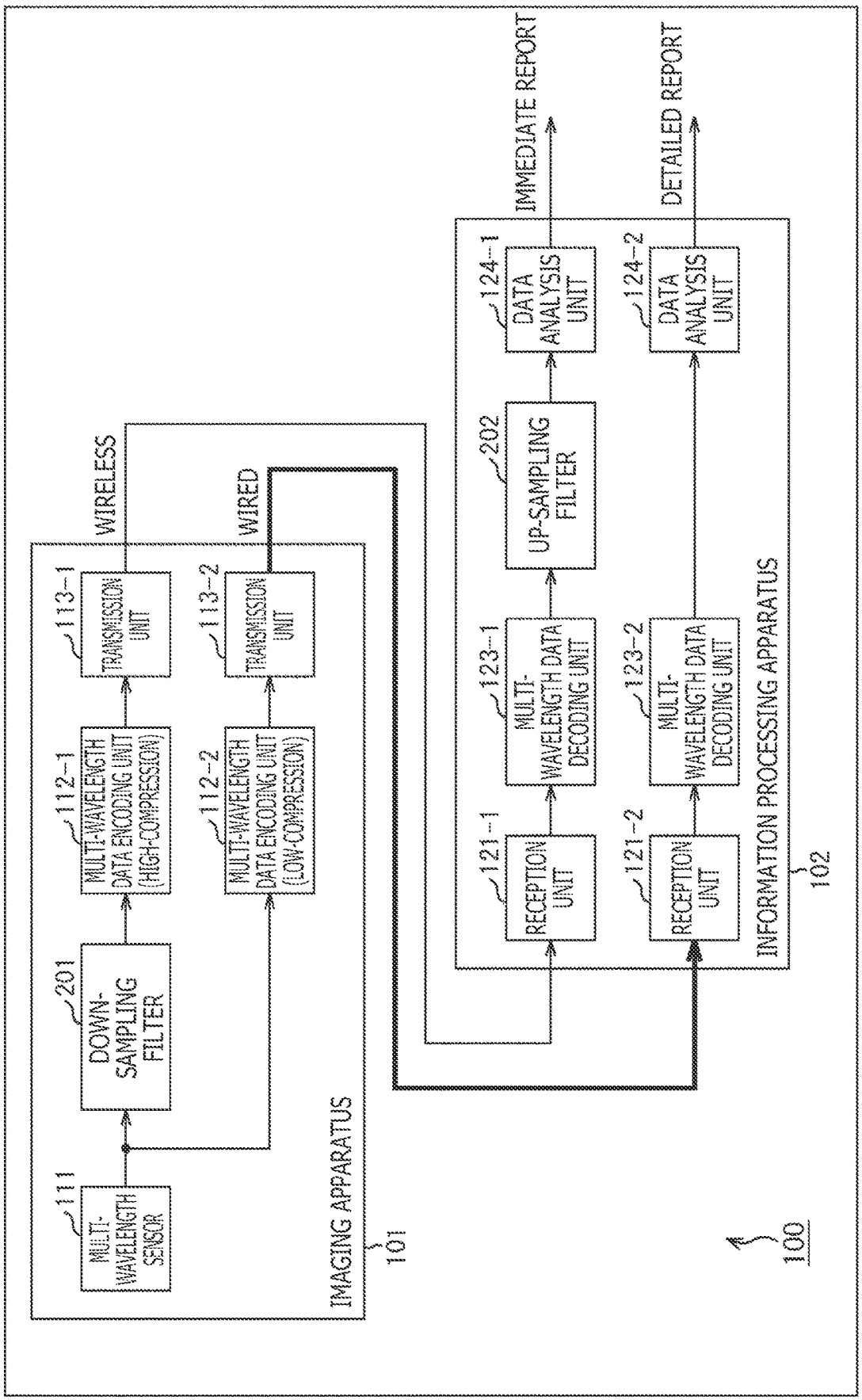
FIG. 18 is a block diagram illustrating a main configuration example of the image processing system.

FIG. 18 is a block diagram illustrating a main configuration example of the image processing system 100 in this case. As illustrated in FIG. 18, the imaging apparatus 101 in this case further includes a down-sampling filter 201 compared to the case of FIG. 1. In addition, the imaging apparatus 101 includes two multi-wavelength data encoding units 112 (multi-wavelength data encoding unit 112-1 and multi-wavelength data encoding unit 112-2) and two transmission units 113 (transmission unit 113-1 and transmission unit 113-2).

The down-sampling filter 201 executes a filtering process of reducing the resolution (the number of pixels) of the multi-wavelength data supplied from the multi-wavelength sensor 111 and supplies the multi-wavelength data subjected to the filtering process to the multi-wavelength data encoding unit 112-1. The multi-wavelength data encoding unit 112-1 encodes the multi-wavelength data to generate a multi-wavelength compressed stream. The transmission unit 113-1 transmits the multi-wavelength compressed stream through, for example, wireless communication.

The multi-wavelength data encoding unit 112-2 encodes the multi-wavelength data supplied from the multi-wavelength sensor 111 to generate a multi-wavelength compressed stream. The transmission unit 113-2 transmits the multi-wavelength compressed stream through, for example, wired communication.

The resolution (amount of information) of the multi-wavelength data is reduced by the down-sampling filter 201, and the compression rate of the multi-wavelength compressed stream transmitted from the transmission unit 113-1 is higher than the compression rate of the multi-wavelength compressed stream transmitted from the transmission unit 113-2. That is, the transmission unit 113-1 transmits a high-compression multi-wavelength compressed stream, and the transmission unit 113-2 transmits a low-compression multi-wavelength compressed stream.

Furthermore, the information processing apparatus 102 in this case further includes an up-sampling filter 202 compared to the case of FIG. 15. In addition, the information processing apparatus 102 includes two reception units 121 (reception unit 121-1 and reception unit 121-2), two multi-wavelength data decoding units 123 (multi-wavelength data decoding unit 123-1 and multi-wavelength data decoding unit 123-2), and two data analysis units 124 (data analysis unit 124-1 and data analysis unit 124-2).

The reception unit 121-1 receives the high-compression multi-wavelength compressed stream transmitted from the transmission unit 113-1. The multi-wavelength data decoding unit 123-1 decodes the high-compression multi-wavelength compressed stream to recover the multi-wavelength data.

The up-sampling filter 202 applies inverse processing of the down-sampling filter 201 to the multi-wavelength data recovered by the multi-wavelength data decoding unit 123-1. The resolution of the multi-wavelength data received by the multi-wavelength data decoding unit 123-1 is reduced by the down-sampling filter 201. The up-sampling filter 202 applies, to the multi-wavelength data, a filtering process of restoring the resolution reduced by the down-sampling filter 201.

The data analysis unit 124-1 analyzes the multi-wavelength data with the resolution restored by the up-sampling filter 202 and generates and outputs a report (immediate report).

The reception unit 121-2 receives the low-compression multi-wavelength compressed stream transmitted from the transmission unit 113-2. The multi-wavelength data decoding unit 123-2 decodes the low-compression multi-wavelength compressed stream to recover the multi-wavelength data. The data analysis unit 124-2 analyzes the multi-wavelength data recovered by the multi-wavelength data decoding unit 123-2 and generates and outputs a report (detailed report).

The detailed report is an analysis result of the multi-wavelength data recovered from the low-compression multi-wavelength compressed stream with a larger amount of information than the high-compression multi-wavelength compressed stream. Therefore, the detailed report basically includes information (analysis result) more accurate than the immediate report that is an analysis result of the multi-wavelength data recovered from the high-compression multi-wavelength compressed stream.

<Flow of Imaging Process>

Figure 19:
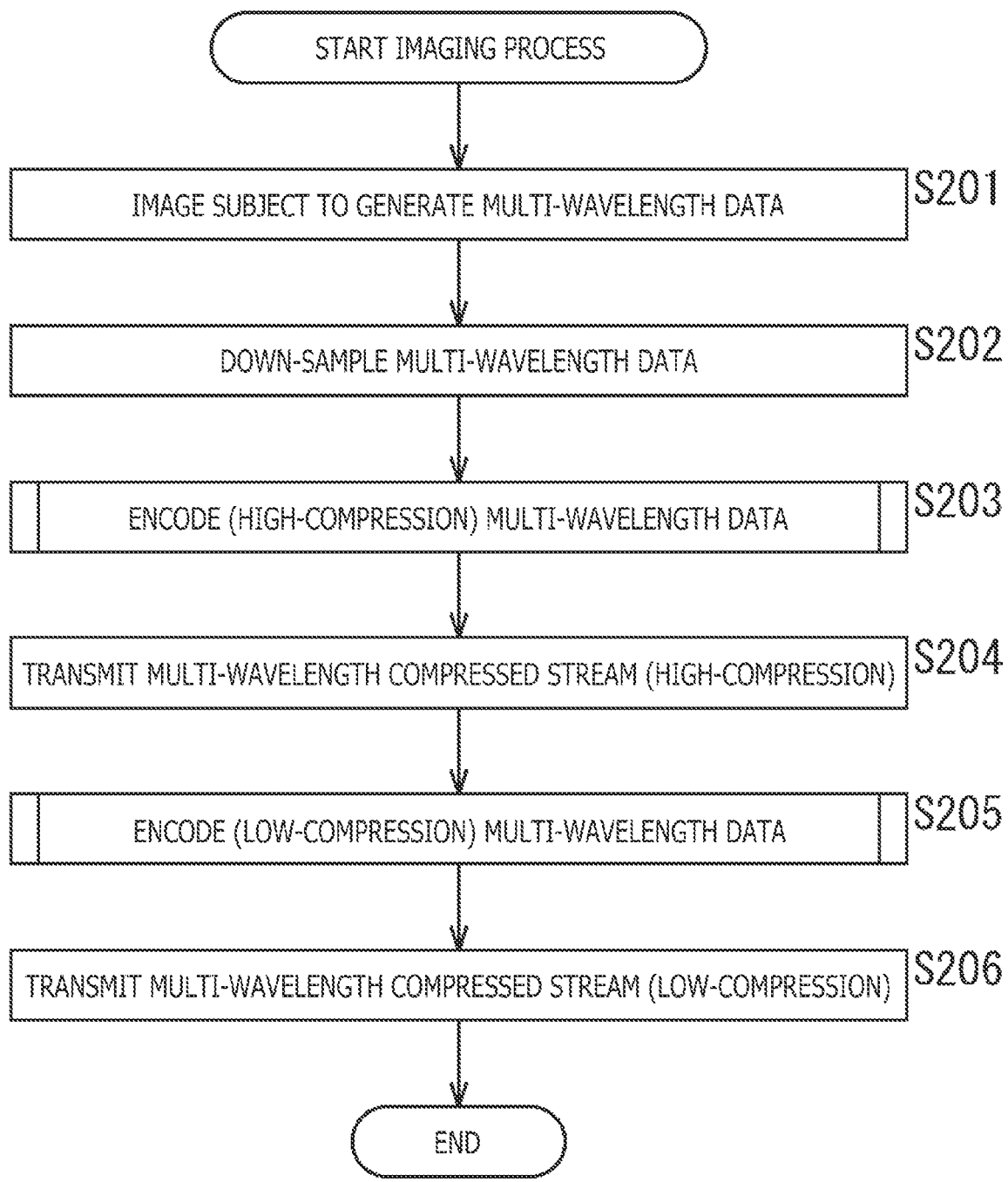
FIG. 19 is a flow chart describing an example of a flow of the imaging process.

In this case, the imaging process is executed in, for example, a flow as illustrated in a flow chart of FIG. 19. That is, once the imaging process is started, the multi-wavelength sensor 111 images the subject to generate the multi-wavelength data in step S201. In step S202, the down-sampling filter 201 down-samples the multi-wavelength data. In step S203, the multi-wavelength data encoding unit 112-1 encodes the down-sampled multi-wavelength data to generate the high-compression multi-wavelength compressed stream. In step S204, the transmission unit 113-1 transmits the high-compression multi-wavelength compressed stream.

Furthermore, in step S204, the multi-wavelength data encoding unit 112-2 encodes the multi-wavelength data generated in step S201 to generate the low-compression multi-wavelength compressed stream. In step S206, the transmission unit 113-1 transmits the low-compression multi-wavelength compressed stream.

The high-compression multi-wavelength compressed stream and the low-compression multi-wavelength compressed stream transmitted by the imaging apparatus 101 are transmitted to the information processing apparatus 102.

<Flow of Multi-Wavelength Data Processing>

An example of a flow of the multi-wavelength data processing executed by the information processing apparatus 102 in this case will be described with reference to a flow chart of FIG. 20. Once the multi-wavelength data processing is started, the reception unit 121-1 receives the high-compression multi-wavelength compressed stream transmitted from the imaging apparatus 101 in step S211. In step S212, the multi-wavelength data decoding unit 123-1 decodes the received high-compression multi-wavelength compressed stream to recover the multi-wavelength data. In step S213, the up-sampling filter 202 up-samples the recovered multi-wavelength data. The data analysis unit 124-1 analyzes the up-sampled multi-wavelength data to create an immediate report in step S214 and outputs the immediate report in step S215.

In addition, the reception unit 121-2 receives the low-compression multi-wavelength compressed stream transmitted from the imaging apparatus 101 in step S216. In step S217, the multi-wavelength data decoding unit 123-2 decodes the received low-compression multi-wavelength compressed stream to recover the multi-wavelength data. The data analysis unit 124-2 analyzes the recovered multi-wavelength data to create a detailed report in step S218 and outputs the detailed report in step S219.

In such a way, the imaging apparatus 101 can transmit the multi-wavelength compressed stream at the compression rate corresponding to, for example, the communication environment and the like (for example, bandwidth, stability, and the like of communication path). In addition, the multi-wavelength compressed streams encoded (compressed) at a plurality of compression rates can be transmitted, and this can also suppress the reduction in the accuracy while suppressing the reduction in the immediacy of the report (analysis result) generated by the information processing apparatus 102.

<Image Processing System>

Figure 21:
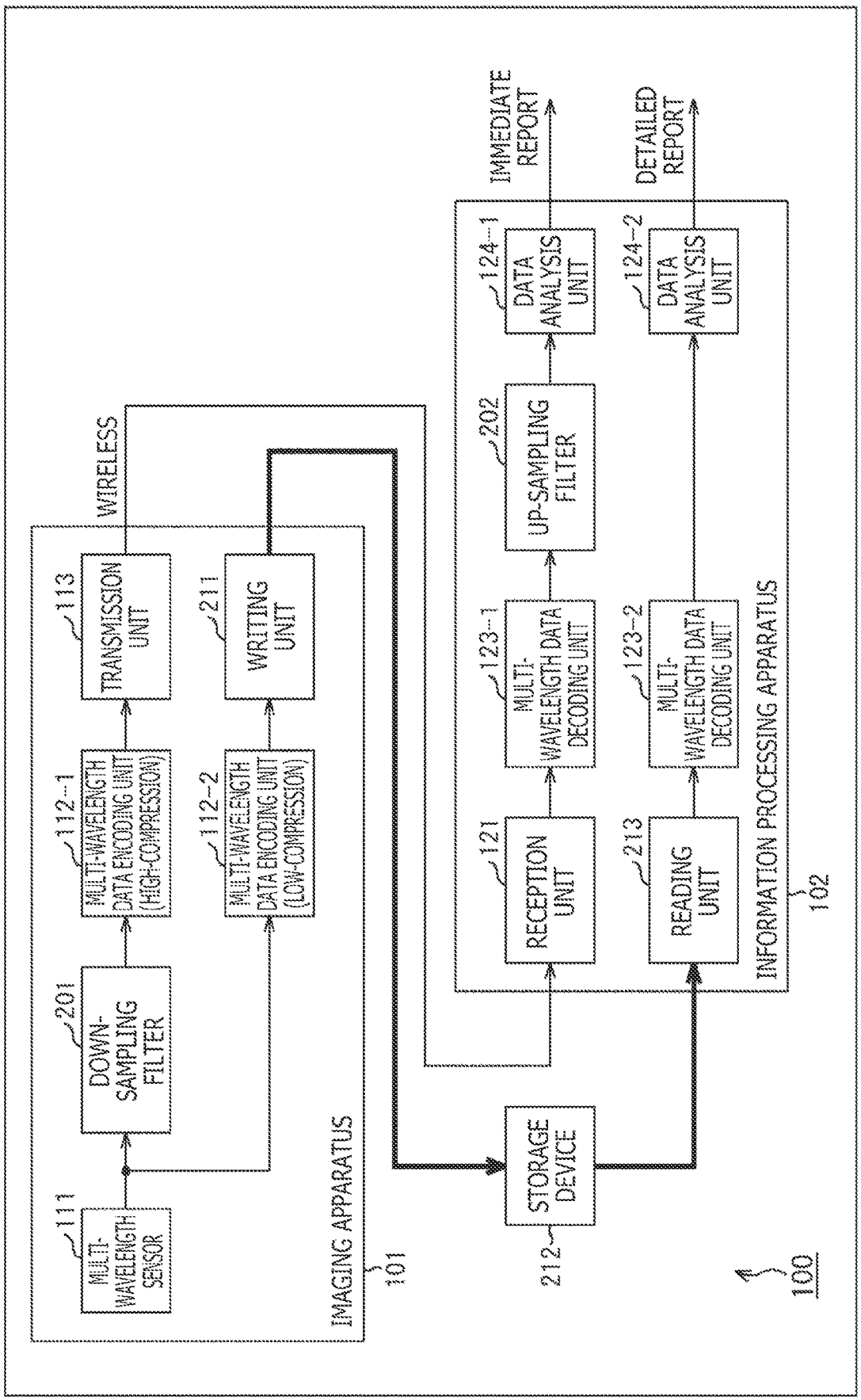
FIG. 21 is a block diagram illustrating a main configuration example of the image processing system.

Note that the multi-wavelength compressed stream may be transmitted from the imaging apparatus 101 to the information processing apparatus 102 through a storage medium instead of the communication medium. FIG. 21 is a block diagram illustrating a main configuration example of the image processing system 100 in this case. In the case of the example illustrated in FIG. 21, the low-compression multi-wavelength compressed stream is provided from the imaging apparatus 101 to the information processing apparatus 102 through the storage medium (storage device 212).

The imaging apparatus 101 in this case includes a writing unit 211 in place of the transmission unit 113-2 compared to the case of FIG. 18. The writing unit 211 writes the low-compression multi-wavelength compressed stream generated by the multi-wavelength data encoding unit 112-2 to the storage device 212.

The storage device 212 is, for example, a device including any storage medium, such as a hard disk and a semiconductor memory. The storage device 212 may be connected to the imaging apparatus 101 and the information processing apparatus 102 through a communication path or may be formed so that the storage device 212 can be attached to and detached from the imaging apparatus 101 and the information processing apparatus 102. The storage device 212 can store multi-wavelength compressed streams.

The information processing apparatus 102 includes a reading unit 213 in place of the reception unit 121-2. The reading unit 213 reads the low-compression multi-wavelength compressed stream stored in the storage device 212 and supplies the low-compression multi-wavelength compressed stream to the multi-wavelength data decoding unit 123-2.

<Flow of Imaging Process>

Figure 22:
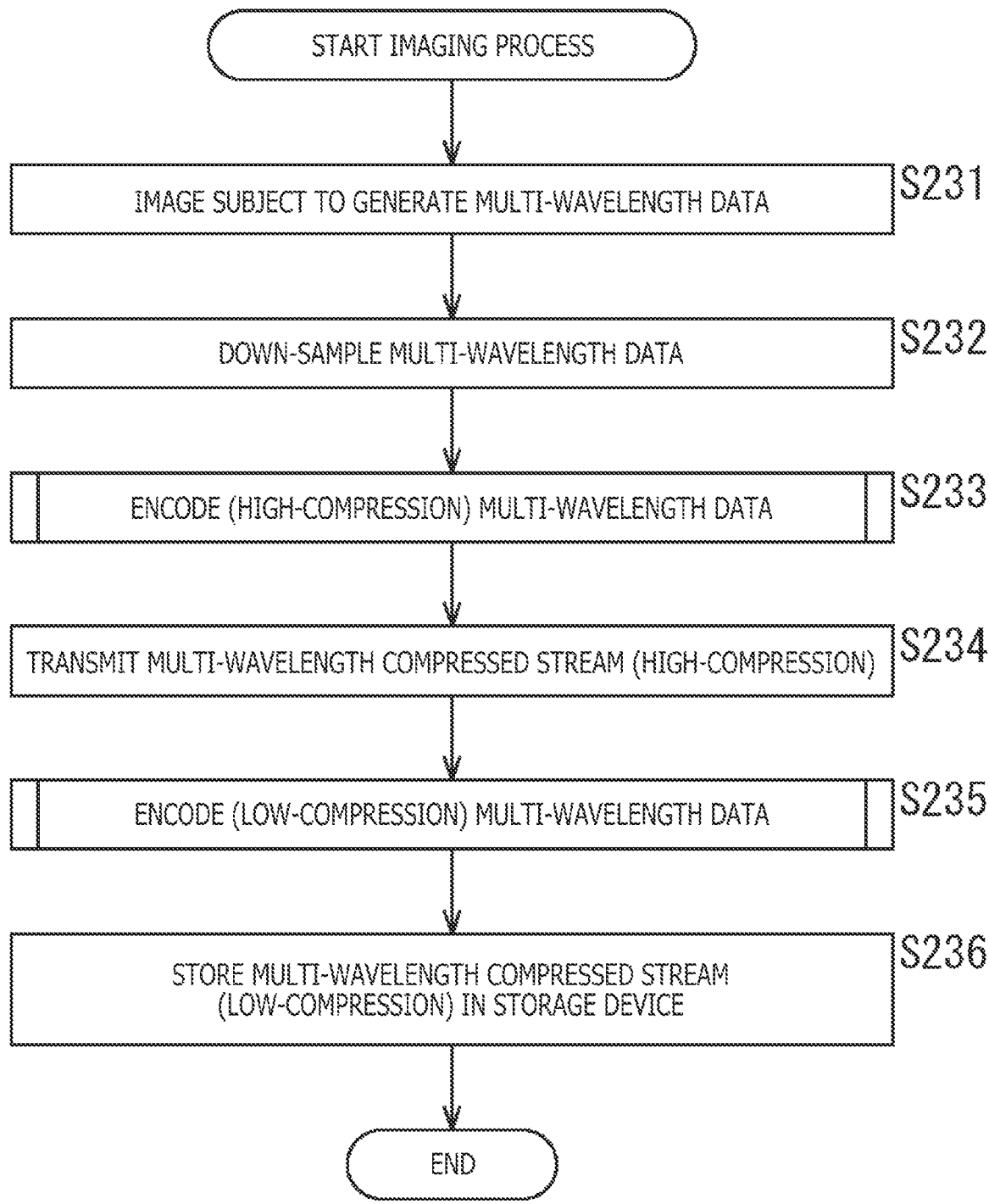
FIG. 22 is a flow chart describing an example of a flow of the imaging process.

In this case, the imaging process is executed in, for example, a flow as illustrated in a flow chart of FIG. 22. That is, once the imaging process is started, processes of steps S231 to S235 are executed as in the processes of steps S201 to S205 in FIG. 19.

In step S236, the writing unit 211 writes (stores) the low-compression multi-wavelength compressed stream generated in step S235 to the storage device 212.

<Flow of Multi-Wavelength Data Processing>

Figure 23:
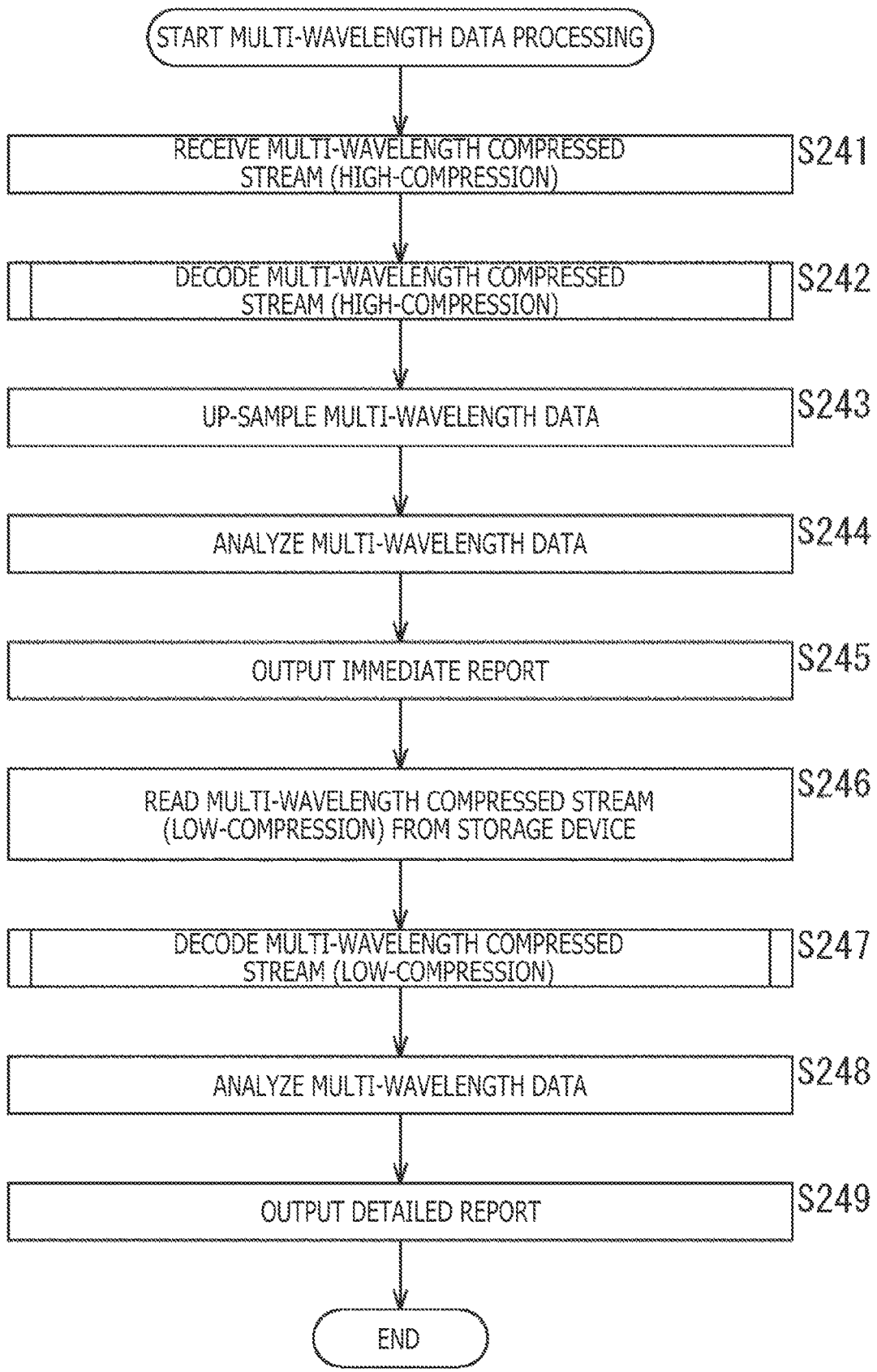
FIG. 23 is a flow chart describing an example of a flow of the multi-wavelength data processing.

An example of a flow of the multi-wavelength data processing executed by the information processing apparatus 102 in this case will be described with reference to a flow chart of FIG. 23. Once the multi-wavelength data processing is started, processes of steps S241 to S245 are executed as in the processes of steps S211 to S215 in FIG. 20.

In step S246, the reading unit 213 reads the low-compression multi-wavelength compressed stream stored in the storage device 212.

Figure 20:
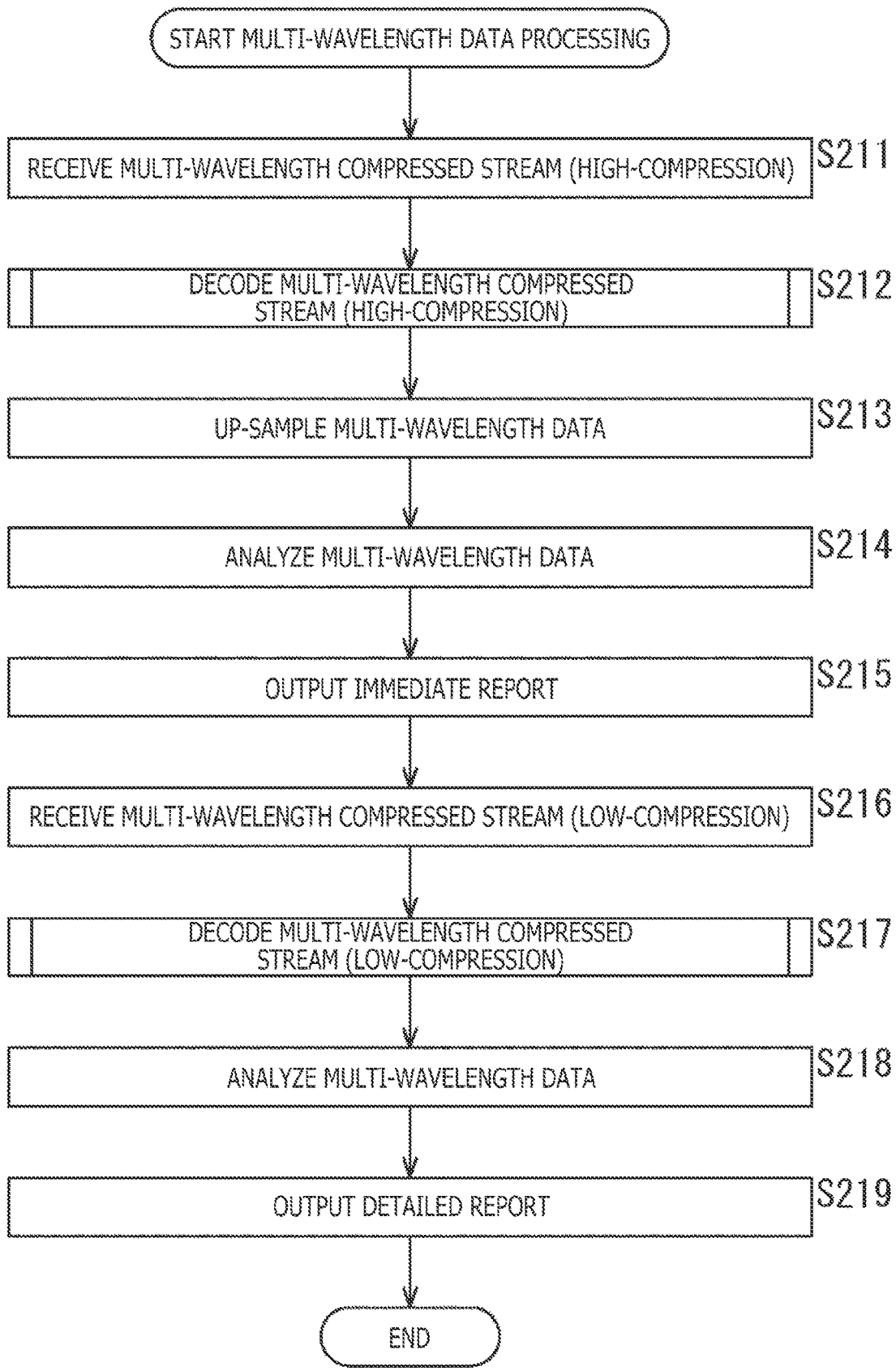
FIG. 20 is a flow chart describing an example of a flow of the multi-wavelength data processing.

Processes of steps S247 to S249 are executed as in the processes of steps S217 to S219 in FIG. 20.

In such a way, the multi-wavelength compressed stream can also be transmitted from the imaging apparatus 101 to the information processing apparatus 102 through the storage device.

<Applications>

Although the multi-wavelength compressed streams with two types of compression rates are transmitted in the examples described in FIGS. 18 to 23, the examples are not limited to these, and multi-wavelength compressed streams with three or more types of compression rates may be transmitted.

In addition, the compression rate of the encoding by the multi-wavelength data encoding unit 112-1 may be the same as the compression rate of the encoding by the multi-wavelength data encoding unit 112-2 or may be higher than the compression rate of the encoding by the multi-wavelength data encoding unit 112-2.

In addition, the up-sampling filter 202 may not be included. In that case, the data analysis unit 124-1 maintains the reduced resolution to analyze the multi-wavelength data and generate the immediate report.

<2-5. Proxy Transmission>

The transmission of the multi-wavelength compressed streams with a plurality of types of compression rates may be used to prioritize the high-compression multi-wavelength compressed stream over the low-compression multi-wavelength compressed stream in transmitting the streams (proxy transmission). For example, the transmission unit in the image processing apparatus may prioritize the encoded data with a higher compression rate in transmitting the data.

<Image Processing System>

Figure 24:
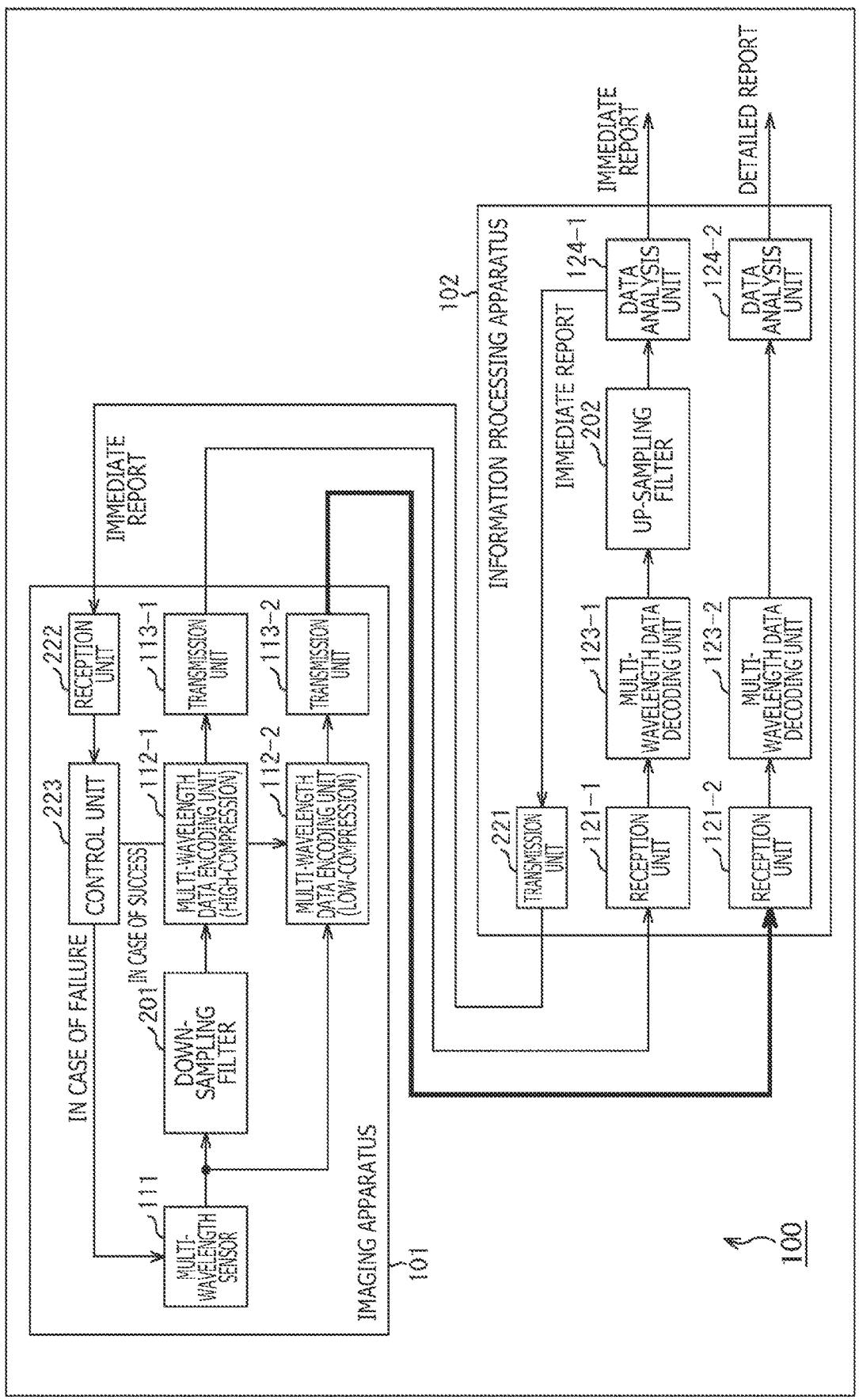
FIG. 24 is a block diagram illustrating a main configuration example of the image processing system.

FIG. 24 is a block diagram illustrating a main configuration example of the image processing system 100 in this case. In the case of the example illustrated in FIG. 24, the information processing apparatus 102 further includes a transmission unit 221 compared to the case of FIG. 18. The transmission unit 221 transmits the immediate report created by the data analysis unit 124-1 to the imaging apparatus 101.

The imaging apparatus 101 further includes a reception unit 222 and a control unit 223 compared to the case of FIG. 18. The reception unit 222 receives the immediate report transmitted from the transmission unit 221 and supplies the immediate report to the control unit 223. The control unit 223 controls the operation of the multi-wavelength sensor 111 and the multi-wavelength data encoding unit 112-2 based on the immediate report supplied from the reception unit 222. For example, in a case where it is found out that the information processing apparatus 102 has failed to generate the immediate report, the control unit 223 controls the multi-wavelength sensor 111 to cause the multi-wavelength sensor 111 to image the subject again. Furthermore, in a case where, for example, it is found out that the information processing apparatus 102 has successfully generated the immediate report, the control unit 223 controls the multi-wavelength data encoding unit 112-2 to cause the multi-wavelength data encoding unit 112-2 to generate the low-compression multi-wavelength compressed stream. That is, the process is advanced so that the information processing apparatus 102 generates the detailed report.

<Flow of Imaging Process>

Figure 25:
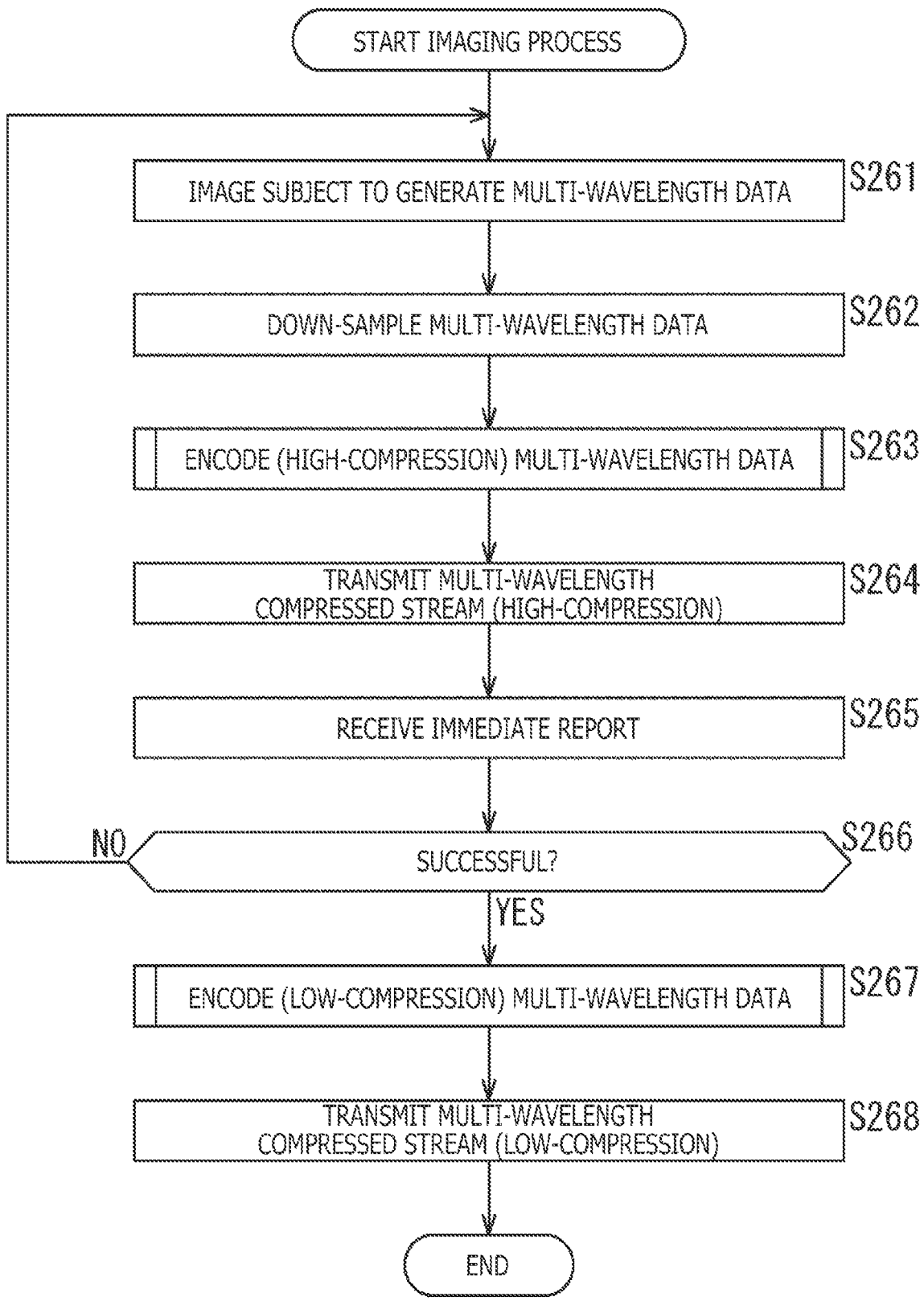
FIG. 25 is a flow chart describing an example of a flow of the imaging process.

In this case, the imaging process is executed in, for example, a flow as illustrated in a flow chart of FIG. 25. That is, once the imaging process is started, the processes of steps S261 to S264 are executed as in the processes of steps S201 to S204 in FIG. 19.

In step S265, the reception unit 222 receives the immediate report transmitted from the information processing apparatus 102. In step S266, the control unit 223 determines whether or not the transmission of the high-compression multi-wavelength compressed stream is successful based on the reception result of the immediate report. In a case where the control unit 223 determines that the acquired immediate report is not correctly generated so that the transmission of the high-compression multi-wavelength compressed stream has failed, the process returns to step S261. That is, the high-compression multi-wavelength compressed stream is transmitted again.

Furthermore, in a case where the control unit 223 determines that the immediate report is correctly generated so that the transmission of the high-compression multi-wavelength compressed stream is successful in step S266, the process proceeds to step S267. Processes of steps S267 and S268 are executed as in the processes of steps S205 and S206 in FIG. 19.

<Flow of Multi-Wavelength Data Processing>

Figure 26:
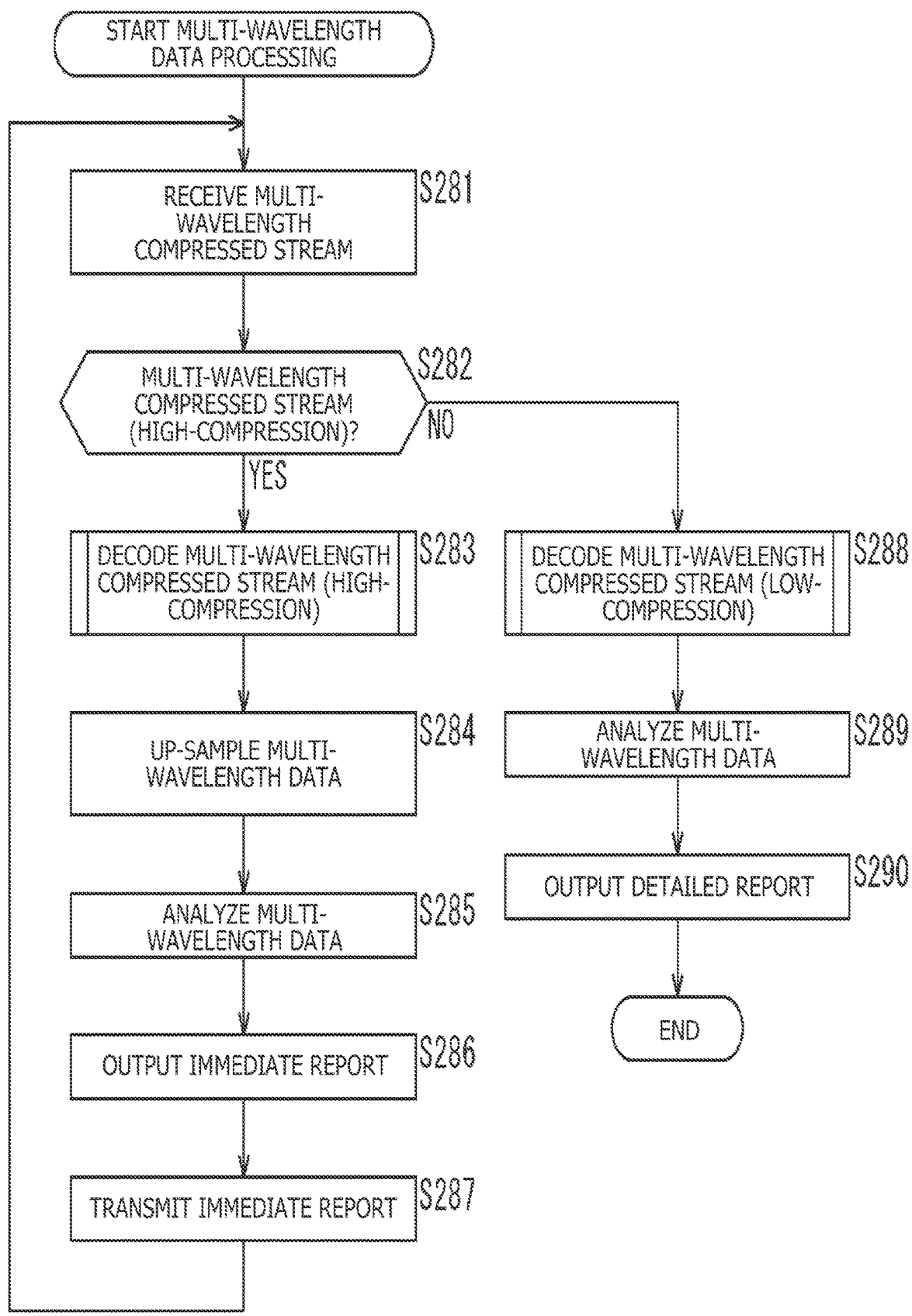
FIG. 26 is a flow chart describing an example of a flow of the multi-wavelength data processing.

An example of a flow of the multi-wavelength data processing executed by the information processing apparatus 102 in this case will be described with reference to a flow chart of FIG. 26. Once the multi-wavelength data processing is started, the reception unit 121 (reception unit 121-1 or reception unit 121-2) receives the multi-wavelength compressed stream in step S281. In step S282, the reception unit 121 determines whether the received multi-wavelength compressed stream is a high-compression stream or a low-compression stream. For example, whether the reception unit 121 that has received the data is the reception unit 121-1 or the reception unit 121-2 is identified to determine the compression rate of the multi-wavelength compressed stream.

In a case where the reception unit 121 determines that the high-compression multi-wavelength compressed stream is received, the process proceeds to step S283. Processes of steps S283 to S286 are executed as in the processes of steps S212 to S215 in FIG. 20. In step S287, the transmission unit 221 transmits the immediate report to the imaging apparatus 101. Once the process of step S287 is finished, the process returns to step S281.

Furthermore, in a case where the reception unit 121 determines that the low-compression multi-wavelength compressed stream is received in step S282, the process proceeds to step S288. Processes of steps S288 to S290 are executed as in the processes of steps S217 to S219 in FIG. 20.

In such a way, the high-compression multi-wavelength compressed stream with a small amount of data can be prioritized and transmitted, and the immediate report can be generated and output earlier. Therefore, the reduction in the immediacy of creating the report can be suppressed.

<Image Processing System>

Figure 27:
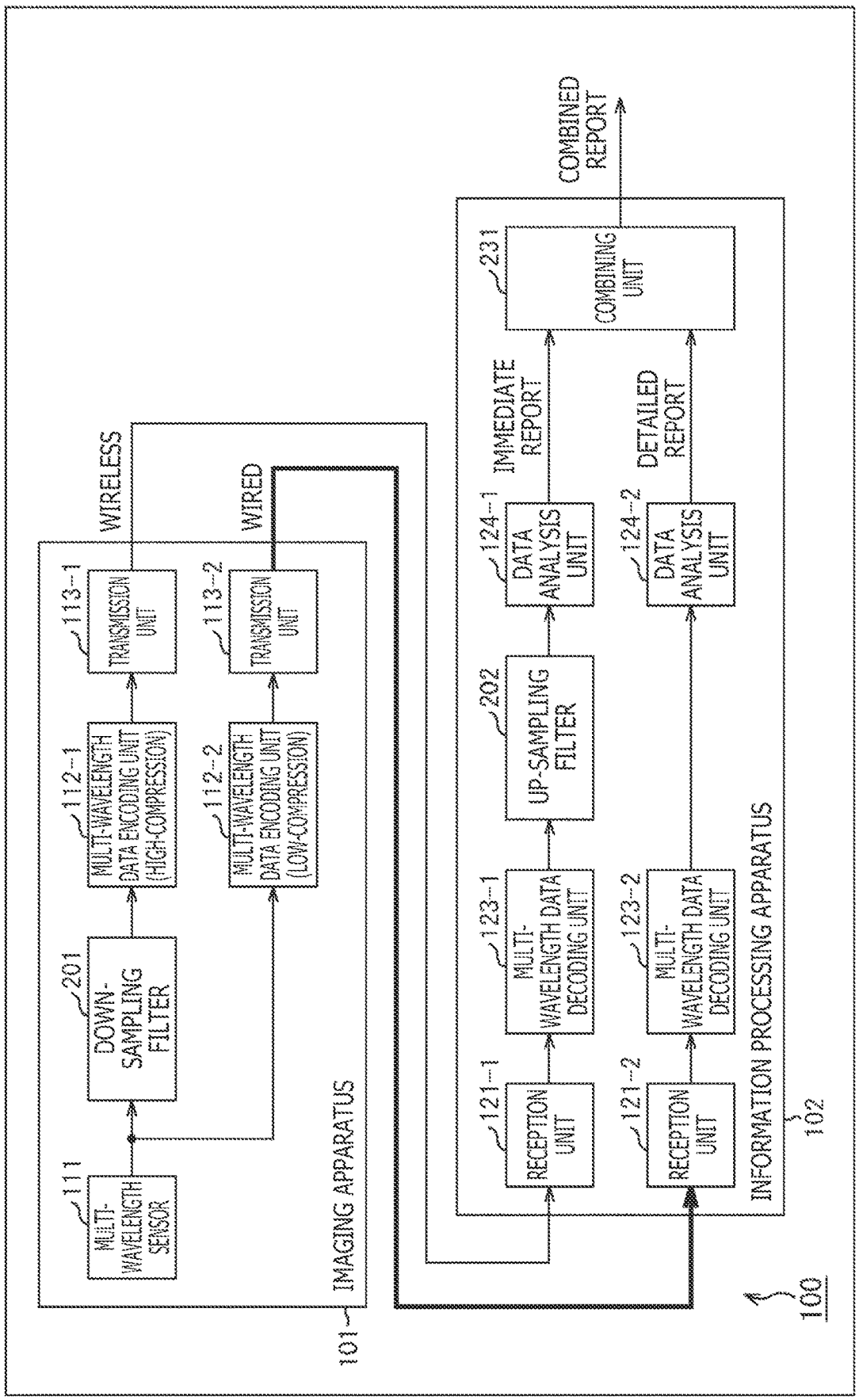
FIG. 27 is a block diagram illustrating a main configuration example of the image processing system.

FIG. 27 is a block diagram illustrating another configuration example of the image processing system 100 that performs the proxy transmission. In the case of the example illustrated in FIG. 27, the information processing apparatus 102 further includes a combining unit 231 compared to the case of FIG. 18. The combining unit 231 combines the immediate report created by the data analysis unit 124-1 and the detailed report created by the data analysis unit 124-2 to generate a combined report and outputs the combined report.

Figure 28:
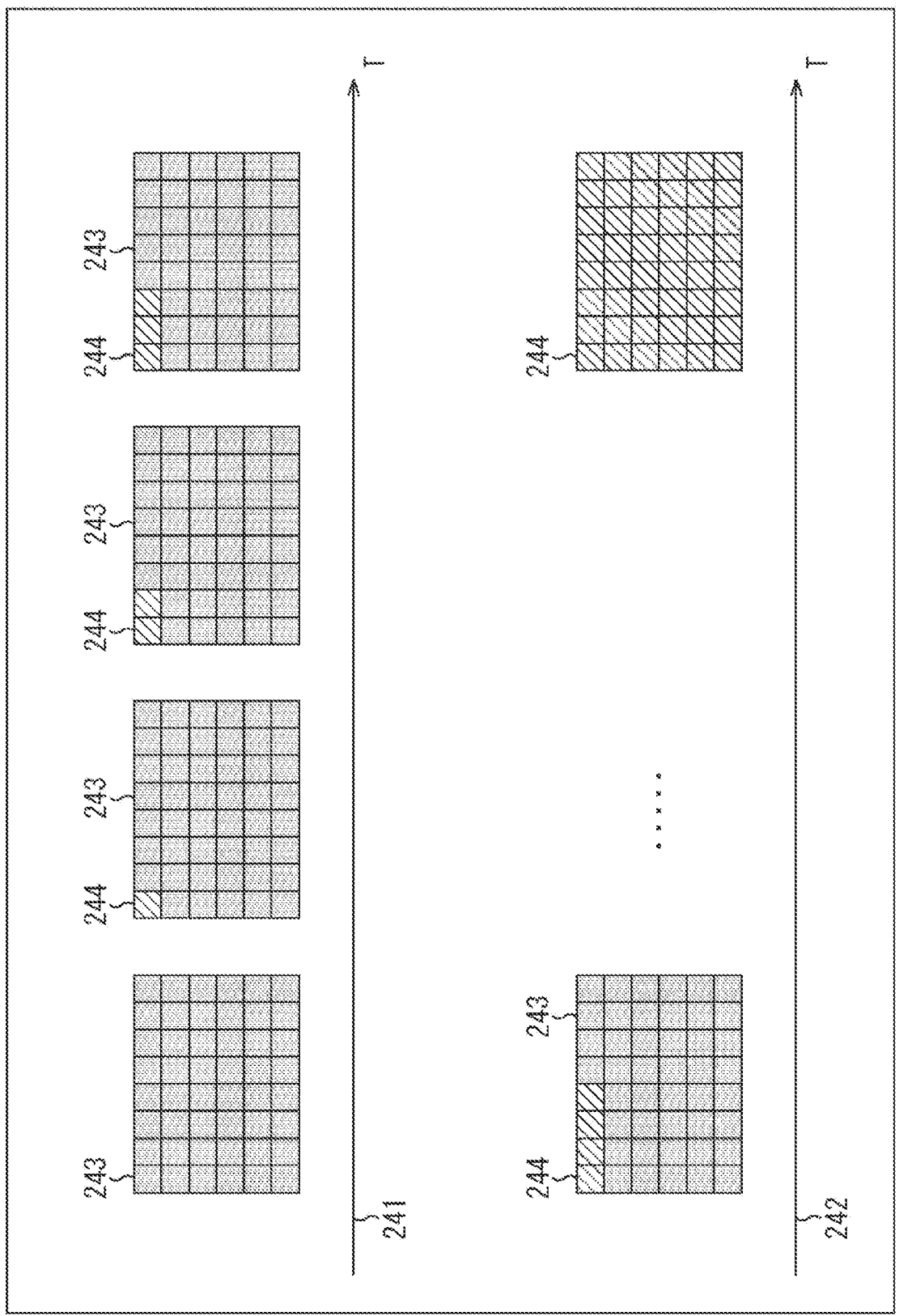
FIG. 28 is a diagram illustrating an example of a state of generating a combined report.

FIG. 28 is a diagram illustrating an example of a state of generating the combined report. In FIG. 28, an arrow 241 and an arrow 242 indicate time series in the direction of the arrows. The time series indicated by the arrow 242 follows the time series indicated by the arrow 241. The image processing system 100 performs the proxy transmission as described above, and the immediate report is generated temporally earlier than the detailed report. Therefore, as illustrated at the left end of the time series of the arrow 241 in FIG. 28, immediate reports 243 are generated first. Subsequently, a detailed report 244 is generated as time goes on. Once the detailed report 244 is generated, the combining unit 231 replaces the corresponding immediate report 243 with the detailed report 244. After that, the immediate report is replaced with the detailed report 244 every time the detailed report 244 is generated. Therefore, the detailed reports 244 increase with time, and ultimately, all of the reports are replaced with the detailed reports 244 as illustrated at the right end of the time series of the arrow 242.

This can suppress the reduction in the accuracy of the content of the report while suppressing the reduction in the immediacy of the report output.

<Flow of Multi-Wavelength Data Processing>

Figure 29:
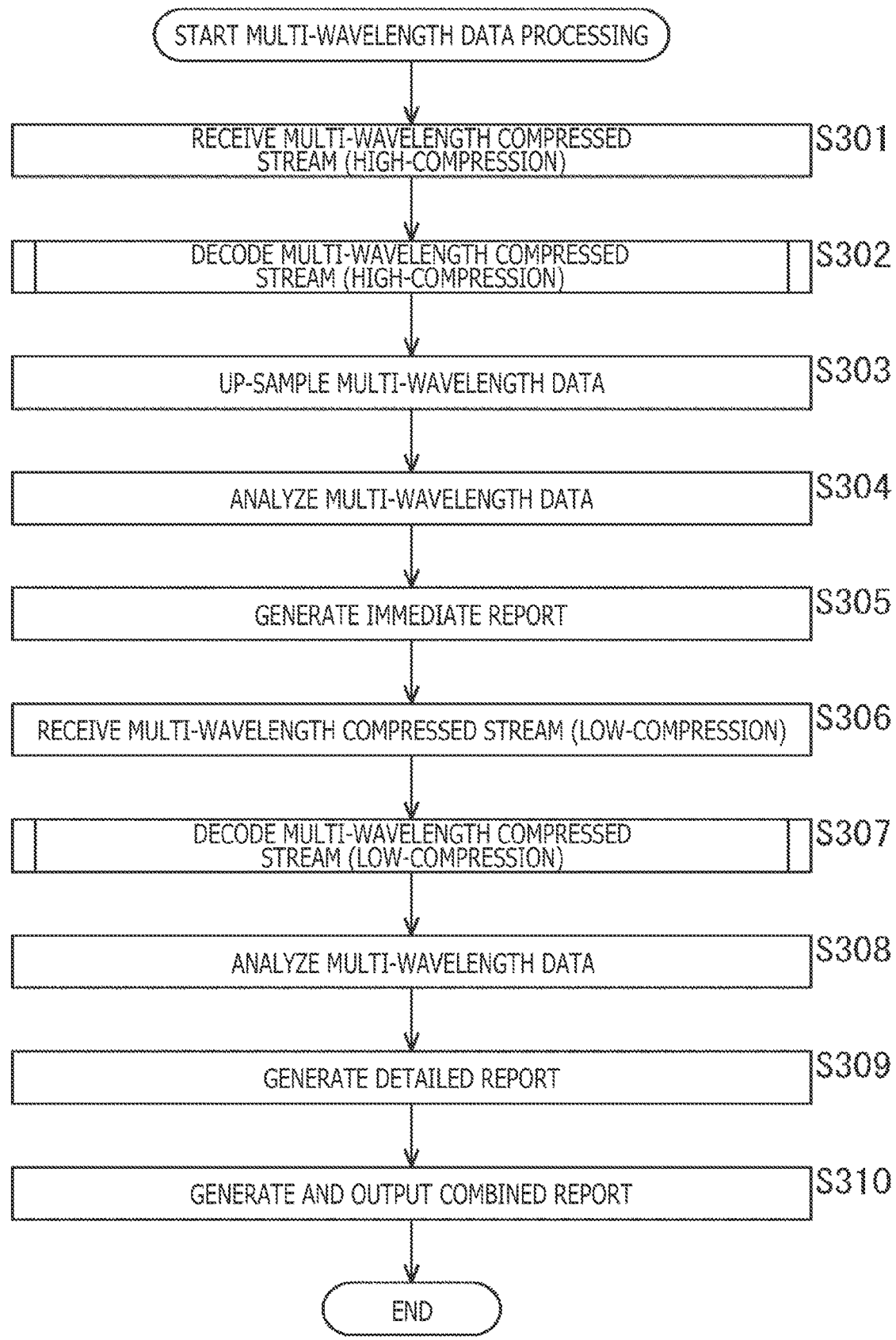
FIG. 29 is a flow chart describing an example of a flow of the multi-wavelength data processing.

An example of a flow of the multi-wavelength data processing executed by the information processing apparatus 102 in this case will be described with reference to a flow chart of FIG. 29. Once the multi-wavelength data processing is started, processes of steps S301 to S309 are executed as in the processes of steps S211 to S219 in FIG. 20. In step S310, the combining unit 231 combines the immediate report and the detailed report to generate the combined report and outputs the combined report.

In such a way, the combined report can be generated and output, and this can suppress the reduction in the accuracy of the content of the report while suppressing the reduction in the immediacy of the report output.

<2-6. Noise Reduction>

A noise reduction process that is a filtering process of removing noise may be applied to the multi-wavelength data encoded as described above. For example, the image processing apparatus may further include a noise reduction processing unit that applies the noise reduction process to the multi-wavelength data generated by the imaging unit, and the encoding unit may encode the multi-wavelength data subjected to the noise reduction process of the noise reduction processing unit.

Figure 30:
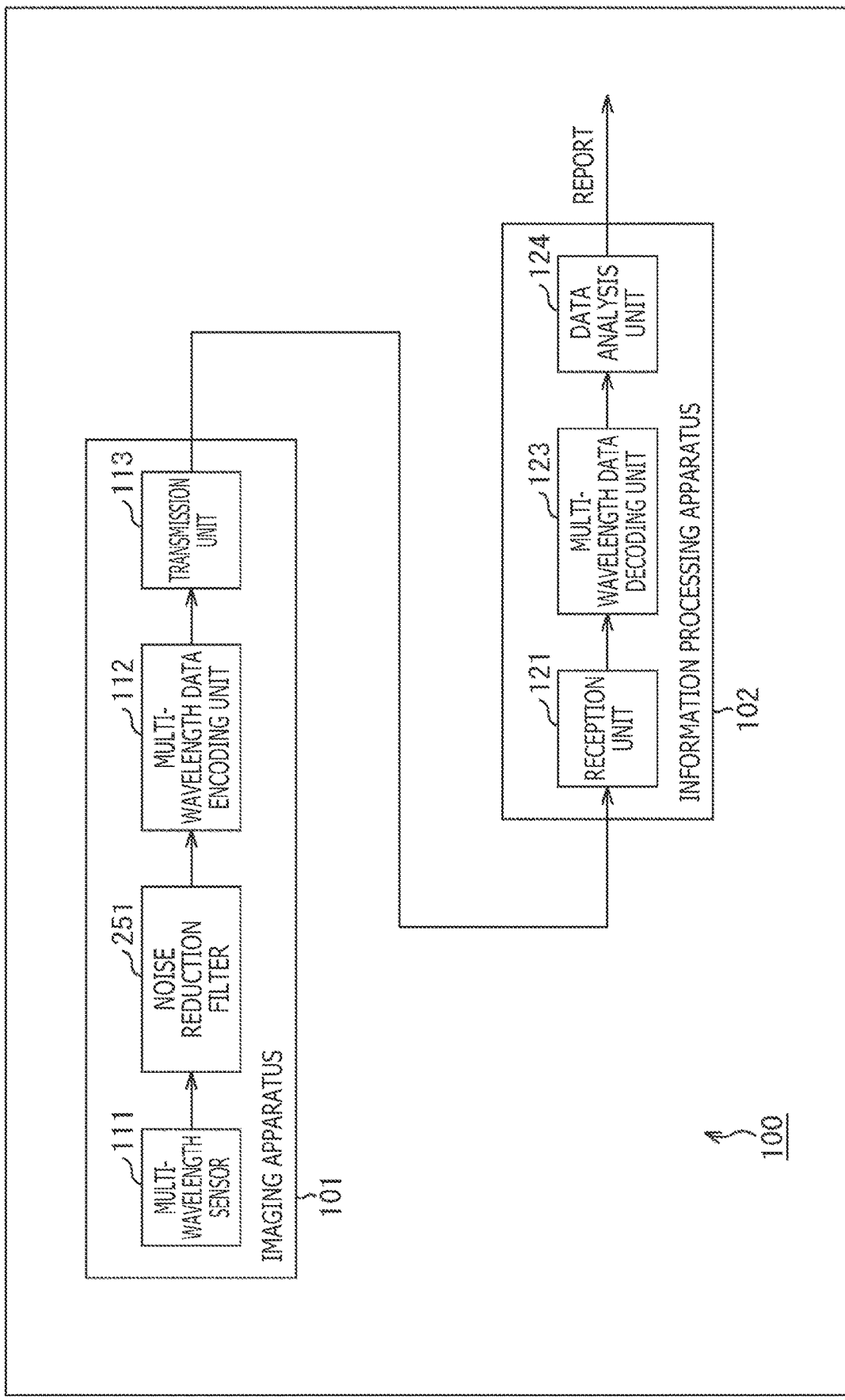
FIG. 30 is a block diagram illustrating a main configuration example of the image processing system.

FIG. 30 is a block diagram illustrating another configuration example of the image processing system 100 in this case. In the case of the example illustrated in FIG. 30, the imaging apparatus 101 includes a noise reduction filter 251 compared to the case of FIG. 1.

The noise reduction filter 251 applies a noise reduction process of suppressing an increase of noise to the single-wavelength data generated by the multi-wavelength sensor 111. The details of the noise reduction process are optional. The multi-wavelength data encoding unit 112 encodes the multi-wavelength data subjected to the noise reduction process.

Furthermore, the information processing apparatus 102 in this case has a configuration similar to the case of FIG. 15.

<Flow of Imaging Process>

Figure 31:
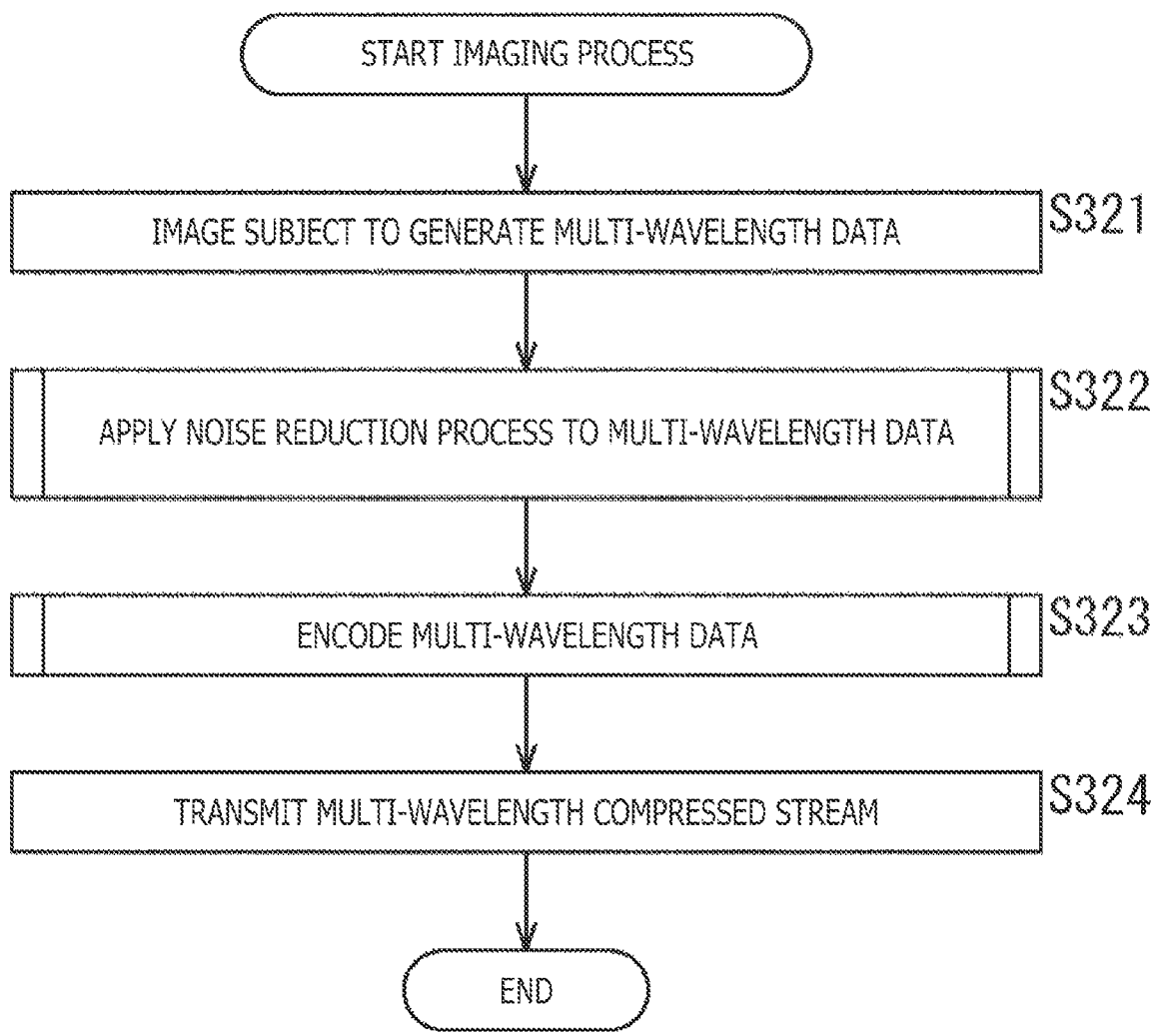
FIG. 31 is a flow chart describing an example of a flow of the imaging process.

An example of a flow of the imaging process in this case will be described with reference to a flow chart of FIG. 31. Once the imaging process is started, the multi-wavelength sensor 111 images the subject to generate the multi-wavelength data in step S321. In step S322, the noise reduction filter 251 applies the noise reduction process to the multi-wavelength data. In step S323, the multi-wavelength data encoding unit 112 encodes the multi-wavelength data subjected to the noise reduction process to generate the encoded data (multi-wavelength compressed stream). In step S324, the transmission unit 113 transmits the multi-wavelength compressed stream.

In such a way, the generation of noise in the multi-wavelength data can be suppressed in the encoding, and the reduction in the encoding efficiency can be suppressed.

<Noise Reduction Filter>

The noise reduction process for the multi-wavelength data may be independently executed on the basis of, for example, wavelength components. For example, the noise reduction processing unit in the image processing apparatus may independently execute the noise reduction process on the basis of the wavelength components of the multi-wavelength data.

Figure 32:
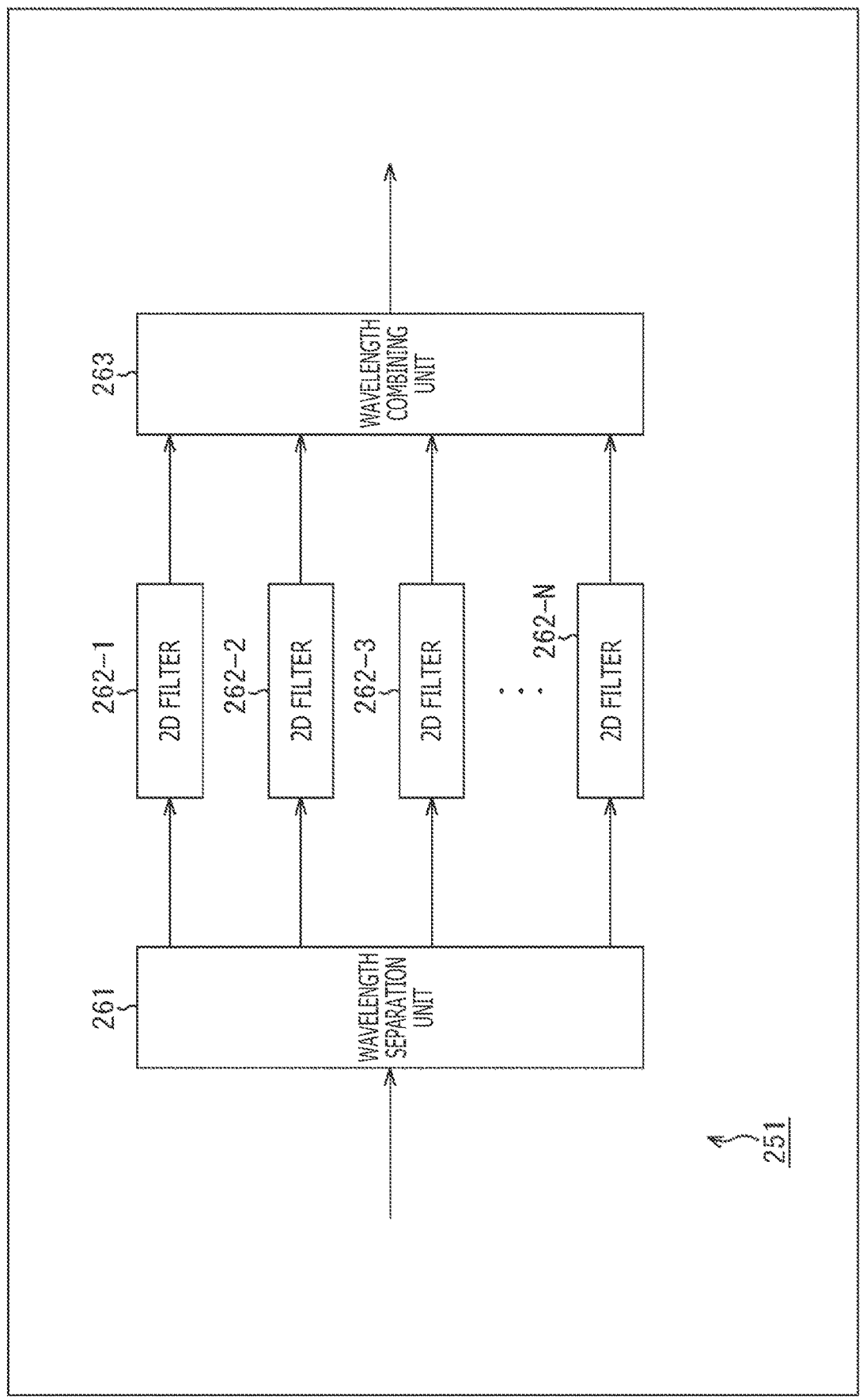
FIG. 32 is a block diagram illustrating a main configuration example of a noise reduction filter.

FIG. 32 is a block diagram illustrating a main configuration example of the multi-wavelength data encoding unit 112 in this case. As illustrated in FIG. 32, the noise reduction filter 251 includes a wavelength separation unit 261, 2D filters 262-1 to 262-N (N is any natural number), and a wavelength combining unit 263. The 2D filters 262-1 to 262-N will be referred to as 2D filters 262 in a case where the filters do not have to be distinguished from each other in the description.

The wavelength separation unit 261 separates the multi-wavelength data into data (single-wavelength data) on the basis of wavelength components. The 2D filters 262 are prepared on the basis of wavelength components. That is, the 2D filters 262-1 to 262-D apply the two-dimensional filtering process to the single-wavelength data of corresponding wavelength components, respectively. The wavelength combining unit 263 combines the single-wavelength data to generate multi-wavelength data and outputs the multi-wavelength data (for example, supplies the multi-wavelength data to the multi-wavelength data encoding unit 112). The method of combining is optional.

<Flow of Noise Reduction Process>

Figure 33:
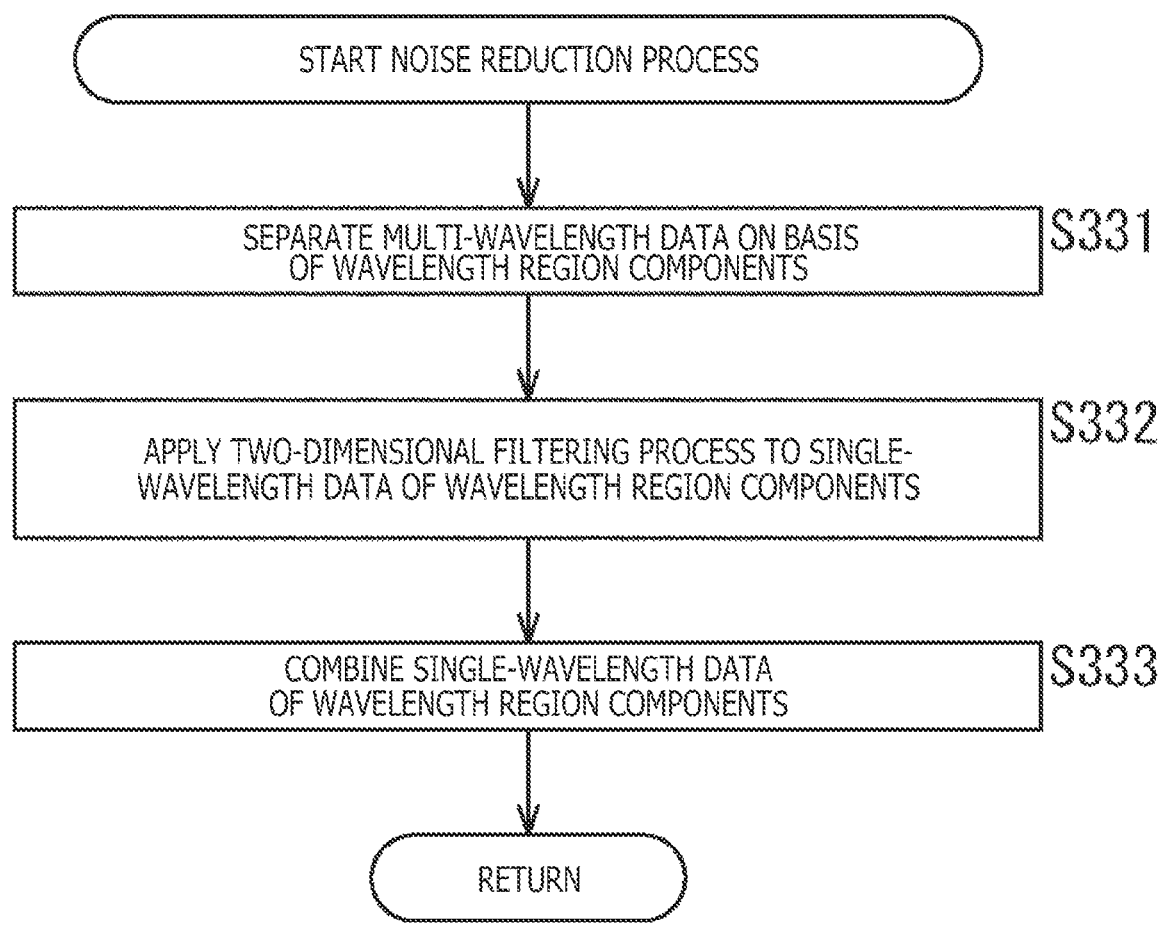
FIG. 33 is a flow chart describing an example of a flow of a noise reduction process.

An example of a flow of the noise reduction process executed in step S322 of FIG. 31 in this case will be described with reference to a flow chart of FIG. 33. Once the noise reduction process is started, the wavelength separation unit 261 separates the multi-wavelength data into single-wavelength data on the basis of wavelength components in step S331. In step S332, the 2D filters 262 apply the two-dimensional filtering process to the single-wavelength data of the wavelength components. In step S333, the wavelength combining unit 263 combines the single-wavelength data of the wavelength components subjected to the two-dimensional filtering process to generate the multi-wavelength data. Once the process of step S333 is finished, the multi-wavelength data encoding process ends, and the process returns to FIG. 31.

In such a way, the noise reduction process can be executed on the basis of wavelength components, and the noise of the multi-wavelength data can be more easily suppressed.

3. Second Embodiment

<3-1 Encoding and Storage of Multi-Wavelength Data>

For example, in the precision agriculture, the multi-wavelength data generated by the imaging apparatus of the terminal is stored as a database in the server (cloud) or the like and is used to, for example, figure out the growth conditions of plants. However, the amount of data of the multi-wavelength data is large, and this may increase the cost for the data accumulation.

Therefore, the multi-wavelength data is encoded (compressed), and the encoded data is stored. In such a way, the increase in the amount of stored data can be suppressed. That is, the increase in the load of processing the multi-wavelength data can be suppressed.

<Image Processing System>

Figure 34:
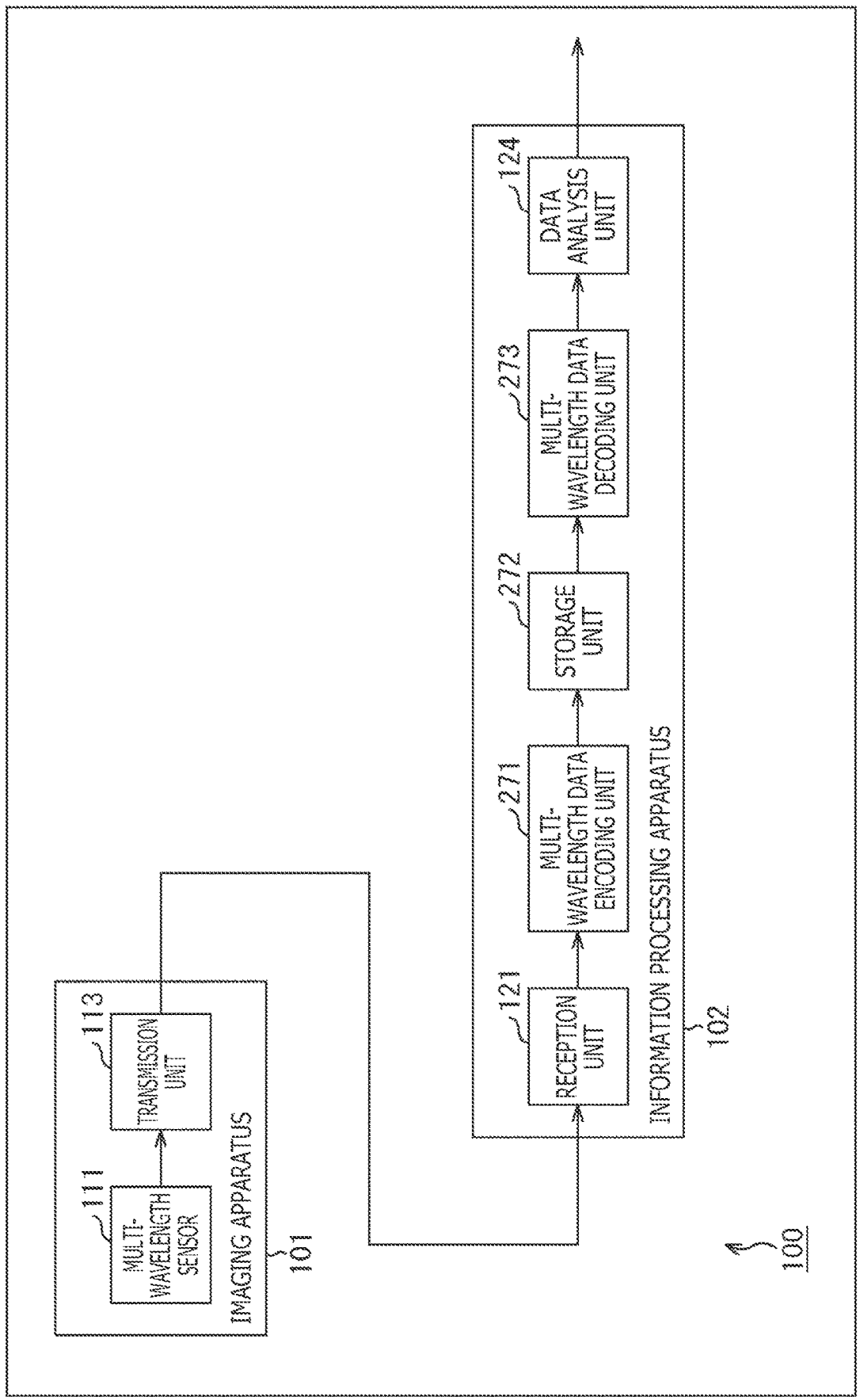
FIG. 34 is a block diagram illustrating a main configuration example of the image processing system.

FIG. 34 is a block diagram illustrating an example of a configuration of the image processing system in this case. In this case, the imaging apparatus 101 includes the multi-wavelength sensor 111 and the transmission unit 113. That is, the imaging apparatus 101 in this case transmits the multi-wavelength data generated by the multi-wavelength sensor 111 from the transmission unit 113 to the information processing apparatus 102 without encoding.

The information processing apparatus 102 includes the reception unit 121, a multi-wavelength data encoding unit 271, a storage unit 272, a multi-wavelength data decoding unit 273, and the data analysis unit 124. The reception unit 121 receives the multi-wavelength data transmitted from the imaging apparatus 101. The multi-wavelength data encoding unit 271 has a function similar to the multi-wavelength data encoding unit 112 and executes a similar process. For example, the multi-wavelength data encoding unit 271 encodes the multi-wavelength data received by the reception unit 121 to generate a multi-wavelength compressed stream. The storage unit 272 includes, for example, any storage medium, such as a hard disk and a semiconductor memory, and stores the multi-wavelength compressed stream generated by the multi-wavelength data encoding unit 271 in the storage medium. The multi-wavelength data decoding unit 273 has a function similar to the multi-wavelength data decoding unit 123 and executes a similar process. For example, the multi-wavelength data decoding unit 273 reads and decodes the multi-wavelength compressed stream stored in the storage unit 272 to recover the multi-wavelength data. The data analysis unit 124 analyzes the multi-wavelength data recovered by the multi-wavelength data decoding unit 273 to generate a report and outputs the report.

<Flow of Imaging Process>

Figure 35:
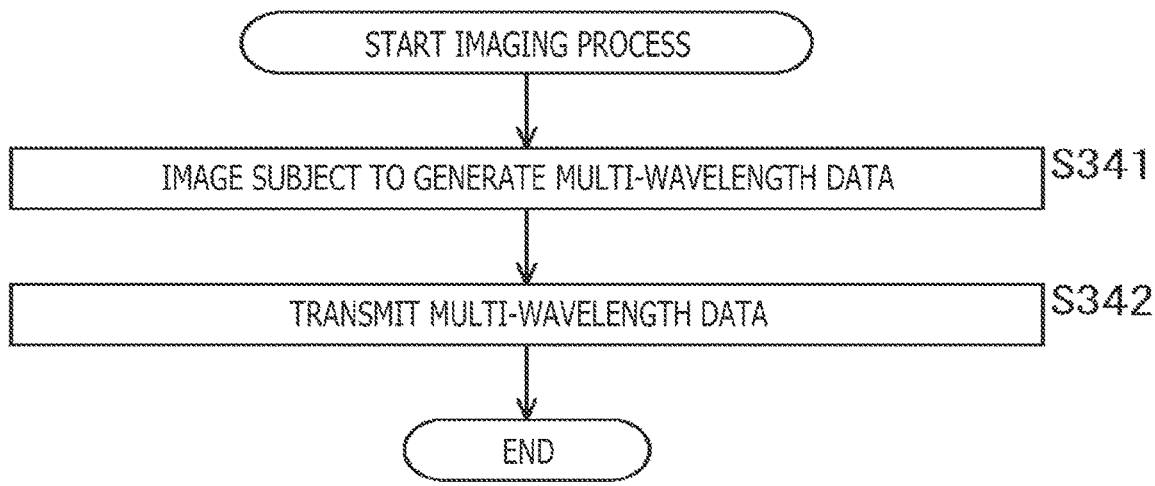
FIG. 35 is a flow chart describing an example of a flow of the imaging process.

An example of a flow of the imaging process executed by the imaging apparatus 101 in this case will be described with reference to a flow chart of FIG. 35. Once the imaging process is started, the multi-wavelength sensor 111 images the subject to generate the multi-wavelength data in step S341. In step S342, the transmission unit 113 transmits the multi-wavelength data to the information processing apparatus 102. Once the process of step S342 is finished, the imaging process ends.

<Flow of Multi-Wavelength Data Processing>

Figure 36:
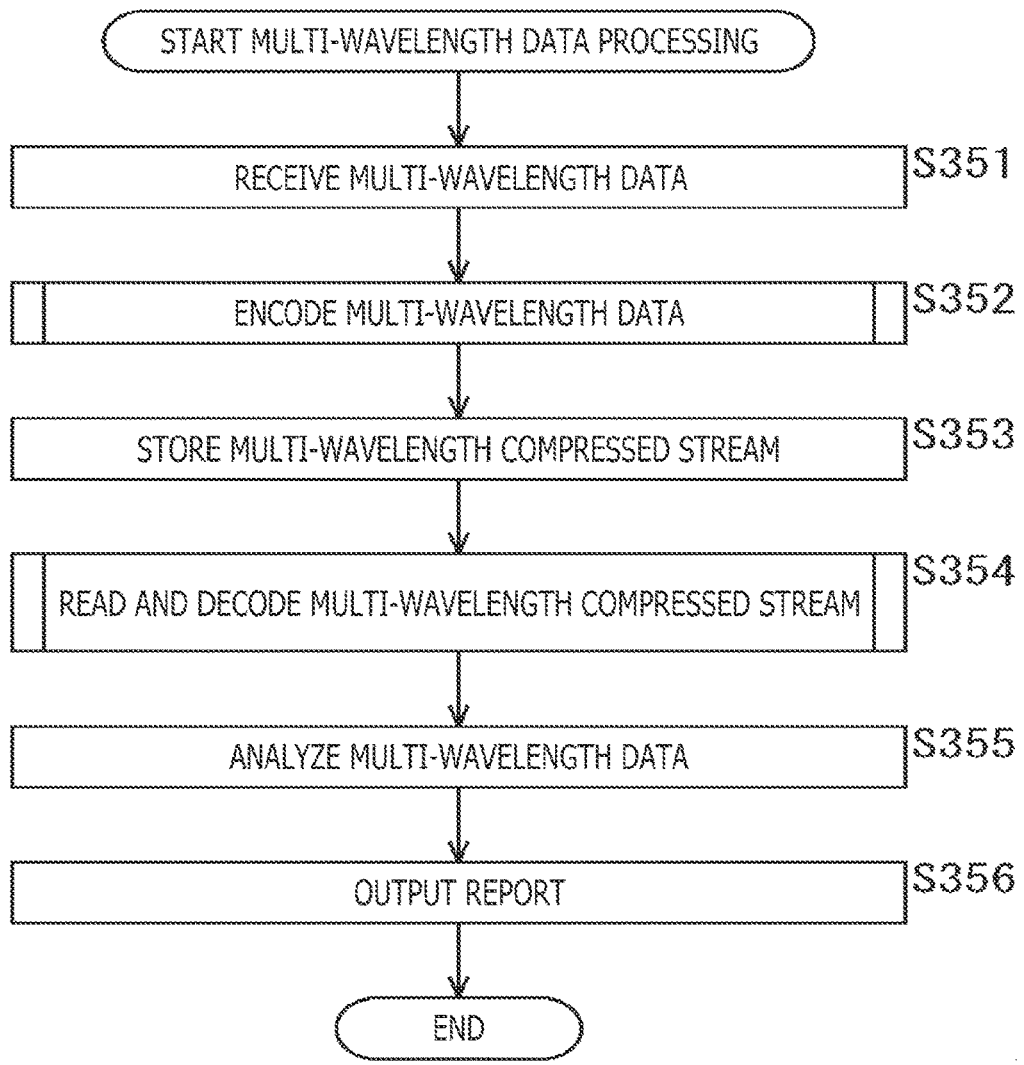
FIG. 36 is a flow chart describing an example of a flow of the multi-wavelength data processing.

An example of a flow of the multi-wavelength data processing executed by the information processing apparatus 102 in this case will be described with reference to a flow chart of FIG. 36. Once the multi-wavelength data processing is started, the reception unit 121 receives the multi-wavelength data transmitted from the imaging apparatus 101 in step S351. In step S352, the multi-wavelength data encoding unit 271 encodes the received multi-wavelength data to generate the multi-wavelength compressed stream. In step S353, the storage unit 272 stores the multi-wavelength compressed stream. In step S354, the multi-wavelength data decoding unit 273 reads and decodes the multi-wavelength compressed stream stored in the storage unit 272 to recover the multi-wavelength data. The data analysis unit 124 analyzes the recovered multi-wavelength data to generate the report in step S355 and outputs the report in step S356.

In such a way, when the multi-wavelength data is to be stored, the multi-wavelength data is encoded and (the encoded data is) stored. In such a way, the increase in the amount of stored data can be suppressed. That is, the increase in the load of processing the multi-wavelength data can be suppressed.

<3-2. Encoding after Certain Time>

Note that in the case of storing the data in the server or the cloud, the cost increases depending on the amount of data and the stored time. In addition, the longer the period of storing data, the older the information included in the data. The importance of the data is reduced. That is, the longer the period of storing data, the smaller the effect of the degradation caused by the encoding and decoding of the data. Therefore, uncompressed multi-wavelength data may be stored first, and the multi-wavelength data may be encoded and stored after a certain time.

<Image Processing System>

Figure 37:
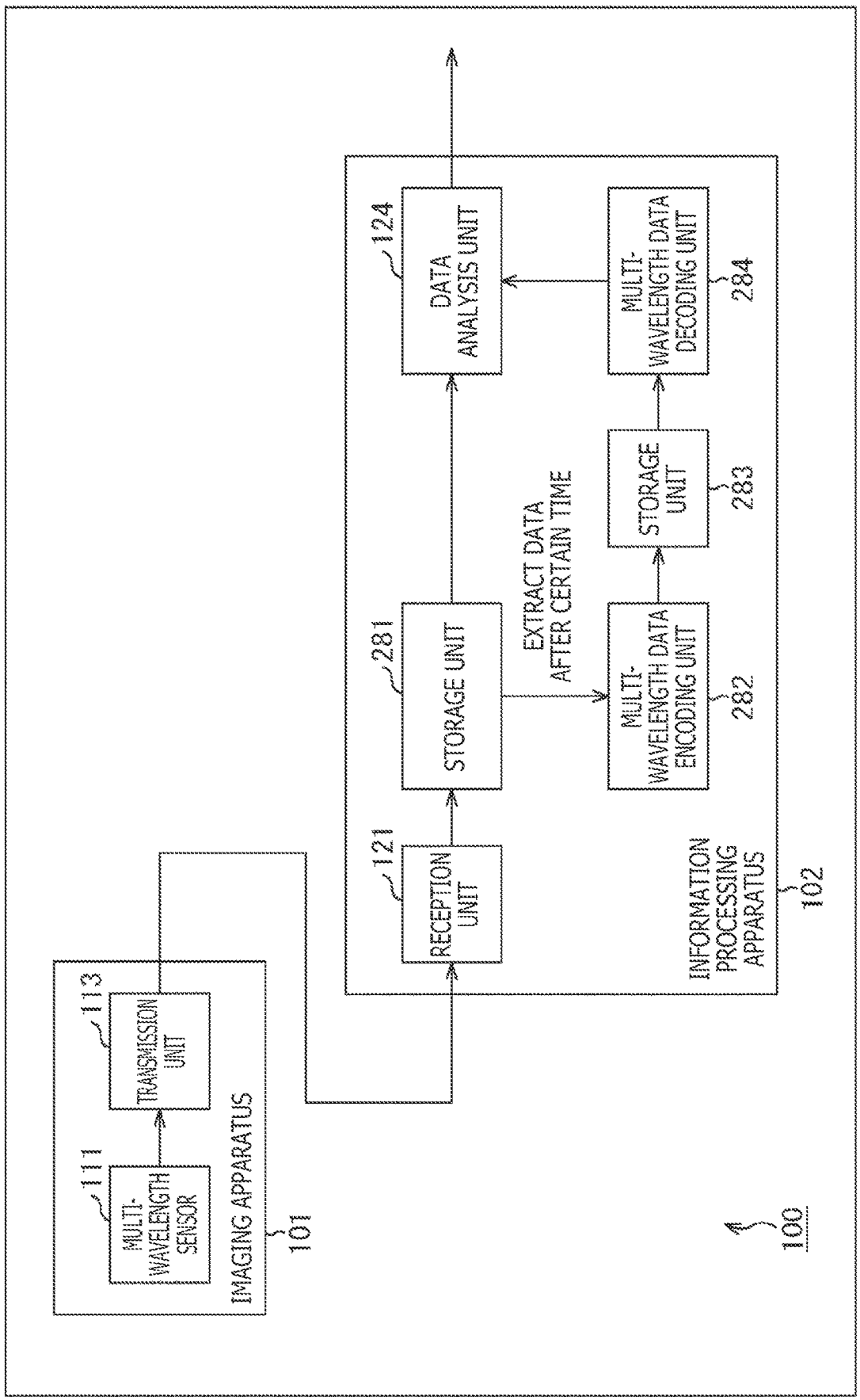
FIG. 37 is a block diagram illustrating a main configuration example of the image processing system.

FIG. 37 is a block diagram illustrating a main configuration example of the image processing system 100 in this case. As illustrated in FIG. 37, the information processing apparatus 102 in this case includes a storage unit 281, a multi-wavelength data encoding unit 282, a storage unit 283, and a multi-wavelength data decoding unit 284 in place of the units from the multi-wavelength data encoding unit 271 to the multi-wavelength data decoding unit 273 compared to the case of FIG. 34.

The storage unit 281 includes, for example, any storage medium, such as a hard disk and a semiconductor memory, and stores the uncompressed multi-wavelength data received by the reception unit 121 in the storage medium.

The multi-wavelength data encoding unit 282 basically has a function similar to the multi-wavelength data encoding unit 271 and executes a similar process. For example, the multi-wavelength data encoding unit 282 reads and encodes the multi-wavelength data stored for a certain time period in the storage unit 281 to generate a multi-wavelength compressed stream. The storage unit 283 includes, for example, any storage medium, such as a hard disk and a semiconductor memory, and stores the multi-wavelength compressed stream generated by the multi-wavelength data encoding unit 282 in the storage medium. The multi-wavelength data decoding unit 284 basically has a function similar to the multi-wavelength data decoding unit 273 and executes a similar process. For example, the multi-wavelength data decoding unit 284 reads and decodes the multi-wavelength compressed stream stored in the storage unit 283 to recover the multi-wavelength data.

The data analysis unit 124 analyzes the multi-wavelength data to generate a report of the analysis and outputs the report. For example, the data analysis unit 124 acquires, from the storage unit 281, the multi-wavelength data stored in the storage unit 281 not more than a certain time before. In addition, the data analysis unit 124 acquires, through the multi-wavelength data decoding unit 284, the multi-wavelength data stored in the storage unit 281 more than a certain time before.

<Flow of Multi-Wavelength Data Processing>

Figure 38:
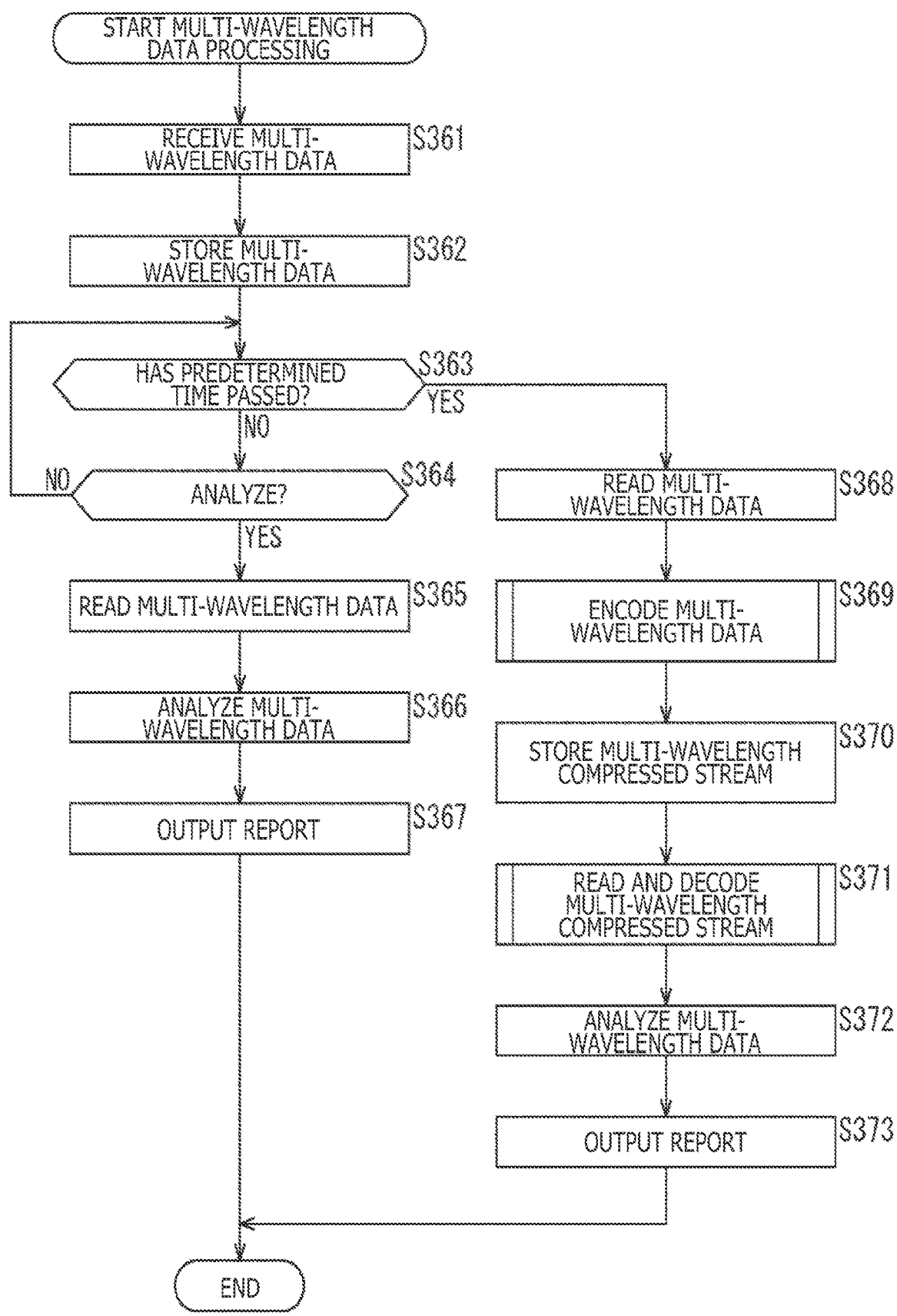
FIG. 38 is a flow chart describing an example of a flow of the multi-wavelength data processing.

An example of a flow of the multi-wavelength data processing in this case will be described with reference to a flow chart of FIG. 38.

In step S361, the reception unit 121 receives the multi-wavelength data. In step S362, the storage unit 281 stores the multi-wavelength data. In step S363, the storage unit 281 determines whether or not a predetermined time has passed after the multi-wavelength data is stored. In a case where the storage unit 281 determines that the predetermined time has not passed, the process proceeds to step S364.

In step S364, the data analysis unit 124 determines whether or not to analyze the data. In a case where the data analysis unit 124 determines not to analyze the data, the process returns to step S363. Furthermore, in a case where the data analysis unit 124 determines to analyze the data in step S364, the process proceeds to step S365. In step S365, the data analysis unit 124 reads the multi-wavelength data from the storage unit 281. In step S366, the data analysis unit 124 analyzes the multi-wavelength data and creates a report. In step S367, the data analysis unit 124 outputs the report.

Furthermore, in a case where the storage unit 281 determines that the predetermined time has passed in step S363, the process proceeds to step S368. In step S368, the multi-wavelength data encoding unit 282 reads the multi-wavelength data from the storage unit 281. In step S369, the multi-wavelength data encoding unit 282 encodes the multi-wavelength data to generate the multi-wavelength compressed stream. In step S370, the storage unit 283 stores the multi-wavelength compressed stream. In step S371, the multi-wavelength data decoding unit 284 reads the multi-wavelength compressed stream from the storage unit 283 and decodes the multi-wavelength compressed stream to recover the multi-wavelength data. In step S372, the data analysis unit 124 analyzes the recovered multi-wavelength data and creates a report. In step S373, the data analysis unit 124 outputs the report.

In such a way, the uncompressed data stored for a certain period can be encoded and stored to suppress the increase in the data with reduced importance. This can suppress the increase in the cost regarding the storage of the multi-wavelength data while suppressing the increase in the effect caused by the compression of data.

<3-3. Recompression after Certain Time>

Note that in the case of storing the data in the server or the cloud, the compression rate may be increased after a certain time.

<Image Processing System>

Figure 39:
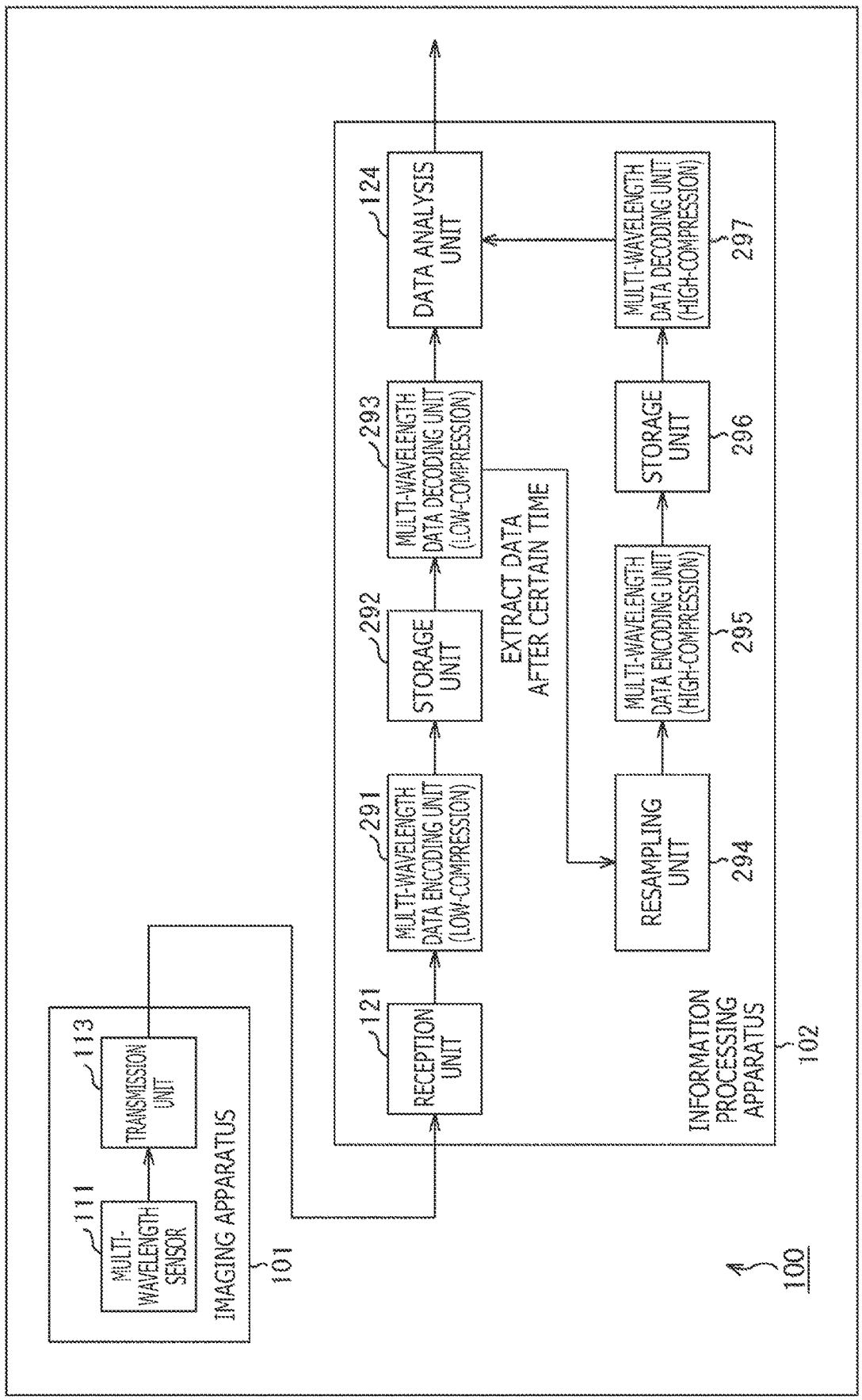
FIG. 39 is a block diagram illustrating a main configuration example of the image processing system.

FIG. 39 is a block diagram illustrating a main configuration example of the image processing system 100 in this case. In this case, the information processing apparatus 102 includes a multi-wavelength data encoding unit 291, a storage unit 292, a multi-wavelength data decoding unit 293, a resampling unit 294, a multi-wavelength data encoding unit 295, a storage unit 296, and a multi-wavelength data decoding unit 297 in place of the units from the storage unit 281 to the multi-wavelength data decoding unit 284 compared to the case of FIG. 37.

The multi-wavelength data encoding unit 291 encodes the multi-wavelength data received by the reception unit 121 to generate a multi-wavelength compressed stream. The storage unit 292 stores the multi-wavelength compressed stream. The multi-wavelength data decoding unit 293 reads the multi-wavelength compressed stream from the storage unit 292 and decodes the multi-wavelength compressed stream to recover the multi-wavelength data.

In addition, the data after a certain time is supplied to the resampling unit 294. The resampling unit 294 applies a resampling process to the multi-wavelength data to reduce the amount of information of the data. The details of the resampling process are optional. The multi-wavelength data encoding unit 295 encodes the multi-wavelength data subjected to the resampling process to generate a multi-wavelength compressed stream. The storage unit 296 stores the multi-wavelength compressed stream. The multi-wavelength data decoding unit 297 reads the multi-wavelength compressed stream stored in the storage unit 296 and decodes the multi-wavelength compressed stream to recover the multi-wavelength data.

The data analysis unit 124 analyzes the multi-wavelength data to generate a report of the analysis and outputs the report. For example, the data analysis unit 124 analyzes the multi-wavelength data recovered by the multi-wavelength data decoding unit 293 or the multi-wavelength data decoding unit 297 to generate a report of the analysis and outputs the report.

<Flow of Multi-Wavelength Data Processing>

Figure 40:
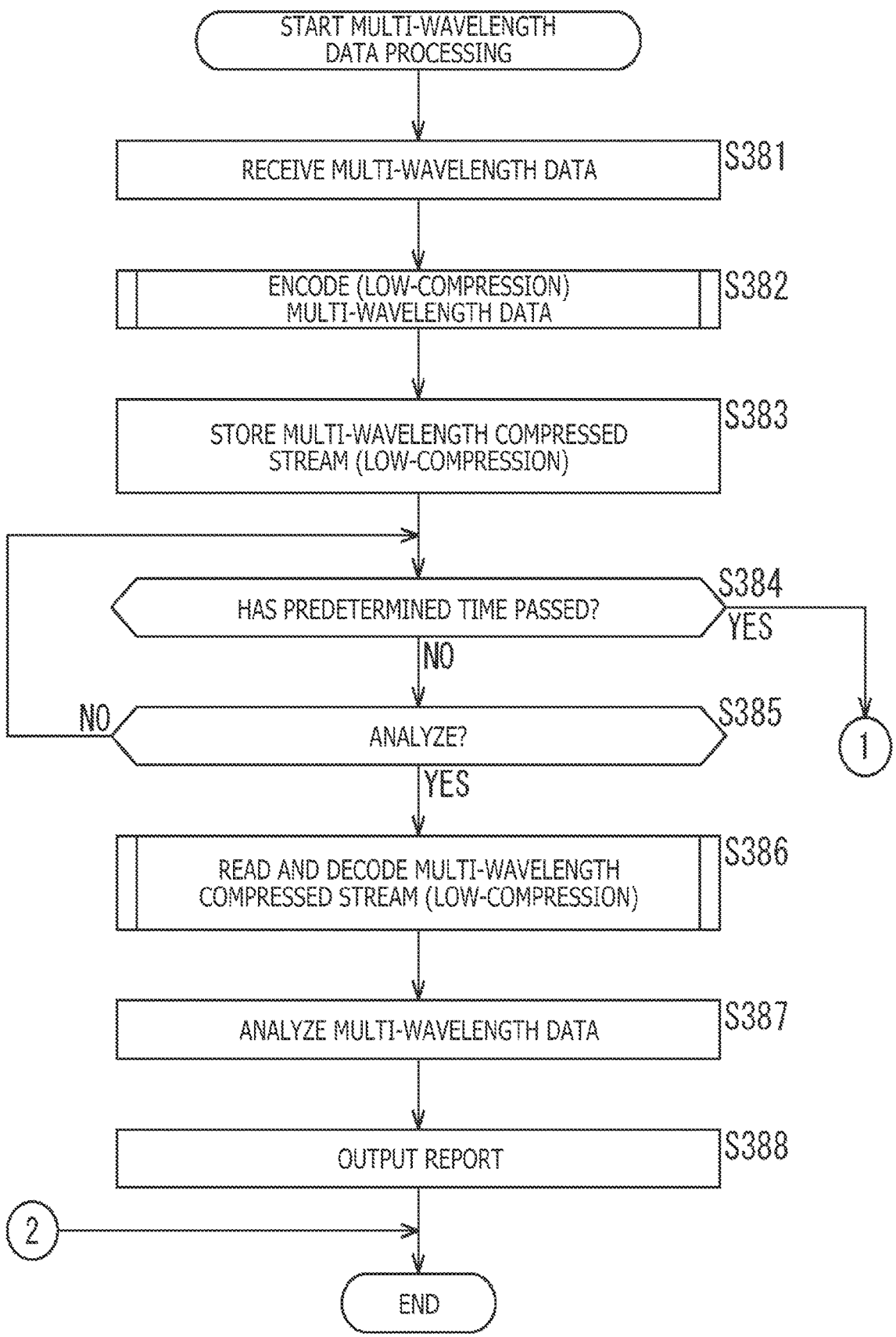
FIG. 40 is a flow chart describing an example of a flow of the multi-wavelength data processing.

An example of a flow of the multi-wavelength data processing in this case will be described with reference to a flow chart of FIGS. 40 and 41.

In step S381, the reception unit 121 receives the multi-wavelength data. In step S382, the multi-wavelength data encoding unit 291 encodes the multi-wavelength data to generate the low-compression multi-wavelength compressed stream. In step S383, the storage unit 292 stores the low-compression multi-wavelength compressed stream. In step S384, the storage unit 292 determines whether or not a predetermined time has passed after the multi-wavelength compressed stream is stored. In a case where the storage unit 292 determines that the predetermined time has passed, the process proceeds to step S385.

In step S385, the data analysis unit 124 determines whether or not to analyze the data. In a case where the data analysis unit 124 determines not to analyze the data, the process returns to step S384. Furthermore, in a case where the data analysis unit 124 determines to analyze the data in step S385, the process proceeds to step S386. In step S386, the multi-wavelength data decoding unit 293 reads the low-compression multi-wavelength compressed stream from the storage unit 292 and decodes the low-compression multi-wavelength compressed stream to recover the multi-wavelength data. In step S387, the data analysis unit 124 analyzes the recovered multi-wavelength data and creates a report. In step S388, the data analysis unit 124 outputs the report.

Figure 41:
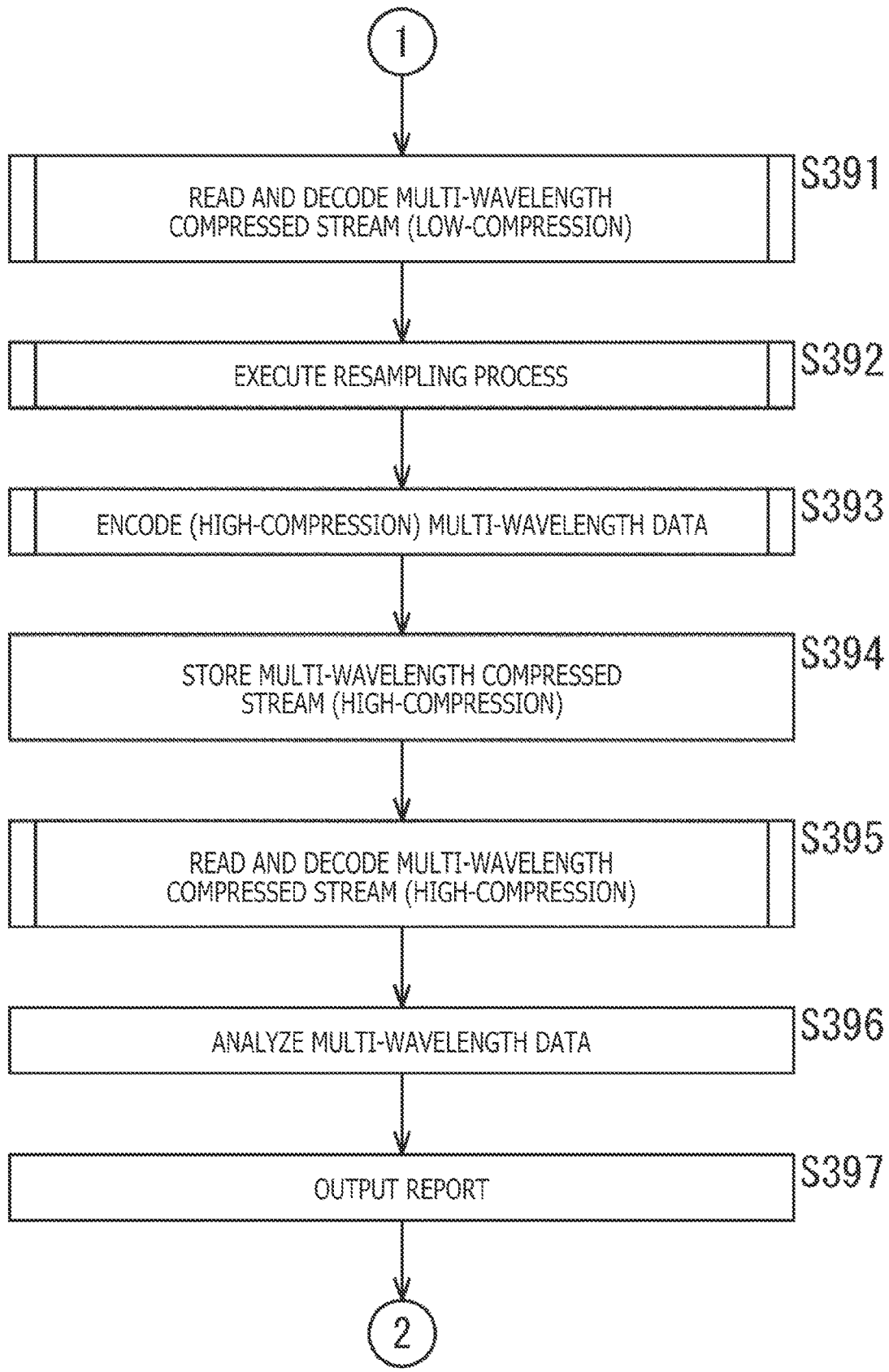
FIG. 41 is a flow chart describing an example of a flow of the multi-wavelength data processing following FIG. 40.

Furthermore, in a case where the storage unit 292 determines that the predetermined time has passed in step S384, the process proceeds to step S391 of FIG. 41. In step S391, the multi-wavelength data decoding unit 293 reads the low-compression multi-wavelength compressed stream from the storage unit 292 to decode the low-compression multi-wavelength compressed stream to recover the multi-wavelength data. In step S392, the resampling unit 294 applies the resampling process to the recovered multi-wavelength data. In step S393, the multi-wavelength data encoding unit 295 encodes the multi-wavelength data subjected to the resampling process to generate the high-compression multi-wavelength compressed stream. In step S394, the storage unit 296 stores the high-compression multi-wavelength compressed stream. In step S395, the multi-wavelength data decoding unit 297 reads the high-compression multi-wavelength compressed stream from the storage unit 296 and decodes the high-compression multi-wavelength compressed stream to recover the multi-wavelength data. In step S396, the data analysis unit 124 analyzes the recovered multi-wavelength data and creates a report. In step S397, the data analysis unit 124 outputs the report.

In such a way, the compression rate of the encoded data stored for a certain period can be increased to suppress the increase in the data with reduced importance. This can suppress the increase in the cost regarding the storage of the multi-wavelength data while suppressing the increase in the effect caused by the compression of data.

<Resampling Unit>

Figure 42:
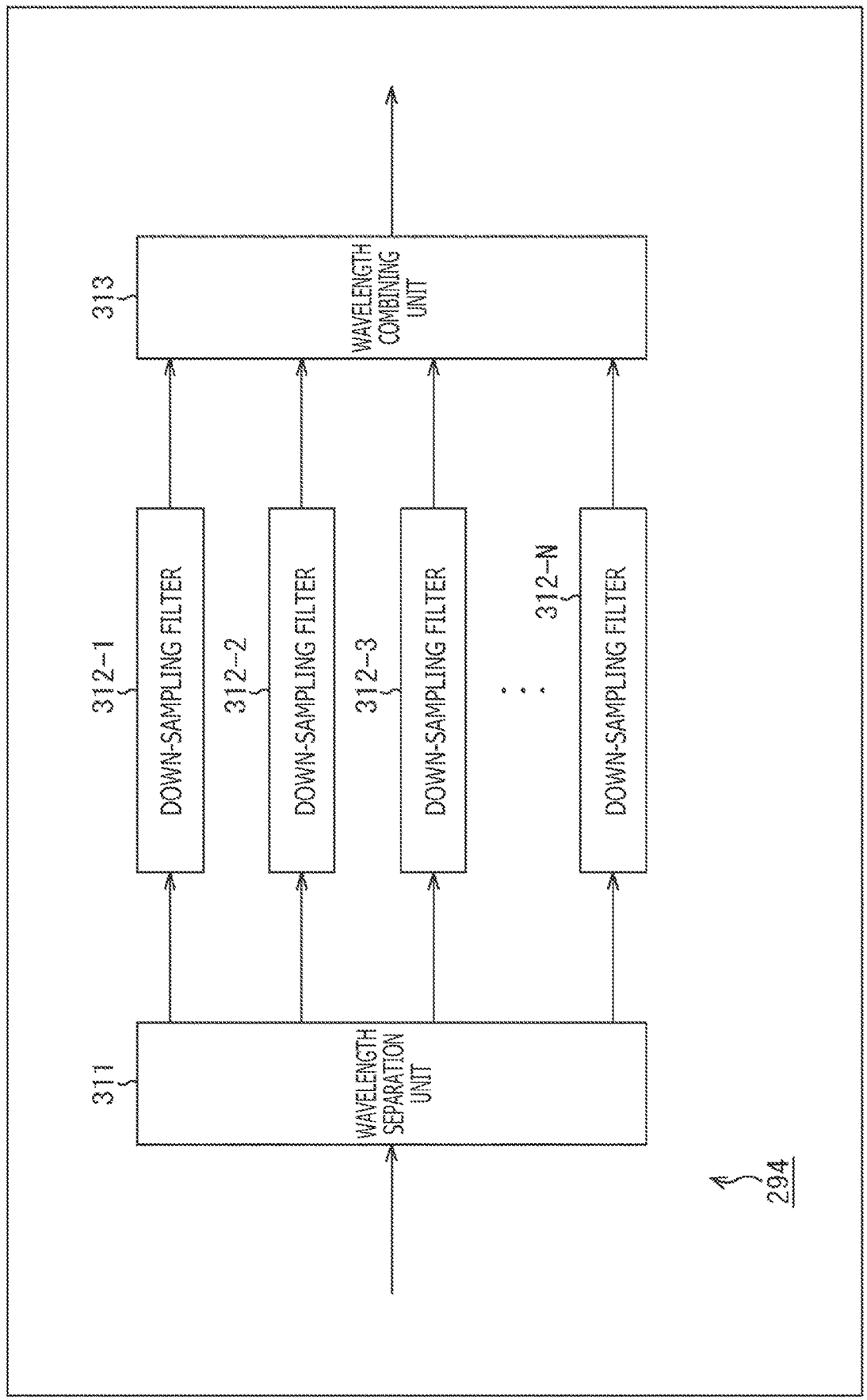
FIG. 42 is a block diagram illustrating a main configuration example of a resampling unit.

In the resampling process, down-sampling may be performed on the basis of, for example, wavelength components. FIG. 42 is a block diagram illustrating a main configuration example of the resampling unit 294 in this case. As illustrated in FIG. 42, the resampling unit 294 includes a wavelength separation unit 311, down-sampling filters 312, and a wavelength combining unit 313. Note that down-sampling filters 312-1 to 312-N will be referred to as down-sampling filters 312 in a case where the filters do not have to be distinguished from each other in the description.

The wavelength separation unit 311 separates the multi-wavelength data into single-wavelength data on the basis of wavelength components. The down-sampling filters 312 are prepared on the basis of wavelength components. That is, the down-sampling filters 312-1 to 312-N down-sample the single-wavelength data of corresponding wavelength components, respectively, to reduce the resolution. The wavelength combining unit 313 combines the single-wavelength data of the wavelength components to recover the multi-wavelength data and outputs the multi-wavelength data.

<Flow of Resampling Process>

Figure 43:
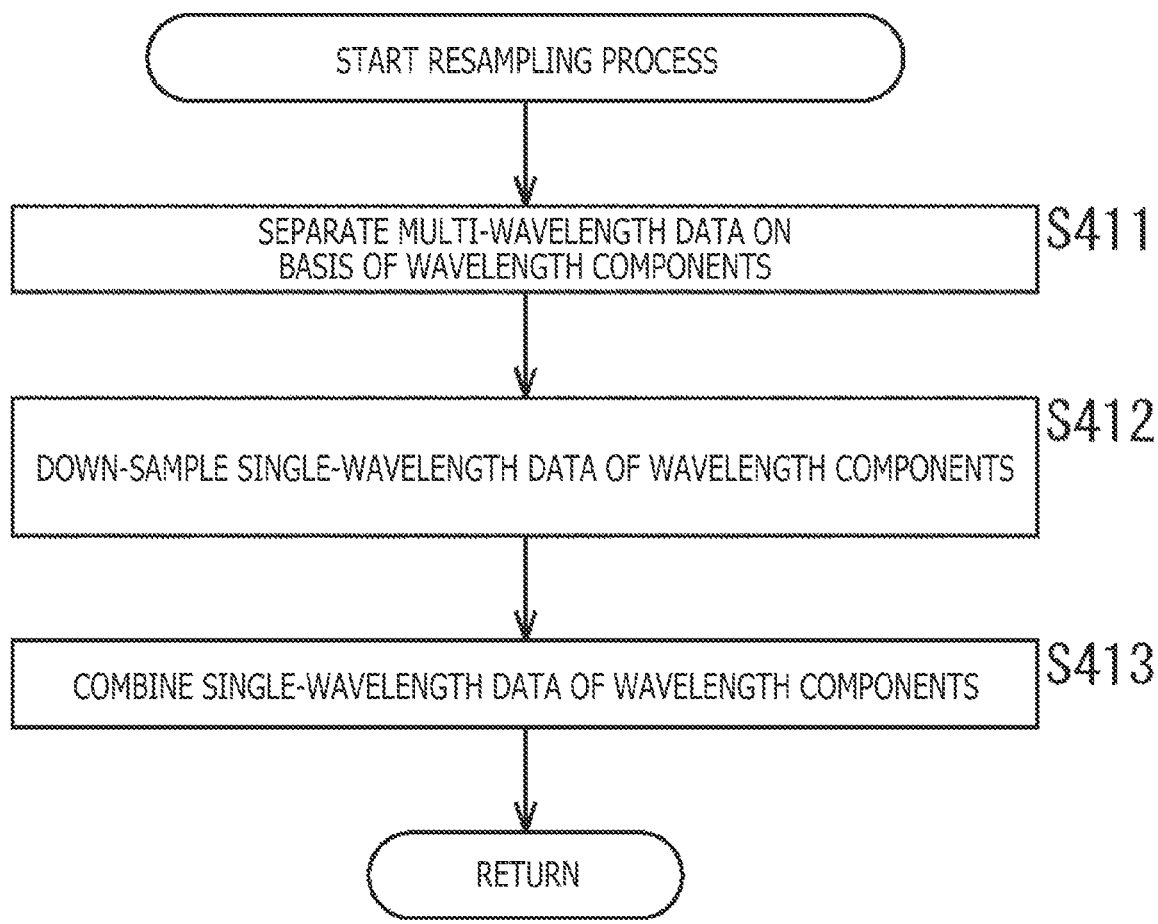
FIG. 43 is a flow chart describing an example of a flow of a resampling process.

An example of a flow of the resampling process executed in step S392 of FIG. 41 by the resampling unit 294 in this case will be described with reference to a flow chart of FIG. 43. In step S411, the wavelength separation unit 311 separates the multi-wavelength data into single-wavelength data on the basis of wavelength components. In step S412, the down-sampling filters 312 down-sample the single-wavelength data of the wavelength components to reduce the resolution. In step S413, the wavelength combining unit 313 combines the down-sampled single-wavelength data of the wavelength components to recover the multi-wavelength data.

In such a way, the down-sampling can be performed on the basis of wavelength components, and the resampling process can be more easily applied to the multi-wavelength data.

<Resampling Unit>

In addition, for example, a low-pass filtering process for part of the wavelength components may be executed in the resampling process. FIG. 44 is a block diagram illustrating a main configuration example of the resampling unit 294 in this case. As illustrated in FIG. 44, the resampling unit 294 includes a wavelength separation unit 321, low-pass filters 322-1 to 322-M (M is any natural number), and a wavelength combining unit 323. Note that the low-pass filters 322-1 to 322-M will be referred to as low-pass filters 322 in a case where the filters do not have to be distinguished from each other in the description.

The wavelength separation unit 321 separates the multi-wavelength data into single-wavelength data on the basis of wavelength components. The low-pass filters 322 are prepared on the basis of the wavelength components. That is, the low-pass filters 322-1 to 322-M apply low-pass filters to the single-wavelength data of part of the wavelength components. The wavelength combining unit 313 combines the single-wavelength data of the wavelength components to recover the multi-wavelength data and outputs the multi-wavelength data.

<Flow of Resampling Process>

An example of a flow of the resampling process executed in step S392 of FIG. 41 by the resampling unit 294 in this case will be described with reference to a flow chart of FIG. 45. In step S421, the wavelength separation unit 321 separates the multi-wavelength data into single-wavelength data on the basis of wavelength components. In step S422, the low-pass filters 322 apply low-pass filters to the single-wavelength data of low-priority wavelength components. In step S423, the wavelength combining unit 323 combines the single-wavelength data of the wavelength components to recover the multi-wavelength data.

In such a way, the low-pass filters can be applied to the low-priority wavelength components, and the resampling process can be more easily applied to the multi-wavelength data.

<Resampling Unit>

In addition, for example, the values of lower bits of low-wireless wavelength data may be replaced with 0 in the resampling process. FIG. 46 is a block diagram illustrating a main configuration example of the resampling unit 294 in this case. In this case, the resampling unit 294 includes a wavelength separation unit 331, LSB mask processing units 332-1 to 332-4, and a wavelength combining unit 333. Note that the LSB mask processing units 332-1 to 332-4 will be referred to as LSB mask processing units 332 in a case where the units do not have to be distinguished from each other in the description.

Figures 47A, 47B:
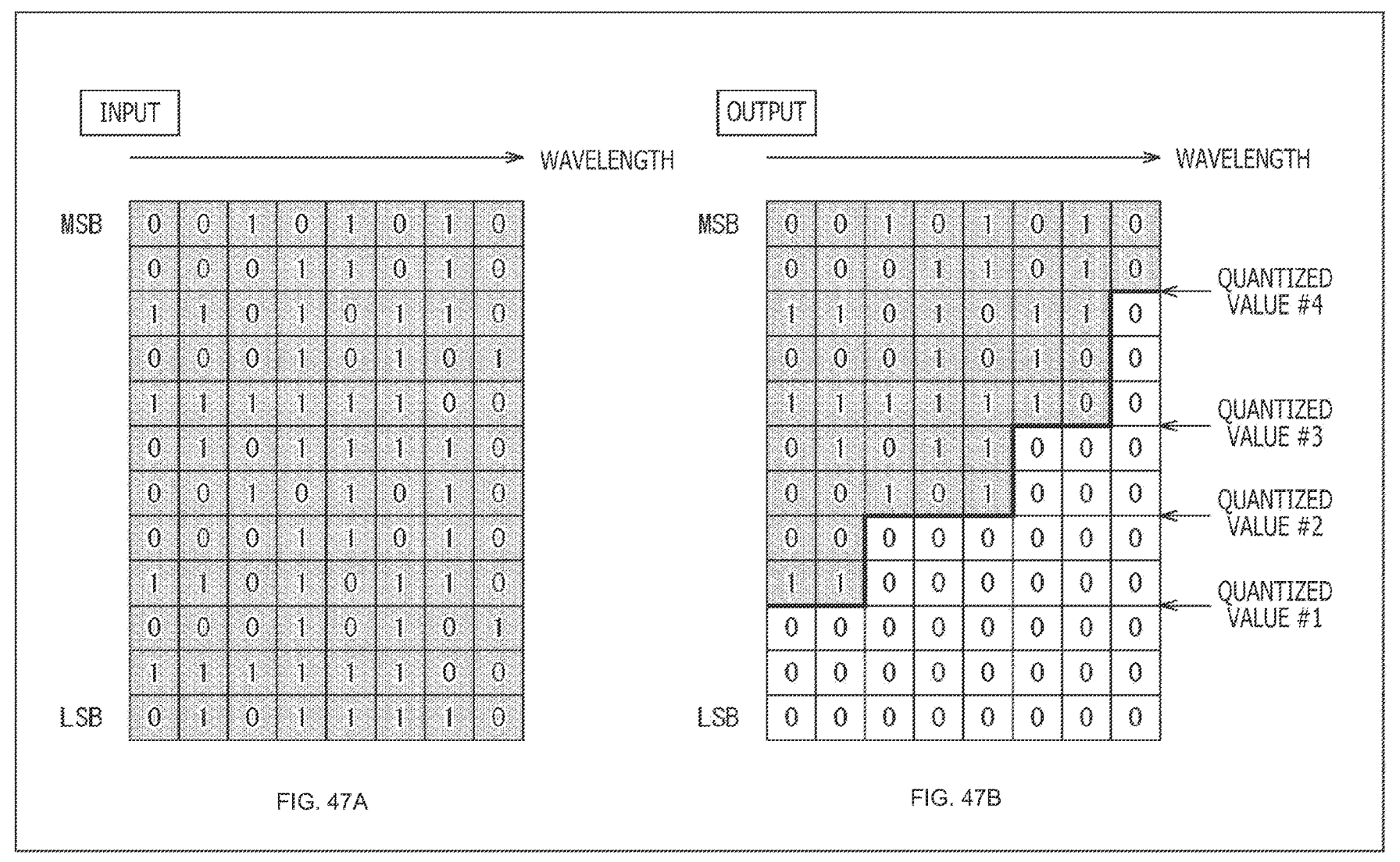

The wavelength separation unit 331 separates the multi-wavelength data into single-wavelength data on the basis of wavelength components. The LSB mask processing units 332 apply LSB mask processing of replacing the values of lower bits of the wavelength data with 0 to the single-wavelength data (for example, bit string indicated in FIG. 47A) of the wavelength components corresponding to the LSB mask processing units 332 (FIG. 47B). The LSB mask processing units 332 replace the values on the LSB side of the wavelength data, corresponding to the number of bits designated by quantized values, with 0. For example, the computation is performed as indicated in the following Equation (1).

$$\text{OUT} = (\text{IN} \gg \text{quantized value } \#n) \ll (\text{quantized value } \#n) \quad (1)$$

The wavelength combining unit 313 combines the single-wavelength data of the wavelength components to recover the multi-wavelength data and outputs the multi-wavelength data.

<Flow of Resampling Process>

Figure 48:
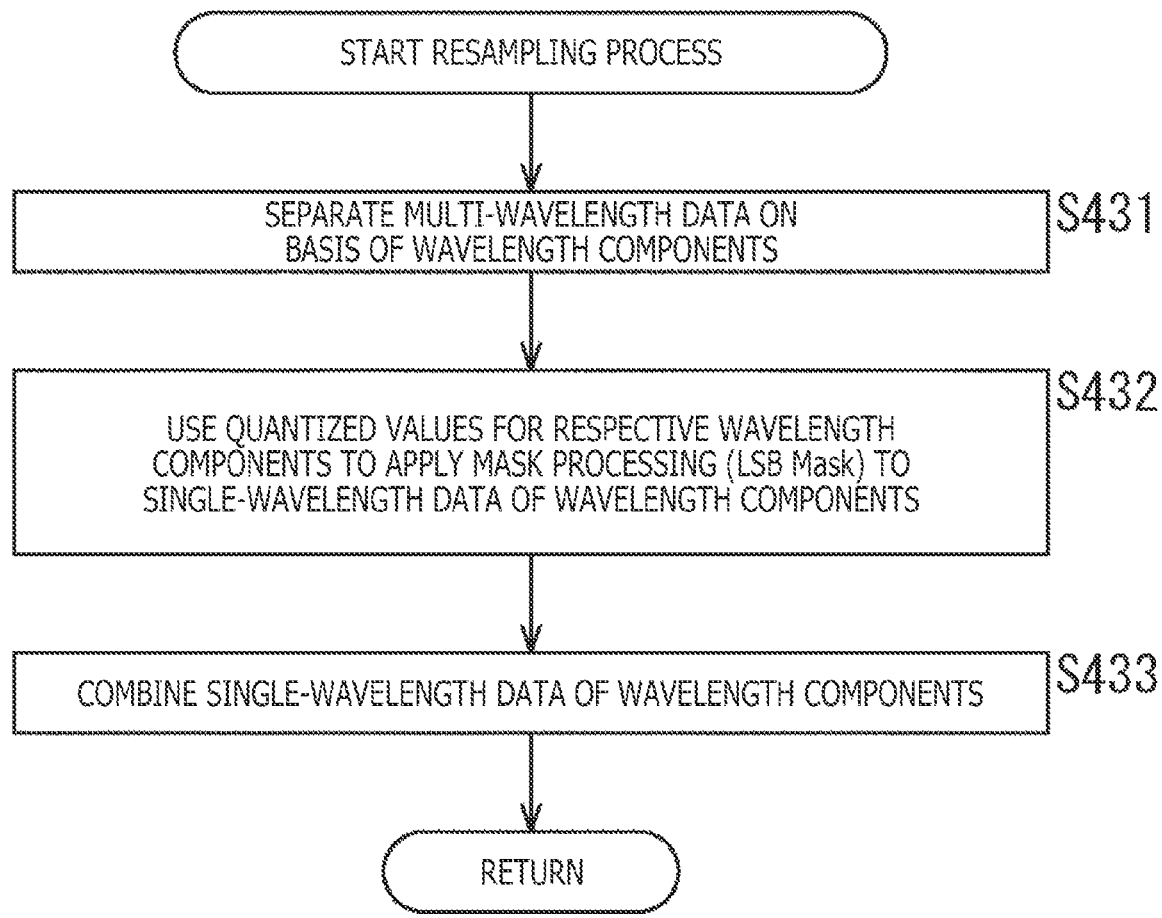
FIG. 48 is a flow chart describing an example of a flow of the resampling process.

An example of a flow of the resampling process executed in step S392 of FIG. 41 by the resampling unit 294 in this case will be described with reference to a flow chart of FIG. 48. In step S431, the wavelength separation unit 331 separates the multi-wavelength data into single-wavelength data on the basis of wavelength components. In step S432, the LSB mask processing units 332 use quantized values (quantized values #n) for respective wavelength components to apply the mask processing (LSB Mask) to the short-wavelength data of the wavelength components. In step S433, the wavelength combining unit 323 combines the single-wavelength data of the wavelength components to recover the multi-wavelength data.

In such a way, the mask processing can be executed on the basis of wavelength components, and the resampling process can be more easily applied to the multi-wavelength data.

4. Third Embodiment

<Quantization>

In a case of acquiring the multi-wavelength data to, for example, figure out the vegetation, the spectral distribution of the light source may be measured at the same time as the imaging of the multi-wavelength data. This is because the spectral distribution of sunlight changes with time, weather, and the like. Therefore, in a case of progress measurement of the growing conditions of plants or the like, the spectral change of the light source needs to be corrected. However, it may not be possible to simply apply an existing compression method because the data is the multi-wavelength data. In addition, the intensity significantly varies between wavelengths depending on the light source spectral distribution. Therefore, in a case where uniform quantization is applied to all of the wavelengths, the data may be excessively compressed, and the information may be unnecessarily degraded.

More specifically, maximum output values of the image sensor or the like generally vary depending on the light source and the like (FIG. 49A). Therefore, the white balance adjustment is usually performed (FIG. 49B). The white balance adjustment is a process of adjusting the gain of each wavelength component so that actual white color is expressed as white color in the image. By the way, conventional quantization is applied to the wavelength components by using uniform quantized values (FIG. 49C and FIG.

49D). However, when the white balance adjustment is performed, the wavelength components are quantized based on different quantized values (FIG. 49E). Therefore, the data may be excessively compressed, and the information may be unnecessarily degraded.

Therefore, the subject is imaged to generate image data including a plurality of wavelength components, and quantized values on the basis of wavelength components are used to quantize and encode the generated image data. For example, provided is an image processing apparatus including an image unit that images a subject to generate image data including a plurality of wavelength components, and an encoding unit that uses quantized values on the basis of wavelength components to quantize and encode the image data generated by the imaging unit.

Figure 50B:
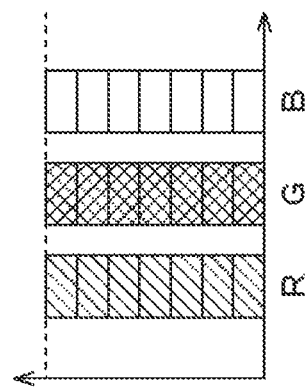
FIGS. 50A and 50B are diagrams illustrating an example of a state of the quantization.
Figure 50A:
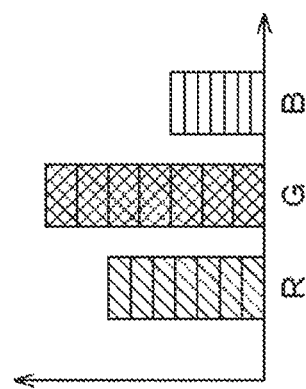

That is, the gain adjustment, such as white balance adjustment, is taken into account in advance to set the quantized value of each wavelength component (FIG. 50A). This can suppress the variation of the quantized values after the gain adjustment of the wavelength components, and the degradation of information can be suppressed (FIG. 50B).

<4-1. Imaging Apparatus>

FIG. 51 is a block diagram illustrating an example of a configuration of an imaging apparatus according to the present technique. An imaging apparatus 400 illustrated in FIG. 51 is an apparatus that images a subject to output image data of a captured image. The imaging apparatus 400 denotes, for example, a terminal apparatus with an imaging functions, such as the artificial satellite, the aerial photography helicopter, and the drown, used in precision agriculture or the like.

The imaging apparatus 400 includes a Bayer sensor 401, a quantization unit 402, a white balance adjustment unit 403, and a development processing unit 404. The Bayer sensor 401 includes a pixel array provided with a color filter of Bayer array and images the subject to generate image data (Bayer data) of a what is generally called RGB image. The Bayer sensor 401 supplies the Bayer data (RAW data) to the quantization unit 402. The quantization unit 402 quantizes the Bayer data and supplies the Bayer data after the quantization to the white balance adjustment unit 403. The white balance adjustment unit 403 makes a white balance adjustment to the Bayer data after the quantization and supplies the Bayer data after the white balance adjustment to the development processing unit 404. The development processing unit 404 executes a demosaicing process or the like to generate image data of the captured image and outputs the image data.

The quantization unit 402 includes a gain-adjustment Bayer data encoding unit 411 and a gain-adjustment Bayer data decoding unit 412. The gain-adjustment Bayer data encoding unit 411 applies encoding involving quantization to the Bayer data to generate encoded data (Bayer compressed stream). The gain-adjustment Bayer data decoding unit 412 uses a decoding method corresponding to the encoding method of the gain-adjustment Bayer data encoding unit 411 to decode the Bayer compressed stream to recover the Bayer data.

In addition, the white balance adjustment unit 403 supplies gains for white balance adjustment to be applied to the Bayer data (R gain for red component, G gain for green component, and B gain for blue component) to the gain-adjustment Bayer data encoding unit 411 and the gain-adjustment Bayer data decoding unit 412. The gain-adjusting Bayer data encoding unit 411 and the gain-adjustment Bayer data decoding unit 412 use the gains (R gain, G gain, and B gain) to perform encoding and decoding while making gain adjustments.

<Gain-Adjustment Bayer Data Encoding Unit>

That is, the gain-adjustment Bayer data encoding unit 411 uses the quantized value corresponding to the white balance adjustment gain for each wavelength component of the image data set by the white balance adjustment unit 403 to quantize and encode each wavelength component of the image data. FIG. 52 is a block diagram illustrating a main configuration example of the gain-adjustment Bayer data encoding unit 411. The gain-adjustment Bayer data encoding unit 411 includes a wavelength separation unit 421, an R gain adjustment unit 422, a G gain adjustment unit 423, a B gain adjustment unit 424, a wavelength combining unit 425, and a Bayer data encoding unit 426.

The wavelength separation unit 421 separates the Bayer data into R components, G components, and B components. The R gain adjustment unit 422 uses the supplied R gain to make gain adjustments to the R components. The G gain adjustment unit 423 uses the supplied G gain to make gain adjustments to the G components. The B gain adjustment unit 424 uses the supplied B gain to make gain adjustments to the B components. The wavelength combining unit 425 combines the R components, the G components, and the B components after the gain adjustments to generate Bayer data in which the gain of each wavelength component is adjusted. The Bayer data encoding unit 426 applies encoding involving quantization to the Bayer data to generate a Bayer compressed stream and outputs the Bayer compressed stream (for example, supplies the Bayer compressed stream to the gain-adjustment Bayer data decoding unit 412).

That is, the encoding is performed in the state in which the gain of each wavelength component is adjusted (white balance is adjusted), and therefore, the quantized value of each wavelength component is set in the state after the gain adjustment. Therefore, this can suppress the variation of the quantized values after the gain adjustments of the wavelength components, and the degradation of information can be suppressed.

<Gain-Adjustment Bayer Data Decoding Unit>

FIG. 53 is a block diagram illustrating a main configuration example of the gain-adjustment Bayer data decoding unit 412. The gain-adjustment Bayer data decoding unit 412 includes a Bayer data decoding unit 431, a wavelength separation unit 432, an inverse R gain adjustment unit 433, an inverse G gain adjustment unit 434, an inverse B gain adjustment unit 435, and a wavelength combining unit 436.

The Bayer data decoding unit 431 uses a decoding method corresponding to the encoding method of the Bayer data encoding unit 426 to decode the Bayer compressed stream to recover the Bayer data. The wavelength separation unit 432 separates the Bayer data into the R components, the G components, and the B components. The inverse R gain adjustment unit 433 uses the supplied R gain to make inverse gain adjustments to the R components. That is, the inverse R gain adjustment unit 433 makes the inverse gain adjustments so as to cancel (restore) the gain adjustments applied by the R gain adjustment unit 422. The inverse G gain adjustment unit 434 uses the supplied G gain to make similar inverse gain adjustments to the G components. The inverse B gain adjustment unit 435 uses the supplied B gain to make similar inverse gain adjustments to the B components. The wavelength combining unit 436 combines the R components, the G components, and the B components after the inverse gain adjustments to generate Bayer data and outputs the Bayer data (for example, supplies the Bayer data to the white balance adjustment unit 403).

<Flow of Imaging Process>

Figure 54:
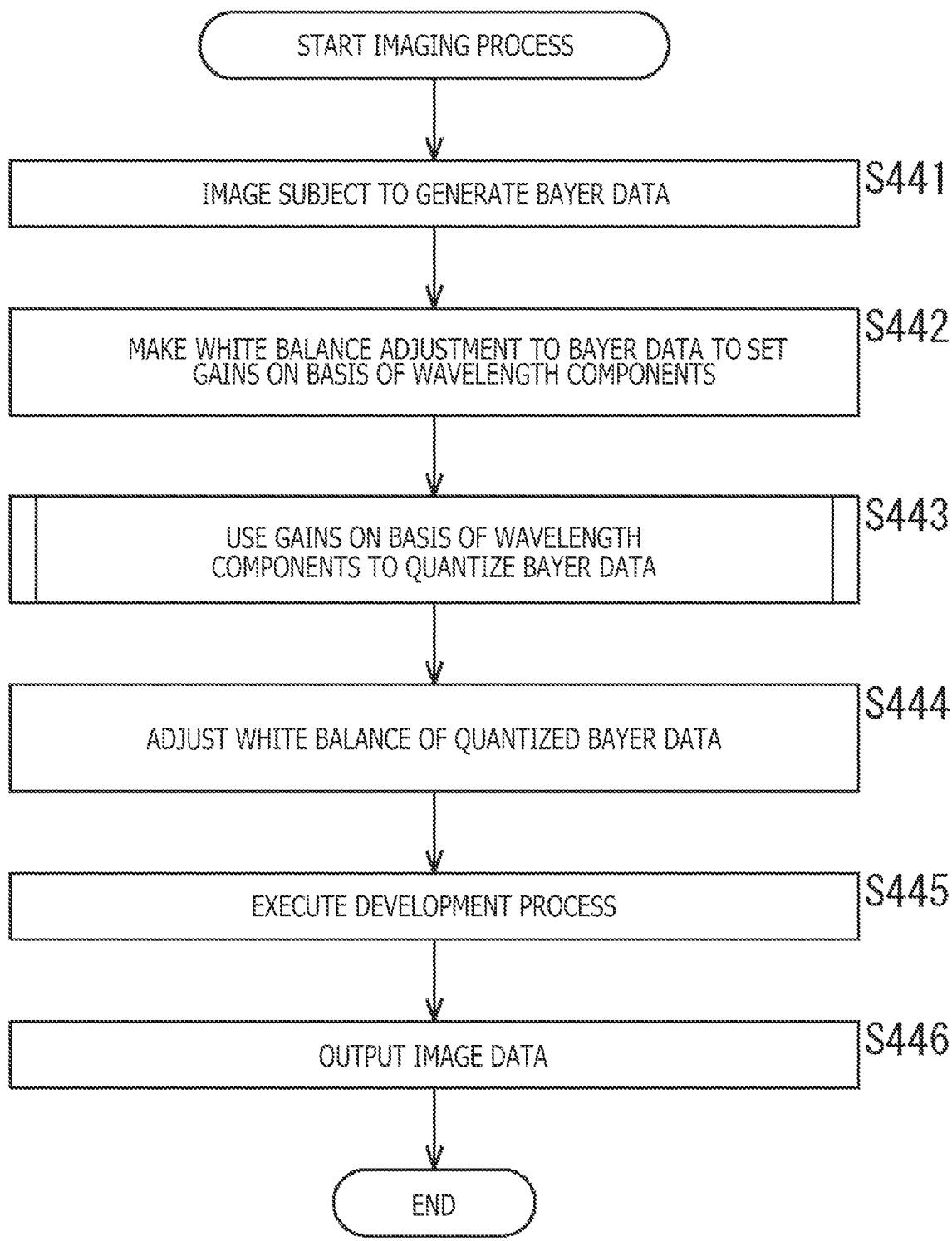
FIG. 54 is a flow chart describing an example of a flow of the imaging process.

An example of a flow of the imaging process executed by the imaging apparatus 400 in this case will be described with reference to a flow chart of FIG. 54. Once the imaging process is started, the Bayer sensor 401 images the subject to generate the Bayer data in step S441. In step S442, the white balance adjustment unit 403 makes a white balance adjustment to the Bayer data to set the gains on the basis of wavelength components. In step S443, the quantization unit 402 uses the gains on the basis of wavelength components to quantize the Bayer data. In step S444, the white balance adjustment unit 403 uses the gains on the basis of wavelength components to adjust the white balance of the quantized Bayer data. In step S445, the development processing unit 404 applies the development process to the Bayer data subjected to the white balance adjustment to generate the image data of the captured image. In step S446, the development processing unit 404 outputs the image data.

<Flow of Bayer Data Quantization Process>

Figure 55:
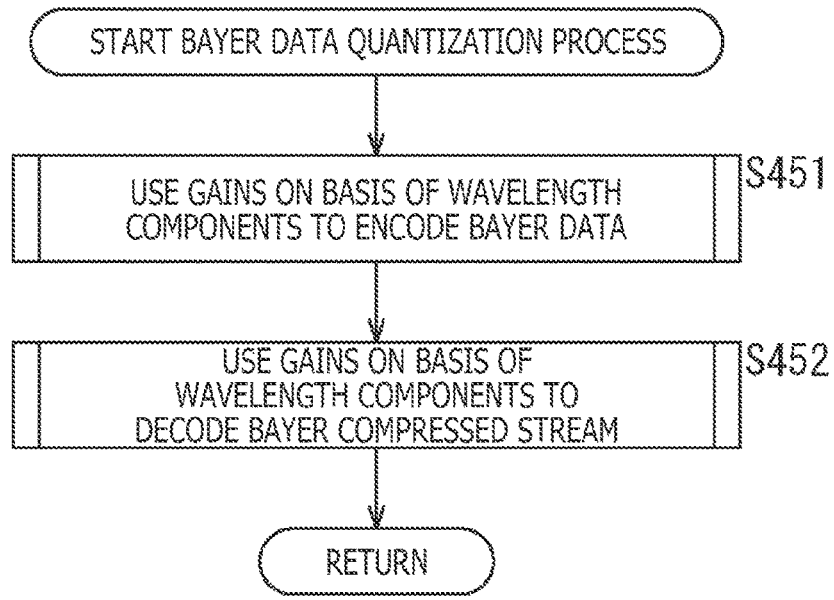
FIG. 55 is a flow chart describing an example of a flow of a Bayer data quantization process.

An example of a flow of the Bayer data quantization process executed in step S443 of FIG. 54 will be described with reference to a flow chart of FIG. 55. In step S451, the gain-adjustment Bayer data encoding unit 411 uses the gains on the basis of wavelength components to encode the Bayer data to generate the Bayer compressed stream. In step S452, the gain-adjustment Bayer data decoding unit 412 uses the gains on the basis of wavelength components to decode the Bayer compressed stream to recover the Bayer data.

<Flow of Bayer Data Encoding Process>

Figure 56:
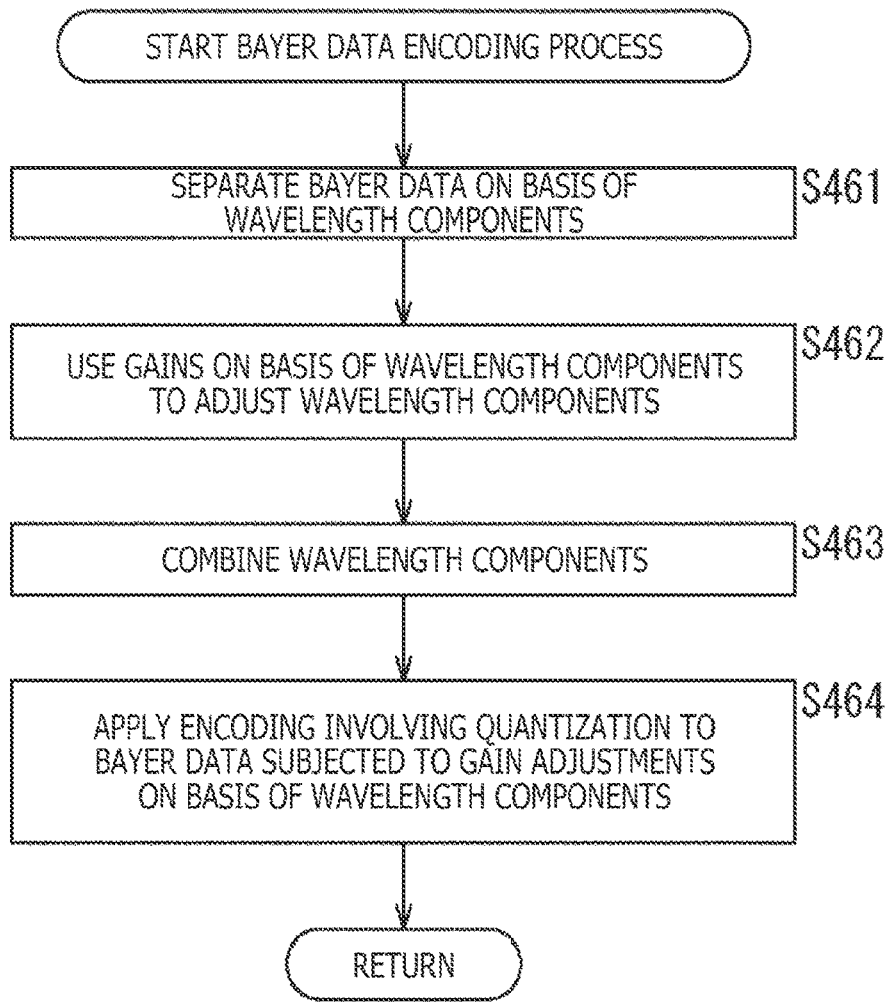
FIG. 56 is a flow chart describing an example of a flow of a Bayer data encoding process.

An example of a flow of the Bayer data encoding process executed in step S451 of FIG. 55 will be described with reference to a flow chart of FIG. 56. In step S461, the wavelength separation unit 421 separates the Bayer data on the basis of wavelength components. In step S462, the R gain adjustment unit 422, the G gain adjustment unit 423, and the B gain adjustment unit 424 use the gains for respectively corresponding wavelength components to make gain adjustments to the respectively corresponding wavelength components. In step S463, the wavelength combining unit 425 combines the wavelength components subjected to the gain adjustments to generate the Bayer data subjected to the gain adjustments on the basis of wavelength components. In step S464, the Bayer data encoding unit 426 applies the encoding involving quantization to the Bayer data subjected to the gain adjustments on the basis of wavelength components.

<Flow of Bayer Compressed Stream Decoding Process>

Figure 57:
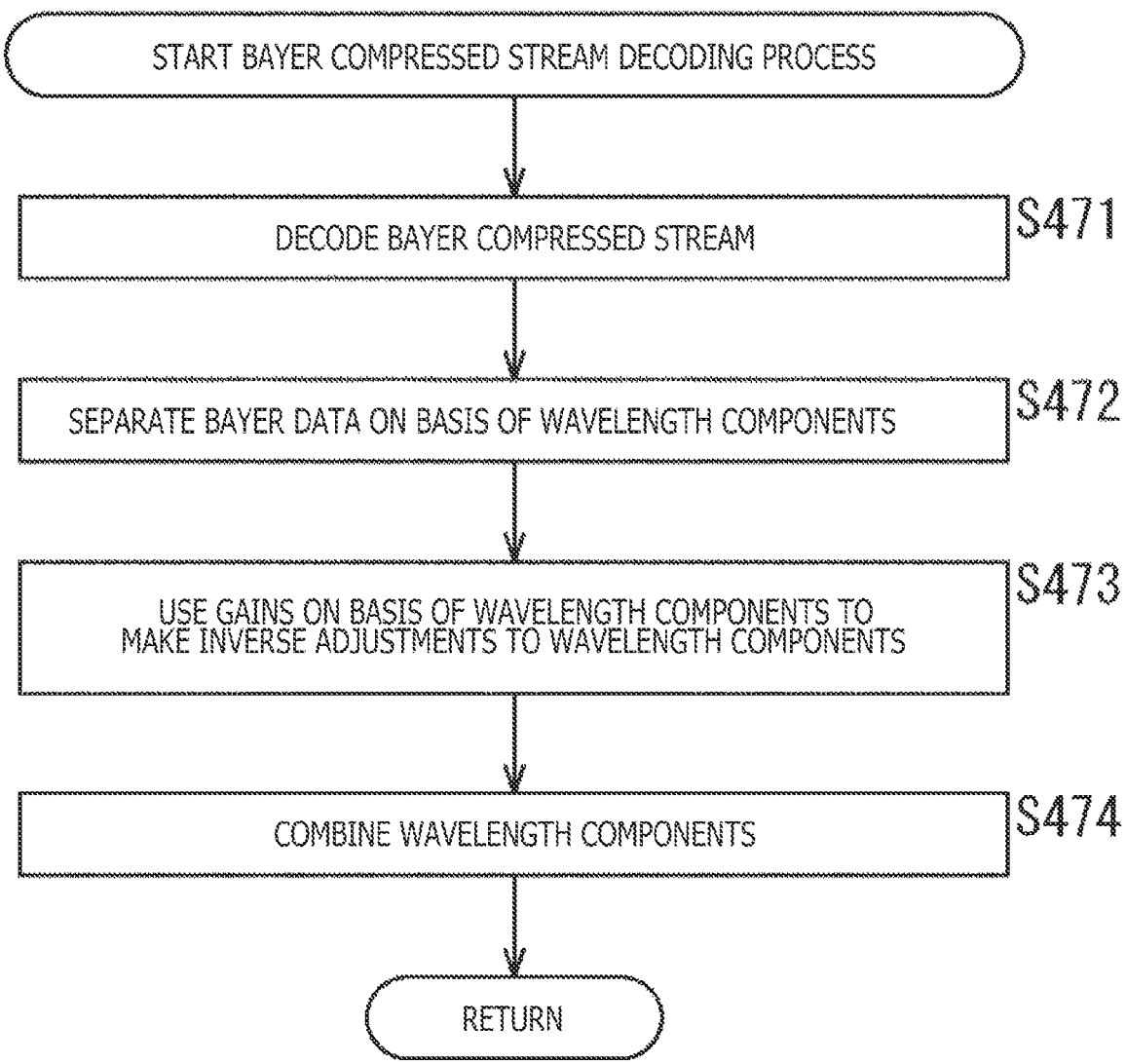
FIG. 57 is a flow chart describing an example of a flow of a Bayer compressed stream decoding process.

An example of a flow of the Bayer compressed stream decoding process executed in step S452 of FIG. 55 will be described with reference to a flow chart of FIG. 57. In step S471, the Bayer data decoding unit 431 decodes the Bayer compressed stream to recover the Bayer data. In step S472, the wavelength separation unit 432 separates the Bayer data on the basis of wavelength components. In step S473, the inverse R gain adjustment unit 433, the inverse G gain adjustment unit 434, and the inverse B gain adjustment unit 435 use the gains for respectively corresponding wavelength components to make inverse gain adjustments to the respectively corresponding wavelength components. In step S474, the wavelength combining unit 436 combines the wavelength components subjected to the inverse gain adjustments to generate the Bayer data.

In such a way, the processes can be executed to suppress the variation of the quantized values after the gain adjustments of the wavelength components, and the degradation of information can be suppressed.

<4-2. Imaging Apparatus>

Note that the imaging apparatus 400 may include a sensor (light source color measurement unit) that measures the color of the light source (light source color), and the quantized value corresponding to the gain for each wavelength component of the image data set based on the measured light source color may be used to quantize and encode each wavelength component of the image data.

Figure 58:
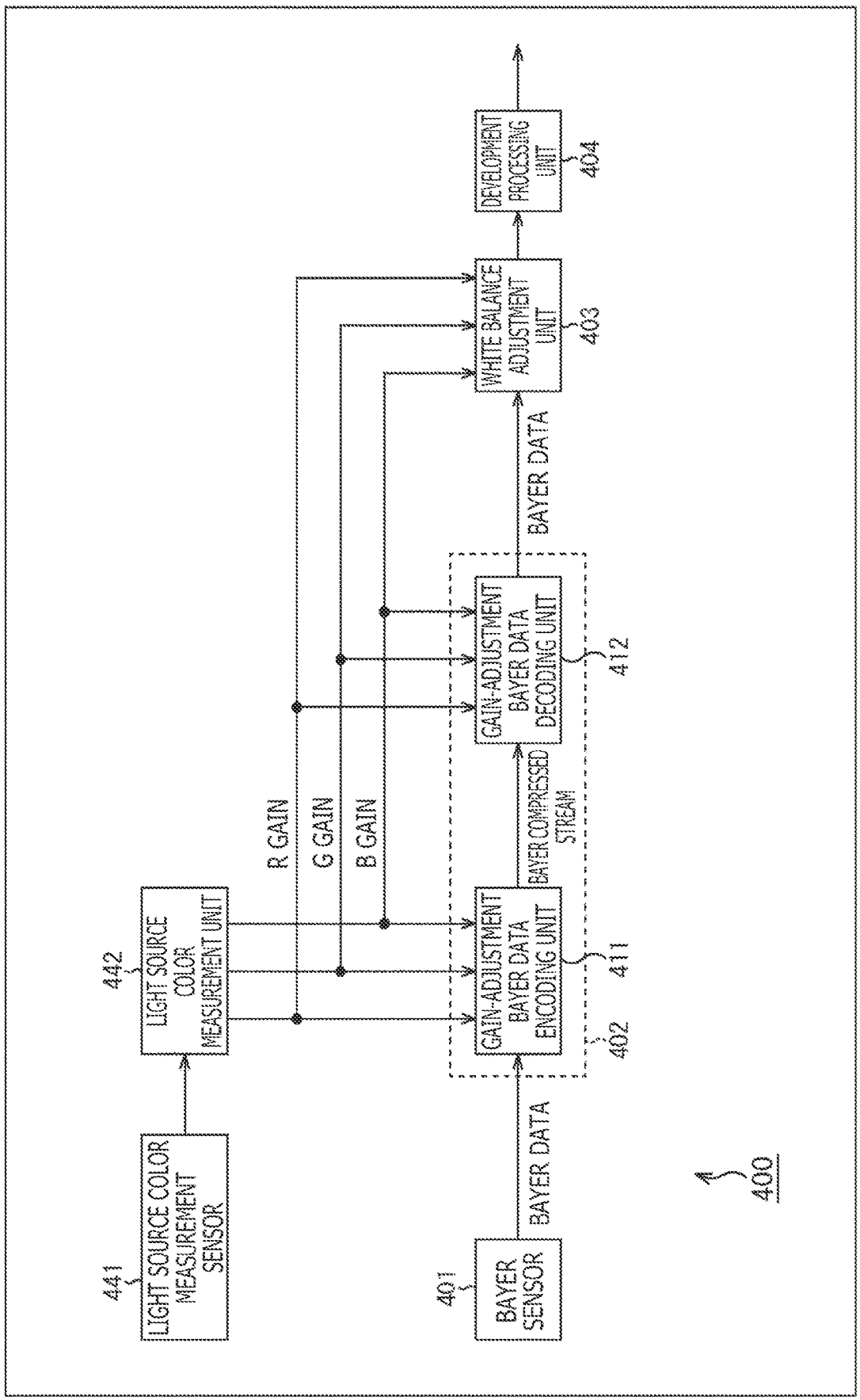
FIG. 58 is a block diagram illustrating a main configuration example of the imaging apparatus.

In this case, the imaging apparatus 400 includes, for example, a light source color measurement sensor 441 and a light source color measurement unit 442 as illustrated in FIG. 58. The light source color measurement sensor 441 detects the light source (for example, environment light) or the like and supplies the detection result to the light source color measurement unit 442. The light source color measurement unit 442 measures the light source color based on the detection result and sets the gains (R gain, G gain, and B gain) of the wavelength components based on the light source color. The light source color measurement unit 442 supplies the gains of the wavelength components to the gain-adjustment Bayer data encoding unit 411, the gain-adjustment Bayer data decoding unit 412, and the white balance adjustment unit 403. The encoding of the Bayer data by the gain-adjustment Bayer data encoding unit 411, the decoding of the Bayer compressed stream by the gain-adjustment Bayer data decoding unit 412, and the white balance adjustment by the white balance adjustment unit 403 are performed by using the gains set by the light source color measurement unit 442.

<Flow of Imaging Process>

Figure 59:
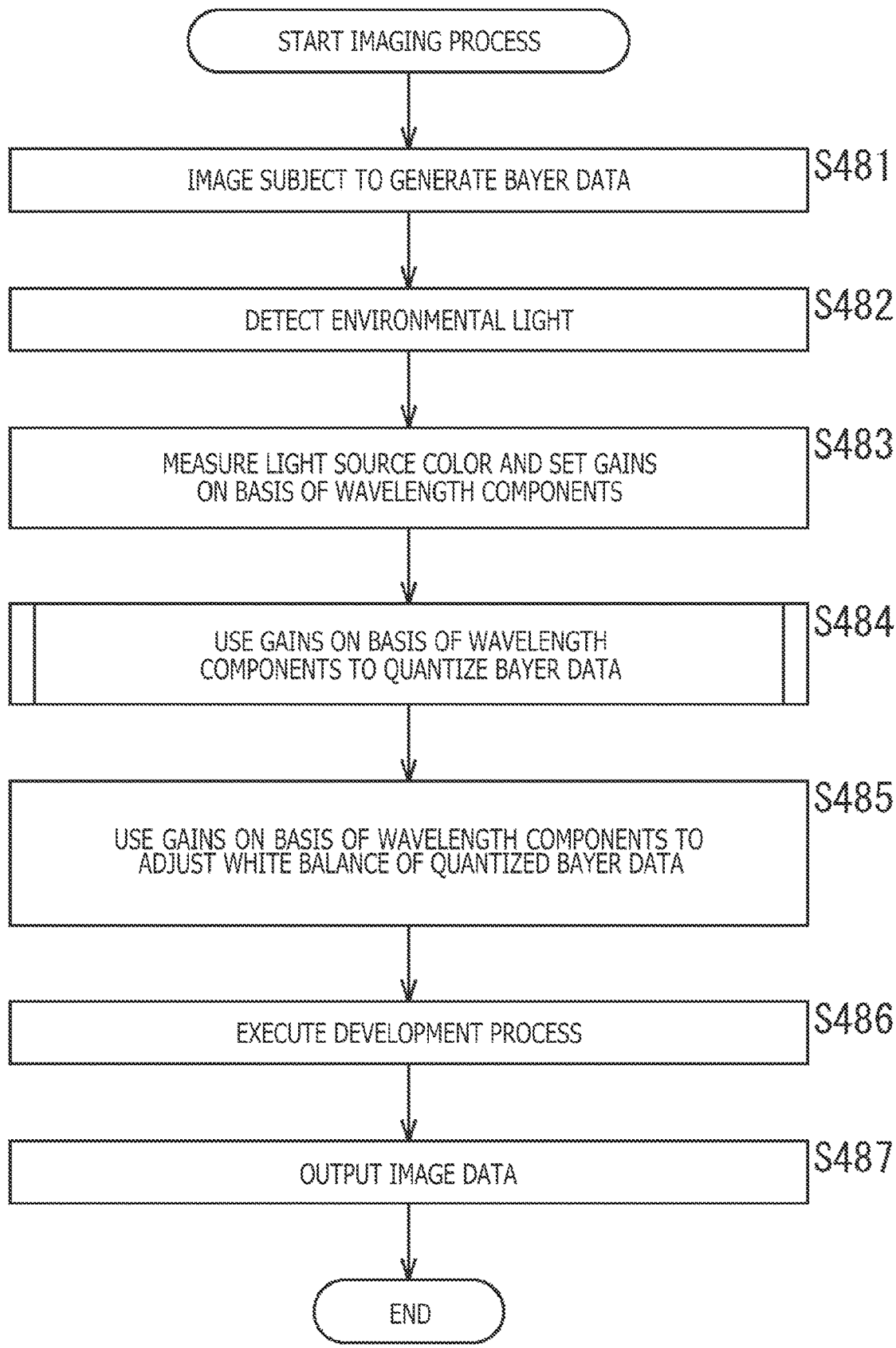
FIG. 59 is a flow chart describing an example of a flow of the imaging process.

An example of a flow of the imaging process executed by the imaging apparatus 400 in this case will be described with reference to a flow chart of FIG. 59. Once the imaging process is started, the Bayer sensor 401 images the subject to generate the Bayer data in step S481. In step S482, the light source color measurement sensor 441 detects the environmental light. In step S483, the light source color measurement unit 442 measures the light source color based on the detection result to set the gains on the basis of wavelength components. In step S484, the quantization unit 402 uses the gains on the basis of wavelength components to quantize the Bayer data. In step S485, the white balance adjustment unit 403 uses the gains on the basis of wavelength components set in step S483 to adjust the white balance of the quantized Bayer data. In step S486, the development processing unit 404 applies the development process to the Bayer data subjected to the white balance adjustment to generate the image data of the captured image. In step S487, the development processing unit 404 outputs the image data.

In such a way, the imaging apparatus 400 can make the white balance adjustment based on the environmental light (ambient light). In addition, the imaging apparatus 400 can also suppress the variation of the quantized values after the gain adjustments of the wavelength components in this case, and the degradation of information can be suppressed.

<4-3. Imaging Apparatus>

Figure 60:
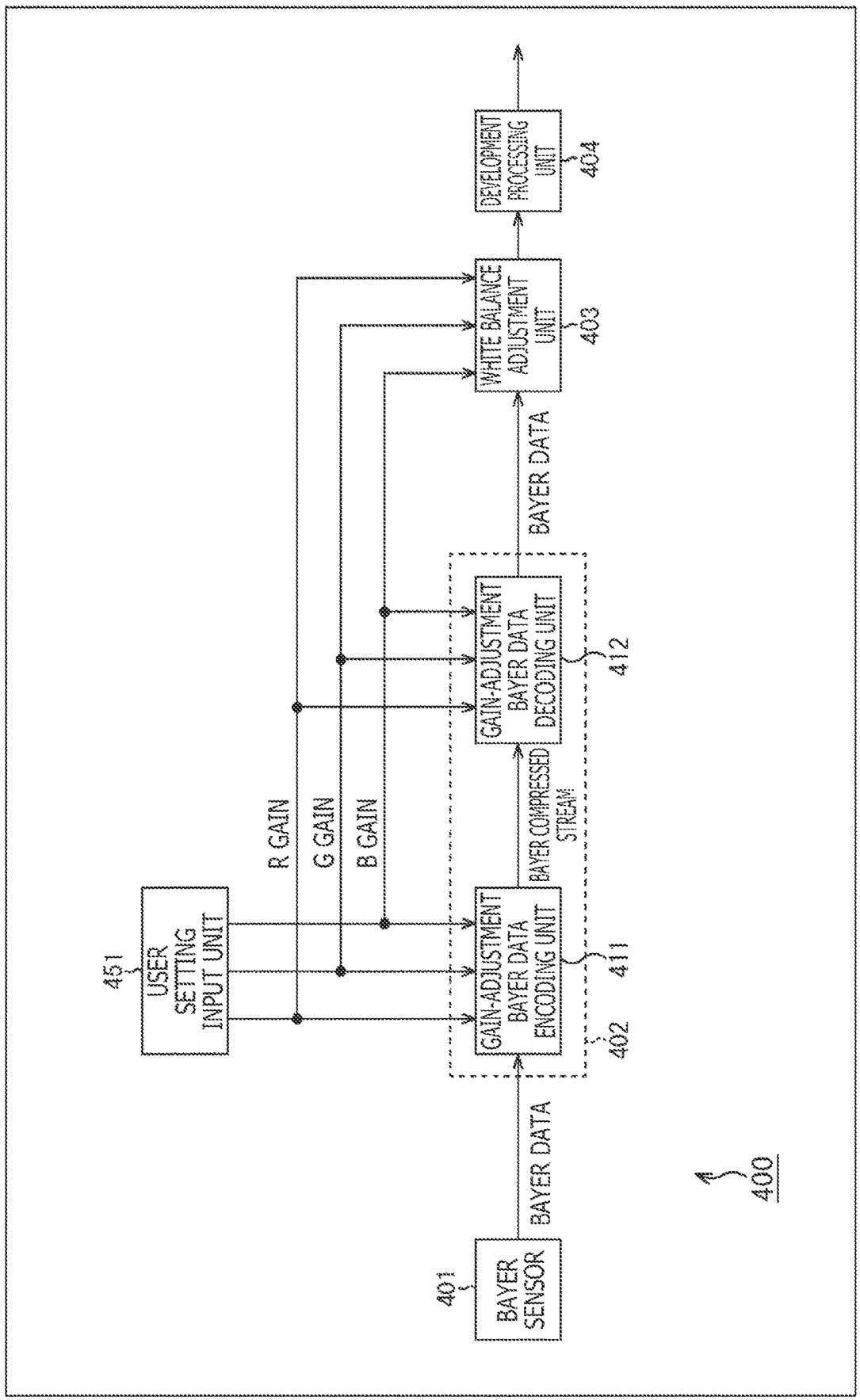
FIG. 60 is a block diagram illustrating a main configuration example of the imaging apparatus.

Note that the user or the like may set the gains on the basis of wavelength components. In this case, the imaging apparatus 400 includes, for example, a user setting input unit 451 as illustrated in FIG. 60. The user setting input unit 451 receives user settings of the gains (R gain, G gain, and B gain) of the wavelength components. The user setting input unit 451 may include, for example, a user interface to receive manual input of the gains by the user or the like or may include an input terminal, a communication unit, and the like to receive the gains from another apparatus.

The gains of the wavelength components input to the user setting input unit 451 are supplied to the gain-adjustment Bayer data encoding unit 411, the gain-adjustment Bayer data decoding unit 412, and the white balance adjustment unit 403. The encoding of the Bayer data by the gain-adjustment Bayer data encoding unit 411, the decoding of the Bayer compressed stream by the gain-adjustment Bayer data decoding unit 412, and the white balance adjustment by the white balance adjustment unit 403 are performed by using the gains.

<Flow of Imaging Process>

Figure 61:
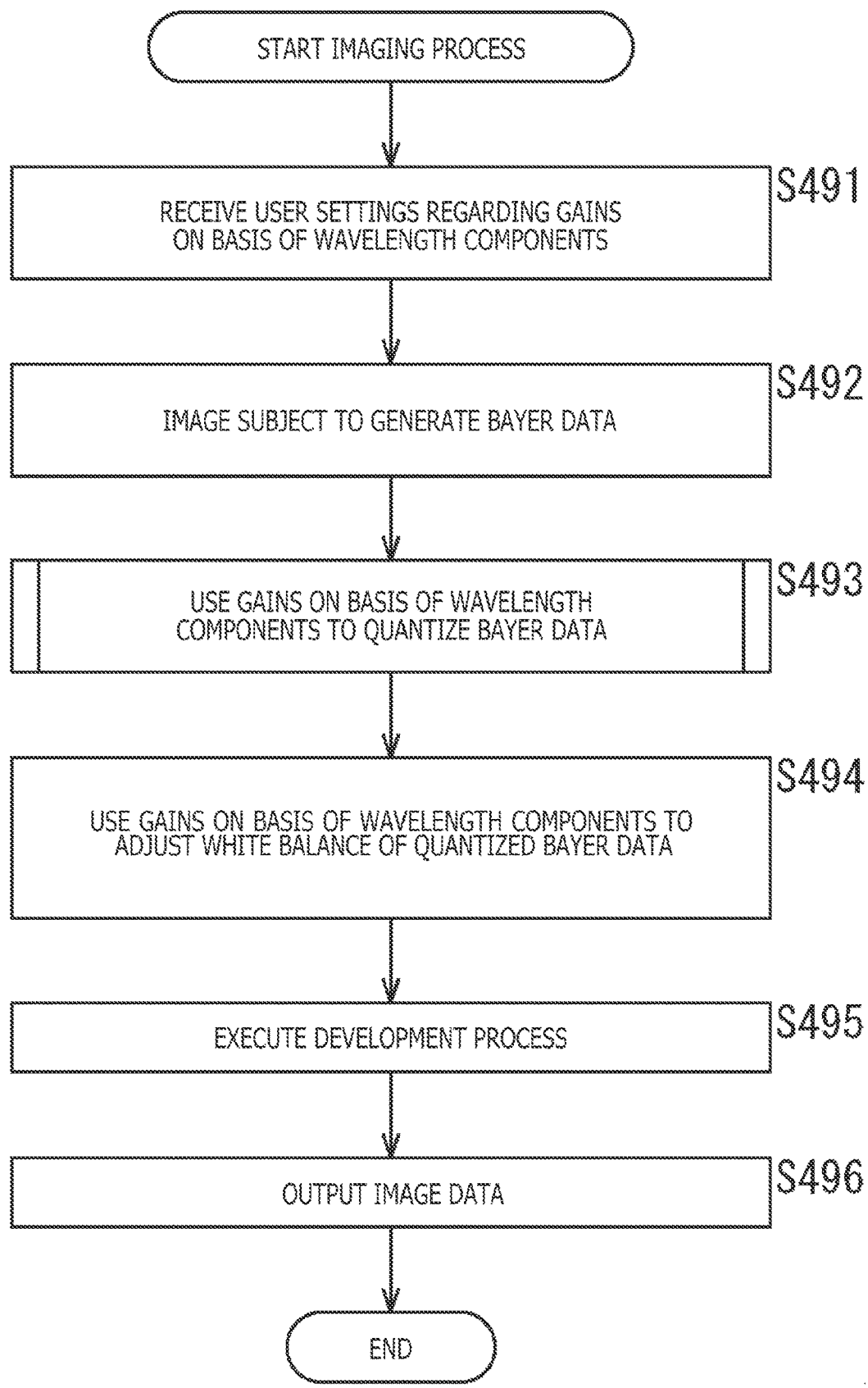
FIG. 61 is a flow chart describing an example of a flow of the imaging process.

An example of a flow of the imaging process executed by the imaging apparatus 400 in this case will be described with reference to a flow chart of FIG. 61. Once the imaging process is started, the user setting input unit 451 receives the user settings regarding the gains on the basis of wavelength components in step S491. In step S492, the Bayer sensor 401 images the subject to generate the Bayer data in step S481. In step S493, the quantization unit 402 uses the gains on the basis of wavelength components input in step S491 to quantize the Bayer data. In step S494, the white balance adjustment unit 403 uses the gains on the basis of wavelength components input in step S491 to adjust the white balance of the quantized Bayer data. In step S495, the development processing unit 404 applies the development process to the Bayer data subjected to the white balance adjustment to generate the image data of the captured image. In step S496, the development processing unit 404 outputs the image data.

In such a way, the imaging apparatus 400 can make the white balance adjustment based on the user settings. Therefore, the white balance adjustment can be made according to, for example, the preference of the user. Furthermore, the imaging apparatus 400 can also suppress the variation of the quantized values after the gain adjustment of the wavelength components in this case, and the degradation of information can be suppressed.

<4-4. Imaging Apparatus>

Figure 62:
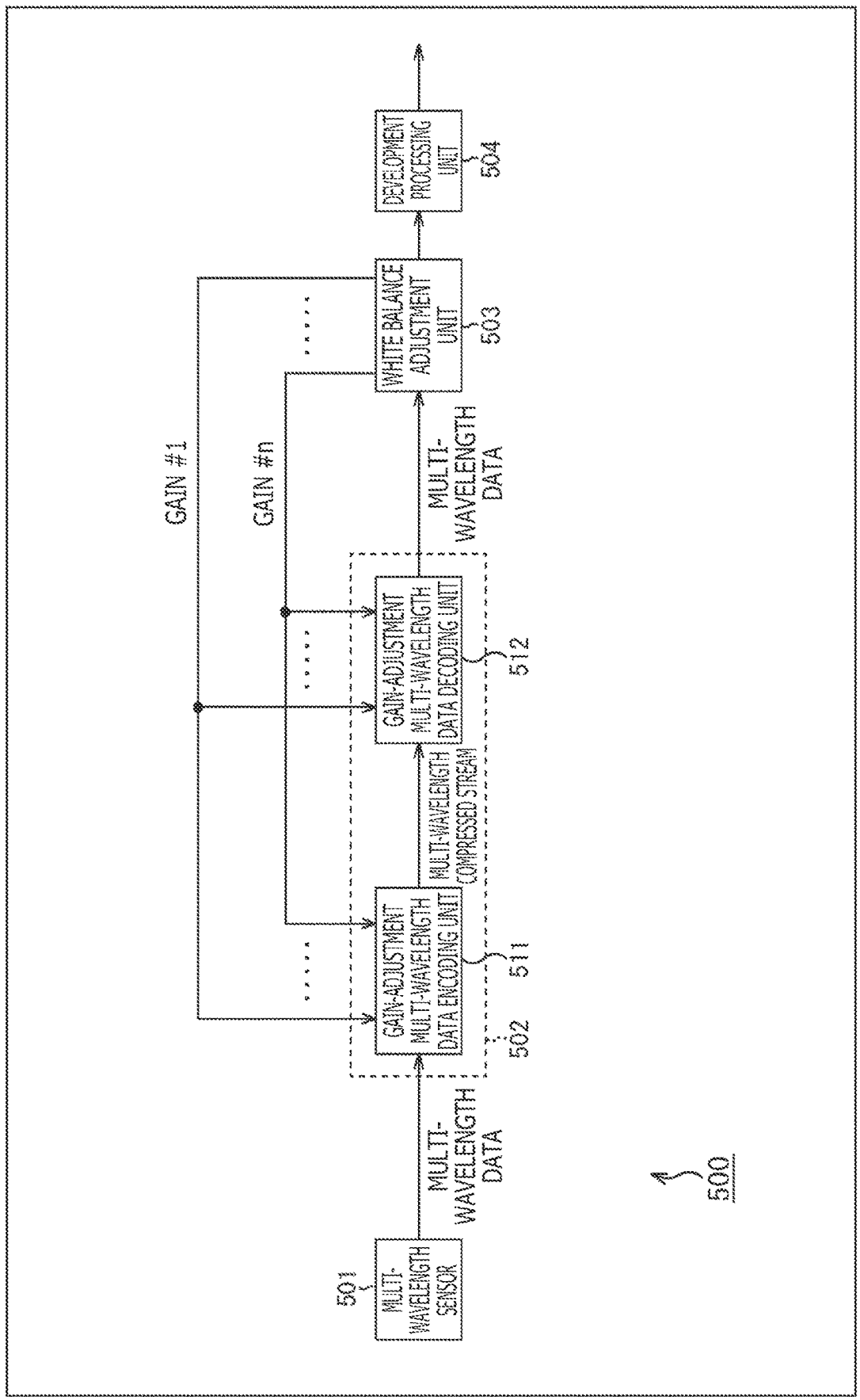
FIG. 62 is a block diagram illustrating a main configuration example of an imaging apparatus.

Although the Bayer data has been described, the present technique can also be applied to multi-wavelength data that is image data including four or more wavelength components. FIG. 62 is a block diagram illustrating an example of a configuration of an imaging apparatus in this case. An imaging apparatus 500 illustrated in FIG. 62 is an apparatus basically similar to the imaging apparatus 400 and is an apparatus that images the subject to output multi-wavelength data. Similar to the imaging apparatus 400, the imaging apparatus 500 denotes, for example, a terminal apparatus with an imaging function, such as the artificial satellite, the aerial photography helicopter, and the drone, used in, for example, precision agriculture.

As illustrated in FIG. 62, the imaging apparatus 500 includes a multi-wavelength sensor 501, a quantization unit 502, a white balance adjustment unit 503, and a development processing unit 504. The processing units are processing units similar to the processing units (from the Bayer sensor 401 to the development processing unit 404) of the imaging apparatus 400 in FIG. 51 except that the target of processing is changed from the Bayer data to the multi-wavelength data, and the processing units execute similar processes.

The quantization unit 502 includes a gain-adjustment multi-wavelength data encoding unit 511 and a gain-adjustment multi-wavelength data decoding unit 512. The processing units are processing units similar to the gain-adjustment Bayer data encoding unit 411 and the gain-adjustment Bayer data decoding unit 412 of the imaging apparatus 400 in FIG. 51 except that the target of processing is changed from the Bayer data (or Bayer compressed stream) to the multi-wavelength data (or multi-wavelength compressed stream), and the processing units execute similar processes.

<Gain-Adjustment Multi-Wavelength Data Encoding Unit>

Figure 63:
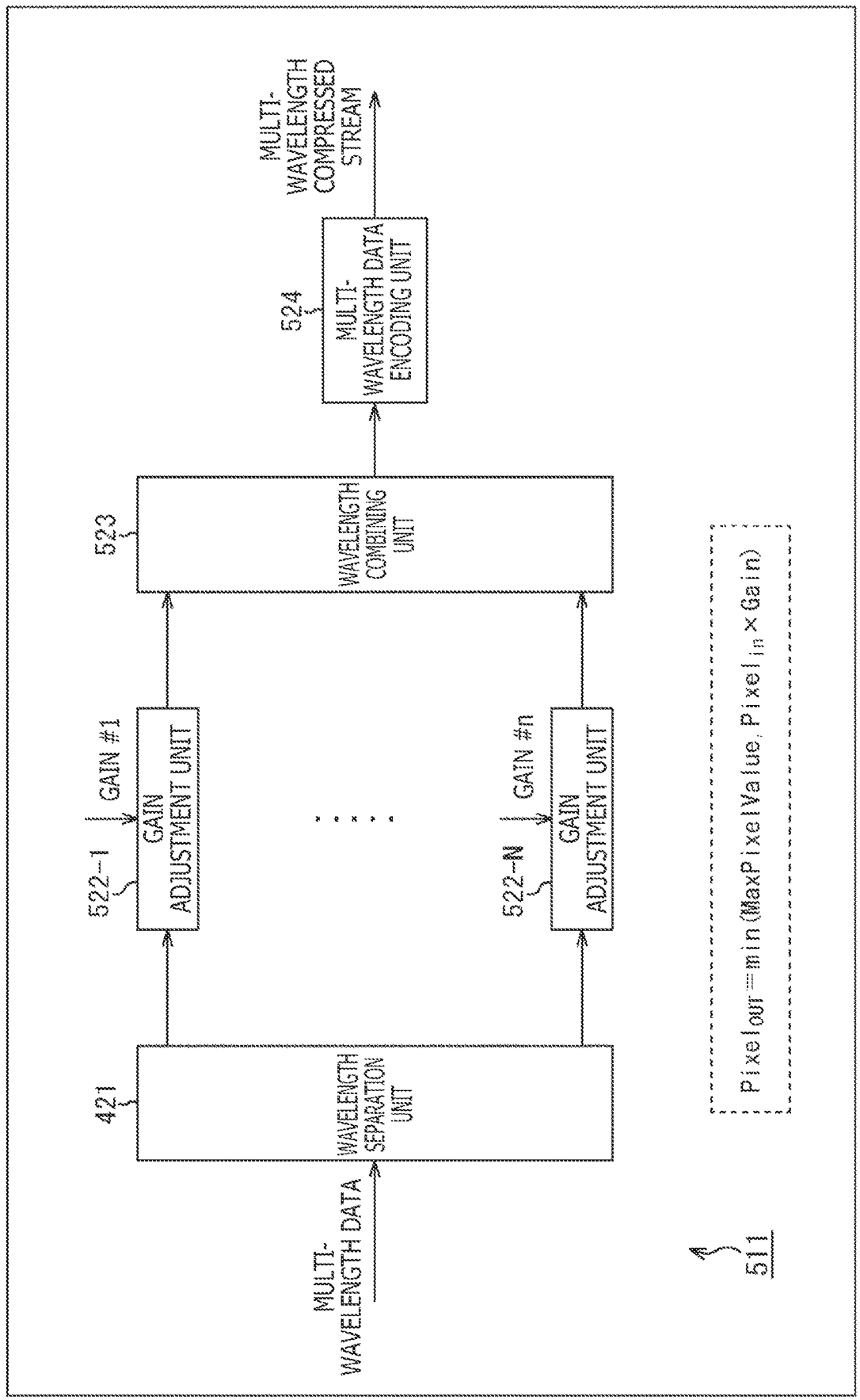
FIG. 63 is a block diagram illustrating a main configuration example of a gain-adjustment multi-wavelength data encoding unit.

That is, the gain-adjustment multi-wavelength data encoding unit 511 uses the quantized values corresponding to the white balance adjustment gains for the wavelength components of the multi-wavelength data set by the white balance adjustment unit 503 to quantize and encode the wavelength components of the multi-wavelength data. FIG. 63 is a block diagram illustrating a main configuration example of the gain-adjustment multi-wavelength data encoding unit 511. The gain-adjustment multi-wavelength data encoding unit 511 includes a wavelength separation unit 521, gain adjustment units 522-1 to 522-N (N is a natural number), a wavelength combining unit 523, and a multi-wavelength data encoding unit 524. The gain adjustment units 522-1 to 522-N will be referred to as gain adjustment units 522 in a case where the units do not have to be distinguished from each other in the description.

The processing units are processing units similar to the processing units of the gain-adjustment Bayer data encoding unit 411 described with reference to FIG. 52 except that the target of processing is changed from the Bayer data to the multi-wavelength data, and the processing units execute similar processes.

That is, the encoding involving quantization by the multi-wavelength data encoding unit 524 is performed in the state in which the gain of each wavelength component is adjusted (white balance is adjusted), and therefore, the quantized value of each wavelength component is set in the state after the gain adjustment. Therefore, this can suppress the variation of the quantized values after the gain adjustments of the wavelength components, and the degradation of information can be suppressed.

<Gain-Adjustment Multi-Wavelength Data Decoding Unit>

Figure 64:
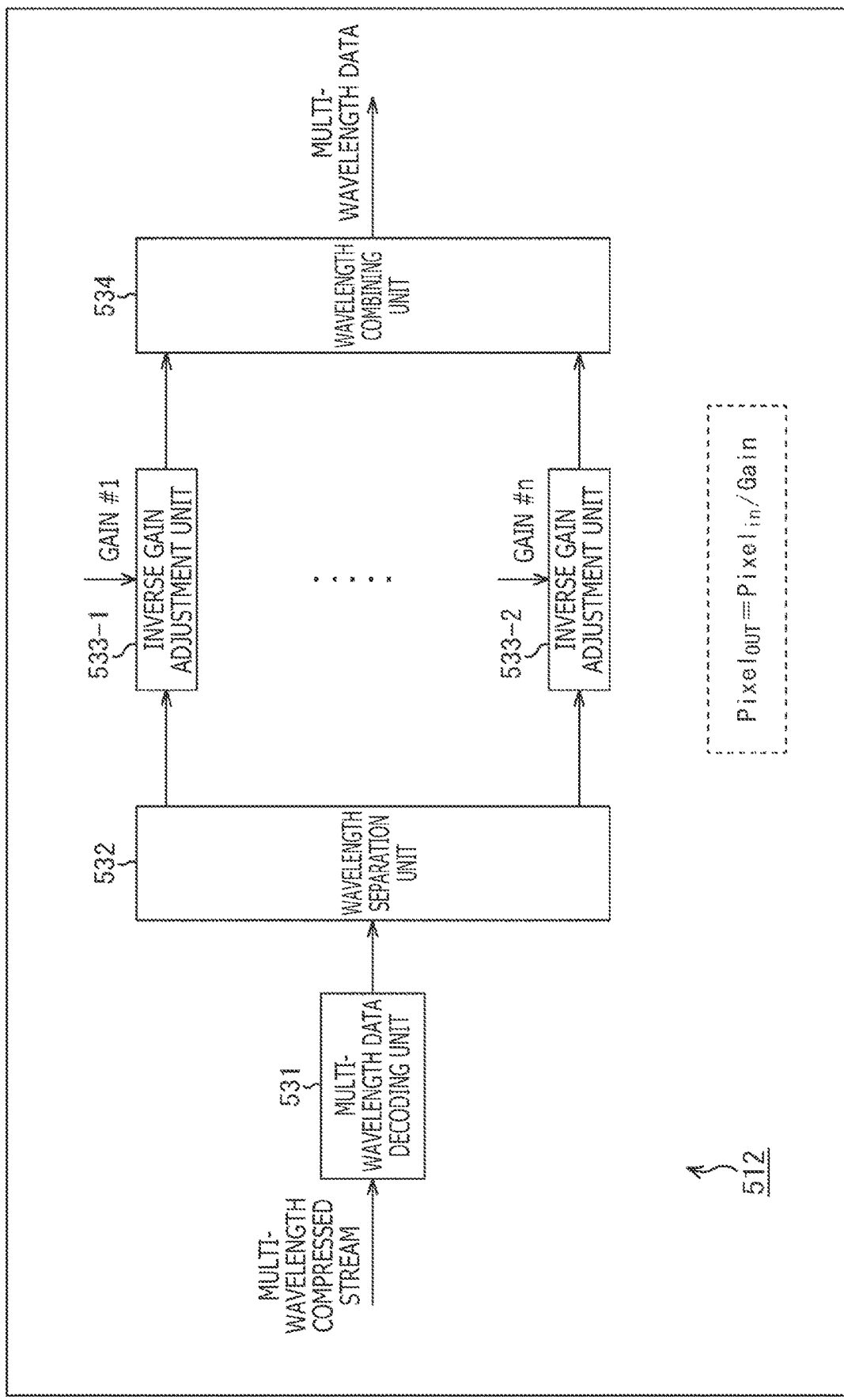
FIG. 64 is a block diagram illustrating a main configuration example of a gain-adjustment multi-wavelength data decoding unit.

FIG. 64 is a block diagram illustrating a main configuration example of the gain-adjustment multi-wavelength data decoding unit 512. The gain-adjustment multi-wavelength data decoding unit 512 includes a multi-wavelength data decoding unit 531, a wavelength separation unit 532, inverse gain adjustment units 533-1 to 533-N (N is a natural number), and a wavelength combining unit 534. The inverse gain adjustment units 533-1 to 533-N will be referred to as inverse gain adjustment units 533 in a case where the units do not have to be distinguished from each other in the description.

The processing units are processing units similar to the processing units of the gain-adjustment Bayer data decoding unit 412 described with reference to FIG. 53 except that the target of processing is changed from the Bayer compressed stream to the multi-wavelength compressed stream, and the processing units execute similar processes.

<Flow of Imaging Process>

Figure 65:
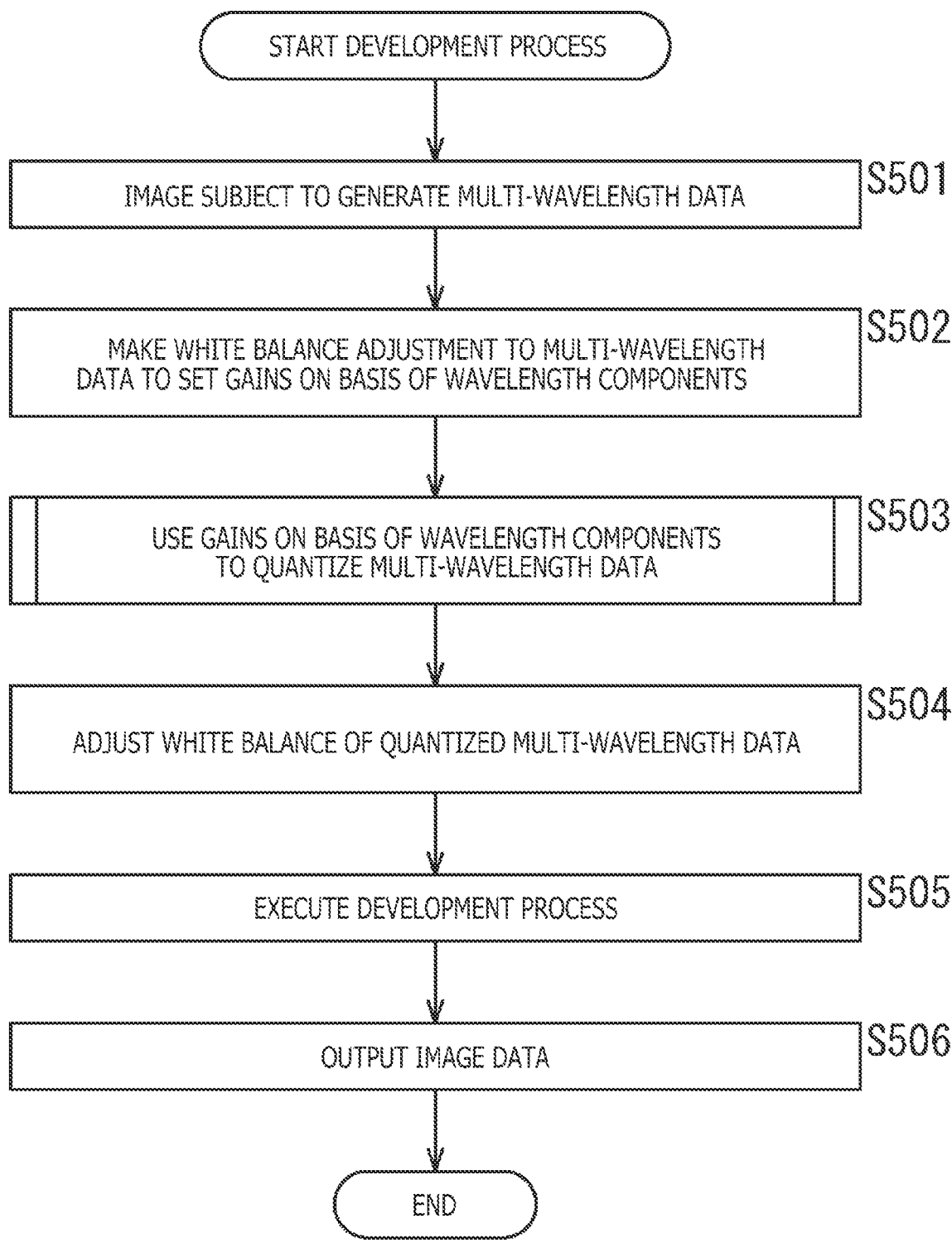
FIG. 65 is a flow chart describing an example of a flow of the imaging process.

The imaging apparatus 500 executes the imaging process as in a flow chart illustrated in FIG. 65. Processes of steps S501 to S506 in FIG. 65 are executed as in the processes of steps S441 to S446 in FIG. 54 except that the target of processing is changed from the Bayer data to the multi-wavelength data.

<Flow of Multi-Wavelength Data Quantization Process>

Figure 66:
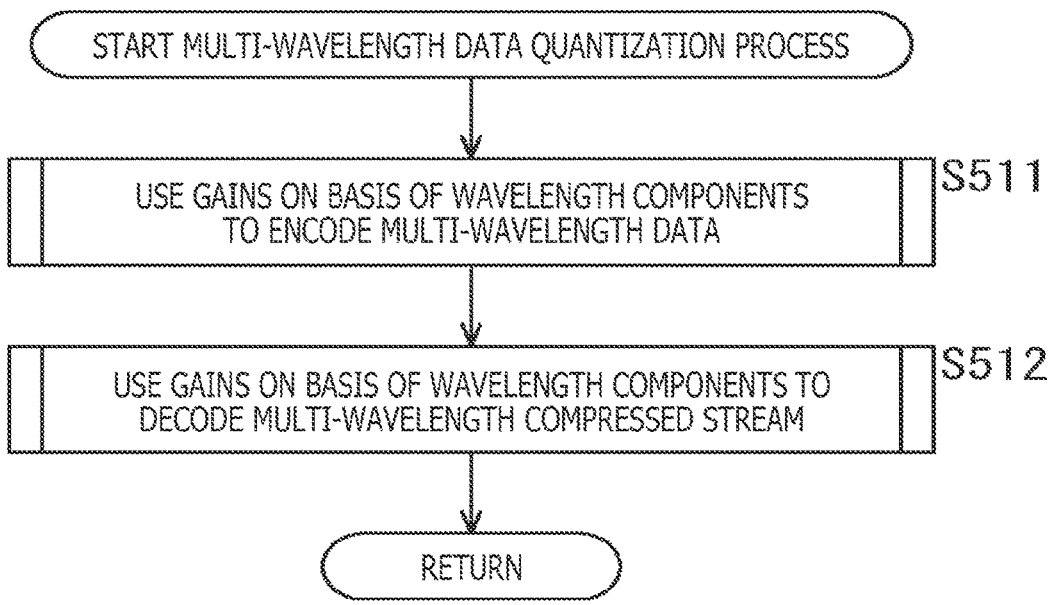
FIG. 66 is a flow chart describing an example of a flow of a multi-wavelength data quantization process.

The multi-wavelength data quantization process executed in step S503 of FIG. 65 is executed as in, for example, a flow chart of FIG. 66. The processes of steps S511 and S512 in FIG. 66 are executed as in the processes of steps S451 and S452 in FIG. 55 except that the target of processing is changed from the Bayer data (or Bayer compressed stream) to the multi-wavelength data (or multi-wavelength compressed stream).

<Flow of Multi-Wavelength Data Encoding Process>

Figure 67:
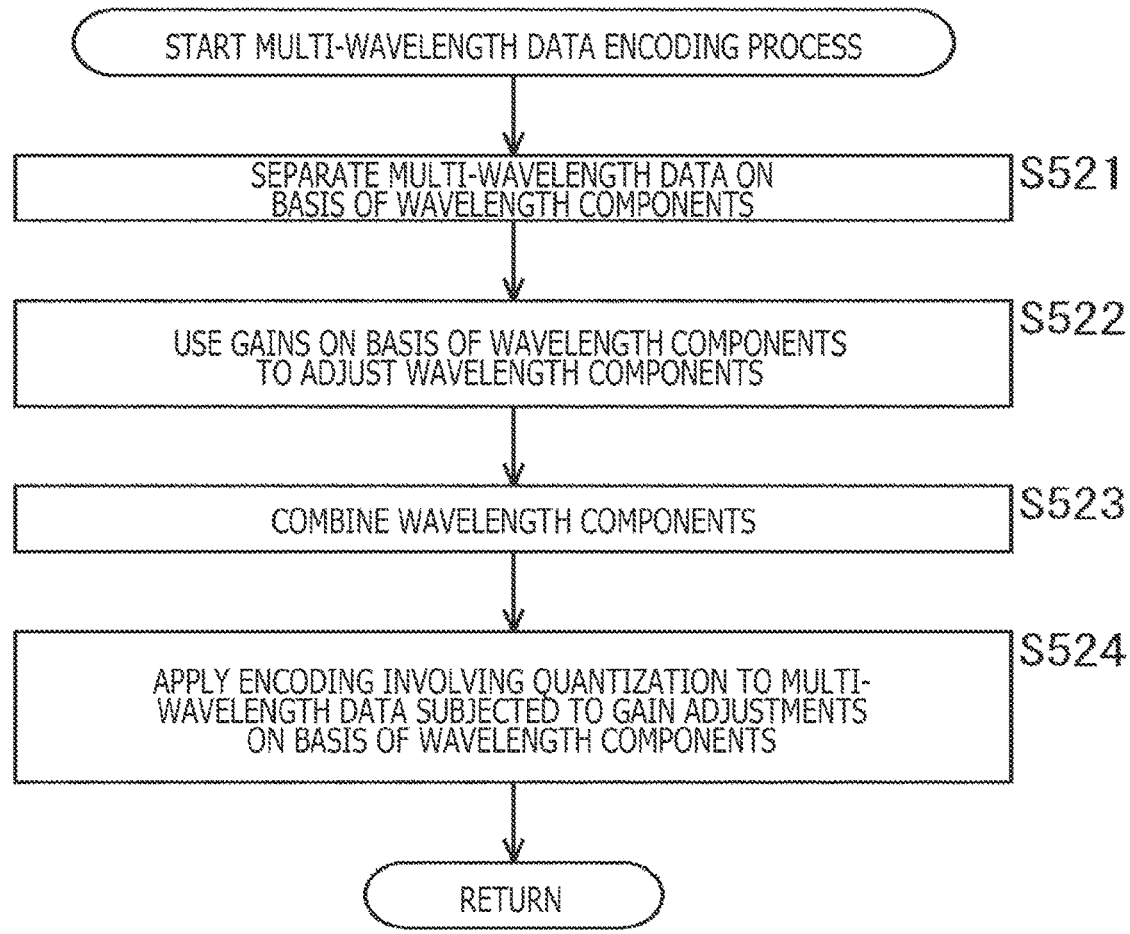
FIG. 67 is a flow chart describing an example of a flow of the multi-wavelength data encoding process.

The multi-wavelength data encoding process executed in step S511 of FIG. 66 is executed as in, for example, a flow chart of FIG. 67. Processes of steps S521 to S524 in FIG. 67 are executed as in the processes of steps S461 to S464 in FIG. 56 except that the target of processing is changed from the Bayer data to the multi-wavelength data.

<Flow of Multi-Wavelength Compressed Stream Decoding Process>

Figure 68:
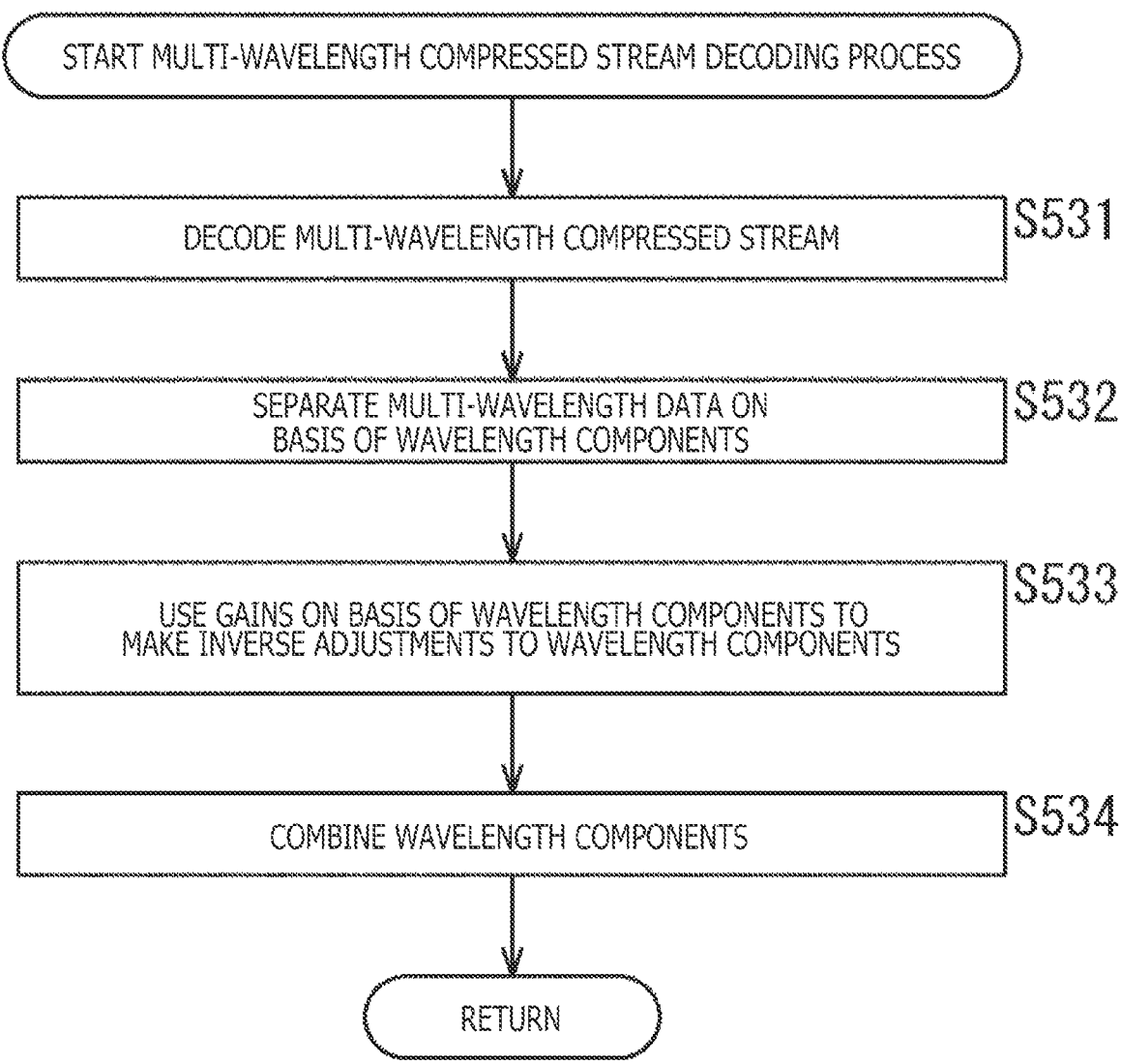
FIG. 68 is a flow chart describing an example of a flow of the multi-wavelength compressed stream decoding process.

The multi-wavelength compressed stream decoding process executed in step S512 of FIG. 66 is executed as in, for example, a flow chart of FIG. 68. Processes of steps S531 to S534 in FIG. 68 are executed as in the processes of steps S471 to S474 in FIG. 57 except that the target of processing is changed from the Bayer compressed stream to the multi-wavelength compressed stream.

The processes can be executed in such a way to suppress the variation of the quantized values after the gain adjustments of the wavelength components even in the case of the multi-wavelength data, and the degradation of information can be suppressed.

<4-5. Imaging Apparatus>

Note that the imaging apparatus 500 may be provided with a sensor (light source color measurement unit) that measures the color of the light source (light source color), and the quantized value corresponding to the gain for each wavelength component of the multi-wavelength data set based on the measured light source color may be used to quantize and encode each wavelength component of the multi-wavelength data.

Figure 69:
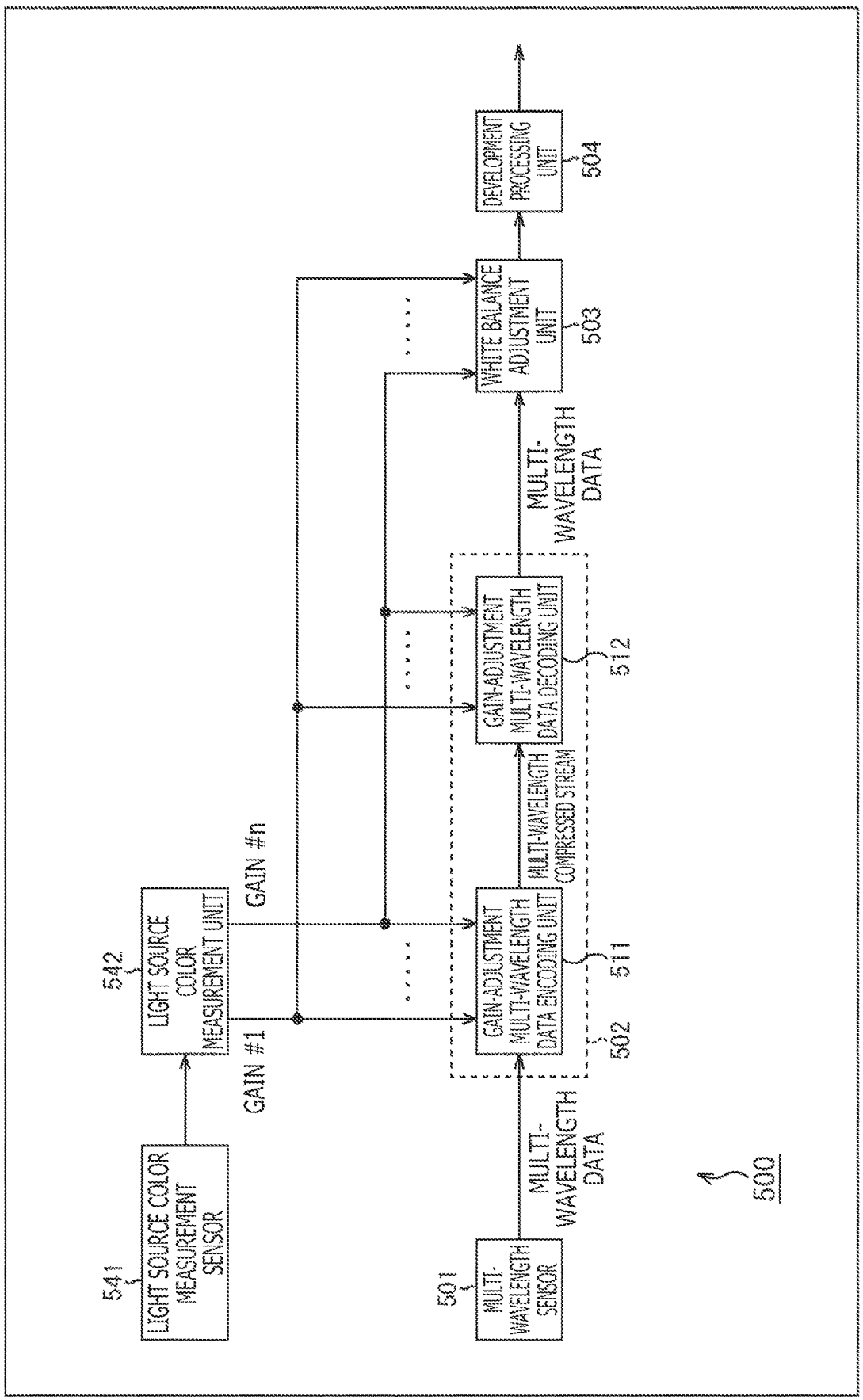
FIG. 69 is a block diagram illustrating a main configuration example of the imaging apparatus.

In this case, the imaging apparatus 500 includes, for example, a light source color measurement sensor 541 and a light source color measurement unit 542 as illustrated in FIG. 69. The light source color measurement sensor 541 detects the light source (for example, environment light) or the like and supplies the detection result to the light source color measurement unit 542. The light source color measurement unit 542 measures the light source color based on the detection result and sets the gain of each wavelength component based on the light source color. The light source color measurement unit 542 supplies the gain of each wavelength component to the gain-adjustment multi-wavelength data encoding unit 511, the gain-adjustment multi-wavelength data decoding unit 512, and the white balance adjustment unit 503. The encoding of the multi-wavelength data by the gain-adjustment multi-wavelength data encoding unit 511, the decoding of the multi-wavelength compressed stream by the gain-adjustment multi-wavelength data decoding unit 512, and the white balance adjustment by the white balance adjustment unit 503 are performed by using the gain set by the light source color measurement unit 542.

<Flow of Imaging Process>

Figure 70:
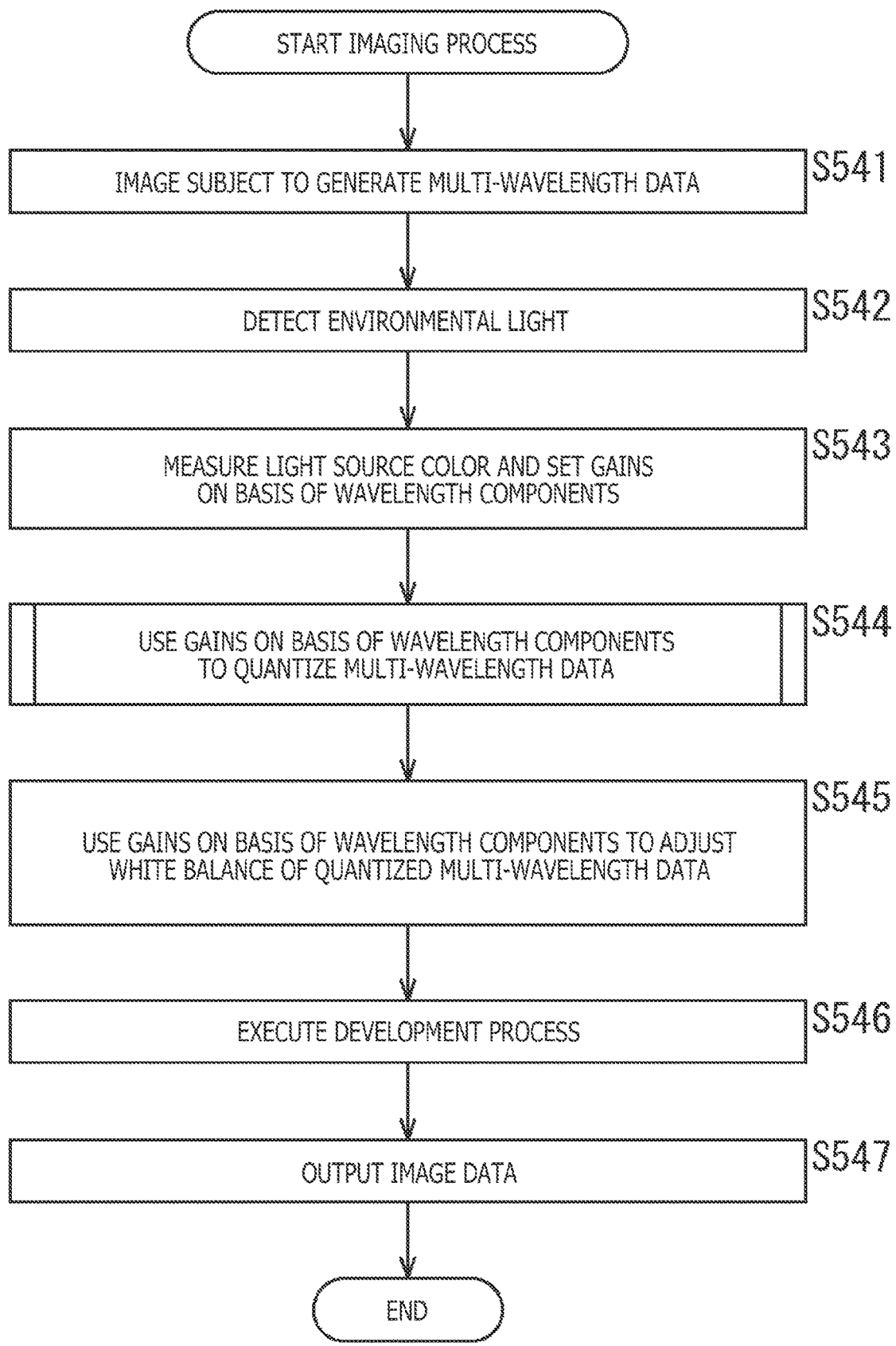
FIG. 70 is a flow chart describing an example of a flow of the imaging process.

The imaging apparatus 500 in this case executes the imaging process as in a flow chart illustrated in FIG. 70. Processes of steps S541 to S547 in FIG. 70 are executed as in the processes of steps S481 to S487 in FIG. 59 except that the target of processing is changed from the Bayer data to the multi-wavelength data.

In such a way, the imaging apparatus 500 can make the white balance adjustment based on the environment light (ambient light). In addition, the imaging apparatus 500 can also suppress the variation of the quantized values after the gain adjustment of the wavelength components of the multi-wavelength data in this case, and the degradation of information can be suppressed.

<4-6. Imaging Apparatus>

Figure 71:
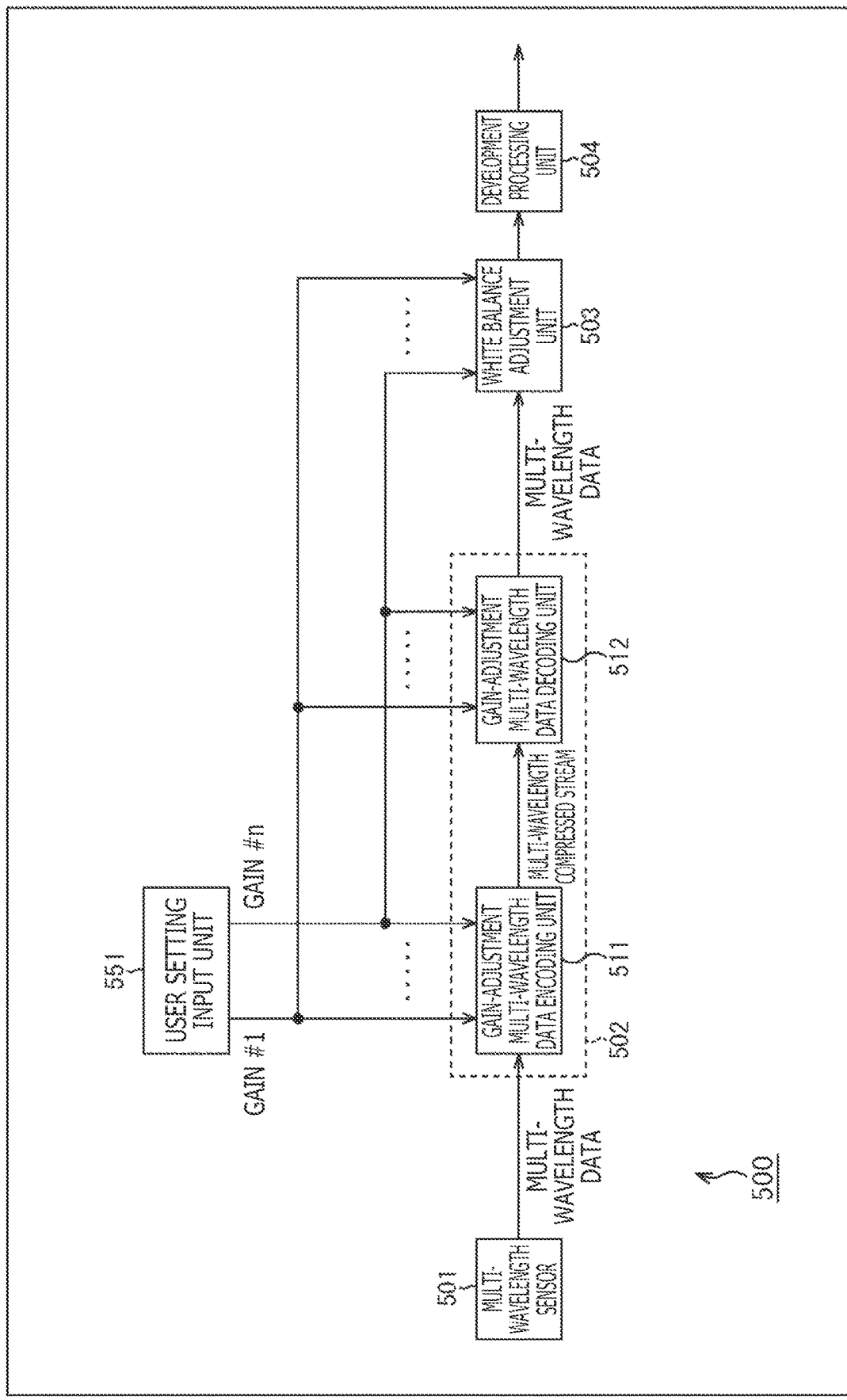
FIG. 71 is a block diagram illustrating a main configuration example of the imaging apparatus.

Note that the user or the like may set the gains on the basis of wavelength components. In this case, the imaging apparatus 500 includes, for example, a user setting input unit 551 as illustrated in FIG. 71. The user setting input unit 551 receives user settings of the gain of each wavelength component of the multi-wavelength data. The user setting input unit 551 may include, for example, a user interface to receive manual input of the gain by the user or the like or may include an input terminal, a communication unit, or the like to receive the gain from another apparatus.

The gain of each wavelength component of the multi-wavelength data input to the user setting input unit 551 is supplied to the gain-adjustment multi-wavelength data encoding unit 511, the gain-adjustment multi-wavelength data decoding unit 512, and the white balance adjustment unit 503. The encoding of the multi-wavelength data by the gain-adjustment multi-wavelength data encoding unit 511, the decoding of the multi-wavelength compressed stream by the gain-adjustment multi-wavelength data decoding unit 512, and the white balance adjustment by the white balance adjustment unit 503 are performed by using the gain.

<Flow of Imaging Process>

Figure 72:
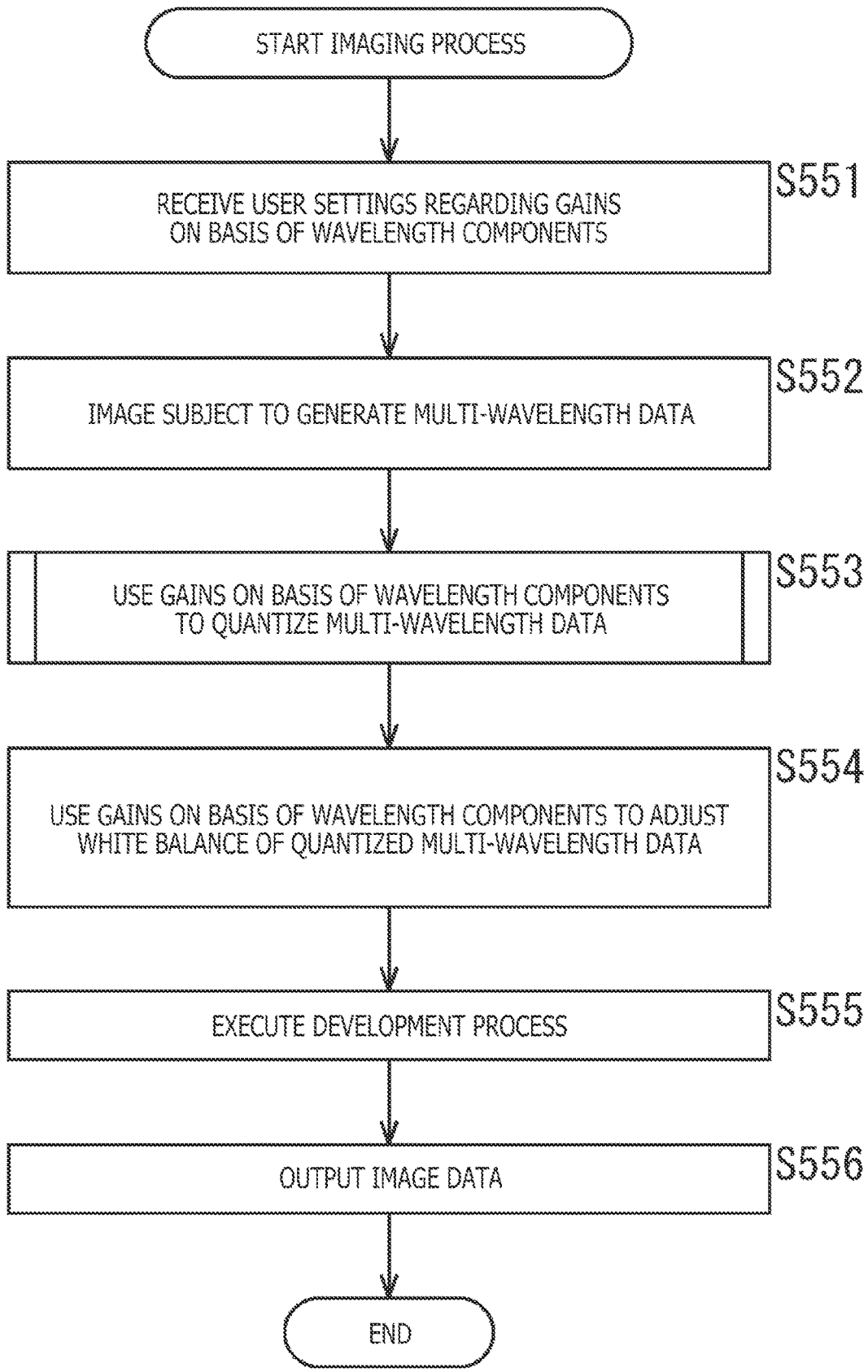
FIG. 72 is a flow chart describing an example of a flow of the imaging process.

The imaging apparatus 500 in this case executes the imaging process as in a flow chart illustrated in FIG. 72. Processes of steps S551 to S556 in FIG. 72 are executed as in the processes of steps S491 to S496 in FIG. 61 except that the target of processing is changed from the Bayer data to the multi-wavelength data.

In such a way, the imaging apparatus 500 can make the white balance adjustment based on the user settings. Therefore, the white balance adjustment can be made according to, for example, the preference of the user. Furthermore, the imaging apparatus 500 can also suppress the variation of the quantized values after the gain adjustment of the wavelength components of the multi-wavelength data in this case, and the degradation of information can be suppressed.

5. Fourth Embodiment

<Protection of Wavelength Region>

Figure 73:
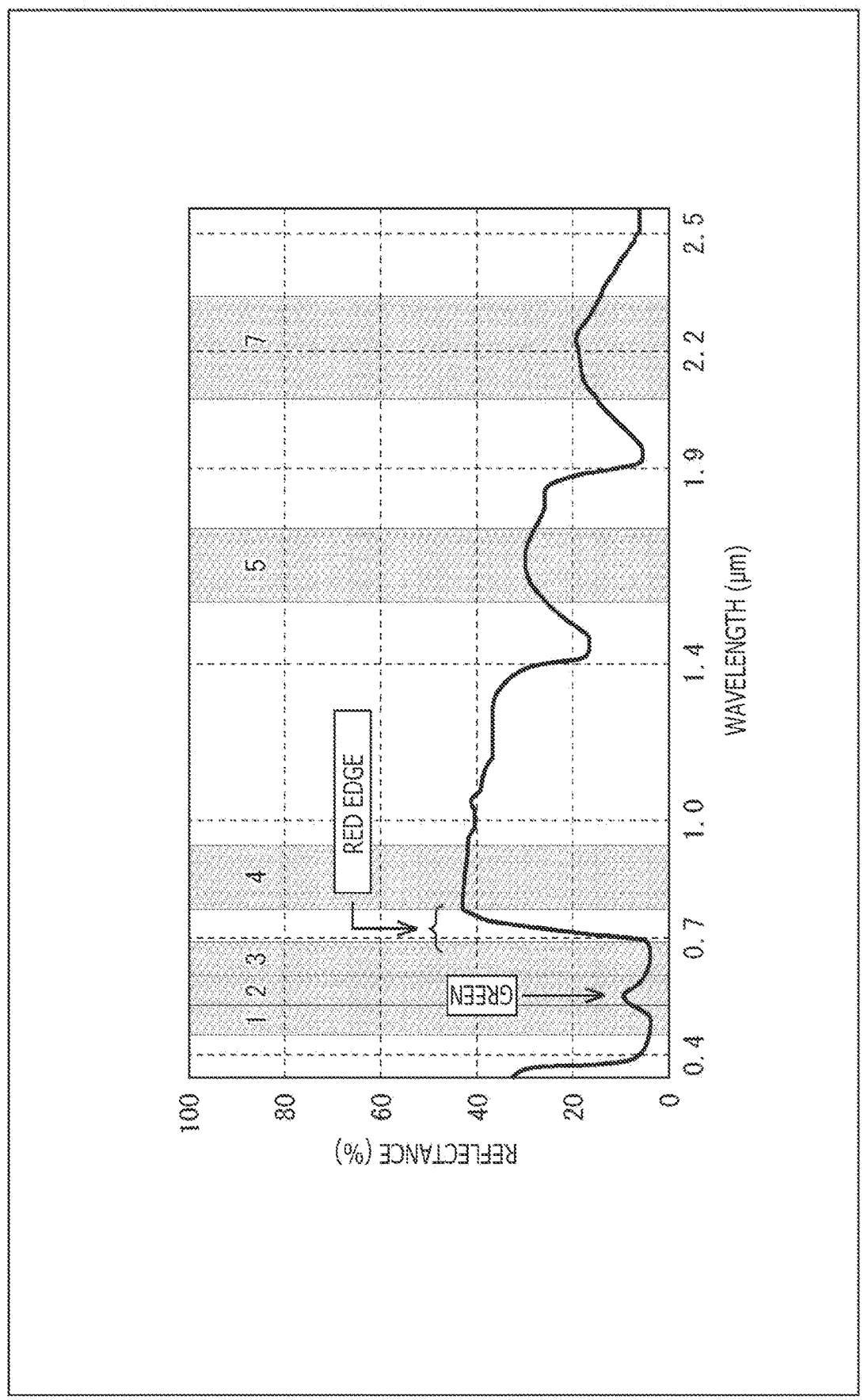
FIG. 73 is a diagram illustrating an example of a light wavelength distribution.

There is also a case in which the importance of all of the wavelength components of the multi-wavelength data is not uniform. For example, it is known that examples of the wavelength used by plants in the photosynthesis include wavelengths of 0.45 µm and 0.68 µm, and it is known that the reflectance at the wavelength of 0.75 µm becomes large in order to protect the chlorophyll sensitive to heat (FIG. 73). The wavelength band with a rapid change in the reflectance is called a red edge, and this is significantly important for figuring out the stress conditions of the plants. For example, in a case where the target plant is in a stress state due to a lack of water or the like, it is known that the red edge changes toward the short wavelength side. In such a way, to figure out the cultivation conditions of plants, the data of the wavelength band called red edge is important. However, the importance between wavelengths does not significantly change in an existing compression method, such as Bayer encoding, and protected and unprotected areas cannot be set among the wavelengths.

Therefore, a wavelength band with high priority may be protected as a protected area, and the precision of the components of the protected area may be set higher than the precision of other wavelength bands (outside of the protected area). In other words, the precision of the data outside of the protected area may be reduced compared to the protected area. In such a way, the degradation of high-priority (more important) information can be suppressed.

The wavelength band to be set as the protected area is optional. For example, the red edge (adjacent wavelength band of visible red light, wavelength band around wavelength 0.75 μm) may be set as the protected area.

Figure 74:
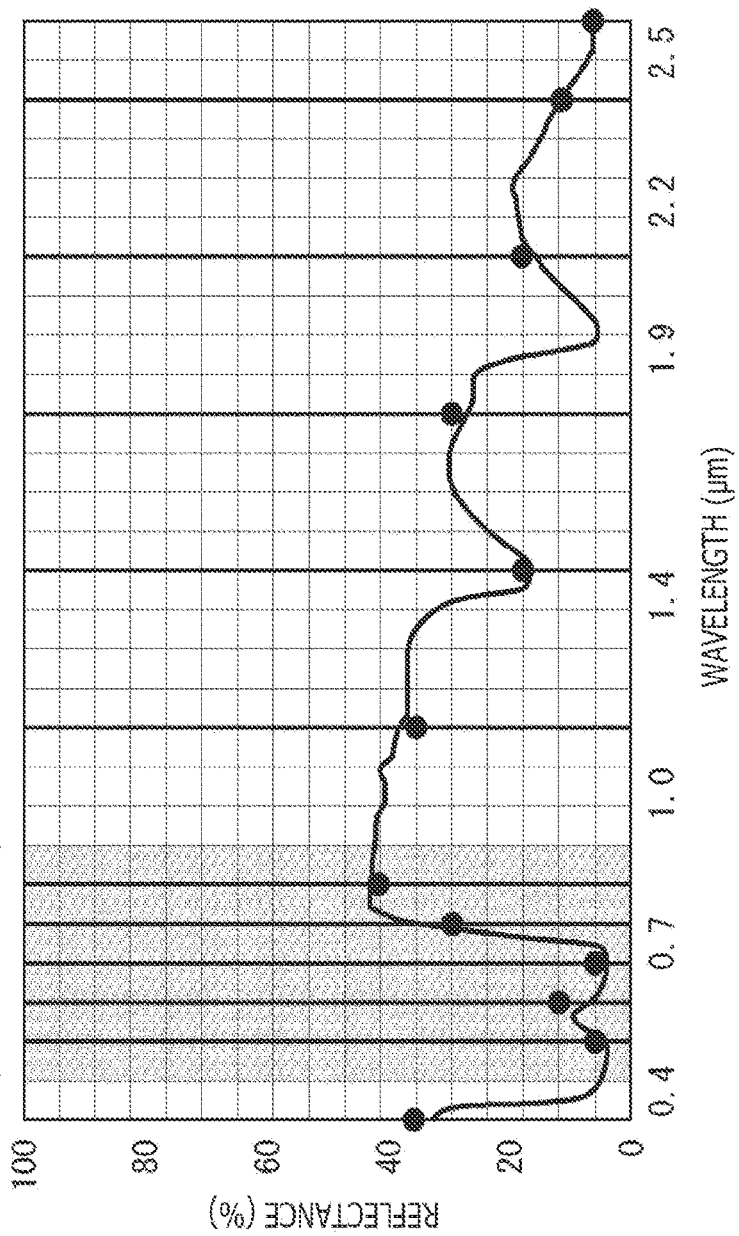
FIG. 74 is a diagram illustrating an example of a state of sampling interval control.

For example, as in an example illustrated in FIG. 74, the sampling in the wavelength direction may be more densely set in the protected area than the outside of the protected area. For example, the spectroscopic capability of the multi-wavelength sensor in the protected area can be set higher than the spectroscopic capability outside of the protected area to realize such sampling settings. This allows to generate multi-wavelength data that can more accurately obtain the information of the high-priority (more important) wavelength band.

In addition, for example, the subject may be imaged to generate multi-wavelength data that is image data including four or more wavelength components, and the generated multi-wavelength data may be quantized so that only predetermined wavelength components (protected area) are quantized by using quantized values smaller than quantized values in other wavelength components (outside of the protected area). The quantized multi-wavelength data may be encoded to generate encoded data of the multi-wavelength data.

Figure 75:
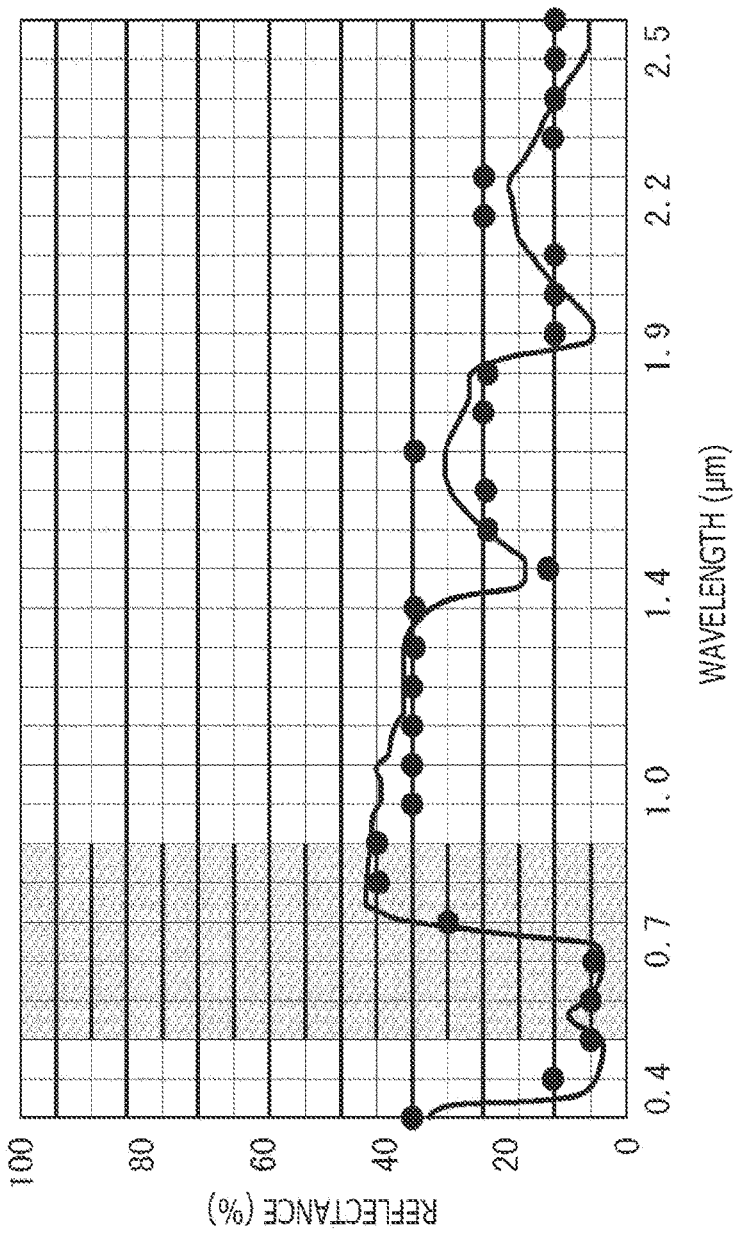
FIG. 75 is a diagram illustrating an example of a state of quantized value control.

For example, as in an example illustrated in FIG. 75, the quantized values of the protected area may be set to values smaller than the values outside of the protected area. This can reduce errors caused by the quantization in the protected area and generate multi-wavelength data that can more accurately obtain the information of the high-priority (more important) wavelength band.

<5-1. Imaging Apparatus>

Figure 76:
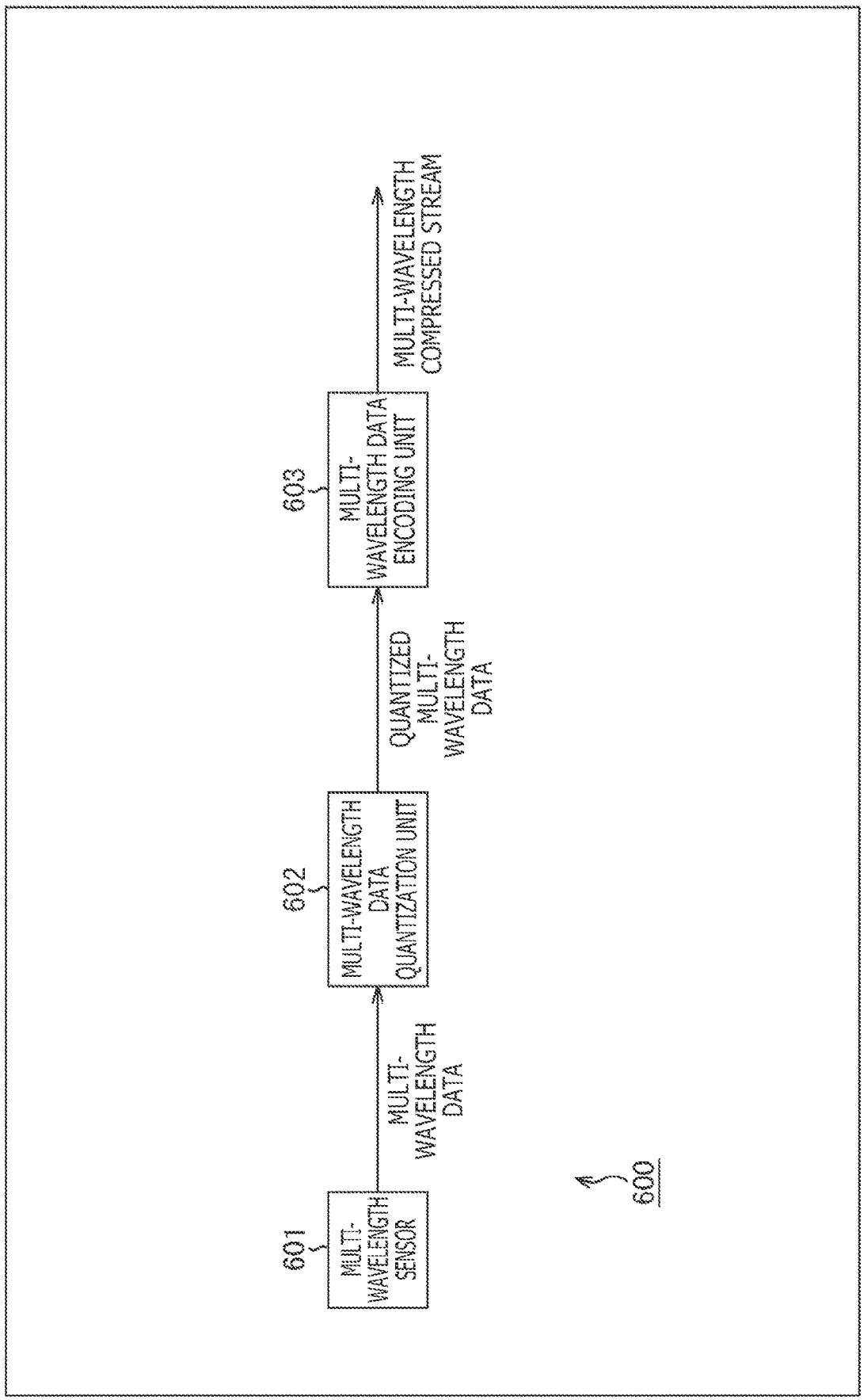
FIG. 76 is a block diagram illustrating a main configuration example of an imaging apparatus.

FIG. 76 is a block diagram illustrating a main configuration example of the imaging apparatus in this case. An imaging apparatus 600 illustrated in FIG. 76 is an apparatus that images the subject to output multi-wavelength data of the captured image. The imaging apparatus 600 denotes, for example, a terminal apparatus with an imaging function, such as the artificial satellite, the aerial photography helicopter, and the drone, used in precision agriculture or the like.

The imaging apparatus 600 includes a multi-wavelength sensor 601, a multi-wavelength data quantization unit 602, and a multi-wavelength data encoding unit 603. The multi-wavelength sensor 601 is a sensor similar to the multi-wavelength sensor 111 (FIG. 1). The multi-wavelength sensor 601 images the subject to generate multi-wavelength data and supplies the multi-wavelength data to the multi-wavelength data quantization unit 602. The multi-wavelength data quantization unit 602 quantizes the multi-wavelength data and supplies the quantized multi-wavelength data to the multi-wavelength data encoding unit 603. The multi-wavelength data encoding unit 603 encodes the quantized multi-wavelength data to generate a multi-wavelength compressed stream and outputs the multi-wavelength compressed stream to the outside of the imaging apparatus 600.

<Multi-Wavelength Data Quantization Unit>

Figure 77:
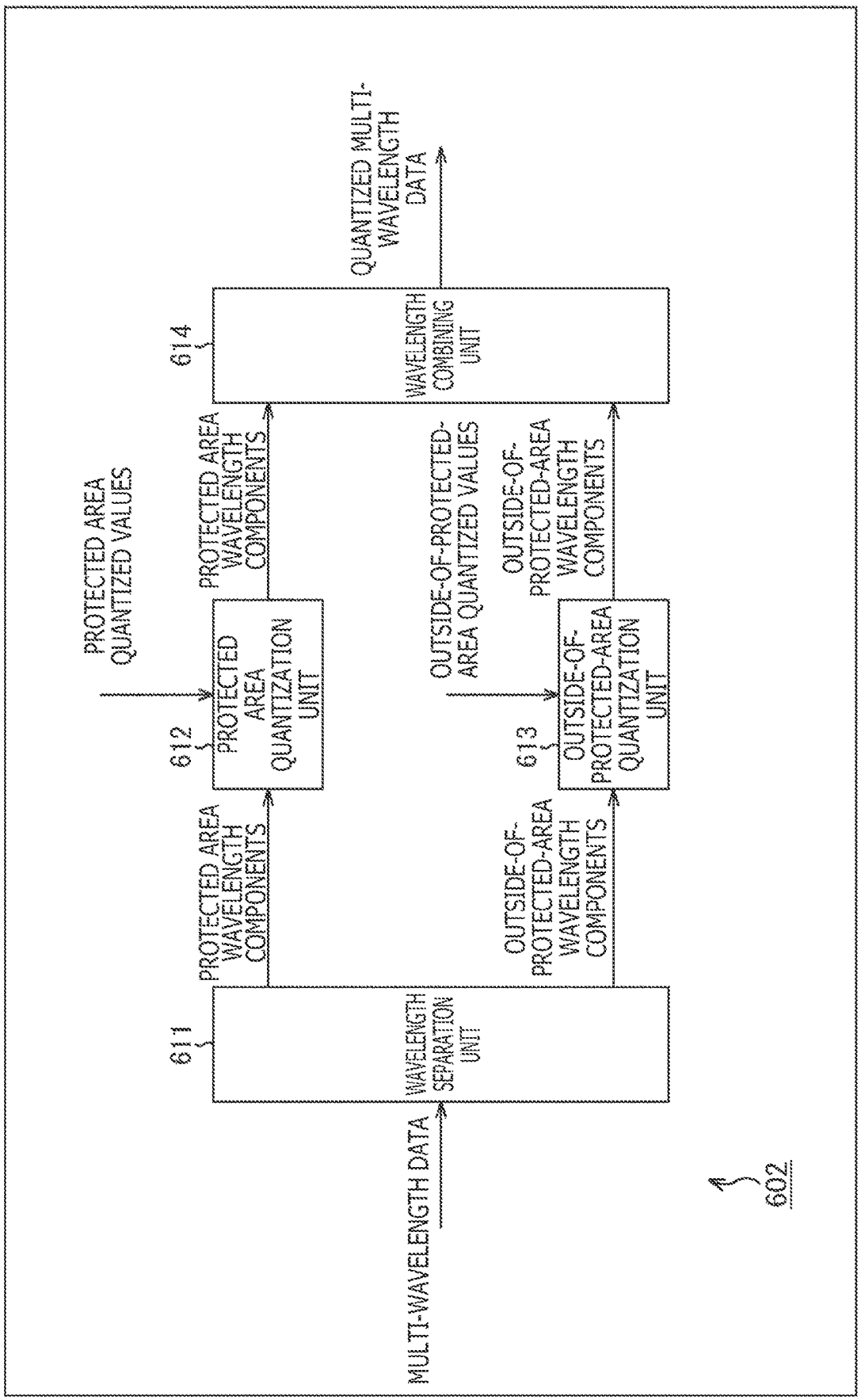
FIG. 77 is a block diagram illustrating a main configuration example of a multi-wavelength data quantization unit.

FIG. 77 is a block diagram illustrating a main configuration example of the multi-wavelength data quantization unit 602 in FIG. 76. The multi-wavelength data quantization unit 602 includes a wavelength separation unit 611, a protected area quantization unit 612, an outside-of-protected-area quantization unit 613, and a wavelength combining unit 614.

The wavelength separation unit 611 separates the multi-wavelength data into components (protected area wavelength components) of a protected area (predetermined wavelength band) and components (outside-of-protected-area wavelength components) outside of the protected area (other wavelength bands). The wavelength separation unit 611 supplies the protected area wavelength components to the protected area quantization unit 612 and supplies the outside-of-protected-area wavelength components to the outside-of-protected-area quantization unit 613.

The protected area quantization unit 612 uses supplied protected area quantized values to quantize the protected area wavelength components. The protected area quantization unit 612 supplies the quantized protected area wavelength components to the wavelength combining unit 614. The outside-of-protected-area quantization unit 613 uses supplied outside-of-protected-area quantized values to quantize the outside-of-protected area wavelength components. The outside-of-protected-area quantization unit 613 supplies the quantized outside-of-protected-area wavelength components to the wavelength combining unit 614. That is, the protected area quantization unit 612 and the outside-of-protected-area quantization unit 613 use quantized values independent from each other to perform the quantization.

The wavelength combining unit 614 combines the quantized protected area wavelength components and the quantized outside-of-protected-area wavelength components to generate quantized multi-wavelength data and outputs the quantized multi-wavelength data.

<Flow of Imaging Process>

Figure 78:
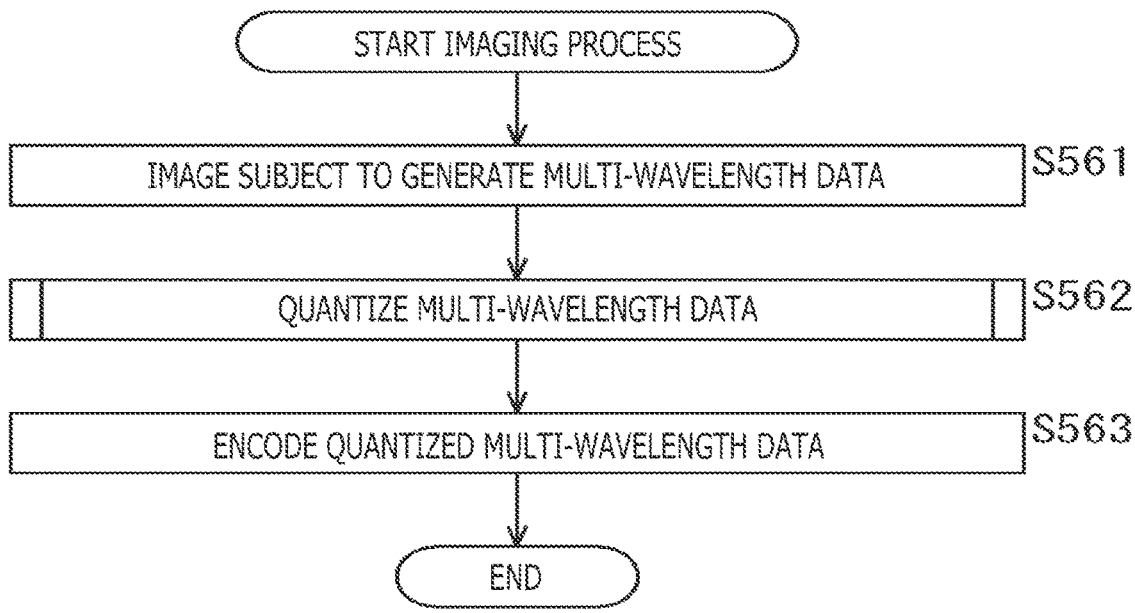
FIG. 78 is a flow chart describing an example of a flow of the imaging process.

An example of a flow of the imaging process executed by the imaging apparatus 600 will be described with reference to a flow chart of FIG. 78. Once the imaging process is started, the multi-wavelength sensor 601 images the subject to generate the multi-wavelength data in step S561. In step S562, the multi-wavelength data quantization unit 602 quantizes the multi-wavelength data. In step S563, the multi-wavelength data encoding unit 603 encodes the quantized multi-wavelength data to generate the multi-wavelength compressed stream.

<Flow of Multi-Wavelength Data Quantization Process>

Figure 79:
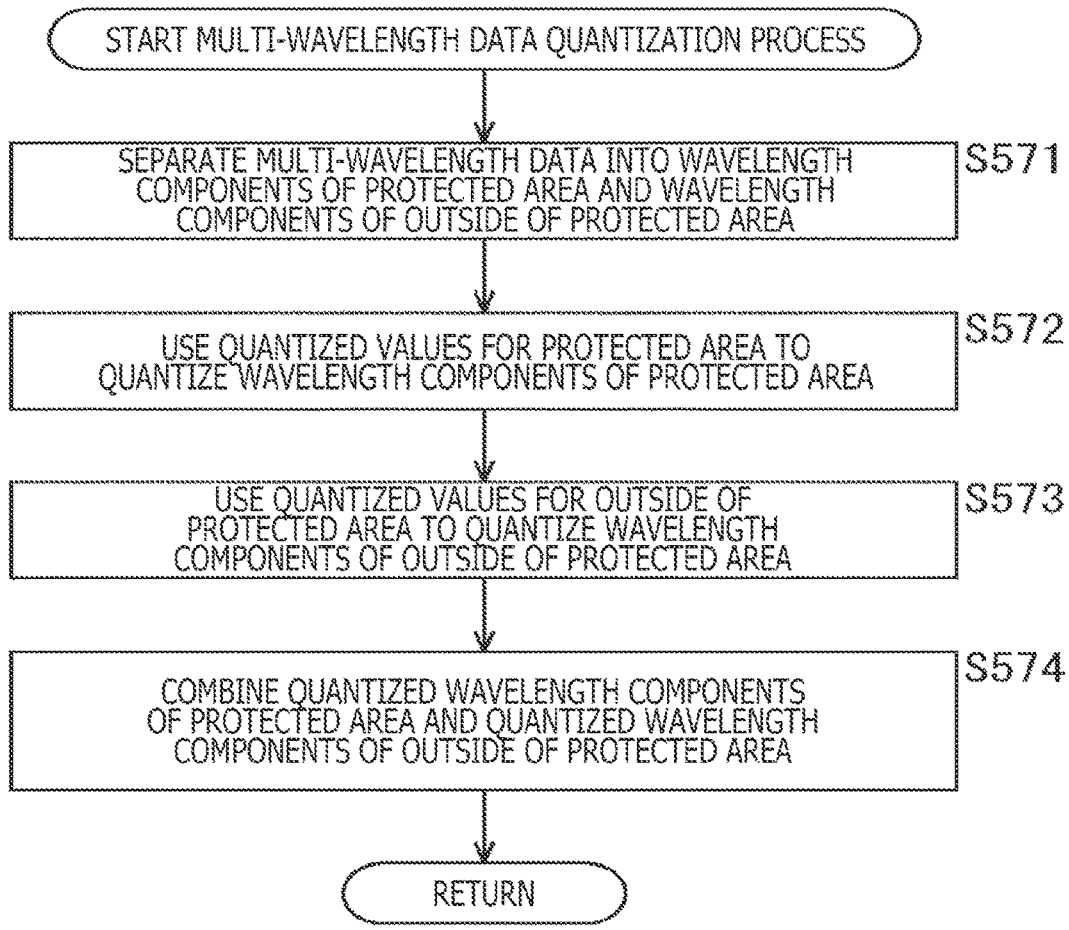
FIG. 79 is a flow chart describing an example of a flow of the multi-wavelength data encoding process.

An example of a flow of the multi-wavelength data quantization process executed in step S562 of FIG. 78 will be described with reference to a flow chart of FIG. 79. Once the multi-wavelength data quantization process is started, the wavelength separation unit 611 separates the multi-wavelength data into the protected area wavelength components and the outside-of-protected-area wavelength components in step S571. In step S572, the protected area quantization unit 612 uses the quantized values for the protected area to quantize the protected area wavelength components. In step S573, the outside-of-protected-area quantization unit 613 uses the quantized values for the outside of the protected area to quantize the outside-of-protected-area wavelength components. In step S574, the wavelength combining unit 614 combines the quantized protected area wavelength components and the quantized outside-of-protected-area wavelength components to generate the quantized multi-wavelength data.

In such a way, the quantized values for the protected area independent from the quantized values for the outside of the protected area can be used to quantize the wavelength components of the protected area to reduce the errors caused by the quantization in the protected area, and the multi-wavelength data that can more accurately obtain the information of the high-priority (more important) wavelength band can be generated.

<Weighting, Rearrangement, and Fixed-Length Compression of Data>

Figure 80:
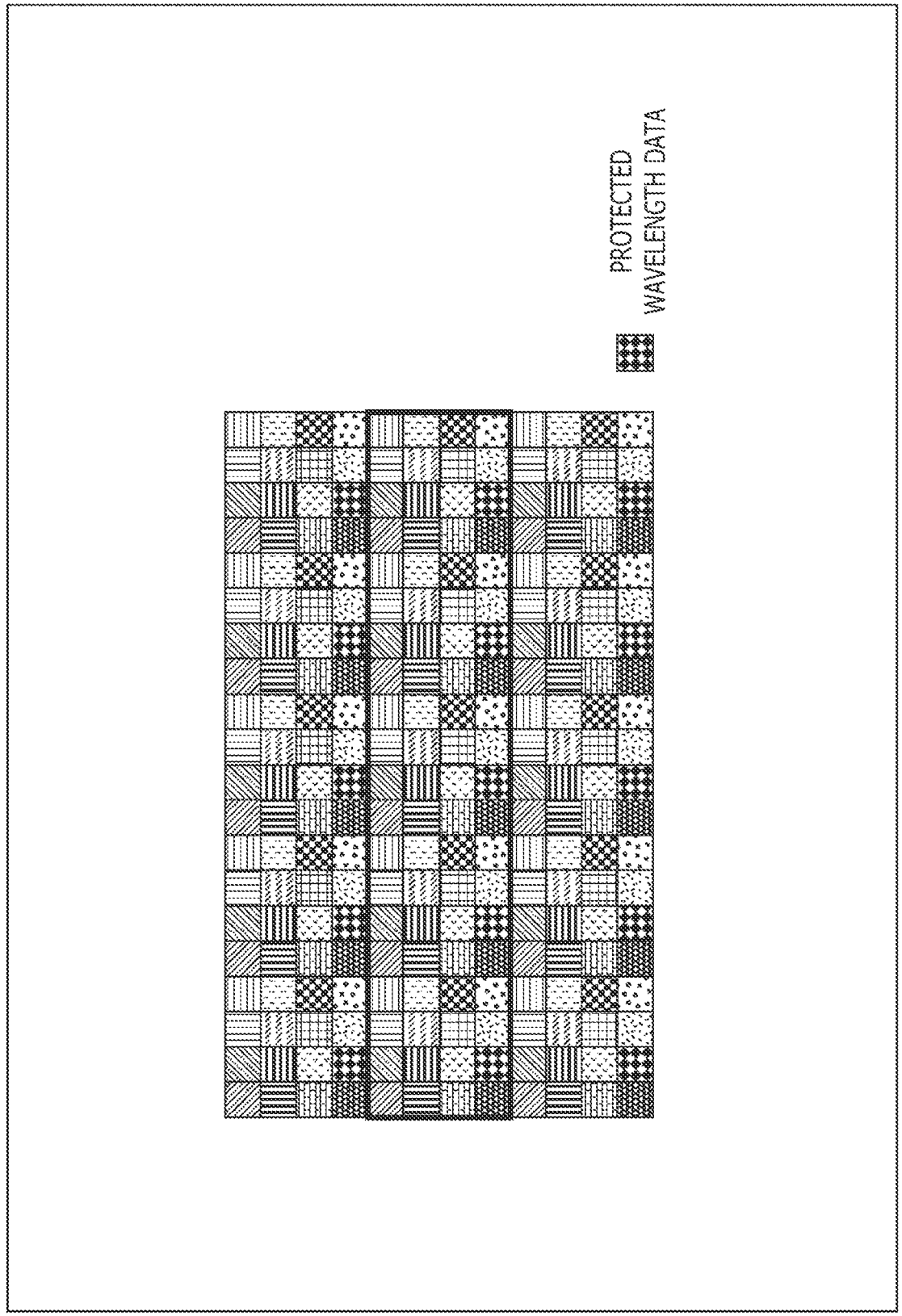
FIG. 80 is a diagram illustrating an example of multi-wavelength data.

The multi-wavelength data includes a plurality of wavelength components. For example, assuming that each rectangle illustrated in FIG. 80 denotes one piece of single-wavelength data, the multi-wavelength data includes a set of single-wavelength data. Furthermore, each piece of single-wavelength data can be independently processed. Therefore, each piece of single-wavelength data may be weighted in quantization as illustrated for example in FIG. 81A. For example, the quantized values of high-priority single-wavelength data can be smaller than the quantized values of low-priority single-wavelength data. That is, each piece of single-wavelength data can be weighted, and this allows to generate multi-wavelength data that can more accurately obtain the information of the high-priority (more important) wavelength band.

In addition, the processing order of the single-wavelength data may be rearranged as illustrated in FIG. 81B. For example, the processing order may be rearranged so that high-priority single-wavelength data (for example, single-wavelength data outside of the protected area) is processed earlier than other single-wavelength data. In such a way, the processing result of the high-priority single-wavelength data can be obtained first.

In addition, fixed-length compression with fixed code length may be used to encode the multi-wavelength data. In that case, the processing order can be rearranged to process the high-priority single-wavelength data first as described above, and this can generate multi-wavelength data of fixed-length compression that can more accurately obtain the information of the high-priority (more important) wavelength band.

<5-2. Imaging Apparatus>

FIG. 82 is a block diagram illustrating a main configuration example of an imaging apparatus in this case. An imaging apparatus 700 illustrated in FIG. 82 is an apparatus that images the subject to output multi-wavelength data of the captured image. The imaging apparatus 700 denotes, for example, a terminal apparatus with an imaging function, such as the artificial satellite, the aerial photography helicopter, and the drone, used in precision agriculture or the like.

The imaging apparatus 700 includes a multi-wavelength sensor 701, a data rearrangement unit 702, a multi-wavelength data encoding unit 703, a multi-wavelength data encoding unit 704, and a stream combining unit 705. The multi-wavelength sensor 701 is a sensor similar to the multi-wavelength sensor 111 (FIG. 1). The multi-wavelength sensor 701 images the subject to generate multi-wavelength data and supplies the multi-wavelength data to the data rearrangement unit 702. The data rearrangement unit 702 rearranges the processing order of the single-wavelength data of the multi-wavelength data. The data rearrangement unit 702 supplies high-priority single-wavelength data (high-priority data) to the multi-wavelength data encoding unit 703 and supplies other single-wavelength data (low-priority single-wavelength data (low-priority data)) to the multi-wavelength data encoding unit 704.

The multi-wavelength data encoding unit 703 encodes the high-priority data at a compression rate lower than the multi-wavelength data encoding unit 704 to generate a low-compression compressed stream (high-priority compressed stream) and supplies the low-compression compressed stream to the stream combining unit 705. In addition, the multi-wavelength data encoding unit 703 sets a target bit amount (low-priority data target bit amount) of the multi-wavelength data encoding unit based on the amount of data of the high-priority compressed stream generated by the multi-wavelength data encoding unit 703 to provide fixed-length compression and supplies the target bit amount to the multi-wavelength data encoding unit 704.

The multi-wavelength data encoding unit 704 encodes the low-priority data at a compression rate higher than the multi-wavelength data encoding unit 703 to generate a high-compression compressed stream (low-priority compressed stream) and supplies the high-compression compressed stream to the stream combining unit 705. Note that the multi-wavelength data encoding unit 704 uses a low-priority data target bit amount supplied from the multi-wavelength data encoding unit 703 to encode the low-priority data to provide fixed-length encoding.

For example, as illustrated in FIG. 83A, the multi-wavelength data encoding unit 703 first encodes the high-priority data and sets the low-priority data target bit amount based on the remaining bit amount. Next, as illustrated in FIG. 83B, the multi-wavelength data encoding unit 704 uses the low-priority data target bit amount to adjust the compression rate to provide fixed-length encoding and encodes the low-priority data. If the bits are left over as in the example of FIG. 83B, stuffing bits may be supplied as illustrated in FIG. 83C.

Returning to FIG. 82, the stream combining unit 705 combines the high-priority compressed stream and the low-priority compressed stream to generate a multi-wavelength compressed stream and outputs the multi-wavelength compressed stream.

<Flow of Imaging Process>

Figure 84:
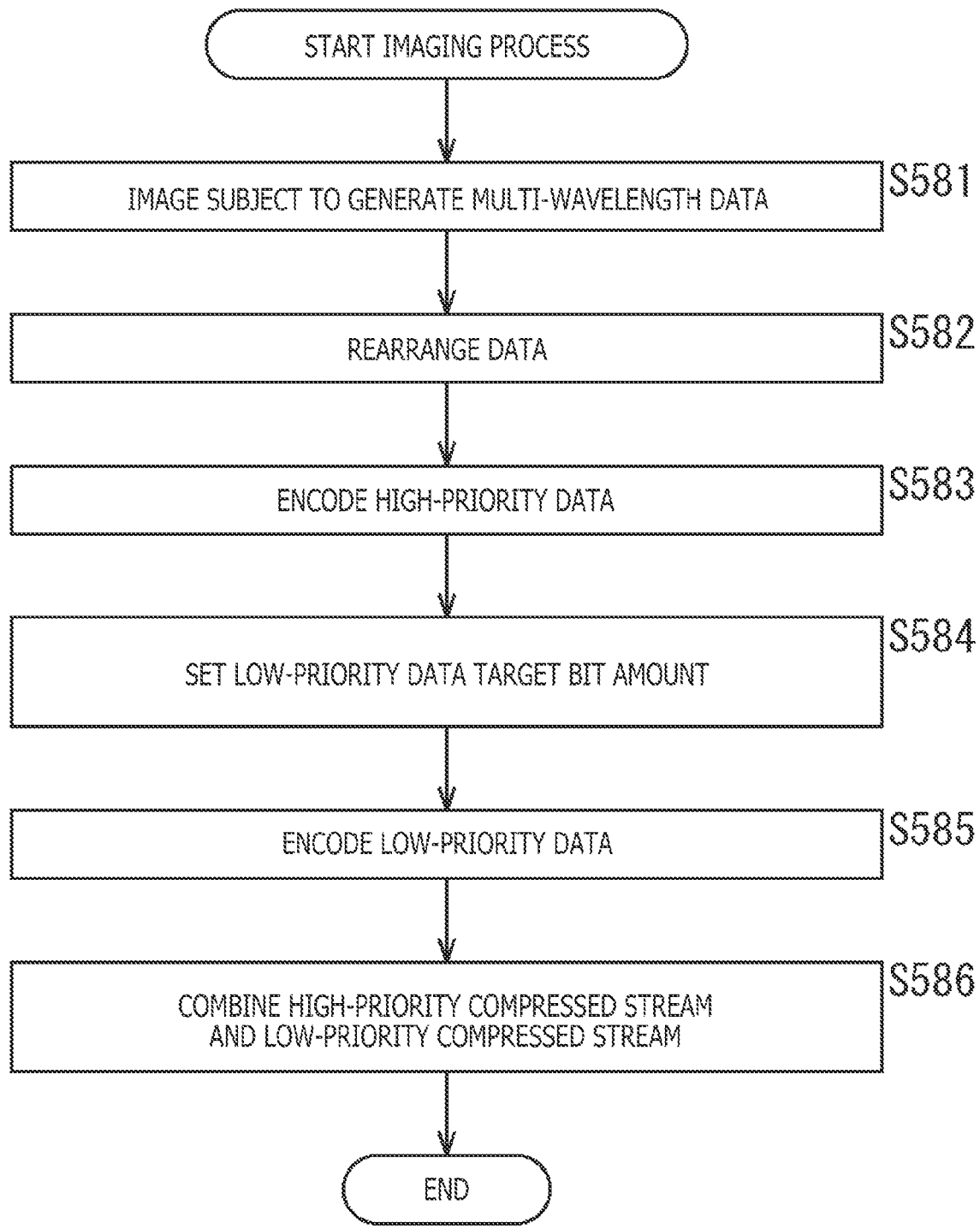
FIG. 84 is a flow chart describing an example of a flow of the imaging process.

An example of a flow of the imaging process executed by the imaging apparatus 700 will be described with reference to a flow chart of FIG. 84. Once the imaging process is started, the multi-wavelength sensor 701 images the subject to generate the multi-wavelength data in step S581. In step S582, the data rearrangement unit 702 appropriately rearranges the processing order of the single-wavelength data of the multi-wavelength data so that the high-priority data is processed first. In step S583, the multi-wavelength data encoding unit 703 encodes the high-priority data. In step S584, the multi-wavelength data encoding unit 703 sets the low-priority data target bit amount. In step S585, the multi-wavelength data encoding unit 704 uses the low-priority data target bit amount to encode the low-priority data to provide fixed-length compression. In step S586, the stream combining unit 705 combines the high-priority compressed stream and the low-priority compressed stream to generate the multi-wavelength compressed stream.

This can generate multi-wavelength data that can more accurately obtain the information of the high-priority (more important) wavelength band.

<Encoding Method Control>

Figure 85:
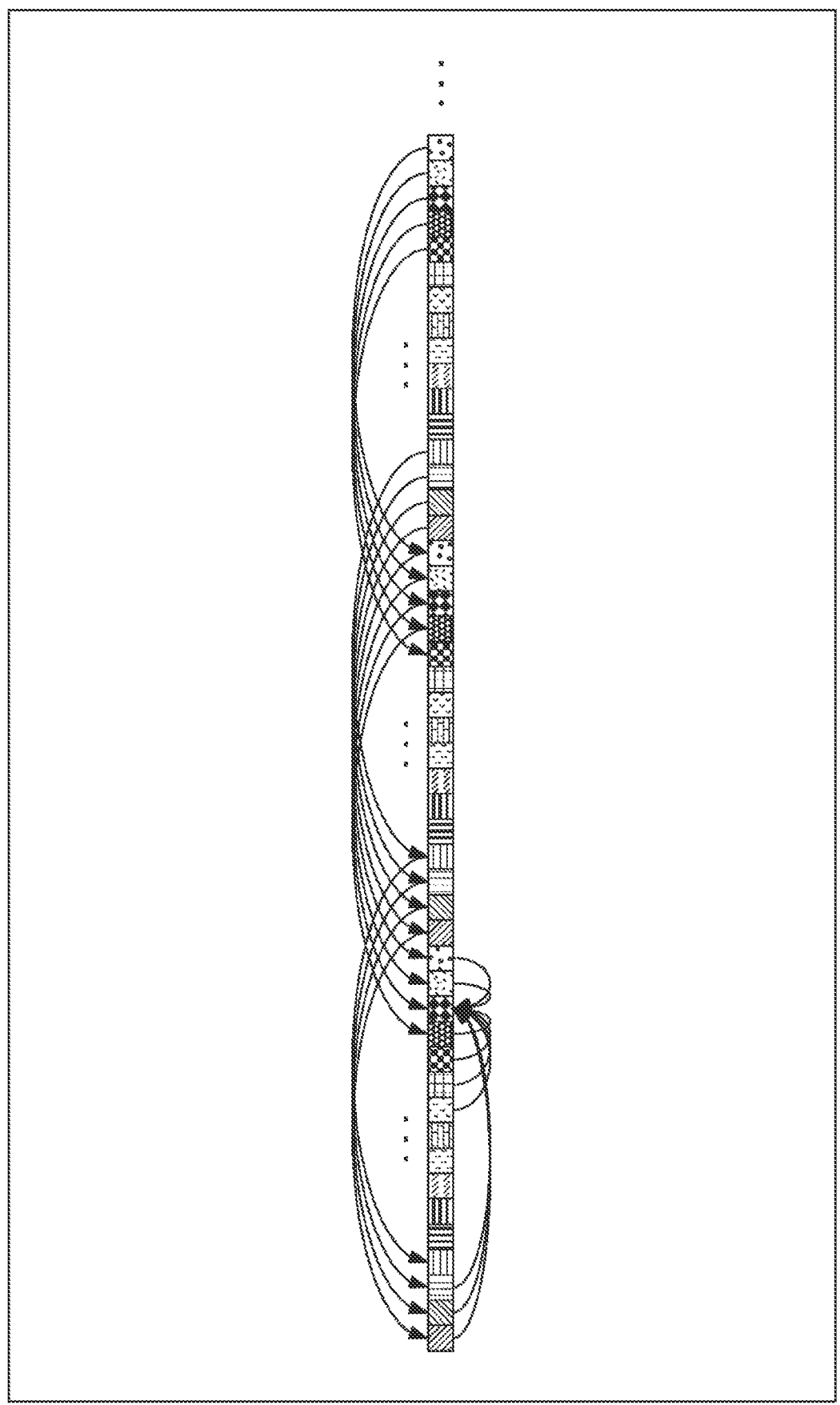
FIG. 85 is a diagram illustrating an example of a state of processing the multi-wavelength data.

In addition, the single-wavelength data of the protected area and the single-wavelength data of the outside of the protected area may be encoded by using different encoding methods. For example, only the data of the single-wavelength data of the protected area may be used to encode the single-wavelength data of the protected area, and prediction using other single-wavelength data may be used to encode the single-wavelength data of the outside of the protected area (FIG. 85).

<5-3. Imaging Apparatus>

Figure 86:
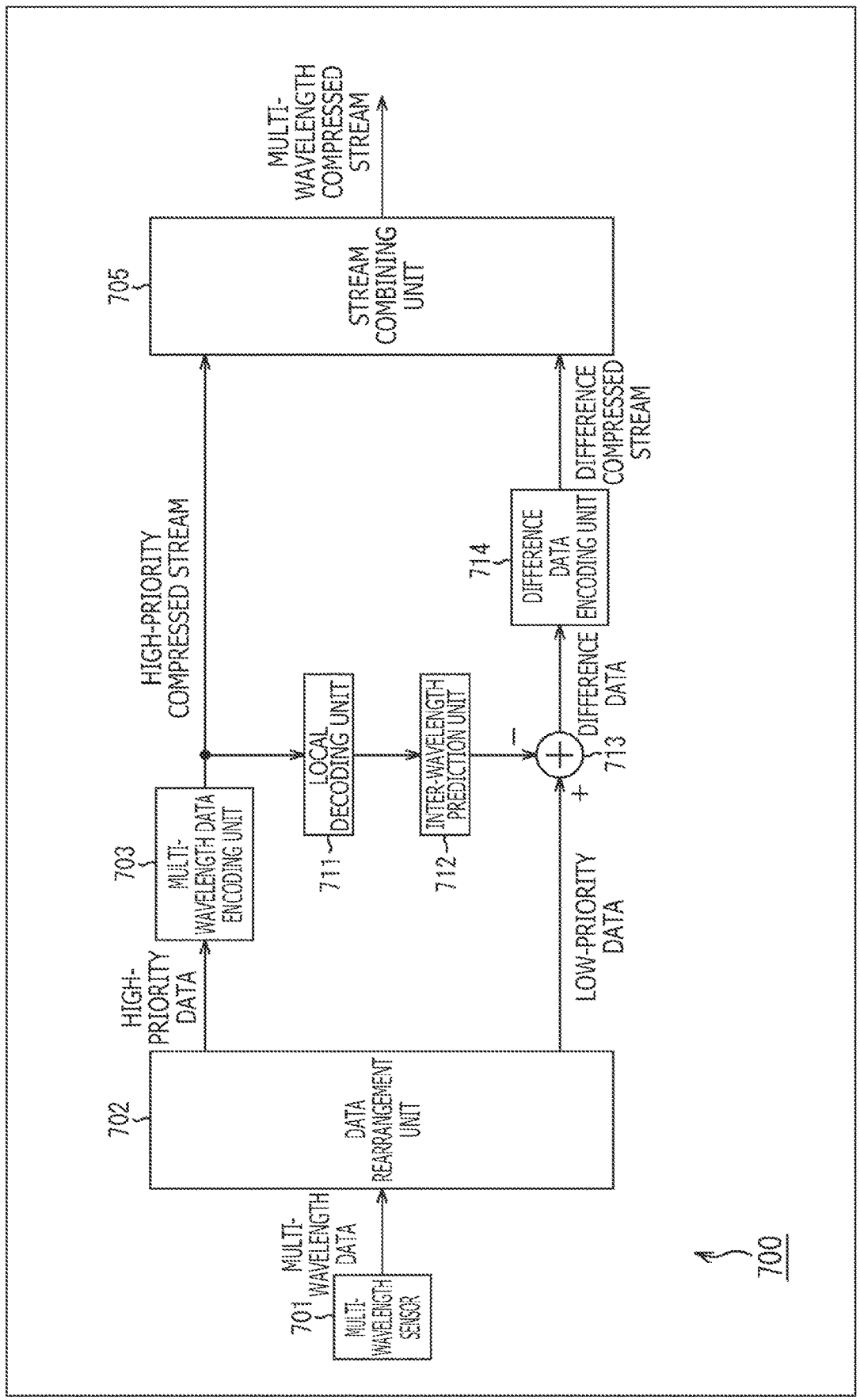
FIG. 86 is a block diagram illustrating a main configuration example of the imaging apparatus.

FIG. 86 is a block diagram illustrating a main configuration example of the imaging apparatus in this case. In the case of the example of FIG. 86, the imaging apparatus 700 includes a local decoding unit 711, an inter-wavelength prediction unit 712, a computation unit 713, and a difference data encoding unit 714 in place of the multi-wavelength data encoding unit 704 compared to the case of FIG. 82.

The local decoding unit 711 decodes the high-priority compressed stream generated by the multi-wavelength data encoding unit 703 to recover the high-priority data. The inter-wavelength prediction unit 712 uses the high-priority data recovered by the local decoding unit 711 to generate predicted data of the low-priority data. The computation unit 713 calculates differences between the low-priority data supplied from the data rearrangement unit 702 and predicted values of the low-priority data supplied from the inter-wavelength prediction unit 712. The difference data encoding unit 714 encodes the differences (difference data) calculated by the computation unit 713 to generate a difference compressed stream. The stream combining unit 705 combines the high-priority compressed stream generated by the multi-wavelength data encoding unit 703 and the difference compressed stream generated by the difference data encoding unit 714 to generate a multi-wavelength compressed stream and outputs the multi-wavelength compressed stream.

<Flow of Imaging Process>

Figure 87:
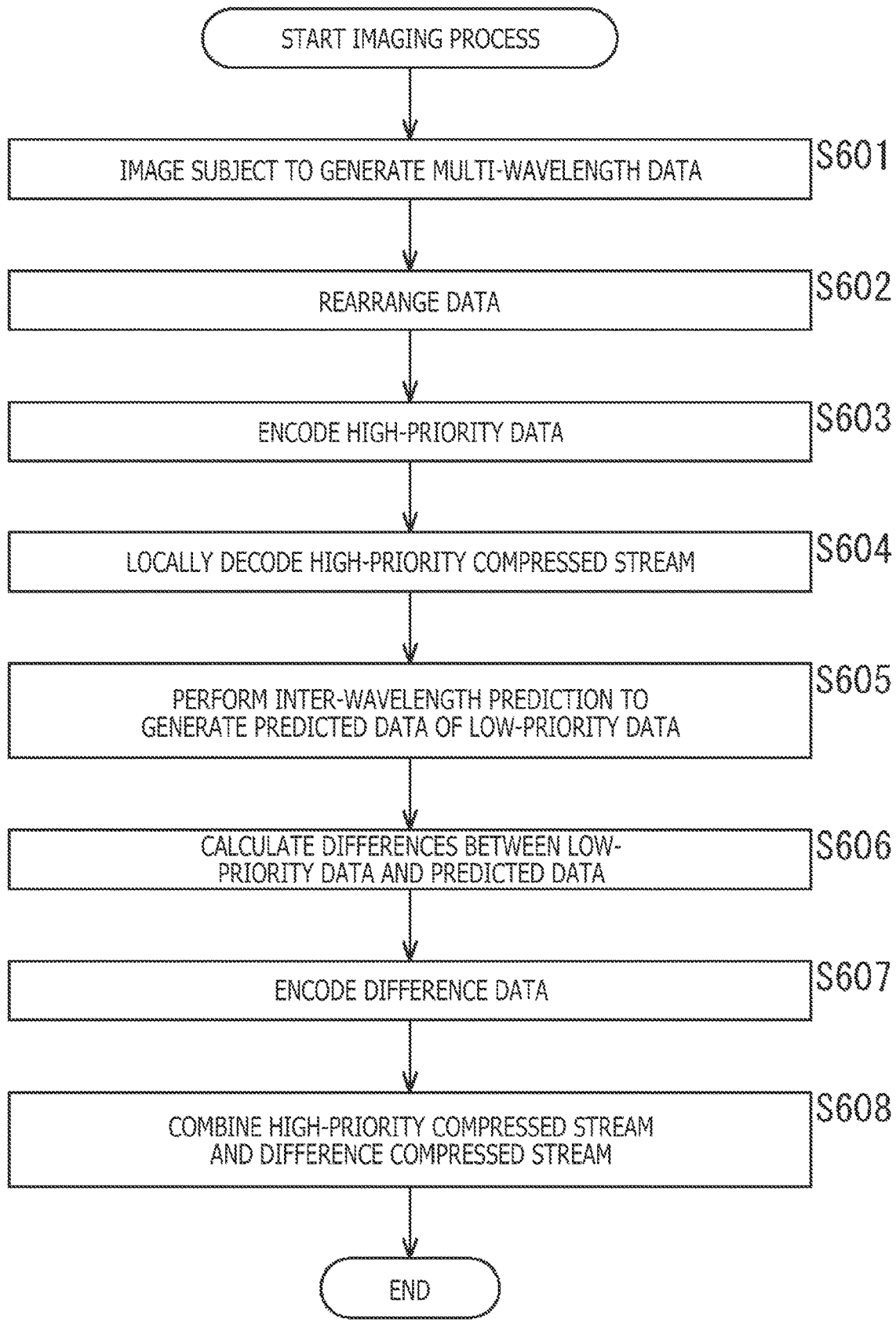
FIG. 87 is a flow chart describing an example of a flow of the imaging process.

An example of a flow of the imaging process in this case will be described with reference to a flow chart of FIG. 87. Once the imaging process is started, the multi-wavelength sensor 701 images the subject to generate the multi-wavelength data in step S601. In step S602, the data rearrangement unit 702 appropriately rearranges the processing order of the single-wavelength data of the multi-wavelength data so that the high-priority data is processed first. In step S603, the multi-wavelength data encoding unit 703 encodes the high-priority data to generate the high-priority compressed stream. In step S604, the local decoding unit 711 locally decodes the high-priority compressed stream generated in step S603 to recover the high-priority data. In step S605, the inter-wavelength prediction unit 712 performs the inter-wavelength prediction and uses the high-priority data recovered in step S604 to generate the predicted data of the low-priority data. In step S606, the computation unit 713 calculates the differences between the low-priority data and the predicted data generated in step S605. In step S607, the difference data encoding unit 714 encodes the difference data generated in step S606. In step S608, the stream combining unit 705 combines the high-priority compressed stream generated in step S603 and the difference compressed stream generated in step S607 to generate the multi-wavelength compressed stream.

This allows to generate multi-wavelength data that can more accurately obtain the information of the high-priority (more important) wavelength band.

<5-4. Imaging Apparatus>

Figure 88:
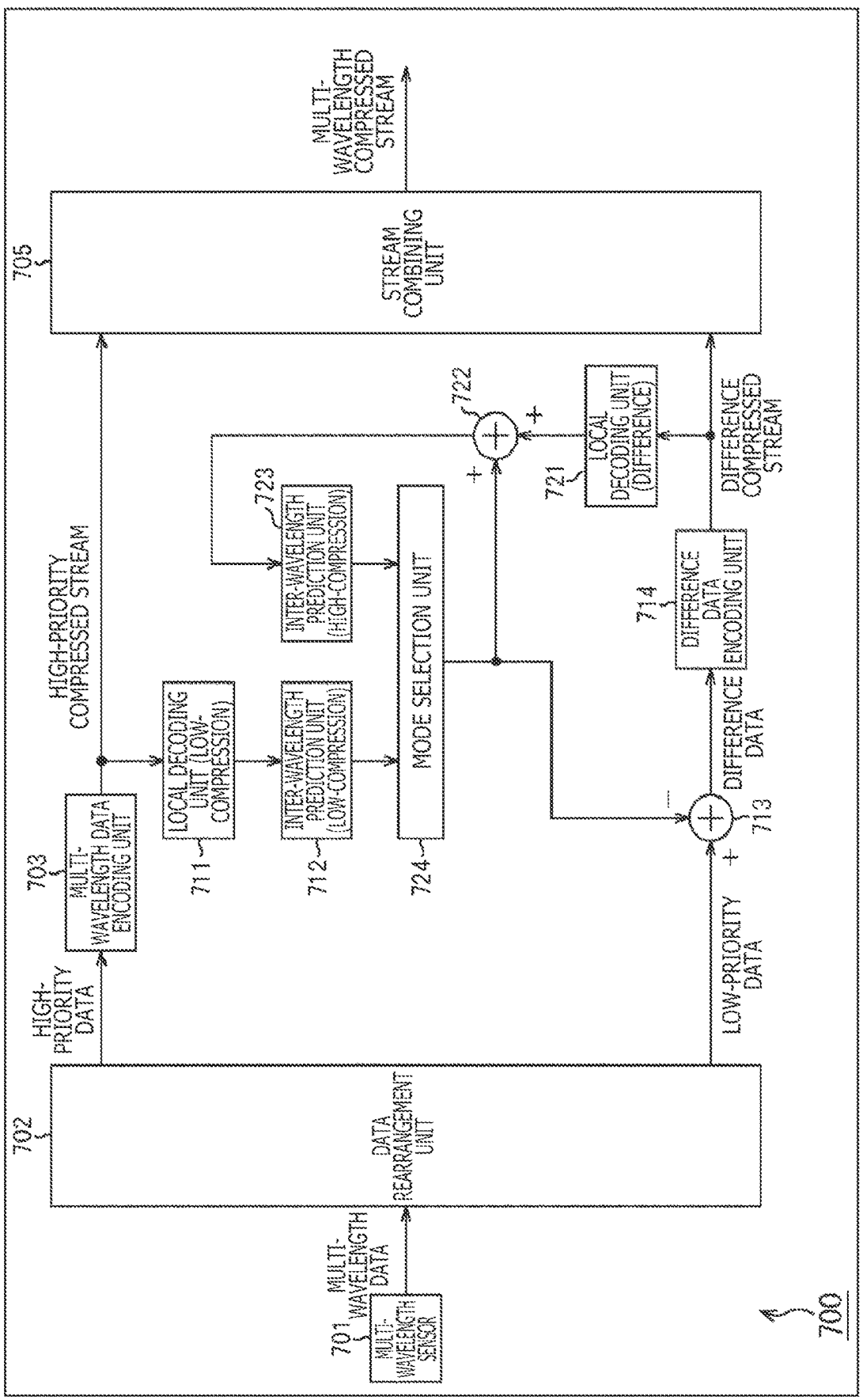
FIG. 88 is a block diagram illustrating a main configuration example of the imaging apparatus.

FIG. 88 is a block diagram illustrating another configuration example of the imaging apparatus in this case. In a case of the example of FIG. 88, the imaging apparatus 700 further includes a local decoding unit 721, a computation unit 722, an inter-wavelength prediction unit 723, and a mode selection unit 724 compared to the case of FIG. 86.

The local decoding unit 721 decodes the difference compressed stream generated by the difference data encoding unit 714 to recover the difference data. The computation unit 722 adds the predicted data supplied from the mode selection unit 724 and the difference data supplied from the local decoding unit 721. That is, the low-priority data is recovered. The inter-wavelength prediction unit 723 uses the low-priority data to generate predicted data of the low-priority data. The mode selection unit 724 selects one of the predicted data generated by the inter-wavelength prediction unit 712 and the predicted data generated by the inter-wavelength prediction unit 723 and supplies the selected predicted data to the computation unit 713 and the computation unit 722.

<Flow of Imaging Process>

Figure 89:
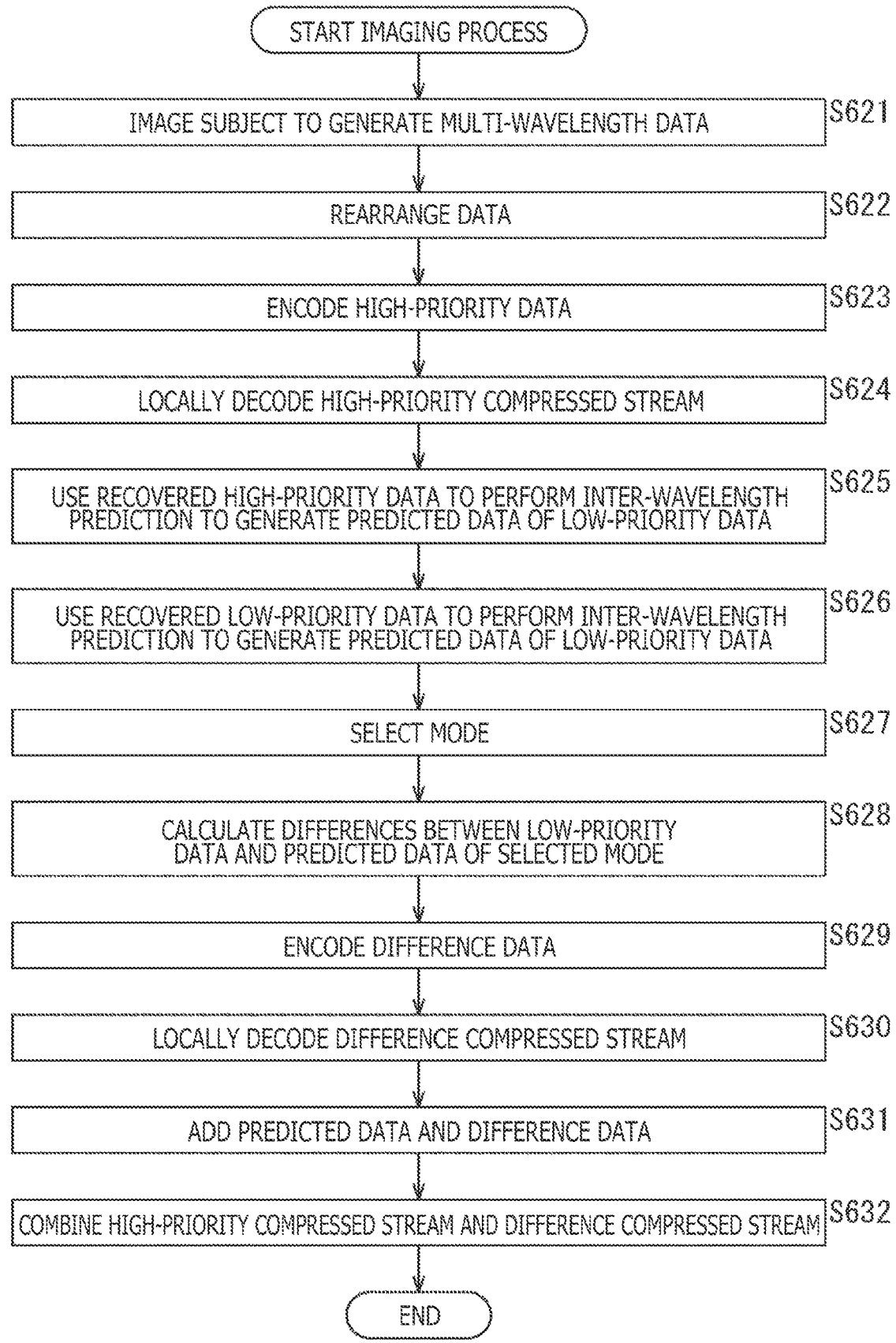
FIG. 89 is a flow chart describing an example of a flow of the imaging process.

An example of a flow of the imaging process in this case will be described with reference to a flow chart of FIG. 89. Once the imaging process is started, the multi-wavelength sensor 701 images the subject to generate the multi-wavelength data in step S621. In step S622, the data rearrangement unit 702 appropriately rearranges the processing order of the single-wavelength data of the multi-wavelength data so that the high-priority data is processed first. In step S623, the multi-wavelength data encoding unit 703 encodes the high-priority data to generate the high-priority compressed stream. In step S624, the local decoding unit 711 locally decodes the high-priority compressed stream generated in step S623 to recover the high-priority data. In step S625, the inter-wavelength prediction unit 712 uses the high-priority data recovered in step S624 to perform the inter-wavelength prediction to generate the predicted data of the low-priority data.

In step S626, the inter-wavelength prediction unit 723 uses the recovered low-priority data to perform the inter-wavelength prediction to generate the predicted data of the low-priority data.

In step S627, the mode selection unit 724 selects the mode of prediction based on, for example, the cost or the like and selects one of the predicted data generated in step S625 and the predicted data generated in step S626.

In step S628, the computation unit 713 calculates the differences between the low-priority data and the predicted data selected in step S627. In step S629, the difference data encoding unit 714 encodes the difference data generated in step S628 to generate the difference compressed stream. In step S630, the local decoding unit 721 locally decodes the difference compressed stream generated in step S629 to recover the difference data. In step S631, the computation unit 722 adds the predicted data selected in step S627 and the difference data recovered in step S630 to recover the low-priority data.

In step S632, the stream combining unit 705 combines the high-priority compressed stream generated in step S623 and the difference compressed stream generated in step S629 to generate the multi-wavelength compressed stream.

This allows to generate multi-wavelength data that can more accurately obtain the information of the high-priority (more important) wavelength band.

6. Additional Remarks

<Wavelength Band of Multi-Wavelength Data>

The multi-wavelength data described in each embodiment can be any image data including four or more wavelength components. That is, the wavelength of each wavelength component of the multi-wavelength data is optional. For example, the multi-wavelength data may or may not include wavelength components of visible light. In addition, the multi-wavelength data may or may not include wavelength components of invisible light.

<Computer>

The series of processes can be executed by hardware or can be executed by software. In the case where the series of processes are executed by software, a program included in the software is installed on a computer. Here, examples of the computer include a computer incorporated into dedicated hardware and a general-purpose personal computer that can execute various functions by installing various programs.

FIG. 90 is a block diagram illustrating a configuration example of the hardware of the computer that uses a program to execute the series of processes.

In a computer 900 illustrated in FIG. 90, a CPU (Central Processing Unit) 901, a ROM (Read Only Memory) 902, and a RAM (Random Access Memory) 903 are connected to each other through a bus 904.

An input-output interface 910 is also connected to the bus 904. An input unit 911, an output unit 912, a storage unit 913, a communication unit 914, and a drive 915 are connected to the input-output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921, such as a magnetic disk, an optical disk, a magneto-optical disk, and a semiconductor memory.

In the computer configured in such a way, the CPU 901 loads, for example, a program stored in the storage unit 913 to the RAM 903 through the input-output interface 910 and the bus 904 to execute the program to thereby execute the series of processes. Data and the like necessary for the CPU 901 to execute various processes are also appropriately stored in the RAM 903.

The program executed by the computer (CPU 901) can be applied by, for example, recording the program in the removable medium 921 as a package medium or the like. In this case, the removable medium 921 can be mounted on the drive 915 to install the program on the storage unit 913 through the input-output interface 910.

Furthermore, the program can also be provided through a wired or wireless transmission medium, such as a local area network, the Internet, and digital satellite broadcasting. In this case, the program can be received by the communication unit 914 and installed on the storage unit 913.

In addition, the program can also be installed in advance on the ROM 902 or the storage unit 913.

<Target of Present Technique>

The present technique can be applied to any image encoding and decoding systems. That is, the specifications of various processes regarding image encoding and decoding are optional as long as the specifications do not contradict the present technique, and the specifications are not limited to the examples.

In addition, although the present technique is applied to the imaging apparatus in the cases described above, the present technique can be applied not only to the imaging apparatus, but also to any apparatuses (electronic devices). For example, the present technique can also be applied to an image processing apparatus or the like that applies image processing to a captured image obtained by high digital gain imaging performed by another apparatus.

In addition, the present technique can also be carried out in any configuration mounted on any apparatus or an apparatus included in a system, such as, for example, a processor (for example, video processor) as system LSI (Large Scale Integration) or the like, a module (for example, video module) using a plurality of processors or the like, a unit (for example, video unit) using a plurality of modules or the like, and a set (for example, video set) provided with other functions in addition to the unit (that is, configuration of part of an apparatus).

Furthermore, the present technique can also be applied to a network system including a plurality of apparatuses. For example, the present technique can also be applied to a cloud service for providing a service regarding images (moving images) to any terminal, such as a computer, an AV (Audio Visual) device, a portable information processing terminal, and an IoT (Internet of Things) device.

Note that the systems, the apparatuses, the processing units, and the like according to the present technique can be used in any fields, such as, for example, traffic, medical care, crime prevention, agriculture, livestock industry, mining industry, cosmetics, factories, home appliances, weather, and natural surveillance. In addition, the usage is also optional.

For example, the present technique can be applied to a system or a device used for providing content to be viewed or the like. In addition, the present technique can be applied to, for example, a system or a device used for traffic, such as for monitoring the traffic conditions and for controlling the automatic driving. Furthermore, the present technique can also be applied to, for example, a system or a device used for security. In addition, the present technique can be applied to, for example, a system or a device used for automatic control of a machine or the like. Furthermore, the present technique can also be applied to, for example, a system or a device used for agriculture or livestock industry. In addition, the present technique can also be applied to, for example, a system or a device that monitors the state of the nature, such as volcanos, forests, and oceans, wild life, and the like. Furthermore, the present technique can also be applied to, for example, a system or a device used for sports.

<Etc.>

Note that the "flag" in the present specification is information for identifying a plurality of states, and the "flag" includes not only information used for identifying two states of true (1) and false (0), but also information that can identify three or more states. Therefore, the number of possible values of the "flag" may be two, such as I/O, or may be three or more. That is, the number of bits of the "flag" is optional, and the "flag" may include 1 bit or a plurality of bits. In addition, as for the identification information (including flag), there can be not only a form of including the identification information in the bitstream, but also a form of including difference information of the identification information with respect to reference information in the bitstream. Therefore, the "flag" and the "identification information" in the present specification include not only the information of the "flag" and the "identification information," but also the difference information with respect to the reference information.

In addition, various types of information (metadata and the like) regarding encoded data (bitstream) may be transmitted or recorded in any form as long as the information is associated with the encoded data. Here, the term "associated" denotes, for example, that one piece of data can be used (can be linked) in processing another piece of data. That is, the data associated with each other may be integrated as one piece of data or may be provided as separate pieces of data. For example, the information associated with the encoded data (image) may be transmitted on a transmission path different from the encoded data (image). In addition, for example, the information associated with the encoded data (image) may be recorded in a recording medium separate from the encoded data (image) (or in a separate recording area of the same recording medium). Note that part of the data may be "associated," instead of the entire data. For example, the image and the information corresponding to the image may be associated with each other in any unit, such as a plurality of frames, one frame, and part of the frame.

Note that the terms, such as "combine," "multiplex," "add," "integrate," "include," "store," "put in," "place into," and "insert," in the present specification denote, for example, grouping of a plurality of things into one thing, such as grouping of encoded data and metadata into one piece of data, and each term denotes one method of "associating" described above.

In addition, the embodiments of the present technique are not limited to the embodiments described above, and various changes can be made without departing from the scope of the present technique.

In addition, for example, the present technique can also be carried out in any configuration included in an apparatus or a system, such as, for example, a processor as system LSI (Large Scale Integration) or the like, a module using a plurality of processors or the like, a unit using a plurality of modules or the like, and a set provided with other functions in addition to the unit (that is, configuration of part of an apparatus).

Note that in the present specification, the system denotes a set of a plurality of constituent elements (apparatuses, modules (components), and the like), and whether or not all of the constituent elements are in the same housing does not matter. Therefore, a plurality of apparatuses stored in separate housings and connected through a network and one apparatus storing a plurality of modules in one housing are both systems.

In addition, for example, the configuration of one apparatus (or processing unit) described above may be divided to provide a plurality of apparatuses (or processing units). Conversely, the configurations of a plurality of apparatuses (or processing units) described above may be integrated to provide one apparatus (or processing unit). In addition, configurations other than the configurations described above may be obviously added to the configuration of each apparatus (or each processing unit). Furthermore, part of the configuration of an apparatus (or processing unit) may be included in the configuration of another apparatus (or another processing unit) as long as the configuration and the operation of the entire system are substantially the same.

In addition, the present technique can be provided as, for example, cloud computing in which a plurality of apparatuses share one function and cooperate to execute a process through a network.

In addition, the program described above can be executed by, for example, any apparatus. In that case, the apparatus can have necessary functions (such as functional blocks) and obtain necessary information.

In addition, for example, one apparatus can execute each step described in the flow charts, or a plurality of apparatuses can take charge and execute each step. Furthermore, in the case where one step includes a plurality of processes, one apparatus can execute the plurality of processes included in one step, or a plurality of apparatuses can take charge and execute the processes. In other words, a plurality of processes included in one step can also be executed as a process of a plurality of steps. Conversely, processes described as a plurality of steps can also be integrated into one step and executed.

Note that in the program executed by the computer, the processes of the steps describing the program may be executed in chronological order described in the present specification or may be executed in parallel or executed separately at necessary timing such as when the processes are invoked. That is, the processes of the steps may be executed in a different order from the order described above as long as there is no contradiction. Furthermore, the processes of the steps describing the program may be executed in parallel with processes of other programs or may be executed in combination with processes of other programs.

Note that the plurality of present techniques described in the present specification can be independently and separately carried out as long as there is no contradiction. Obviously, a plurality of any present techniques can be combined and carried out. For example, part or all of the present technique described in one of the embodiments can also be carried out in combination with part or all of the present technique described in another embodiment. In addition, part or all of any present technique described above can also be carried out in combination with another technique not described above.

Note that the present technique can also be configured as follows.

(1)

An image processing apparatus including:

an imaging unit that images a subject to generate multi-wavelength data that is image data including four or more wavelength components;

an encoding unit that encodes the multi-wavelength data generated by the imaging unit to generate encoded data of the multi-wavelength data; and a transmission unit that transmits the encoded data generated by the encoding unit.

(2)

The image processing apparatus according to (1), in which the encoding unit independently encodes the multi-wavelength data on the basis of the wavelength components.

(3)

The image processing apparatus according to (2), in which the encoding unit quantizes each of the wavelength components, calculates differences between the quantized wavelength components, and applies variable-length encoding to the differences.

(4)

The image processing apparatus according to any one of (1) to (3), further including:

an encoding control unit that controls whether or not to encode the multi-wavelength data according to a transmission rate of the transmission unit, in which in a case where the encoding control unit controls to perform the encoding, the encoding unit encodes the multi-wavelength data, and the transmission unit transmits the encoded data generated by the encoding unit, and in a case where the encoding control unit controls not to perform the encoding, the transmission unit transmits the multi-wavelength data generated by the imaging unit.

(5)

The image processing apparatus according to any one of (1) to (4), further including:

an encoding control unit that controls a compression rate of the encoding of the multi-wavelength data according to the transmission rate of the transmission unit, in which the encoding unit encodes the multi-wavelength data at the compression rate controlled by the encoding control unit.

(6)

The image processing apparatus according to any one of (1) to (5), in which the encoding unit encodes the multi-wavelength data at a plurality of compression rates, and the transmission unit transmits each piece of the encoded data with each of the compression rates generated by the encoding unit.

(7)

The image processing apparatus according to (6), in which the transmission unit prioritizes and transmits the encoded data with higher compression rates.

(8)

The image processing apparatus according to any one of (1) to (7), further including:

a noise reduction processing unit that applies a noise reduction process to the multi-wavelength data generated by the imaging unit, in which the encoding unit encodes the multi-wavelength data subjected to the noise reduction process by the noise reduction processing unit.

(9)

The image processing apparatus according to (8), in which the noise reduction processing unit independently executes the noise reduction process on the basis of the wavelength components of the multi-wavelength data.

(10)

An image processing method including:

imaging a subject to generate multi-wavelength data that is image data including four or more wavelength components;

encoding the generated multi-wavelength data to generate encoded data of the multi-wavelength data; and transmitting the generated encoded data.

(11)

An image processing apparatus including:

an imaging unit that images a subject to generate image data including a plurality of wavelength components; and an encoding unit that uses quantized values on the basis of the wavelength components to quantize and encode the image data generated by the imaging unit.

(12)

The image processing apparatus according to (11), in which the encoding unit uses a quantized value corresponding to a white balance adjustment gain for each wavelength component of the image data to quantize and encode each wavelength component of the image data.

(13)

The image processing apparatus according to (11) or (12), further including:

a light source color measurement unit that measures light source color, in which the encoding unit uses a quantized value corresponding to a gain for each wavelength component of the image data set based on the light source color measured by the light source color measurement unit to quantize and encode each wavelength component of the image data.

(14)

The image processing apparatus according to any one of (11) to (13), in which the image data is multi-wavelength data that is image data including four or more wavelength components.

(15)

An image processing method including:

imaging a subject to generate image data including a plurality of wavelength components; and using quantized values on the basis of the wavelength components to quantize and encode the generated image data.

(16)

An image processing apparatus including:

an imaging unit that images a subject to generate multi-wavelength data that is image data including four or more wavelength components;

a quantization unit that quantizes the multi-wavelength data generated by the imaging unit so that only a predetermined wavelength component is quantized by using a quantized value smaller than in other wavelength components; and an encoding unit that encodes the multi-wavelength data quantized by the quantization unit to generate encoded data of the multi-wavelength data.

(17)

The image processing apparatus according to (16), in which the predetermined wavelength component includes a red edge.

(18)

The image processing apparatus according to (16) or (17), further including:

a rearrangement unit that rearranges data of each wavelength component of the multi-wavelength data.

(19)

The image processing apparatus according to (18), in which the encoding unit encodes the multi-wavelength data so that a code length becomes fixed.

(20)

An image processing method including:

imaging a subject to generate multi-wavelength data that is image data including four or more wavelength components;

quantizing the generated multi-wavelength data so that only a predetermined wavelength component is quantized by using a quantized value smaller than in other wavelength components; and encoding the quantized multi-wavelength data to generate encoded data of the multi-wavelength data.

REFERENCE SIGNS LIST

100 Image processing system, 101 Imaging apparatus, 102 Information processing apparatus, 111 Multi-wavelength sensor, 112 Multi-wavelength data encoding unit, 113 Transmission unit, 121 Reception unit, 122 storage unit, 123 Multi-wavelength data decoding unit, 124 Data analysis unit, 131 Wavelength separation unit, 132 Single-wavelength data encoding unit, 133 Stream combining unit, 141 Quantization unit, 142 Delay buffer, 143 Computation unit, 144 VLC encoder, 151 Stream separation unit, 152 Single-wavelength data decoding unit, 153 Wavelength combining unit, 161 VLC decoder, 162 Computation unit, 163 Delay buffer, 164 Inverse quantization unit, 171 Format selection unit, 181 Format determination unit, 191 Quantized value setting unit, 201 Down-sampling filter, 202 Up-sampling filter, 211 Writing unit, 212 Storage device, 213 Reading unit, 221 Transmission unit, 222 Reception unit, 223 Control unit, 231 Combining unit, 251 Noise reduction filter, 261 Wavelength separation unit, 262 2D filter, 263 Wavelength combining unit, 271 Multi-wavelength data encoding unit, 272 Storage unit, 273 Multi-wavelength data decoding unit, 281 Storage unit, 282 Multi-wavelength data encoding unit, 283 Storage unit, 284 Multi-wavelength data decoding unit, 291 Multi-wavelength data encoding unit, 292 Storage unit, 293 Multi-wavelength data decoding unit, 294 Resampling unit, 295 Multi-wavelength data encoding unit, 296 Storage unit, 297 Multi-wavelength data decoding unit, 311 Wavelength separation unit, 312 Down-sampling filter, 313 Wavelength combining unit, 321 Wavelength separation unit, 322 Low-pass filter, 323 Wavelength combining unit, 331 Wavelength separation unit, 332 LSB mask processing unit, 333 Wavelength combining unit, 400 Imaging apparatus, 401 Bayer sensor, 402 Quantization unit, 403 White balance adjustment unit, 404 Development processing unit, 411 Gain-adjustment Bayer data encoding unit, 412 Gain-adjustment Bayer data decoding unit, 421 Wavelength separation unit, 422 R gain adjustment unit, 423 G gain adjustment unit, 424 B gain adjustment unit, 425 Wavelength combining unit, 426 Bayer data encoding unit, 431 Bayer data decoding unit, 432 Wavelength separation unit, 433 Inverse R gain adjustment unit, 434 Inverse G gain adjustment unit, 435 Inverse B gain adjustment unit, 436 Wavelength combining unit, 441 Light source color measurement sensor, 442 Light source color measurement unit, 451 User setting input unit, 500 Imaging apparatus, 501 Multi-wavelength sensor, 502 Quantization unit, 503 White balance adjustment unit, 504 Development processing unit, 511 Gain-adjustment multi-wavelength data encoding unit, 512 Gain-adjustment multi-wavelength data decoding unit, 521 Wavelength separation unit, 522 Gain adjustment unit, 523 Wavelength combining unit, 524 Multi-wavelength data encoding unit, 531 Multi-wavelength data decoding unit, 532 Wavelength separation unit, 533 Inverse gain adjustment unit, 534 Wavelength combining unit, 541 Light source color measurement sensor, 542 Light source color measurement unit, 551 User setting input unit, 600 Imaging apparatus, 601 Multi-wavelength sensor, 602 Multi-wavelength data quantization unit, 603 Multi-wavelength data encoding unit, 611 Wavelength separation unit, 612 Protected area quantization unit, 613 Outside-of-protected-area quantization unit, 614 Wavelength combining unit, 700 Imaging apparatus, 701 Multi-wavelength sensor, 702 Data rearrangement unit, 703 Multi-wavelength data encoding unit, 704 Multi-wavelength data encoding unit, 705 Stream combining unit, 711 Local decoding unit, 712 Inter-wavelength prediction unit, 713 Computation unit, 714 Difference data encoding unit, 721 Local decoding unit, 722 Computation unit, 723 Inter-wavelength prediction unit, 724 Mode selection unit

The invention claimed is:

1. An image processing apparatus, comprising:
an imaging unit configured to image a subject to generate multi-wavelength data, wherein the generated multi-wavelength data is image data that includes at least four wavelength components;
an encoding unit;
a transmission unit; and
an encoding control unit configured to determine, based on a transmission rate of the transmission unit, whether to encode the generated multi-wavelength data, wherein
in a case where the determination is to encode the generated multi-wavelength data,
the encoding unit is configured to encode the generated multi-wavelength data to generate encoded data of the generated multi-wavelength data, and
the transmission unit is configured to transmit the generated encoded data, and
in a case where the determination is not to encode the generated multi-wavelength data, the transmission unit is further configured to transmit the multi-wavelength data generated by the imaging unit.

2. The image processing apparatus according to claim 1, wherein the encoding unit is further configured to independently encode the multi-wavelength data based on the at least four wavelength components.

3. The image processing apparatus according to claim 2, wherein the encoding unit is further configured to:
quantize each wavelength component of the at least four wavelength components;
calculate differences between the quantized wavelength components; and
apply variable-length encoding to the differences.

4. The image processing apparatus according to claim 1, wherein
the encoding control unit is further configured to control a compression rate of encoding of the multi-wavelength data based on the transmission rate of the transmission unit, and
the encoding unit is further configured to encode the multi-wavelength data at the compression rate.

5. The image processing apparatus according to claim 1, wherein
the encoding unit is further configured to encode the multi-wavelength data at a plurality of compression rates to generate a plurality of pieces of encoded data,
the transmission unit is further configured to transmit each piece of the generated plurality of pieces of encoded data,
each piece of the generated plurality of pieces of encoded data is associated with a respective compression rate of the plurality of compression rates, and
the generated plurality of pieces of encoded data includes the generated encoded data.

6. The image processing apparatus according to claim 5, wherein the transmission unit is further configured to:
prioritize a first piece of encoded data of the generated plurality of pieces of encoded data over a second piece of encoded data of the generated plurality of pieces of encoded data, wherein a compression rate of the plurality of compression rates associated with the first piece of encoded data is higher than a compression rate of the plurality of compression rates associated with the second piece of encoded data; and
transmit the prioritized first piece of encoded data.

7. The image processing apparatus according to claim 1, further comprising a noise reduction processing unit configured to apply a noise reduction process to the generated multi-wavelength data, wherein the encoding unit is further configured to encode the multi-wavelength data subjected to the noise reduction process.

8. The image processing apparatus according to claim 7, wherein the noise reduction processing unit is further configured to independently execute the noise reduction process based on the at least four wavelength components of the multi-wavelength data.

9. An image processing method, comprising:
imaging a subject to generate multi-wavelength data, wherein the generated multi-wavelength data is image data that includes at least four wavelength components; and
determining, based on a transmission rate of a transmission unit, whether to encode the generated multi-wavelength data, wherein
in a case where the determination is to encode the generated multi-wavelength data,
encoding the generated multi-wavelength data to generate encoded data of the generated multi-wavelength data; and
transmitting the generated encoded data, and
in a case where the determination is not to encode the generated multi-wavelength data, transmitting the generated multi-wavelength data.

10. An image processing apparatus, comprising:
an imaging unit configured to image a subject to generate image data that includes a plurality of wavelength components; and
an encoding unit configured to:
quantize the generated image data based on a quantized value corresponding to a white balance adjustment gain of each wavelength component of the plurality of wavelength components of the image data; and
encode the quantized image data.

11. The image processing apparatus according to claim 10, further comprising a light source color measurement unit configured to:
measure light source color; and
set, based on the measured light source color, a gain for each wavelength component of the plurality of wavelength components, wherein the encoding unit is further configured to:
quantize each wavelength component of the plurality of wavelength components, based on a quantized value corresponding to the gain of each wavelength component of the plurality of wavelength components; and
encode each quantized wavelength component of the quantized plurality of wavelength components.

12. The image processing apparatus according to claim 10, wherein the image data is multi-wavelength data that includes at least four wavelength components.

13. An image processing method, comprising:
imaging a subject to generate image data that includes a plurality of wavelength components;
quantizing the generated image data based on a quantized value corresponding to a white balance adjustment gain of each wavelength component of the plurality of wavelength components of the image data; and
encoding the quantized image data.

14. An image processing apparatus, comprising:
an imaging unit configured to image a subject to generate multi-wavelength data, wherein the generated multi-wavelength data is image data that includes at least four wavelength components;
a quantization unit configured to quantize the generated multi-wavelength data so that only a specific wavelength component of the at least four wavelength components is quantized by using a quantized value smaller than a quantized value of each wavelength component of a set of wavelength components of the at least four wavelength components; and
an encoding unit configured to encode the quantized multi-wavelength data to generate encoded data of the generated multi-wavelength data.

15. The image processing apparatus according to claim 14, wherein the specific wavelength component includes a red edge.

16. The image processing apparatus according to claim 14, further comprising a rearrangement unit configured to rearrange data of each wavelength component of the at least four wavelength components of the multi-wavelength data.

17. The image processing apparatus according to claim 16, wherein the encoding unit is further configured to encode the multi-wavelength data so that a code length becomes fixed.

18. An image processing method, comprising:
imaging a subject to generate multi-wavelength data, wherein the generated multi-wavelength data is image data that includes at least four wavelength components;
quantizing the generated multi-wavelength data so that only a specific wavelength component of the at least four wavelength components is quantized by using a quantized value smaller than a quantized value of each wavelength component of a set of wavelength components of the at least four wavelength components; and
encoding the quantized multi-wavelength data to generate encoded data of the generated multi-wavelength data.

* * * * *